US011722776B2

(12) United States Patent
Besley et al.

(10) Patent No.: US 11,722,776 B2
(45) Date of Patent: Aug. 8, 2023

(54) HYPER CAMERA WITH SHARED MIRROR

(71) Applicant: Nearmap Australia Pty Ltd., Barangaroo (AU)

(72) Inventors: James Austin Besley, Killara (AU); Mark Harold Tarlinton, Marrickville (AU); David Arnold Bleads, Tennyson (AU)

(73) Assignee: NEARMAP AUSTRALIA PTY LTD., Barangaroo (AU)

( * ) Notice: Subject to any disclaimer, the term of this patent is extended or adjusted under 35 U.S.C. 154(b) by 0 days.

(21) Appl. No.: 17/362,246

(22) Filed: Jun. 29, 2021

(65) Prior Publication Data
US 2022/0417430 A1 Dec. 29, 2022

Related U.S. Application Data

(63) Continuation of application No. PCT/IB2021/039333, filed on Jun. 28, 2021.

(51) Int. Cl.
*H04N 23/698* (2023.01)
*G03B 15/00* (2021.01)
(Continued)

(52) U.S. Cl.
CPC ........... *H04N 23/698* (2023.01); *B64D 47/08* (2013.01); *G01C 11/025* (2013.01);
(Continued)

(58) Field of Classification Search
CPC ........... H04N 5/23238; H04N 5/23296; G02B 26/105; G03B 15/006; B64C 39/024; B64C 2201/127; G01C 11/02
(Continued)

(56) References Cited

U.S. PATENT DOCUMENTS 9,046,759 B1 6/2015 Tarlinton et al.
9,052,571 B1 6/2015 Lapstun et al.
(Continued)

FOREIGN PATENT DOCUMENTS

AU 2015330956 B2 4/2016
WO 2020/237288 A1 12/2020

OTHER PUBLICATIONS

International Search Report and Written Opinion of the International Searching Authority dated Oct. 14, 2021 in PCT/IB2021/000430, citing documents AA-AQ therein, 17 pages.

*Primary Examiner* — Marnie A Matt
(74) *Attorney, Agent, or Firm* — Xsensus LLP

(57) ABSTRACT

An imaging system can include a first and second camera configured to capture first and second sets of oblique images along first and second scan paths, respectively, on an object area. A drive is coupled to a scanning mirror structure, having at least one mirror surface, and configured to rotate the structure about a scan axis based on a scan angle. The first and second cameras each have an optical axis set at an oblique angle to the scan axis and include a respective lens to focus first and second imaging beams reflected from the mirror surface to an image sensor located in each of the cameras. The first and second imaging beams captured by their respective cameras can vary according to the scan angle. Each of the image sensors captures respective sets of oblique images by sampling the imaging beams at first and second values of the scan angle.

40 Claims, 67 Drawing Sheets

(51) Int. Cl.

| | | |
|---|---|---|
| *G02B 26/10* | (2006.01) | |
| *H04N 23/69* | (2023.01) | |
| *H04N 23/45* | (2023.01) | |
| *H04N 23/55* | (2023.01) | |
| *B64D 47/08* | (2006.01) | |
| *G02B 7/182* | (2021.01) | |
| *G01C 11/02* | (2006.01) | |
| *G06T 17/00* | (2006.01) | |
| *G06T 7/11* | (2017.01) | |
| *H04N 23/51* | (2023.01) | |
| *H04N 23/75* | (2023.01) | |
| *G06T 5/50* | (2006.01) | |
| *B64C 39/02* | (2023.01) | |
| *B64U 101/30* | (2023.01) | |

(52) U.S. Cl.
CPC ......... *G02B 7/1821* (2013.01); *G02B 26/101* (2013.01); *G02B 26/105* (2013.01); *G03B 15/006* (2013.01); *G06T 5/50* (2013.01); *G06T 7/11* (2017.01); *G06T 17/00* (2013.01); *H04N 23/45* (2023.01); *H04N 23/51* (2023.01); *H04N 23/55* (2023.01); *H04N 23/69* (2023.01); *H04N 23/75* (2023.01); *B64C 39/024* (2013.01); *B64U 2101/30* (2023.01); *G01C 11/02* (2013.01); *G06T 2207/20132* (2013.01); *G06T 2207/20221* (2013.01); *G06T 2207/30252* (2013.01)

(58) Field of Classification Search
USPC .......................................................... 348/144
See application file for complete search history.

(56) References Cited

U.S. PATENT DOCUMENTS

| | | | |
|---|---|---|---|
| 9,185,290 B1 | 11/2015 | Lapstun et al. | |
| 9,188,838 B1 | 11/2015 | Tarlinton et al. | |
| 9,440,750 B2 | 9/2016 | Lapstun et al. | |
| 9,462,185 B2 | 10/2016 | Lapstun et al. | |
| 9,641,736 B2 | 5/2017 | Lapstun et al. | |
| 9,706,117 B2 | 7/2017 | Lapstun et al. | |
| 10,846,558 B2 | 11/2020 | Lapstun | |
| 10,848,654 B2 | 11/2020 | Lapstun | |
| 2009/0188980 A1* | 7/2009 | Bobba | G06K 7/10623 235/462.39 |
| 2010/0277587 A1* | 11/2010 | Pechatnikov | H04N 13/221 348/E5.091 |
| 2014/0104378 A1* | 4/2014 | Kauff | G02B 27/143 348/38 |
| 2014/0362177 A1 | 12/2014 | Dunn | |
| 2015/0367958 A1 | 12/2015 | Lapstun et al. | |
| 2015/0373267 A1 | 12/2015 | Lapstun et al. | |
| 2016/0057345 A1 | 2/2016 | Lapstun et al. | |
| 2016/0150142 A1 | 5/2016 | Lapstun et al. | |
| 2017/0195569 A1 | 7/2017 | Lapstun et al. | |
| 2017/0244880 A1* | 8/2017 | Cope | G01C 11/02 |
| 2020/0160012 A1* | 5/2020 | Nunnink | G06K 7/10722 |
| 2020/0191568 A1* | 6/2020 | Lapstun | H04N 13/221 |
| 2020/0193214 A1* | 6/2020 | Lapstun | F16M 13/02 |
| 2020/0195813 A1* | 6/2020 | Lapstun | H04N 5/2259 |
| 2021/0049402 A1 | 2/2021 | Lapstun | |
| 2021/0051311 A1* | 2/2021 | Lapstun | H04N 5/2254 |
| 2021/0096359 A1* | 4/2021 | Klam | G01S 17/89 |
| 2021/0203853 A1 | 7/2021 | Lapstun | |
| 2021/0400193 A1* | 12/2021 | Ma | H04N 5/23229 |
| 2022/0234753 A1* | 7/2022 | Byrne | G03B 15/006 |

* cited by examiner

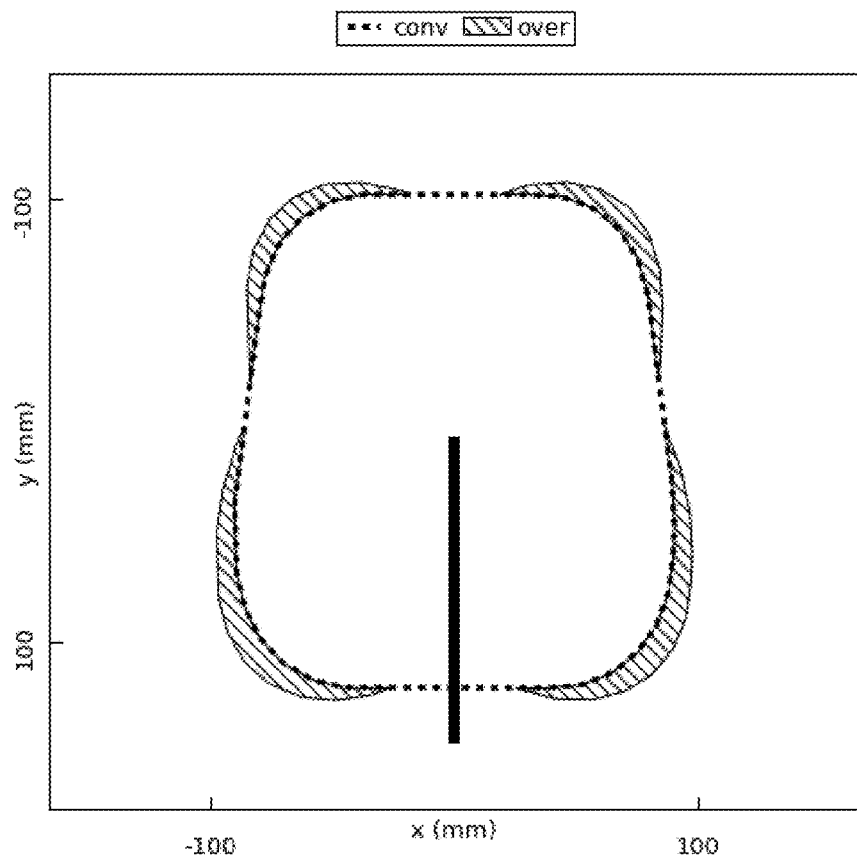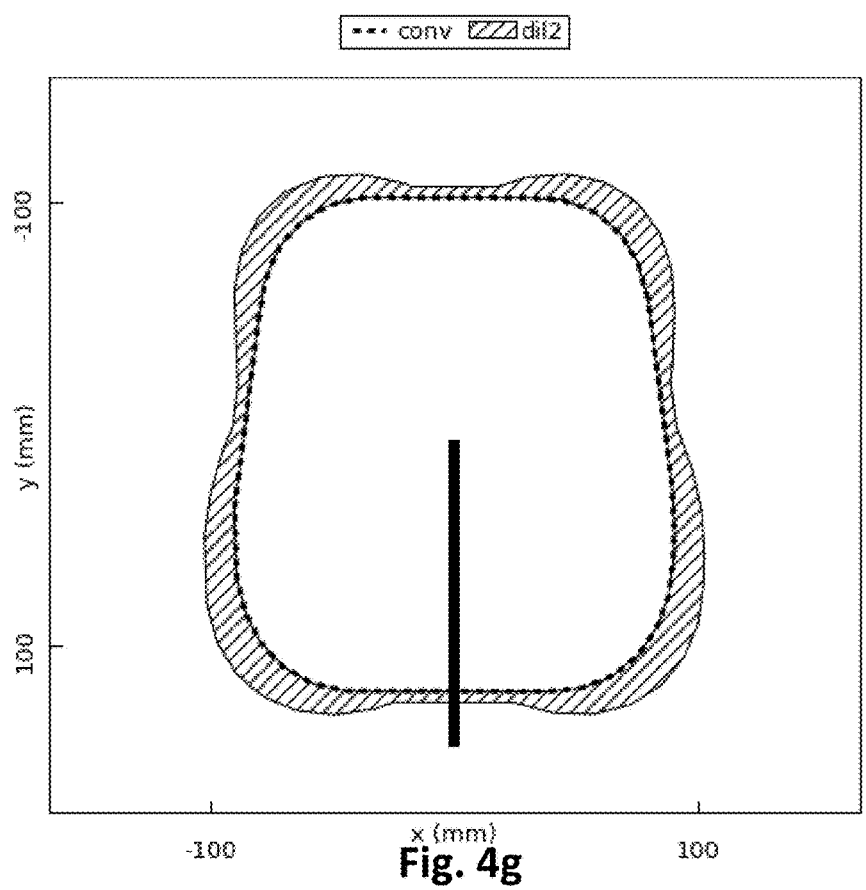
Fig. 4g

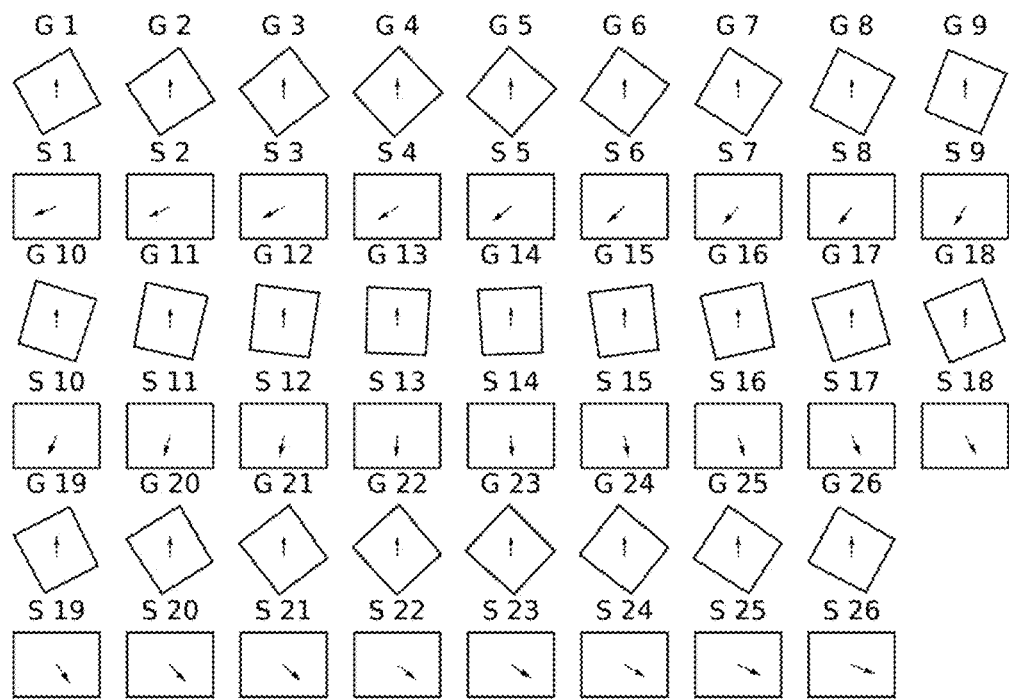
Fig. 18a
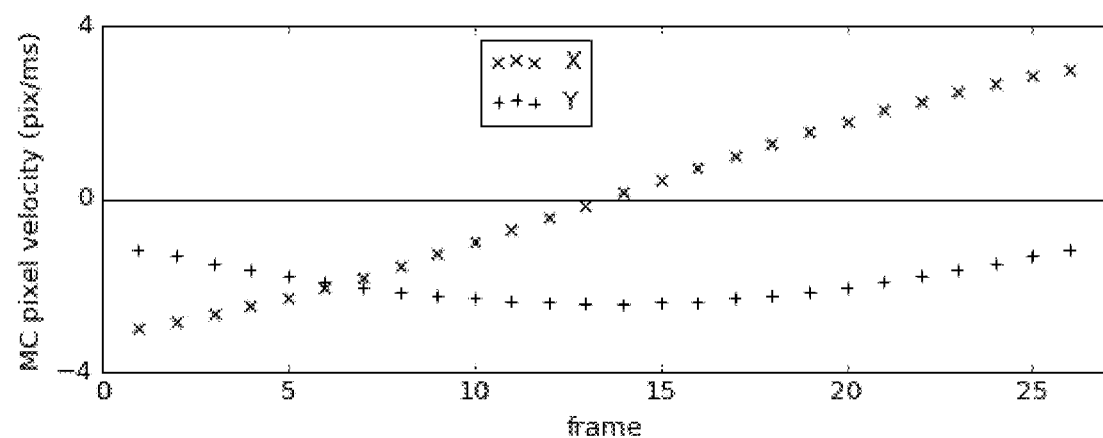
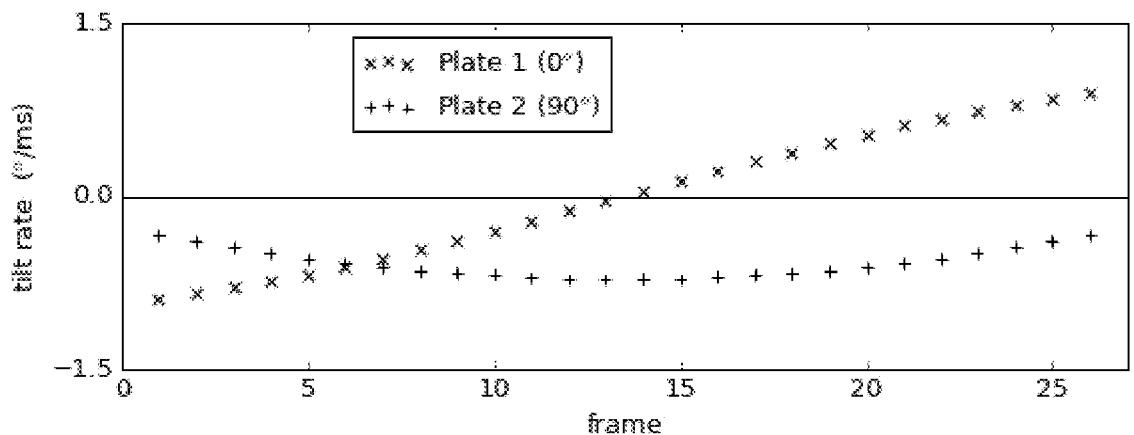
Fig. 18b

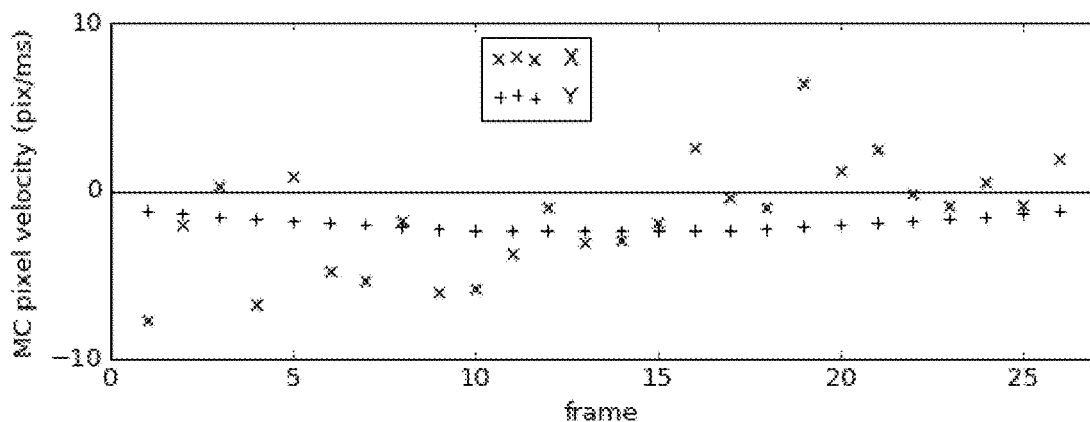
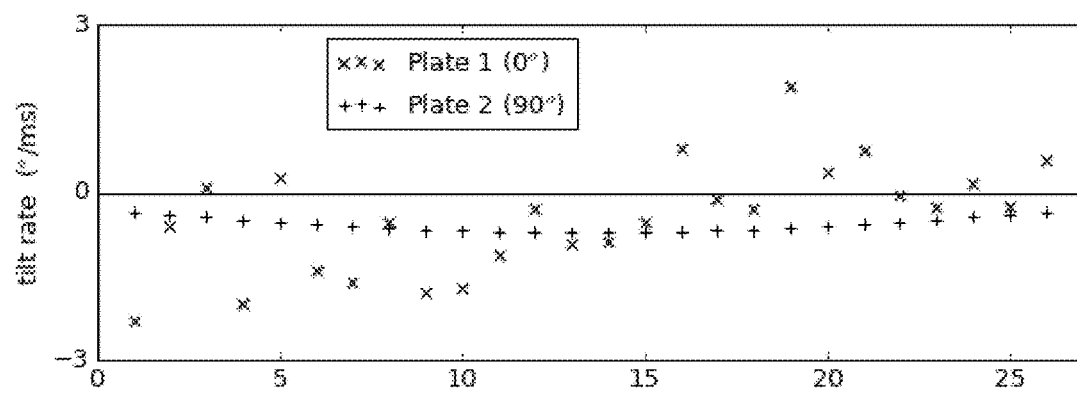
Fig. 22a
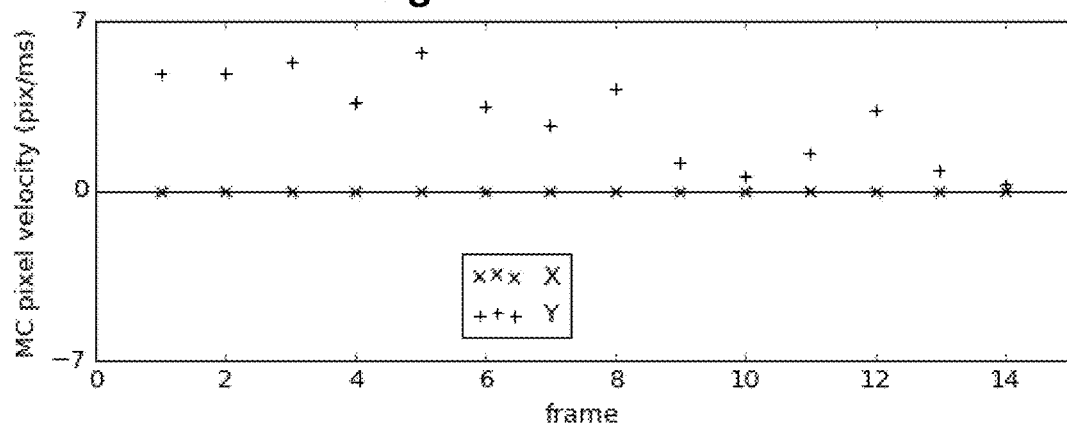
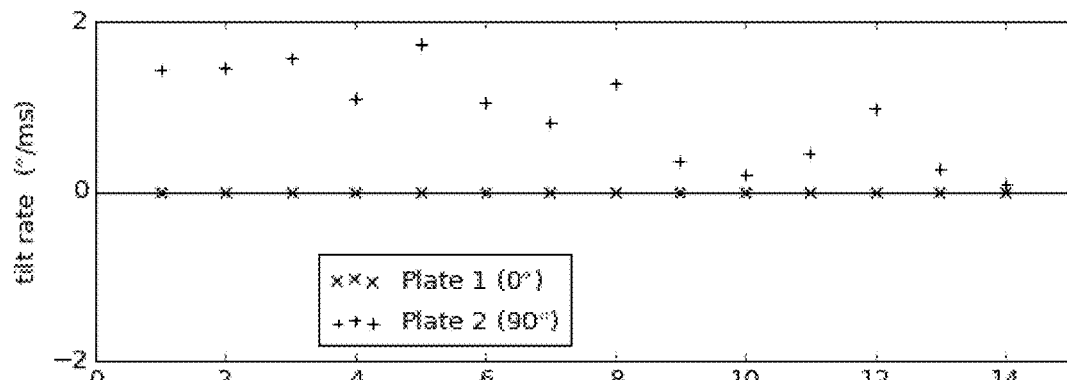
Fig. 22b top view
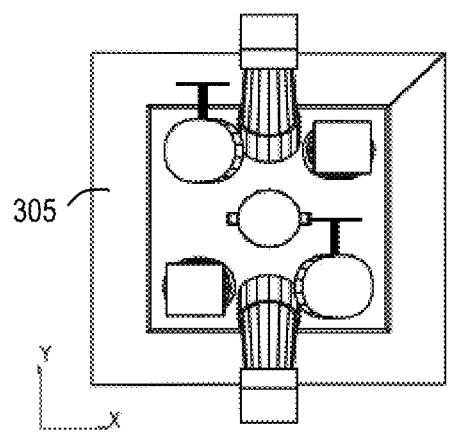
bottom view
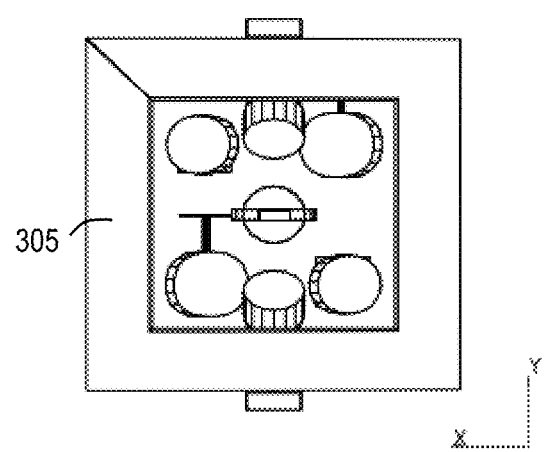
Fig. 25 top view
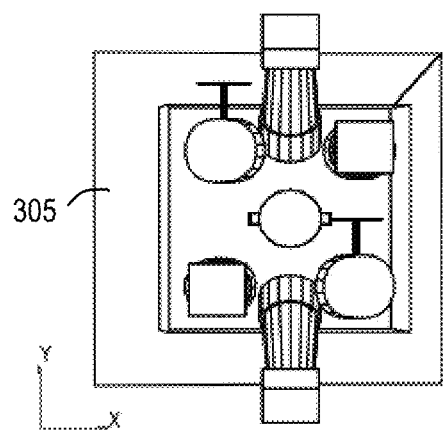
bottom view
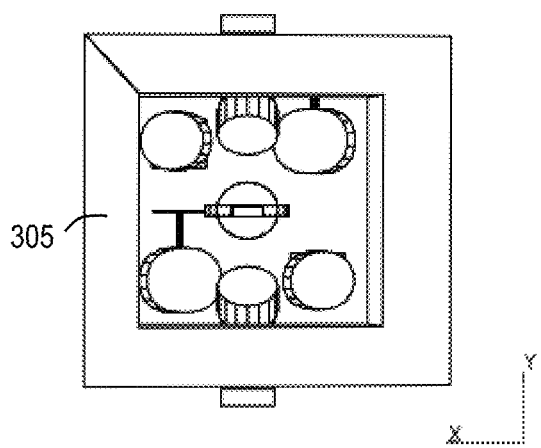
Fig. 26 top view
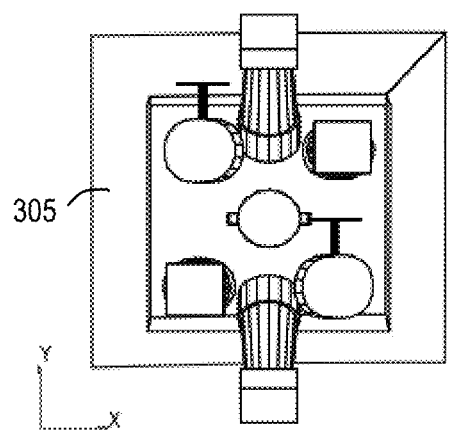
bottom view
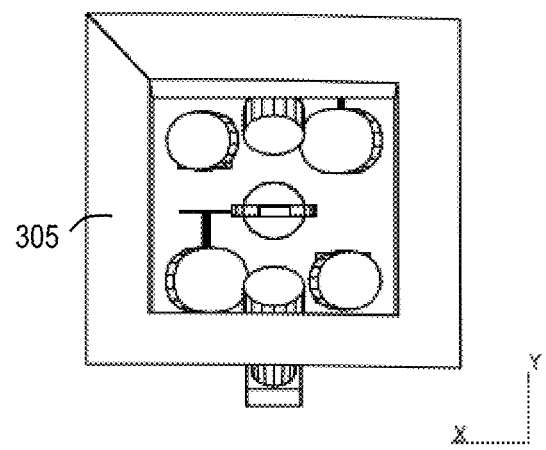
Fig. 27 top view
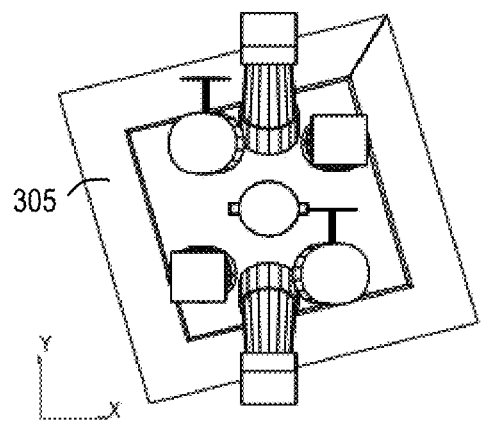
bottom view
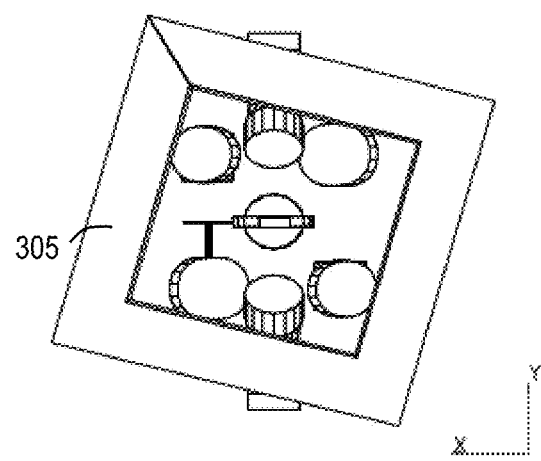
Fig. 28 top view
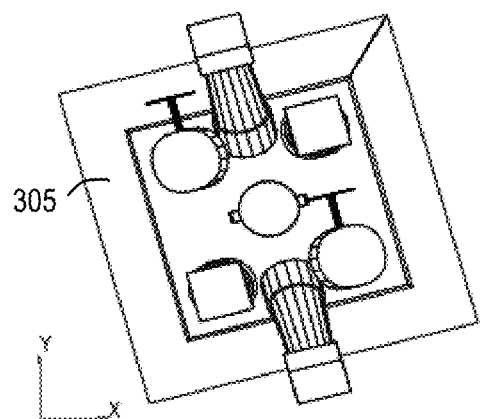
bottom view
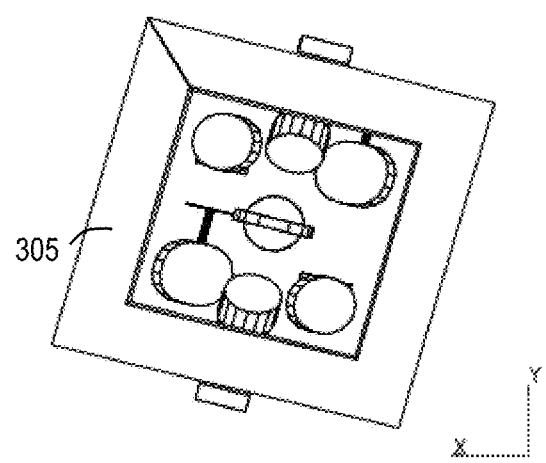
Fig. 29 top view
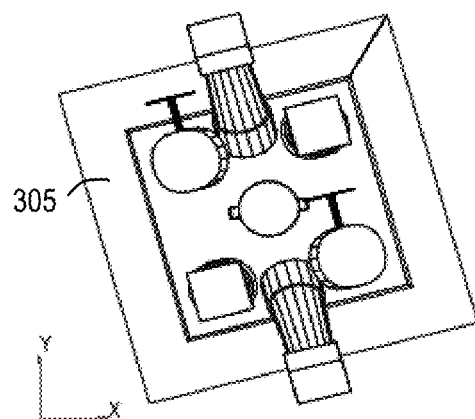
bottom view
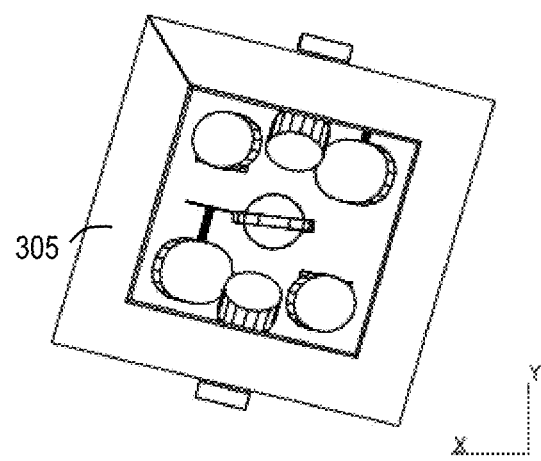
Fig. 31

| Focal length (mm) | Altitude (ft) | Ground speed (kts) | Flight line spacing (m) | GSD (cm) | Max. Vert. Obliquness (deg) | SDU 1 timing/ frame (ms) | SDU 2 & 3 timing/ frame (ms) | Efficiency (km²/hour) |
|---|---|---|---|---|---|---|---|---|
| 300 | 11000 | 240 | 1323 | 3.578 | 12 | 185 | 176 | 588 |
| 300 | 11000 | 240 | 2050 | 3.578 | 18 | 185 | 176 | 911 |
| 300 | 11000 | 240 | 2829 | 3.578 | 24 | 185 | 176 | 1257 |
| 300 | 22000 | 300 | 2646 | 7.155 | 12 | 296 | 281 | 1470 |
| 300 | 22000 | 300 | 4100 | 7.155 | 18 | 296 | 281 | 2278 |
| 300 | 22000 | 300 | 5657 | 7.155 | 24 | 296 | 281 | 3143 |
| 300 | 22000 | 200 | 2646 | 7.155 | 12 | 444 | 422 | 980 |
| 300 | 22000 | 200 | 4100 | 7.155 | 18 | 444 | 422 | 1519 |
| 300 | 22000 | 200 | 5657 | 7.155 | 24 | 444 | 422 | 2096 |
| 420 | 11000 | 240 | 1337 | 2.556 | 12 | 97 | 90 | 594 |
| 420 | 11000 | 240 | 2063 | 2.556 | 18 | 97 | 90 | 917 |
| 420 | 11000 | 240 | 2841 | 2.556 | 24 | 97 | 90 | 1263 |
| 420 | 22000 | 300 | 2674 | 5.111 | 12 | 155 | 143 | 1486 |
| 420 | 22000 | 300 | 4126 | 5.111 | 18 | 155 | 143 | 2292 |
| 420 | 22000 | 300 | 5682 | 5.111 | 24 | 155 | 143 | 3157 |
| 420 | 40000 | 500 | 4861 | 9.292 | 12 | 169 | 156 | 4502 |
| 420 | 40000 | 500 | 7502 | 9.292 | 18 | 169 | 156 | 6947 |
| 420 | 40000 | 500 | 10331 | 9.292 | 24 | 169 | 156 | 9567 |
| 600 | 11000 | 240 | 1347 | 1.789 | 12 | 46 | 44 | 599 |
| 600 | 11000 | 240 | 2073 | 1.789 | 18 | 46 | 44 | 921 |
| 600 | 11000 | 240 | 2850 | 1.789 | 24 | 46 | 44 | 1267 |
| 600 | 22000 | 300 | 2694 | 3.578 | 12 | 74 | 70 | 1497 |
| 600 | 22000 | 300 | 4146 | 3.578 | 18 | 74 | 70 | 2303 |
| 600 | 22000 | 300 | 5700 | 3.578 | 24 | 74 | 70 | 3167 |
| 900 | 40000 | 500 | 4927 | 4.336 | 12 | 37 | 34 | 4563 |
| 900 | 40000 | 500 | 7565 | 4.336 | 18 | 37 | 34 | 7005 |
| 900 | 40000 | 500 | 10390 | 4.336 | 24 | 37 | 34 | 9621 |

Fig. 40

| Focal length (mm) | Altitude (ft) | Ground speed (kts) | Flight line spacing (m) | GSD (cm) | Max. Vert. Obliquness (deg) | SDU 1 timing/ frame (ms) | SDU 2 & 3 timing/ frame (ms) | Efficiency (km²/hour) |
|---|---|---|---|---|---|---|---|---|
| 300 | 11000 | 240 | 1308 | 5.143 | 12 | 198 | 181 | 582 |
| 300 | 11000 | 240 | 2039 | 5.143 | 18 | 198 | 181 | 906 |
| 300 | 11000 | 240 | 2818 | 5.143 | 24 | 198 | 181 | 1253 |
| 300 | 22000 | 300 | 2617 | 10.286 | 12 | 317 | 289 | 1454 |
| 300 | 22000 | 300 | 4078 | 10.286 | 18 | 317 | 289 | 2266 |
| 300 | 22000 | 300 | 5637 | 10.286 | 24 | 317 | 289 | 3132 |
| 300 | 22000 | 200 | 2617 | 10.286 | 12 | 475 | 434 | 969 |
| 300 | 22000 | 200 | 4078 | 10.286 | 18 | 475 | 434 | 1510 |
| 300 | 22000 | 200 | 5637 | 10.286 | 24 | 475 | 434 | 2088 |
| 420 | 11000 | 240 | 1329 | 3.674 | 12 | 103 | 97 | 591 |
| 420 | 11000 | 240 | 2055 | 3.674 | 18 | 103 | 97 | 913 |
| 420 | 11000 | 240 | 2834 | 3.674 | 24 | 103 | 97 | 1260 |
| 420 | 22000 | 300 | 2657 | 7.347 | 12 | 166 | 155 | 1476 |
| 420 | 22000 | 300 | 4110 | 7.347 | 18 | 166 | 155 | 2284 |
| 420 | 22000 | 300 | 5667 | 7.347 | 24 | 166 | 155 | 3149 |
| 420 | 40000 | 500 | 4832 | 13.358 | 12 | 181 | 169 | 4474 |
| 420 | 40000 | 500 | 7473 | 13.358 | 18 | 181 | 169 | 6920 |
| 420 | 40000 | 500 | 10304 | 13.358 | 24 | 181 | 169 | 9542 |
| 600 | 11000 | 240 | 1341 | 2.571 | 12 | 50 | 47 | 596 |
| 600 | 11000 | 240 | 2067 | 2.571 | 18 | 50 | 47 | 919 |
| 600 | 11000 | 240 | 2845 | 2.571 | 24 | 50 | 47 | 1265 |
| 600 | 22000 | 300 | 2683 | 5.143 | 12 | 81 | 75 | 1491 |
| 600 | 22000 | 300 | 4135 | 5.143 | 18 | 81 | 75 | 2297 |
| 600 | 22000 | 300 | 5690 | 5.143 | 24 | 81 | 75 | 3161 |
| 900 | 40000 | 500 | 4914 | 6.234 | 12 | 39 | 36 | 4550 |
| 900 | 40000 | 500 | 7552 | 6.234 | 18 | 39 | 36 | 6993 |
| 900 | 40000 | 500 | 10378 | 6.234 | 24 | 39 | 36 | 9610 |

Fig. 41

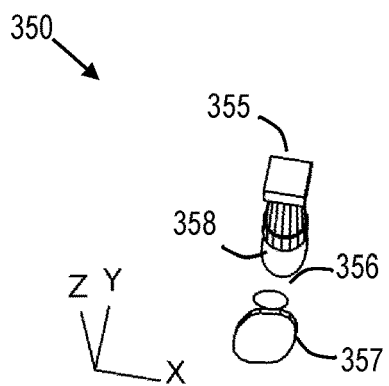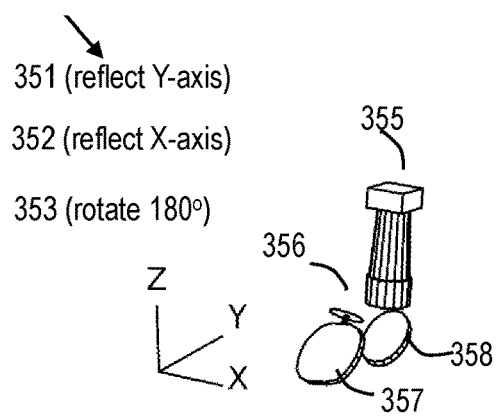
Fig. 45a     Fig. 45b
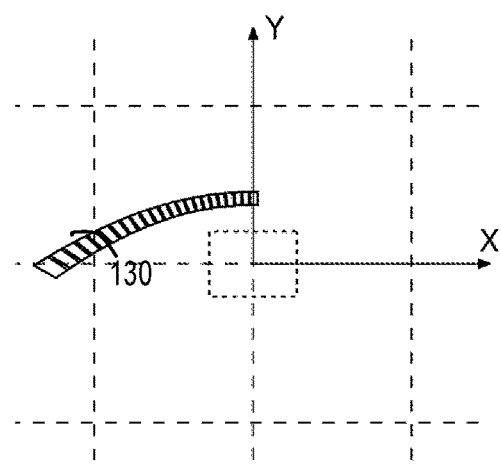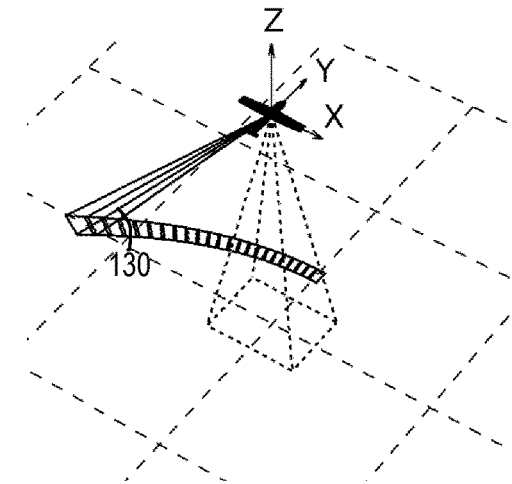
Fig. 45c     Fig. 45d
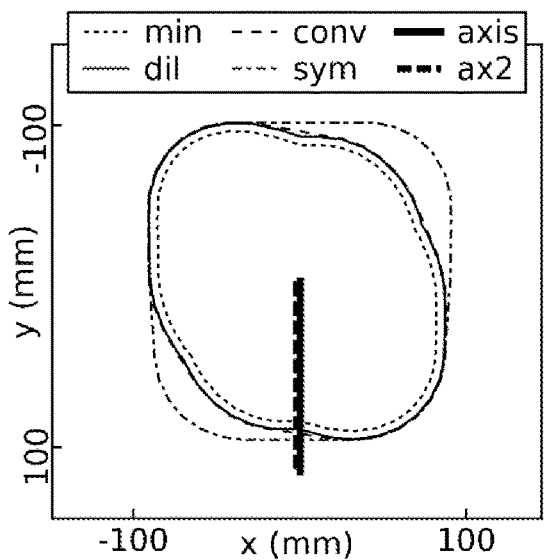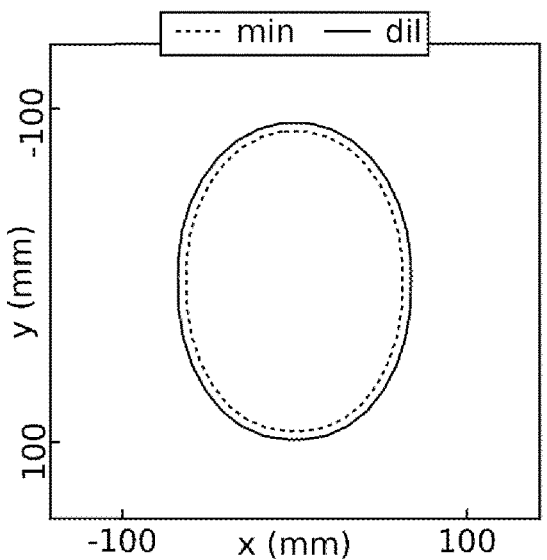
Fig. 45e     Fig. 45f

354 = 300 + 350 + 351

355 = 300 + 350 + 351 + 352 + 353

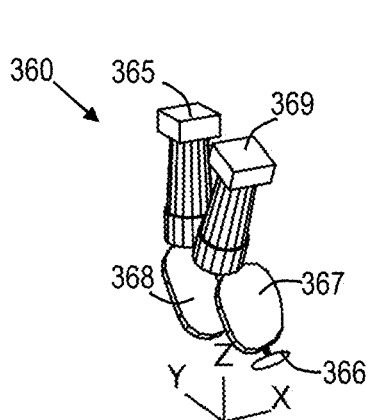
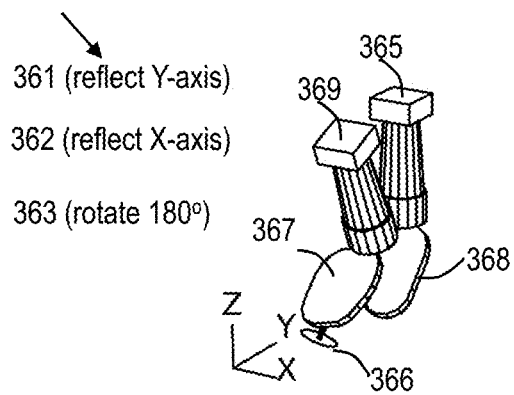
361 (reflect Y-axis)
362 (reflect X-axis)
363 (rotate 180°)
Fig. 48a
Fig. 48b
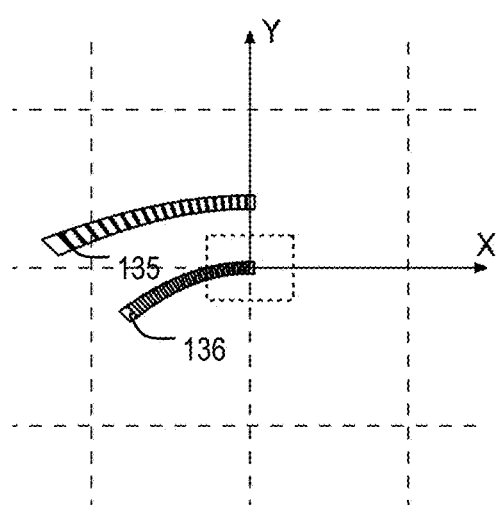
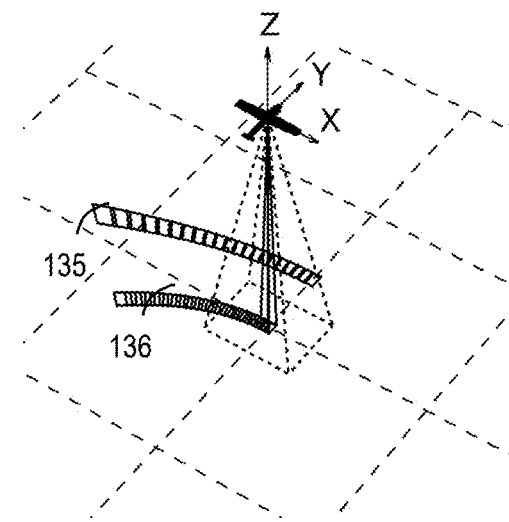
Fig. 48c
Fig. 48d
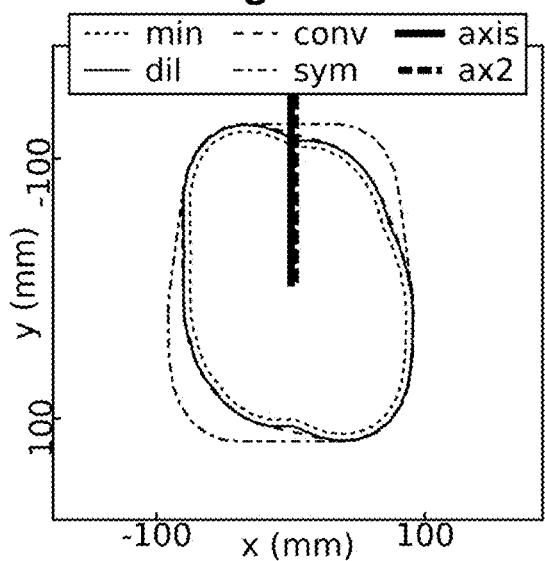
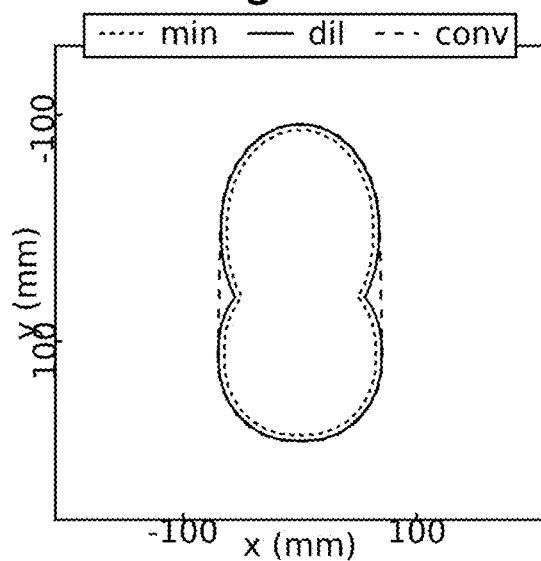
Fig. 48e
Fig. 48f 364 = 301 + 360 + 361
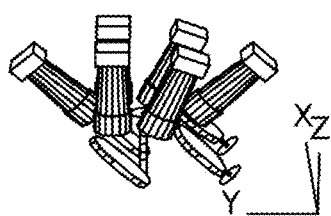
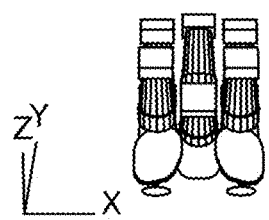
Fig. 50a
Fig. 50b
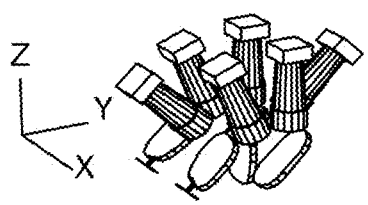
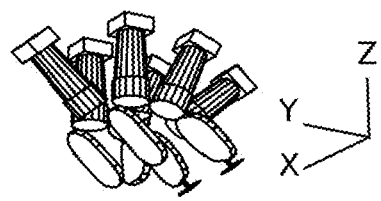
Fig. 50c
Fig. 50d
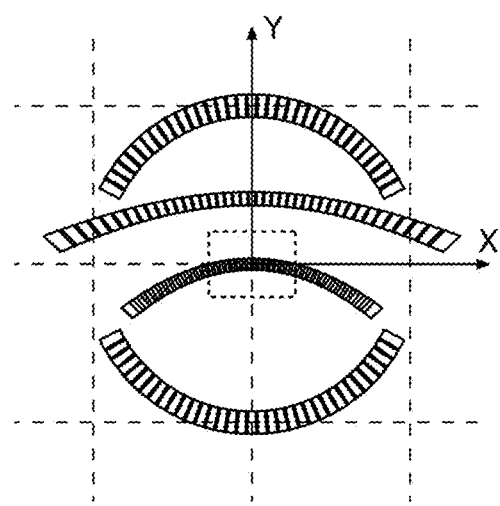
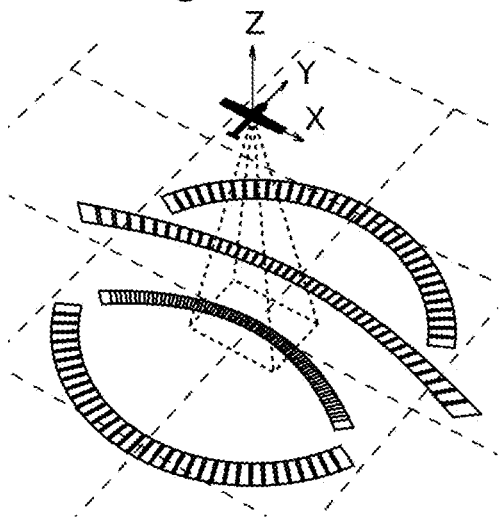
Fig. 50e
Fig. 50f

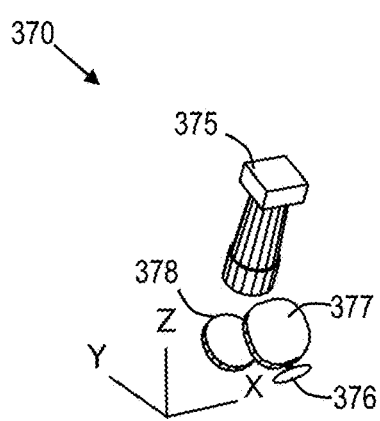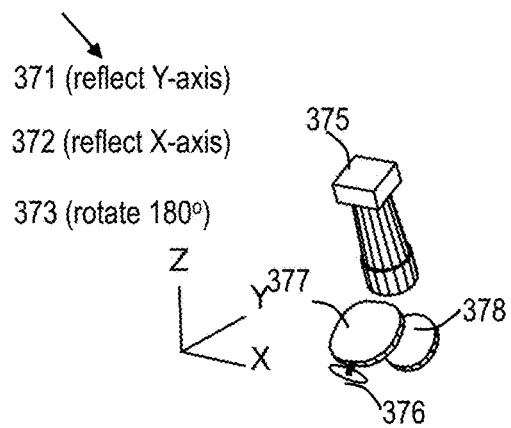
371 (reflect Y-axis)
372 (reflect X-axis)
373 (rotate 180°)
Fig. 51a  Fig. 51b
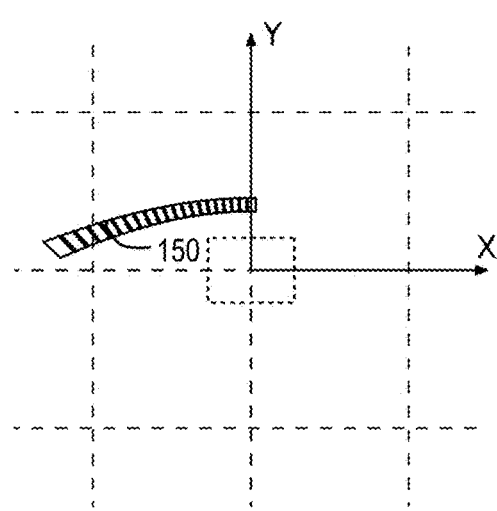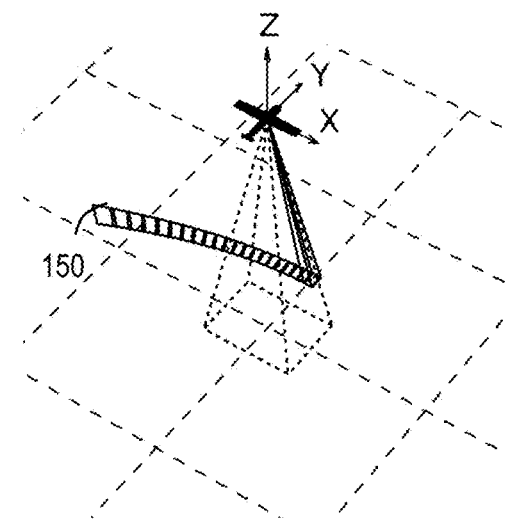
Fig. 51c  Fig. 51d
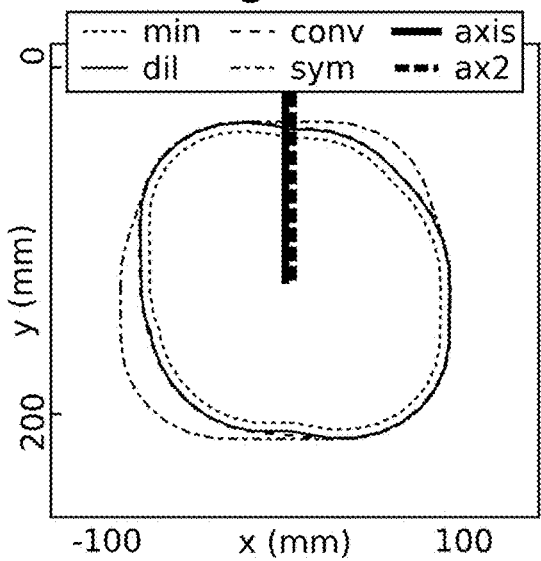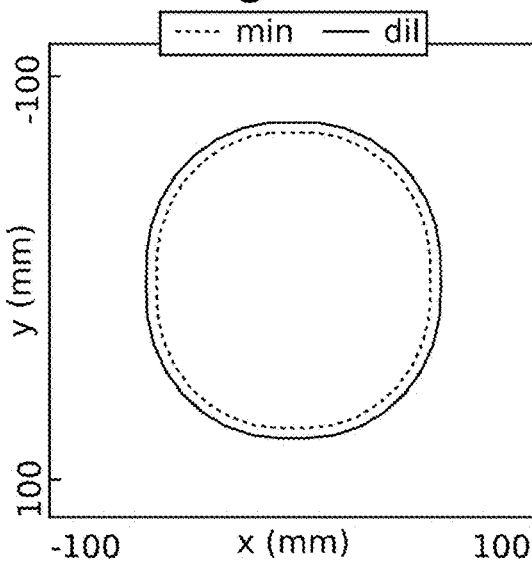
Fig. 51e  Fig. 51f

379 = 301 + 360 + 361 + 372 + 373

381 = 300 + 372 + 373

382 = 300 + 370 + 371 + 372 + 373

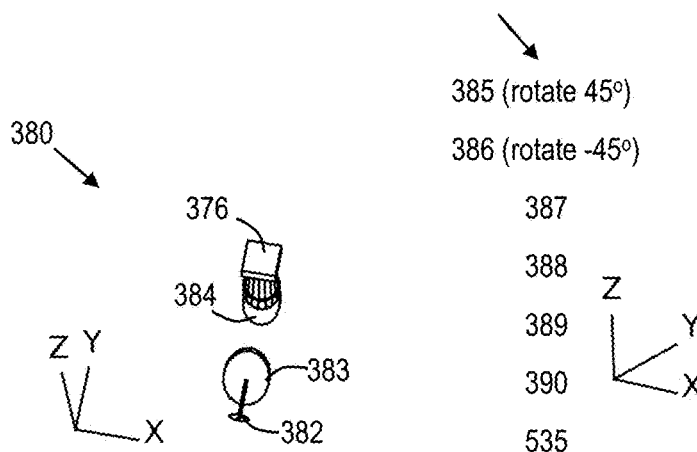
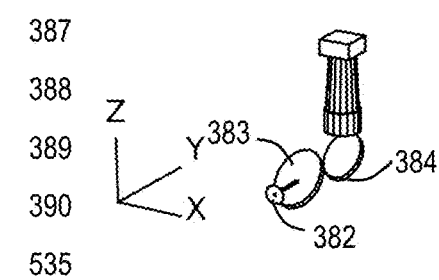
Fig. 54a    Fig. 54b
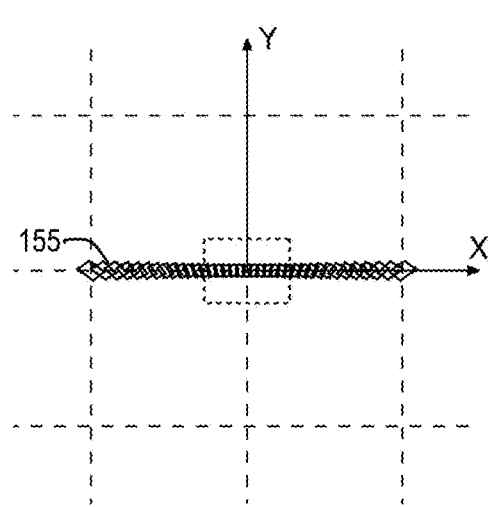
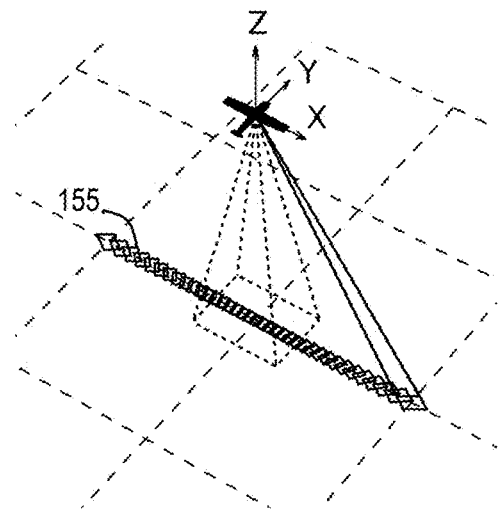
Fig. 54c    Fig. 54d
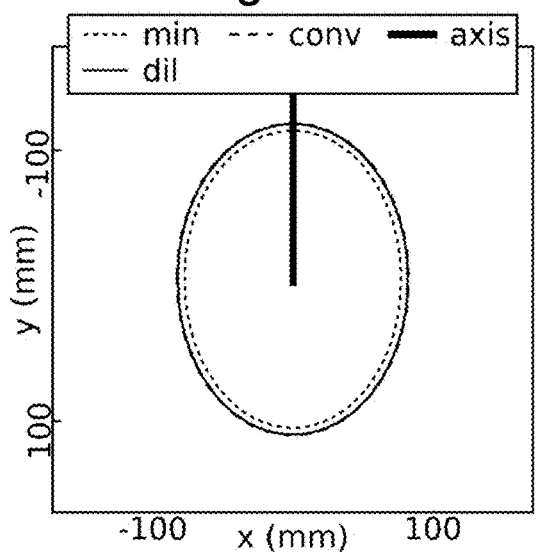
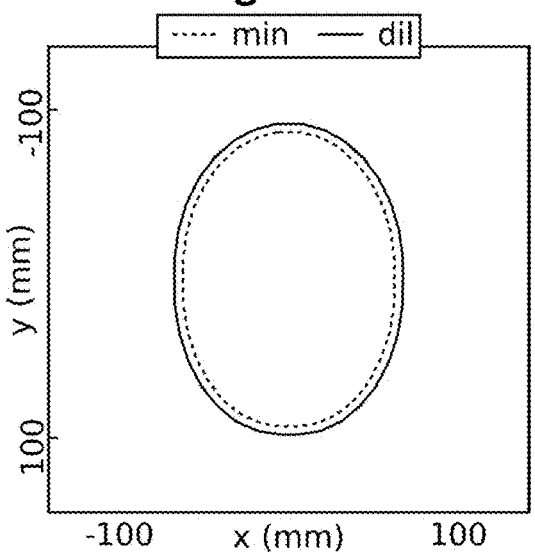
Fig. 54e    Fig. 54f

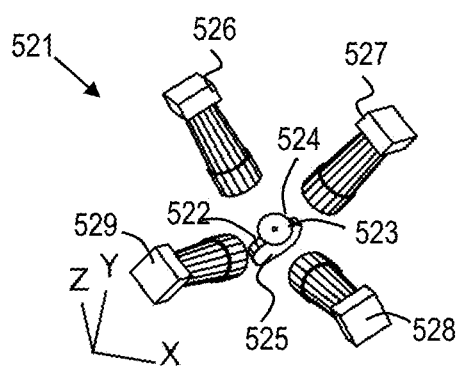
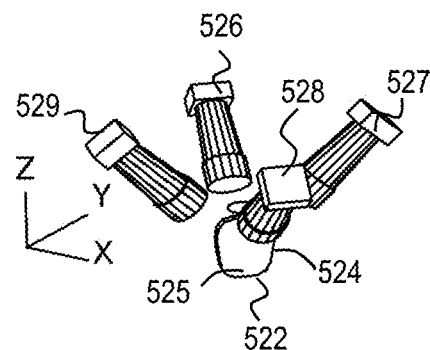
Fig. 61a Fig. 61b
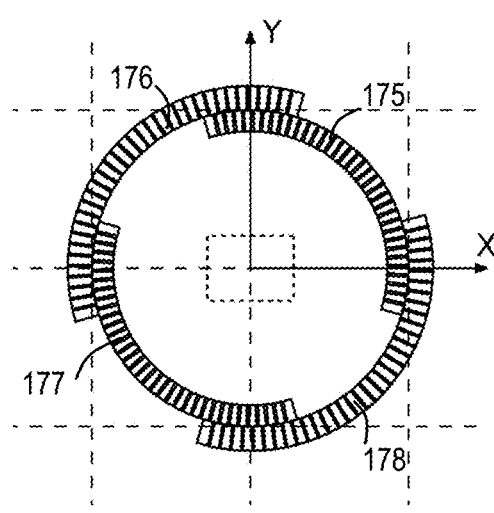
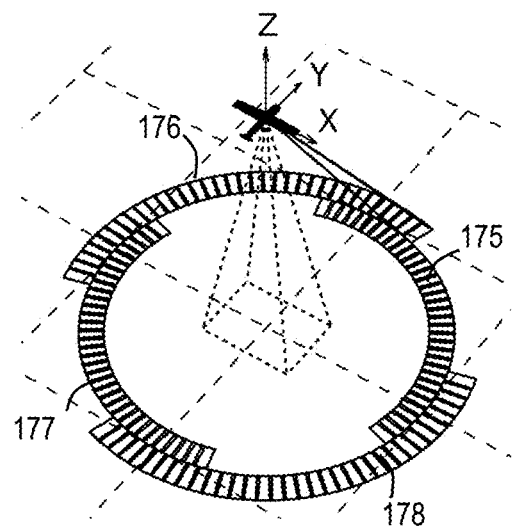
Fig. 61c Fig. 61d
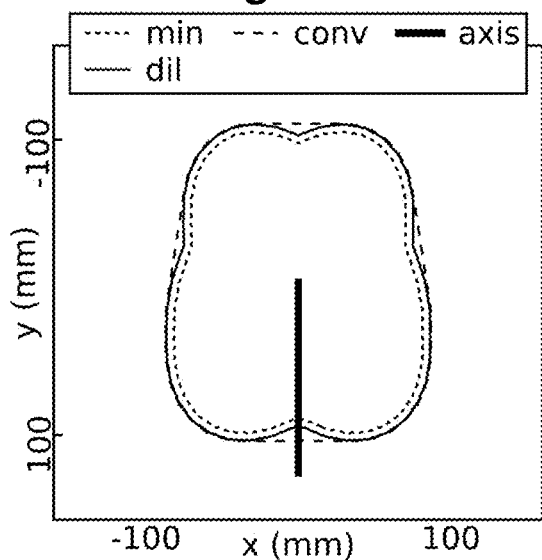
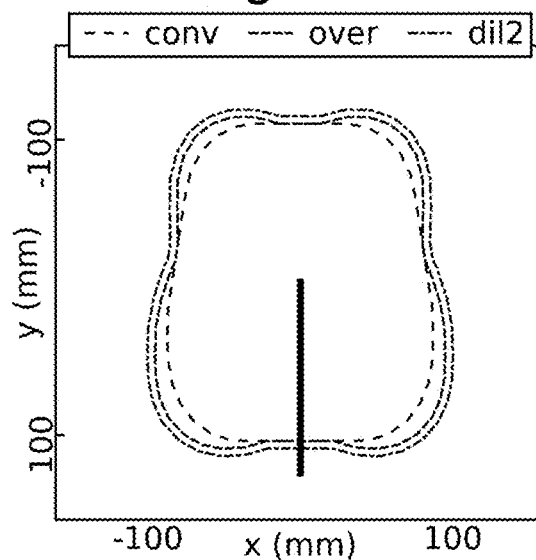
Fig. 61e Fig. 61f

US 11,722,776 B2

HYPER CAMERA WITH SHARED MIRROR

CROSS-REFERENCE TO RELATED APPLICATIONS

The present application claims priority to PCT Application No. PCT/IB2021/039333, filed Jun. 28, 2021, the contents of which are incorporated by reference herein in their entirety for all purposes.

FIELD OF THE INVENTION

The present invention relates to efficient aerial camera systems and efficient methods for creating orthomosaics and textured 3D models from aerial photos.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Accurately georeferenced mosaics of orthophotos, referred to as orthomosaics, can be created from aerial photos. In such a case, these photos can provide useful images of an area, such as the ground. The creation of an orthomosaic requires the systematic capture of overlapping aerial photos of the region of interest (ROI), both to ensure complete coverage of the ROI, and to ensure that there is sufficient redundancy in the imagery to allow accurate bundle adjustment, orthorectification and alignment of the photos.

Bundle adjustment is the process by which redundant estimates of ground points and camera poses are refined. Bundle adjustment may operate on the positions of manually-identified ground points, or, increasingly, on the positions of automatically-identified ground features which are automatically matched between overlapping photos.

Overlapping aerial photos are typically captured by navigating a survey aircraft in a serpentine pattern over the area of interest. The survey aircraft carries an aerial scanning camera system, and the serpentine flight pattern ensures that the photos captured by the scanning camera system overlap both along flight lines within the flight pattern and between adjacent flight lines.

Though such scanning camera systems can be useful in some instances, they are not without their flaws. Examples of such flaws include: (1) difficulty fitting several long focal length lenses and matched aperture mirrors in configured spaces on a vehicle for capturing vertical and oblique imagery; (2) a camera hole in an aerial vehicle is generally rectangular, but yaw correction gimbal space requirements are defined by a circle, so inefficiencies in spacing are present; and (3) low quality images (e.g. blurry, vignetting).

SUMMARY

The present disclosure is directed towards an imaging system, comprising: a first camera configured to capture a first set of oblique images along a first scan path on an object area; a second camera configured to capture a second set of oblique images along a second scan path on the object area; a scanning mirror structure including at least one mirror surface; and a drive coupled to the scanning mirror structure and configured to rotate the scanning mirror structure about a scan axis based on a scan angle, wherein the first camera has an optical axis set at an oblique angle to the scan axis and includes a lens to focus a first imaging beam reflected from the scanning mirror structure to an image sensor of the first camera, the second camera has an optical axis set at an oblique angle to the scan axis and includes a lens to focus a second imaging beam reflected from the scanning mirror structure to an image sensor of the second camera, at least one of an elevation and azimuth of the first imaging beam and at least one of an elevation and azimuth of the second imaging beam vary according to the scan angle, the image sensor of the first camera captures the first set of oblique images along the first scan path by sampling the first imaging beam at first values of the scan angle, and the image sensor of the second camera captures the second set of oblique images along the second scan path by sampling the second imaging beam at second values of the scan angle.

The present disclosure is directed to an imaging method comprising: reflecting a first imaging beam from an object area using a scanning mirror structure having at least one mirror surface to a first image sensor of a first camera to capture a first set of oblique images along a first scan path of the object area, the first camera comprising a first lens to focus the first imaging beam to the first image sensor; reflecting a second imaging beam from the object area using the scanning mirror structure to a second image sensor of a second camera to capture a second set of oblique images along a second scan path of the object area, the second camera comprising a second lens to focus the second imaging beam to the second image sensor; rotating the scanning mirror structure about a scan axis based on a scan angle, wherein at least one of an elevation and azimuth of the each of the first and second imaging beams vary according to the scan angle; setting an optical axis of each of the first and second cameras at an oblique angle to the scan axis; and sampling the first and second imaging beams at values of the scan angle.

The present disclosure is directed to an imaging system installed on a vehicle, comprising: a first camera configured to capture a first set of oblique images along a first scan path on an object area; a scanning mirror structure including at least one mirror surface; a drive coupled to the scanning mirror structure and configured to rotate the scanning mirror structure about a scan axis based on a scan angle; and processing circuitry configured to set the scan angle of the scanning mirror structure based on, at least in part, a yaw angle of the vehicle, wherein the first camera has an optical axis set at an oblique angle to the scan axis and includes a lens to focus a first imaging beam reflected from the scanning mirror structure to an image sensor of the first camera, an azimuth of the first imaging beam captured by the first camera varies according to the scan angle and the yaw angle of the vehicle, and the image sensor of the first camera captures the first set of oblique images along the first scan path by sampling the first imaging beam at values of the scan angle.

The present disclosure is directed to a method comprising: reflecting a first imaging beam from an object area using a scanning mirror structure having at least one mirror surface to a first image sensor of a first camera to capture a first set of oblique images along a first scan path of the object area, the first camera comprising a lens to focus the first imaging beam to the first image sensor; rotating the scanning mirror structure about a scan axis based on a scan angle, wherein values of the scan angle are determined based on, at least in part, a yaw angle of a vehicle including the scanning mirror structure, wherein an azimuth of the first imaging beam captured by the first camera varies according to the scan angle and the yaw angle of the vehicle; and sampling the first imaging beam at the values of the scan angle.

BRIEF DESCRIPTION OF FIGURES

A more complete understanding of this disclosure is provided by reference to the following detailed description when considered in connection with the accompanying drawings, wherein:

FIG. 4g shows potential geometries for scanning mirror structures and paddle flaps, according to one exemplary embodiment of the present disclosure;

FIG. 18a illustrates object area projection geometries and corresponding sensor plots for motion compensation, according to one exemplary embodiment of the present disclosure;

FIG. 18b illustrates the motion compensation pixel velocity from FIG. 18a (upper) and corresponding plate rates for a first and second optical plate (lower), according to one exemplary embodiment of the present disclosure;

FIG. 22a illustrates pixel velocities and tilt rates for a first scan drive unit, according to one exemplary embodiment of the present disclosure;

FIG. 22b illustrates pixel velocities and tilt rates for a second scan drive unit, according to one exemplary embodiment of the present disclosure;

FIG. 25 shows a top view (upper) and bottom view (lower) of a scanning camera system in a survey hole in the absence of roll, pitch or yaw, according to one exemplary embodiment of the present disclosure;

FIG. 26 shows a top view (upper) and bottom view (lower) of a scanning camera system in a survey hole with roll corrected using a stabilisation platform, according to one exemplary embodiment of the present disclosure;

FIG. 27 shows a top view (upper) and bottom view (lower) of a scanning camera system in a survey hole with pitch corrected using a stabilisation platform, according to one exemplary embodiment of the present disclosure;

FIG. 28 shows a top view (upper) and bottom view (lower) of a scanning camera system in a survey hole with yaw corrected using a stabilisation platform, according to one exemplary embodiment of the present disclosure;

FIG. 29 shows a top view (upper) and bottom view (lower) of a scanning camera system in a survey hole where a stabilisation platform has not corrected the yaw, according to one exemplary embodiment of the present disclosure;

FIG. 31 shows a top view (upper) and bottom view (lower) of a scanning camera system in a survey hole for a case that the aerial vehicle has yaw that has been corrected by an offset scan angle, according to one exemplary embodiment of the present disclosure;

FIG. 40 shows various suitable survey parameters for a scanning camera system, according to one exemplary embodiment of the present disclosure;

FIG. 41 shows various suitable survey parameters for a scanning camera system, according to one exemplary embodiment of the present disclosure;

FIG. 45a shows a scan drive unit at a first perspective, according to one exemplary embodiment of the present disclosure;

FIG. 45b shows the scan drive unit at a second perspective, according to one exemplary embodiment of the present disclosure;

FIG. 45c shows a top down view of a scan pattern for the scan drive unit, according to one exemplary embodiment of the present disclosure;

FIG. 45d shows an oblique view of the scan pattern for the scan drive unit, according to one exemplary embodiment of the present disclosure;

FIG. 45e shows potential primary mirror geometries, according to one exemplary embodiment of the present disclosure;

FIG. 45f shows potential secondary mirror geometries, according to one exemplary embodiment of the present disclosure;

FIG. 47a shows a top down view of scan patterns for a scanning camera system, according to one exemplary embodiment of the present disclosure;

FIG. 47b shows an oblique view of the scan pattern from FIG. 47a, according to one exemplary embodiment of the present disclosure;

FIG. 47c shows a top down view of scan patterns for a scanning camera system, according to one exemplary embodiment of the present disclosure;

FIG. 47d shows an oblique view of the scan patterns from FIG. 47c, according to one exemplary embodiment of the present disclosure;

FIG. 48a shows a scan drive unit at a first perspective, according to one exemplary embodiment of the present disclosure;

FIG. 48b shows the scan drive unit at a second perspective, according to one exemplary embodiment of the present disclosure;

FIG. 48c shows a top down view of a scan pattern for the scan drive unit, according to one exemplary embodiment of the present disclosure;

FIG. 48d shows an oblique view of the scan pattern for the scan drive unit, according to one exemplary embodiment of the present disclosure;

FIG. 48e shows potential primary mirror geometries, according to one exemplary embodiment of the present disclosure;

FIG. 48f shows potential secondary mirror geometries, according to one exemplary embodiment of the present disclosure;

FIG. 49a shows a top down view of a scan pattern for a scan drive unit, according to one exemplary embodiment of the present disclosure;

FIG. 49b shows an oblique view of a scan pattern for the scan drive unit from FIG. 49a, according to one exemplary embodiment of the present disclosure;

Figure 49A:
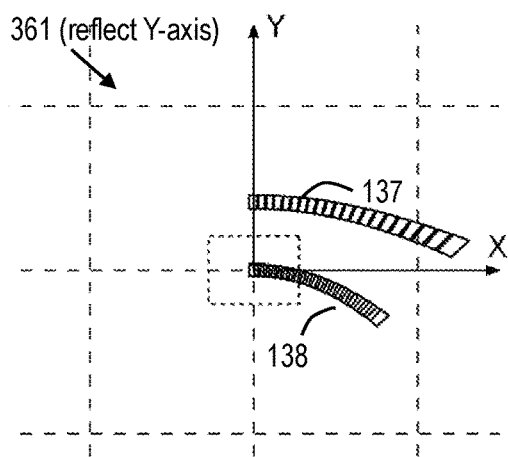
Figure 49B:
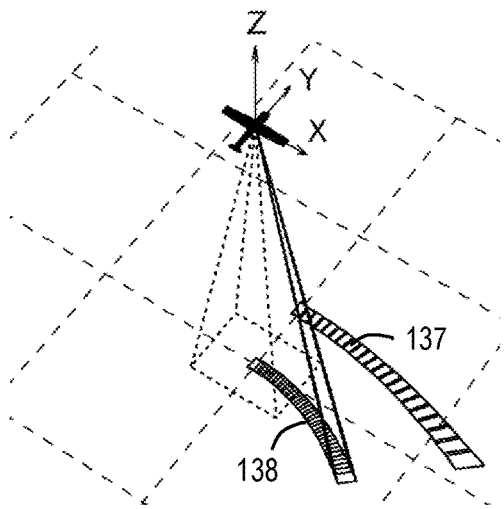
Figure 49C:
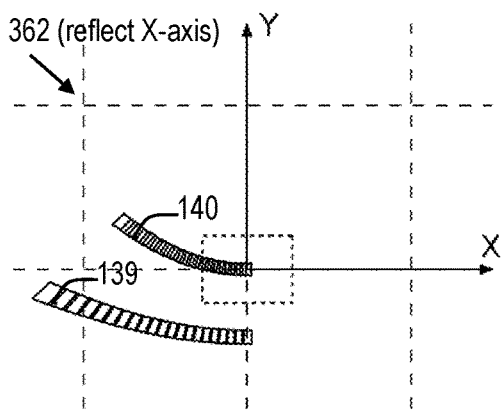
Figure 49D:
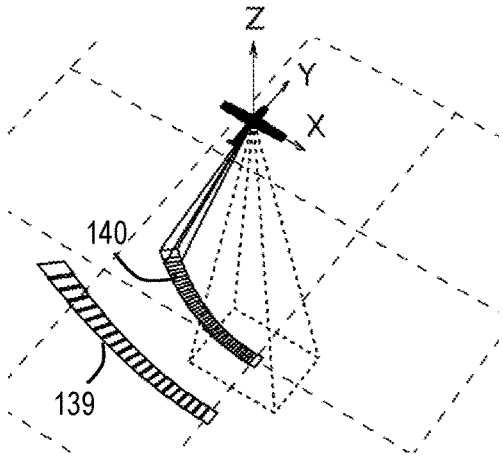
Figure 49E:
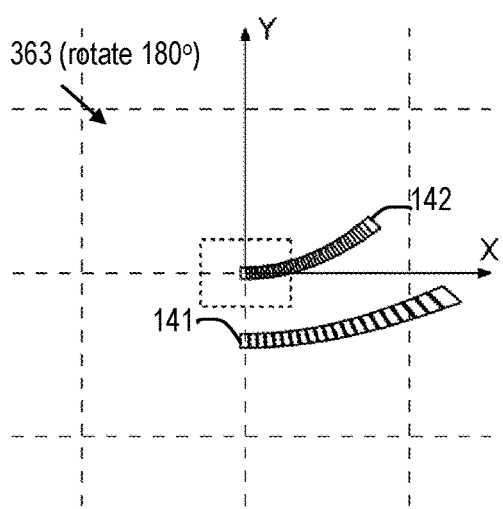
Figure 49F:
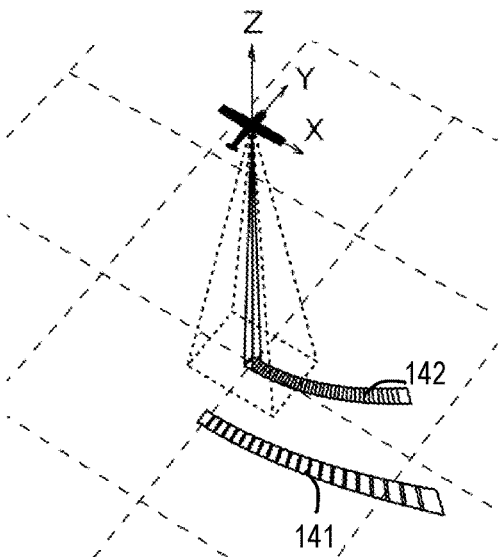
Figure 52A:
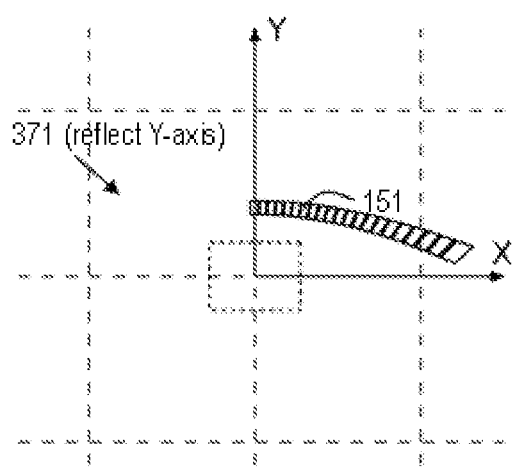
Figure 52B:
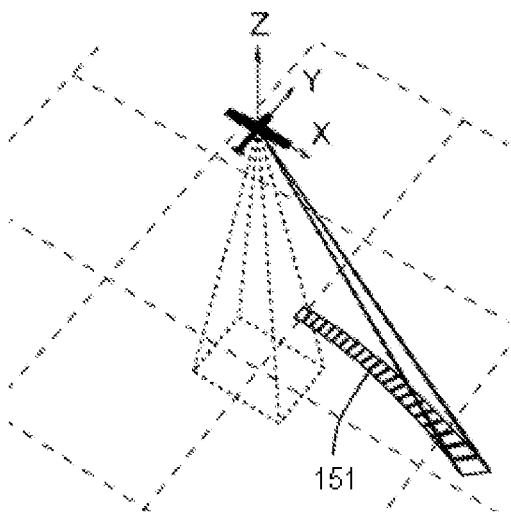
Figure 52C:
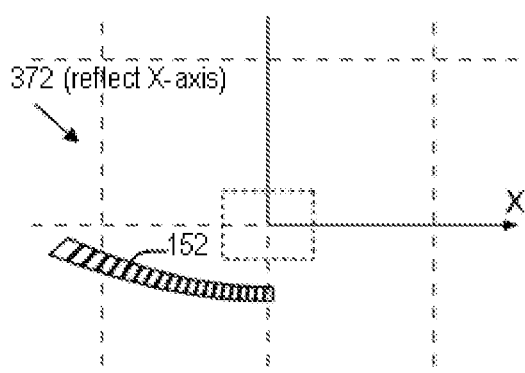
Figure 52D:
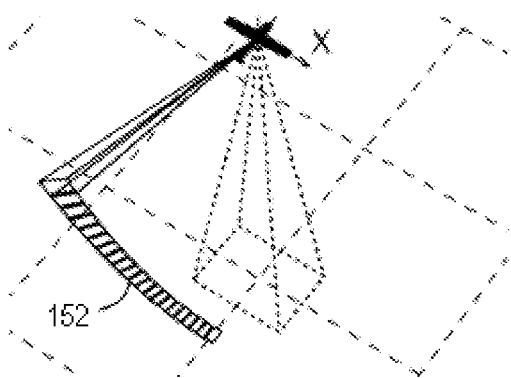
Figure 52E:
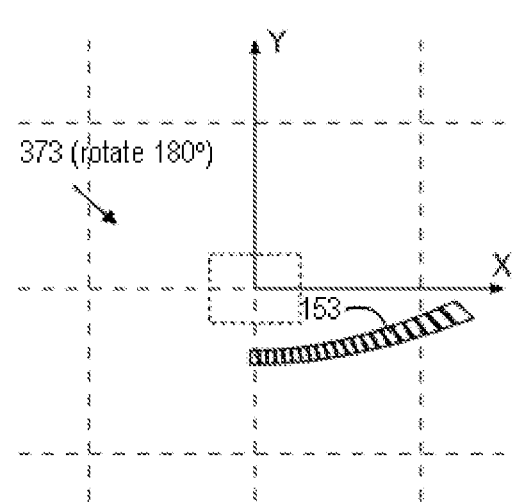
Figure 52F:
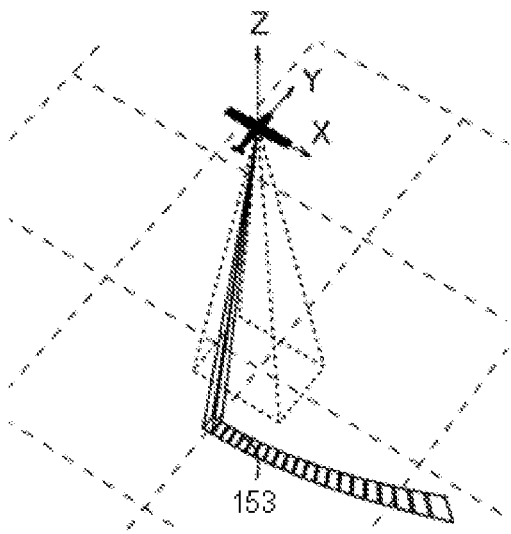
Figure 53A:
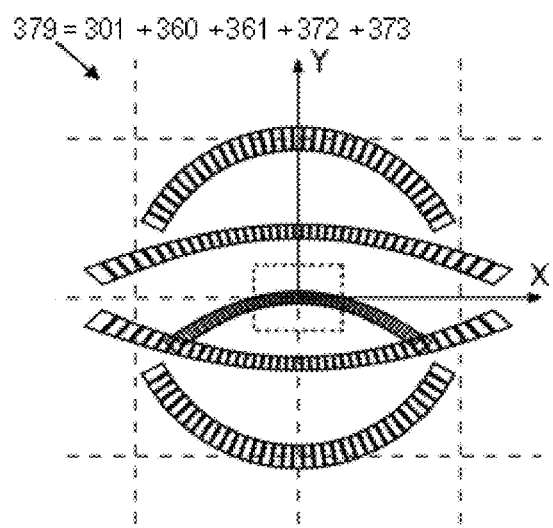
Figure 53B:
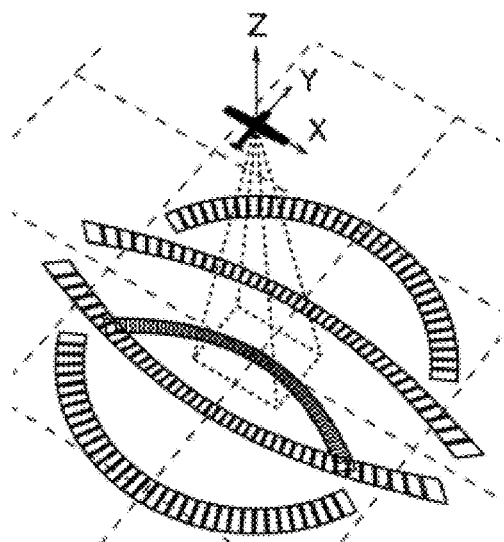
Figure 53C:
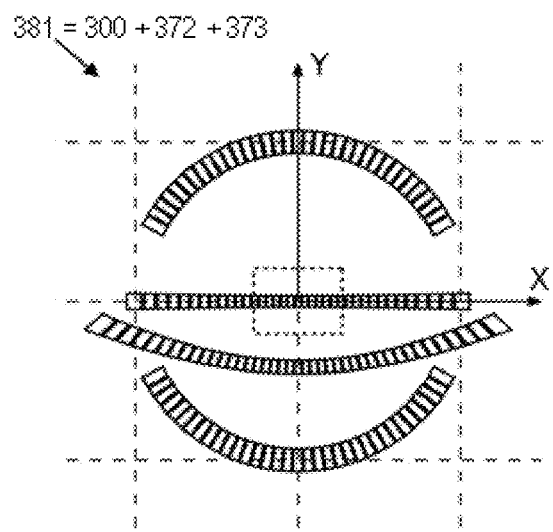
Figure 53D:
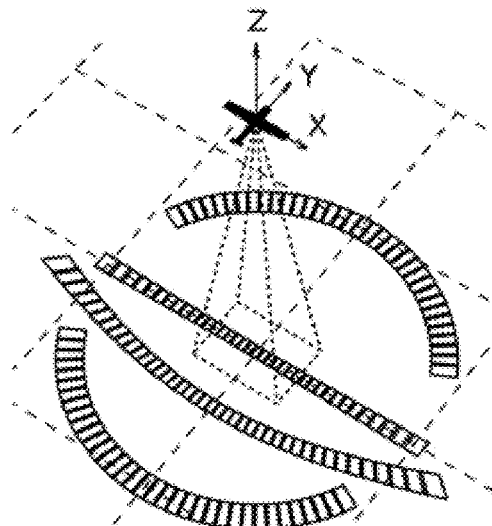
Figure 53E:
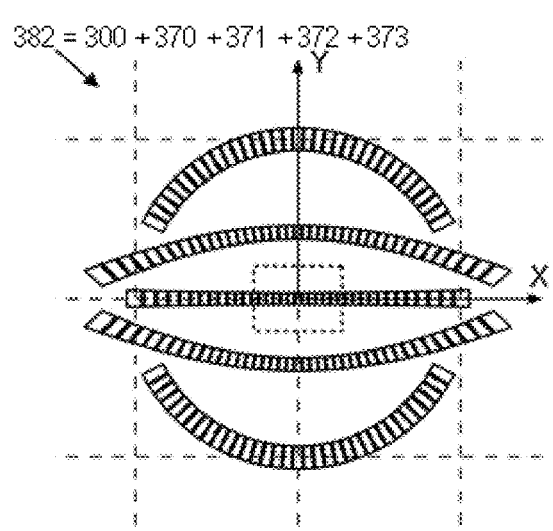
Figure 53F:
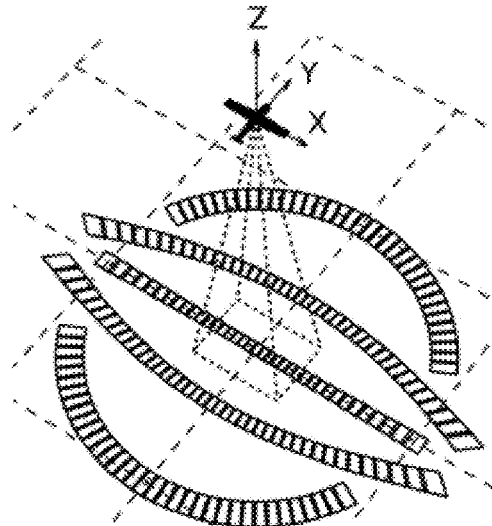
Figure 55A:
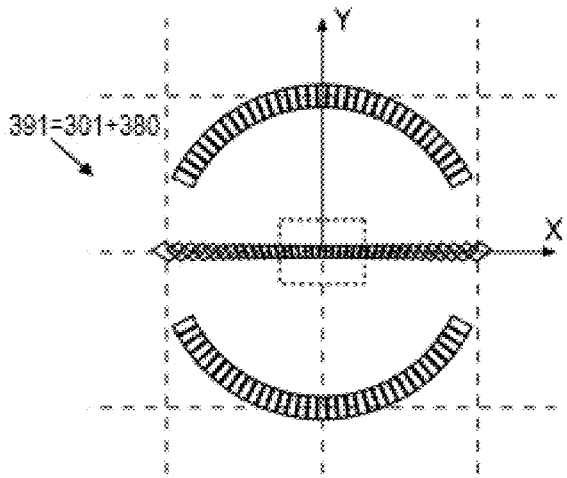
Figure 55B:
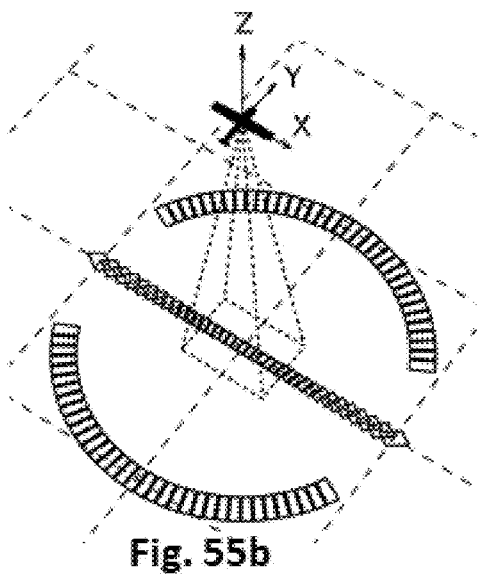
Figure 55C:
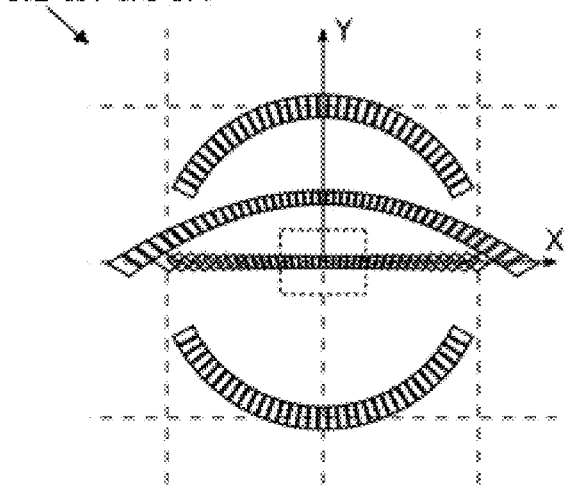
Figure 55D:
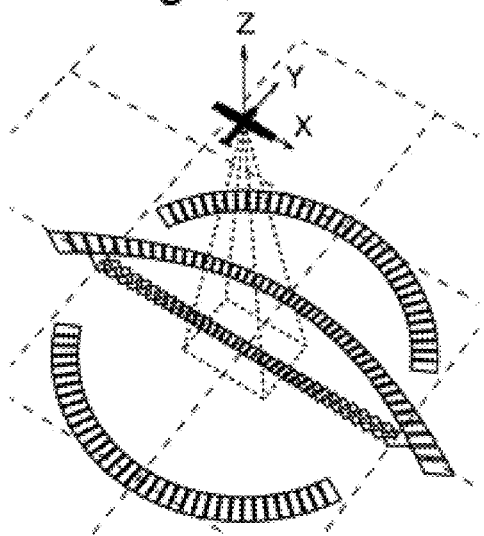
Figure 55E:
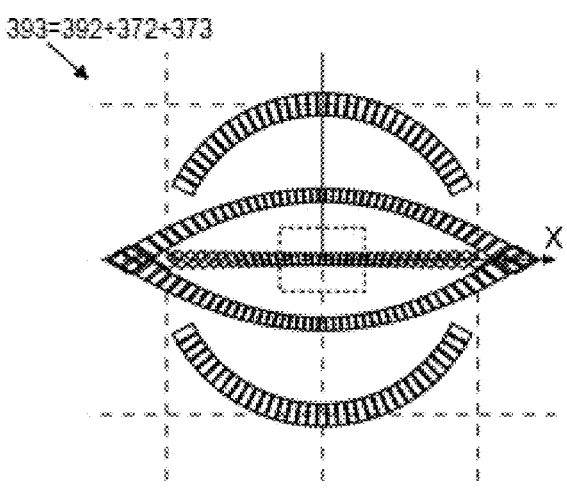
Figure 55F:
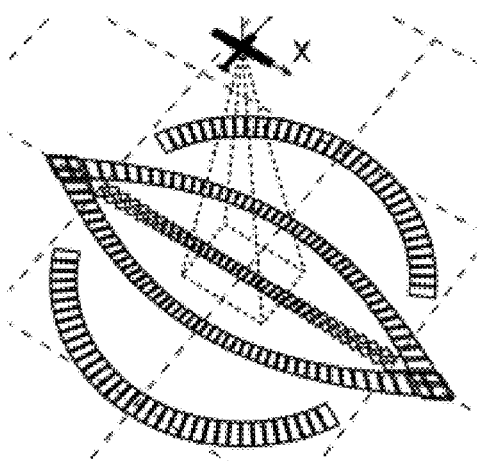
Figure 56A:
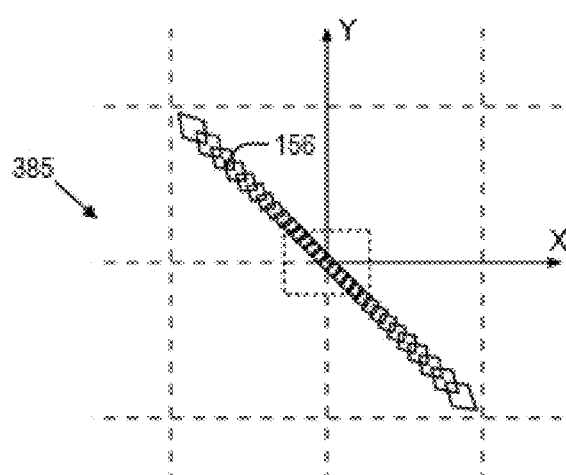
Figure 56B:
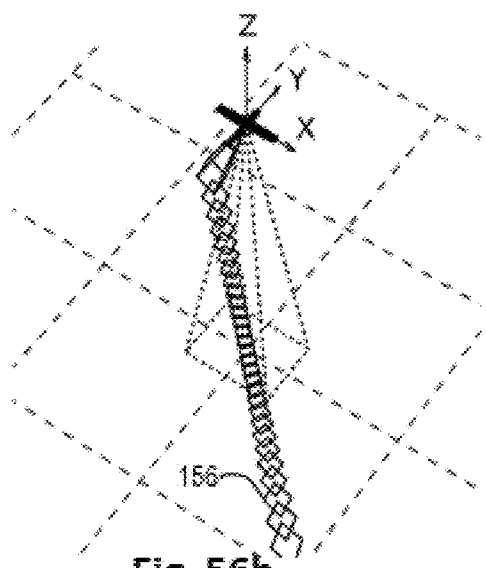
Figure 56C:
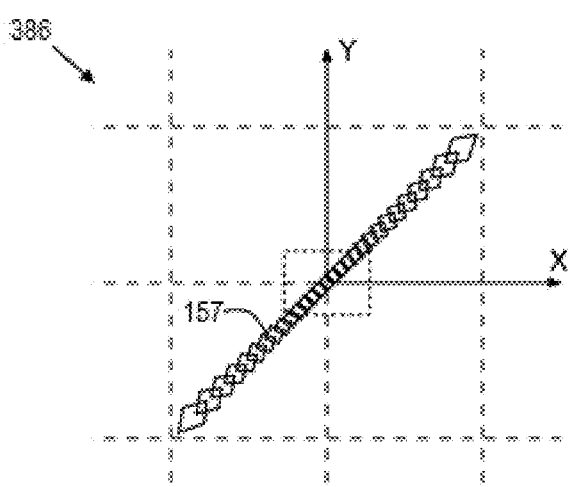
Figure 56D:
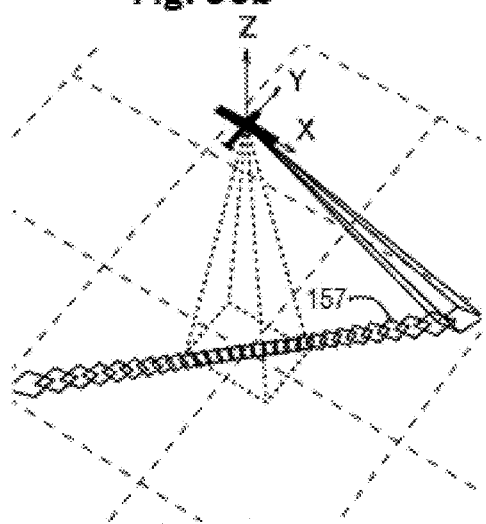
Figure 56E:
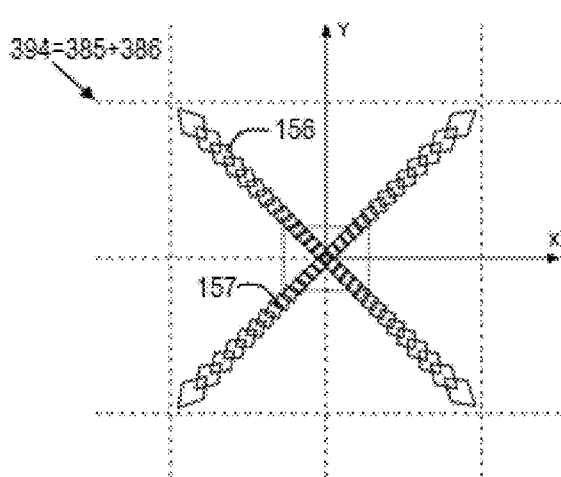
Figure 56F:
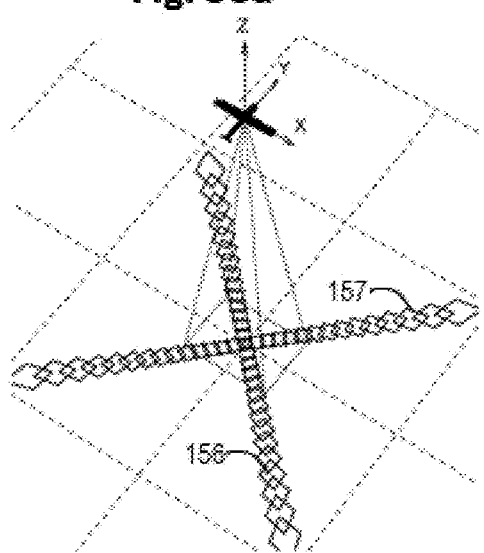
Figure 57A:
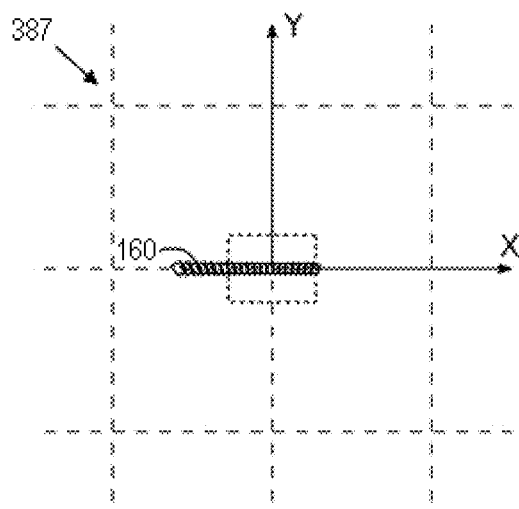
Figure 57B:
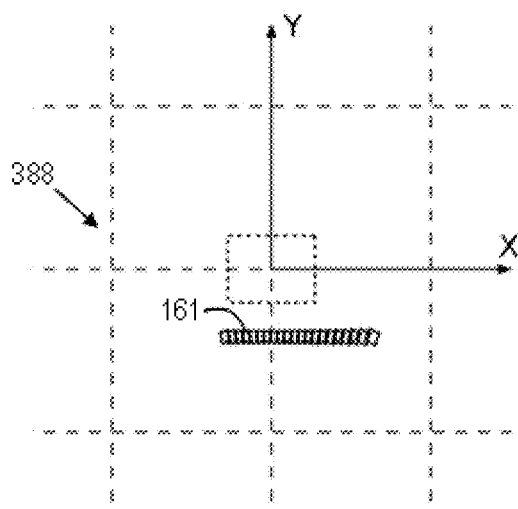
Figure 57C:
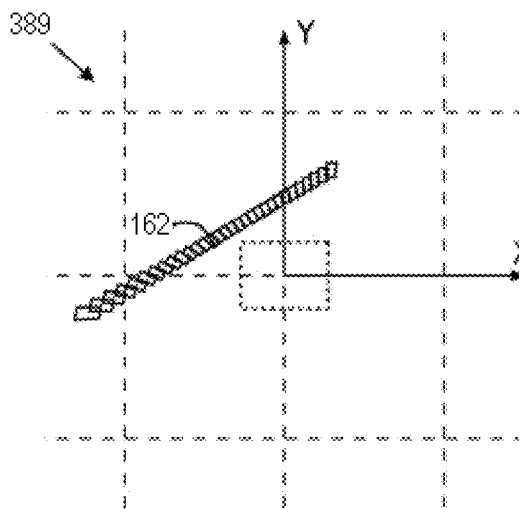
Figure 57D:
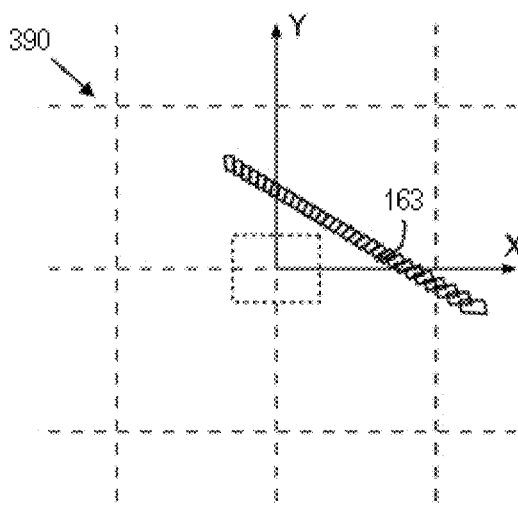
Figure 57E:
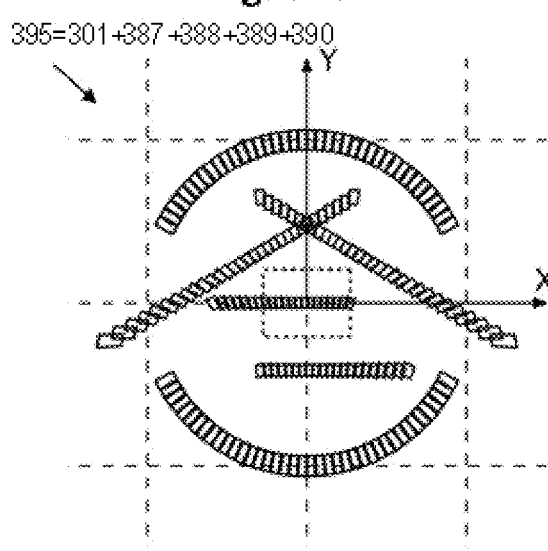
Figure 57F:
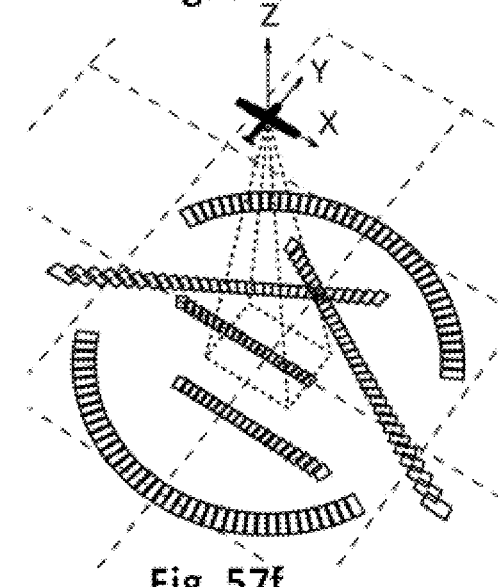
Figure 58A:
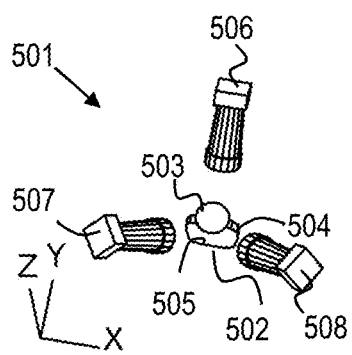
Figure 58B:
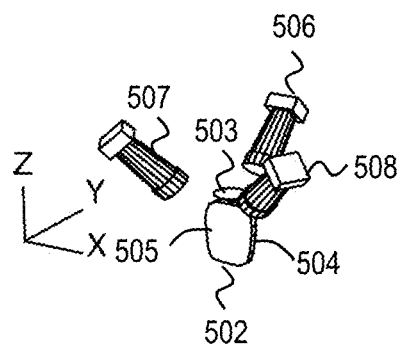
Figure 58C:
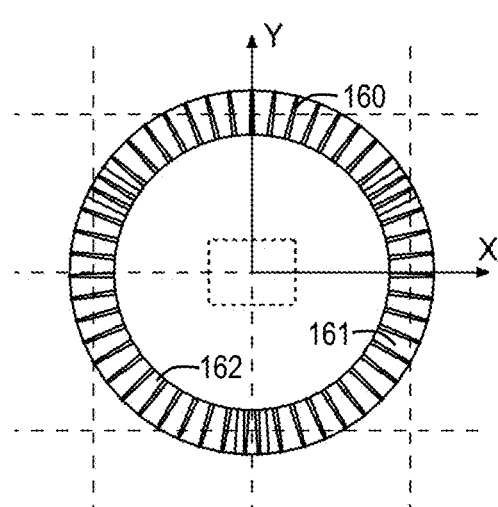
Figure 58D:
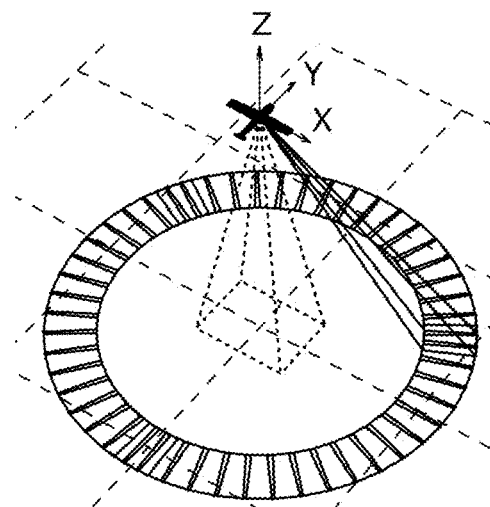
Figure 58E:
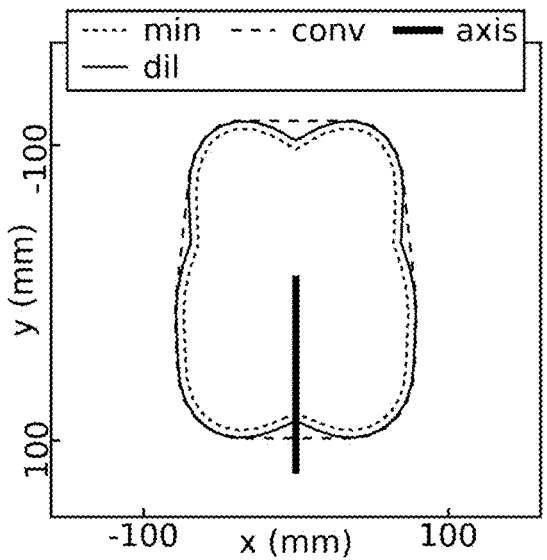
Figure 58F:
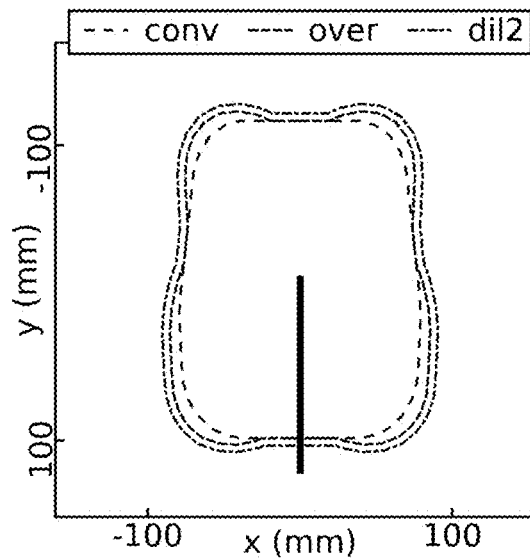
Figure 59A:
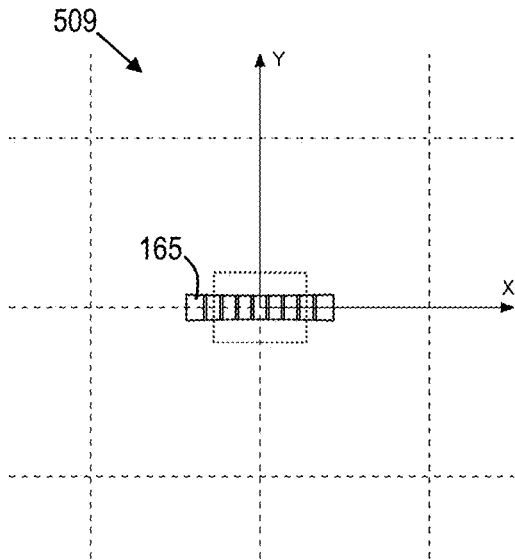
Figure 59B:
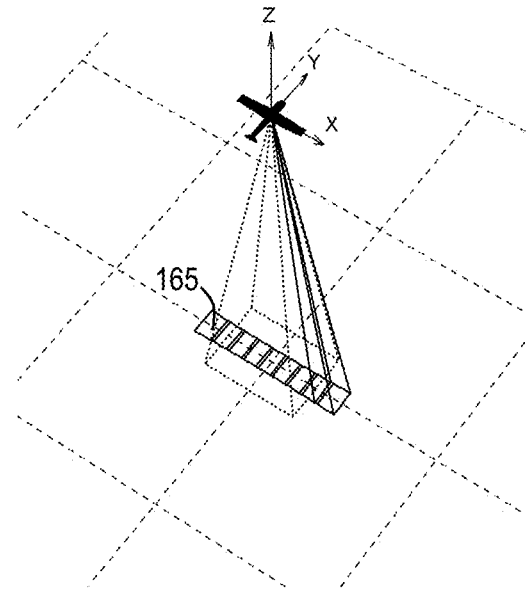
Figure 59C:
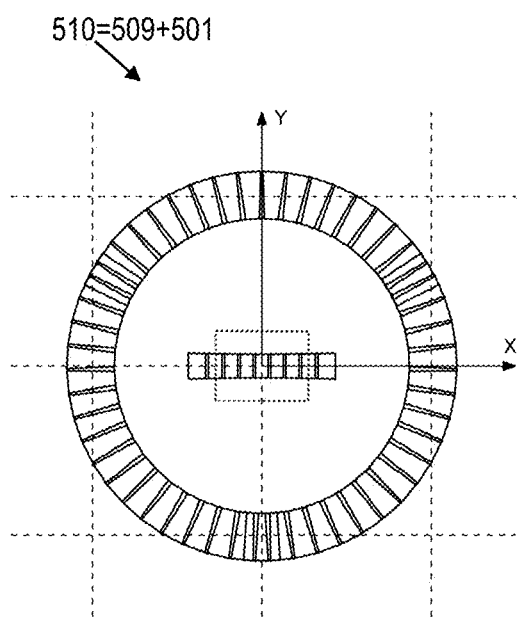
Figure 59D:
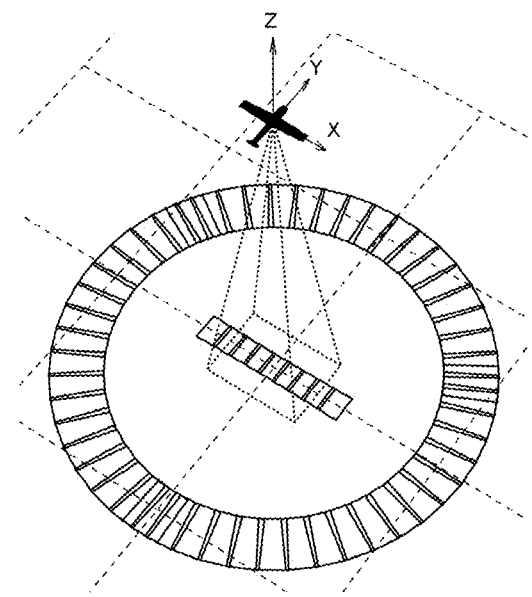
Figure 60A:
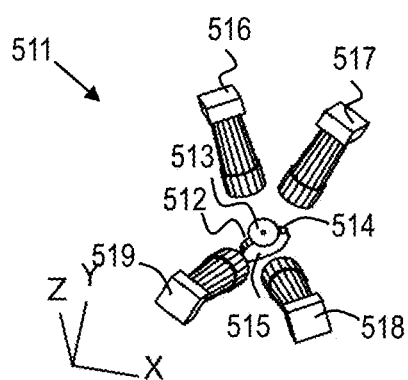
Figure 60B:
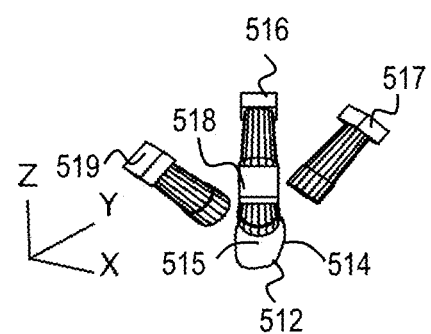
Figure 60C:
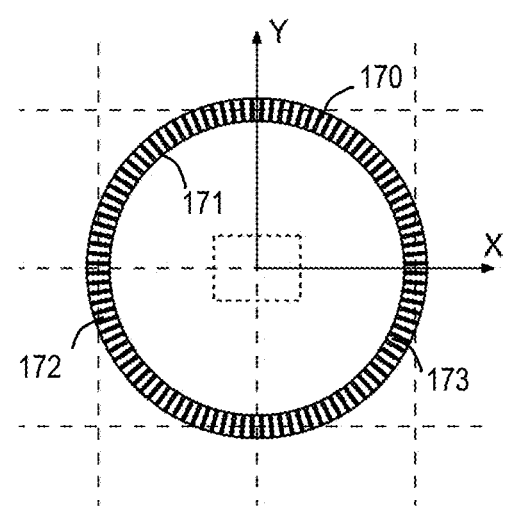
Figure 60D:
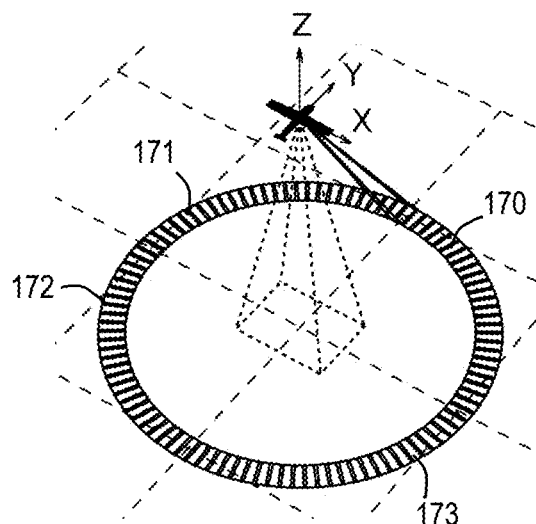
Figure 60E:
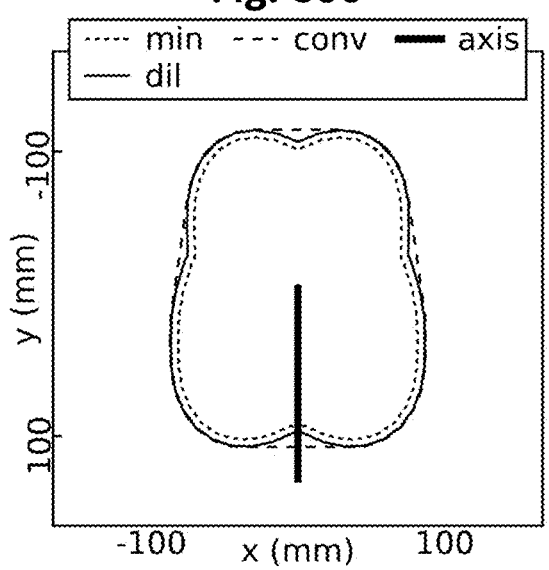
Figure 60F:
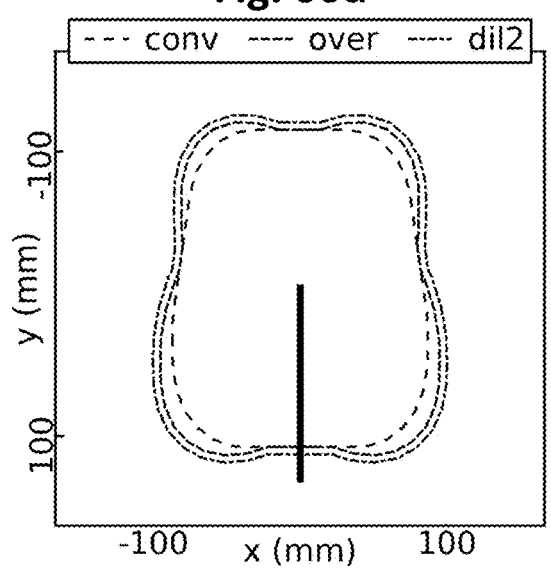
Figure 62A:
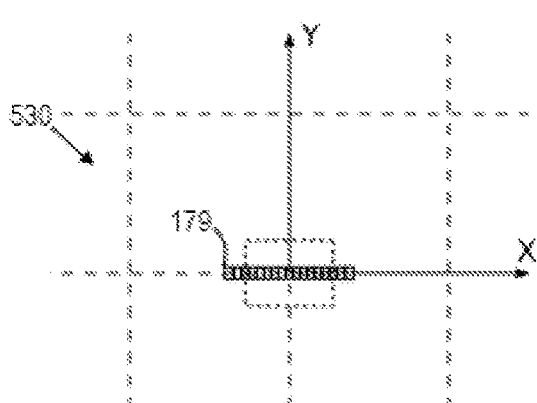
Figure 62B:
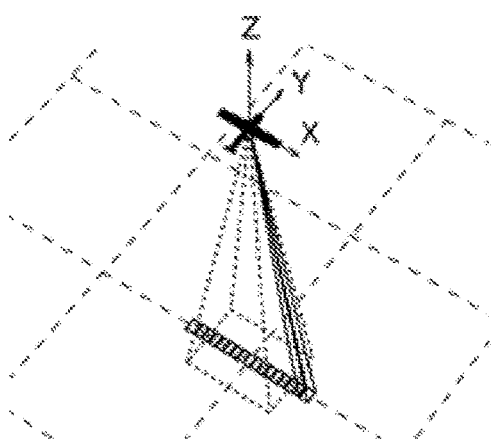
Figure 62C:
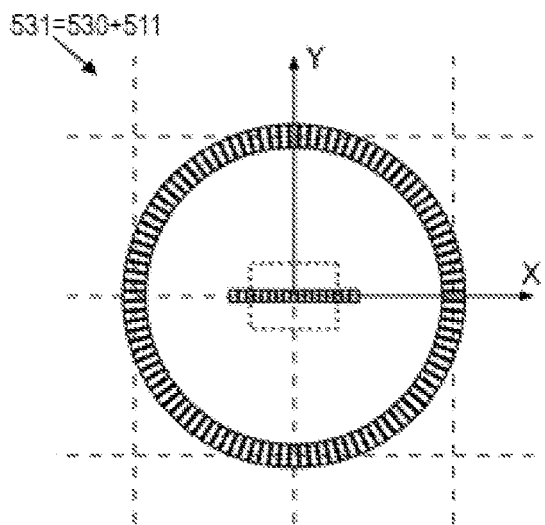
Figure 62D:
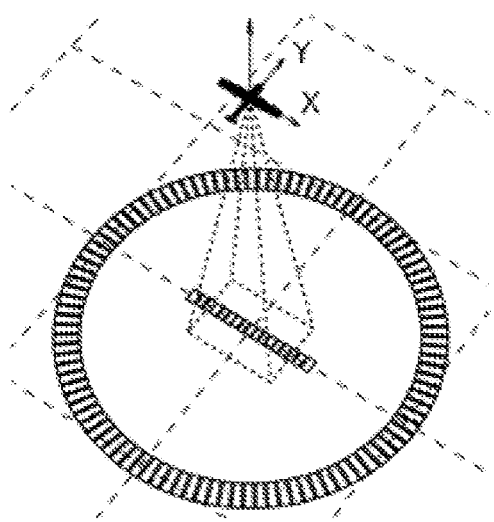
Figure 62E:
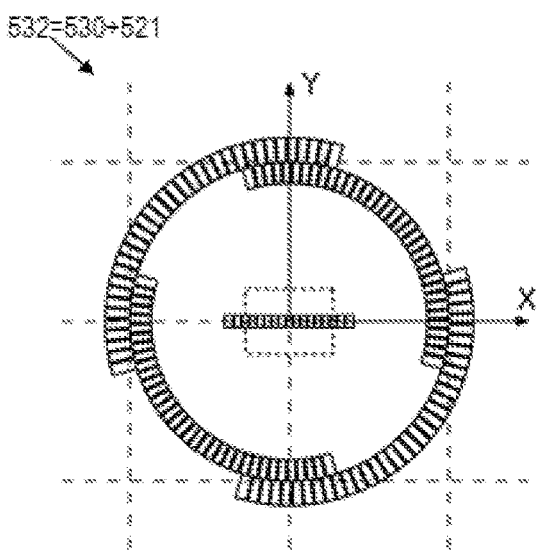
Figure 62F:
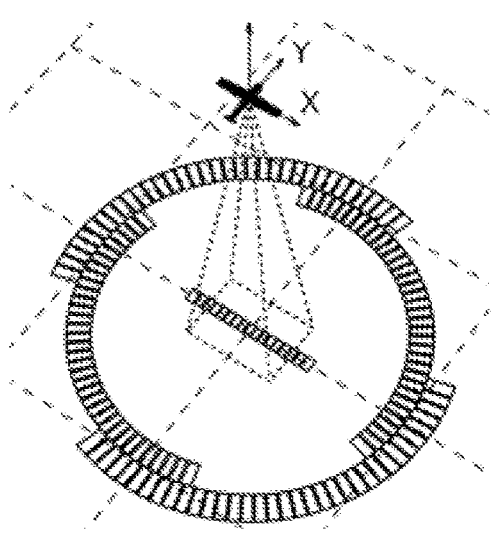
Figure 63A:
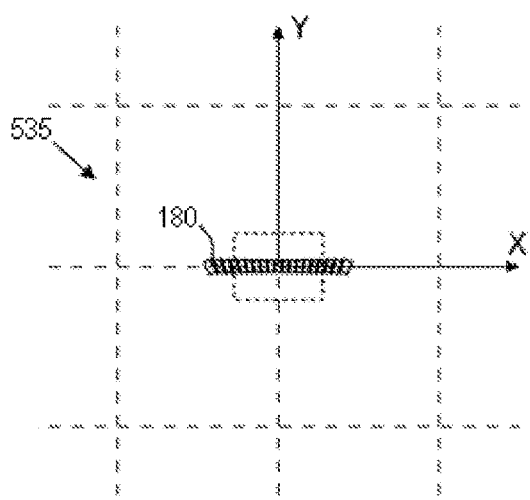
Figure 63B:
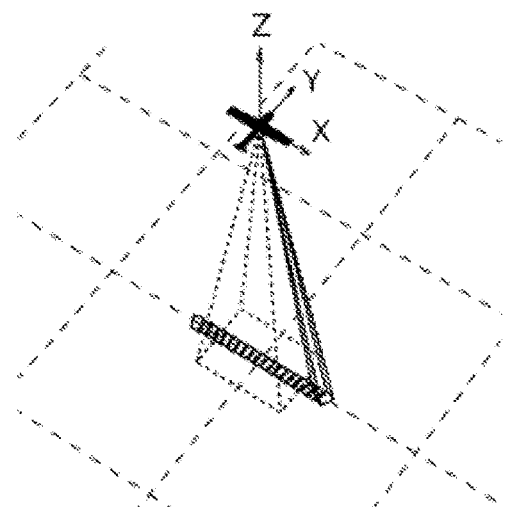
Figure 63C:
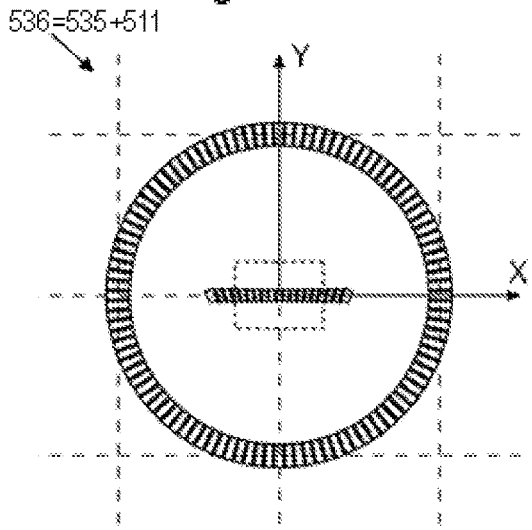
Figure 63D:
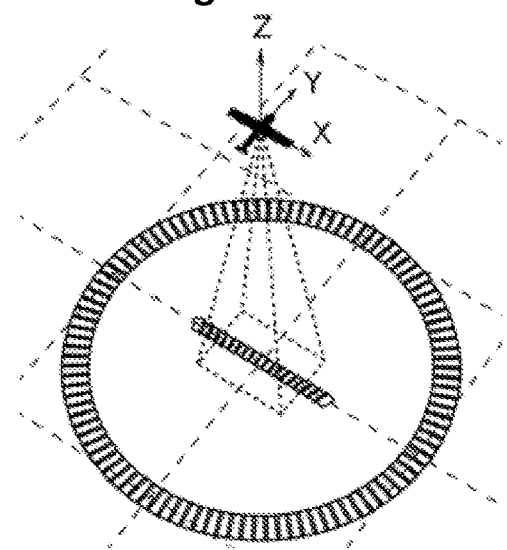
Figure 63E:
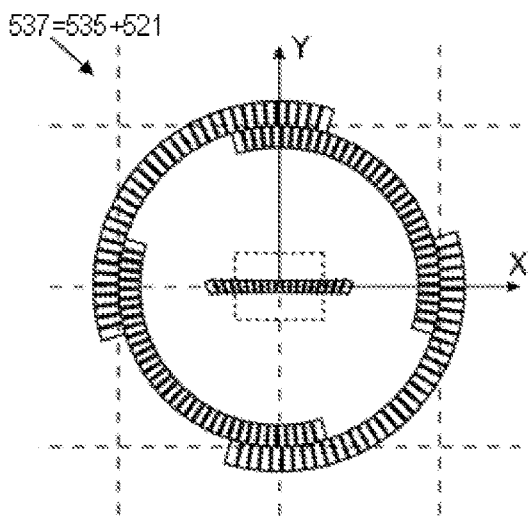
Figure 63F:
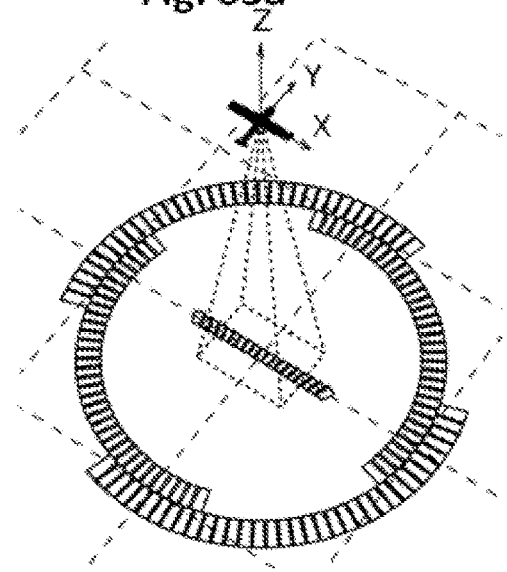

FIG. 49c shows a top down view of a scan pattern for a scan drive unit, according to one exemplary embodiment of the present disclosure;

FIG. 49d shows an oblique view of the scan pattern for the scan drive unit from FIG. 49c, according to one exemplary embodiment of the present disclosure;

FIG. 49e shows a top down view of a scan pattern for a scan drive unit, according to one exemplary embodiment of the present disclosure;

FIG. 49f shows an oblique view of the scan pattern for the scan drive unit from FIG. 49e, according to one exemplary embodiment of the present disclosure;

FIG. 50a shows a scanning camera system from a first perspective, according to one exemplary embodiment of the present disclosure;

FIG. 50b shows the scanning camera system from a second perspective, according to one exemplary embodiment of the present disclosure;

FIG. 50c shows the scanning camera system from a third perspective, according to one exemplary embodiment of the present disclosure;

FIG. 50d shows the scanning camera system from a fourth perspective, according to one exemplary embodiment of the present disclosure;

FIG. 50e shows a top down view of scan patterns for the scanning camera system of FIGS. 50a-50d, according to one exemplary embodiment of the present disclosure;

FIG. 50f shows an oblique view of scan patterns for the scanning camera system of FIGS. 50a-50d, according to one exemplary embodiment of the present disclosure;

FIG. 51a shows a scan drive unit at a first perspective, according to one exemplary embodiment of the present disclosure;

FIG. 51b shows the scan drive unit at a second perspective, according to one exemplary embodiment of the present disclosure;

FIG. 51c shows a top down view of a scan pattern for the scan drive unit, according to one exemplary embodiment of the present disclosure;

FIG. 51d shows an oblique view of the scan pattern for the scan drive unit, according to one exemplary embodiment of the present disclosure;

FIG. 51e shows potential primary mirror geometries, according to one exemplary embodiment of the present disclosure;

FIG. 51f shows potential secondary mirror geometries, according to one exemplary embodiment of the present disclosure;

FIG. 52a shows a top down view of a scan pattern for a scan drive unit, according to one exemplary embodiment of the present disclosure;

FIG. 52b shows an oblique view of a scan pattern for the scan drive unit from FIG. 52a, according to one exemplary embodiment of the present disclosure;

FIG. 52c shows a top down view of a scan pattern for a scan drive unit, according to one exemplary embodiment of the present disclosure;

FIG. 52d shows an oblique view of the scan pattern for the scan drive unit from FIG. 52c, according to one exemplary embodiment of the present disclosure;

FIG. 52e shows a top down view of a scan pattern for a scan drive unit, according to one exemplary embodiment of the present disclosure;

FIG. 52f shows an oblique view of the scan pattern for the scan drive unit from FIG. 52e, according to one exemplary embodiment of the present disclosure;

FIG. 53a shows a top down view of scan patterns for a scanning camera system, according to one exemplary embodiment of the present disclosure;

FIG. 53b shows an oblique view of the scan patterns from FIG. 53a, according to one exemplary embodiment of the present disclosure;

FIG. 53c shows a top down view of scan patterns for a scanning camera system, according to one exemplary embodiment of the present disclosure;

FIG. 53d shows an oblique view of the scan patterns from FIG. 53c, according to one exemplary embodiment of the present disclosure;

FIG. 53e shows a top down view of scan patterns for a scanning camera system, according to one exemplary embodiment of the present disclosure;

FIG. 53f shows an oblique view of the scan patterns from FIG. 53e, according to one exemplary embodiment of the present disclosure;

FIG. 54a shows a scan drive unit at a first perspective, according to one exemplary embodiment of the present disclosure;

FIG. 54b shows the scan drive unit at a second perspective, according to one exemplary embodiment of the present disclosure;

FIG. 54c shows a top down view of a scan pattern for the scan drive unit, according to one exemplary embodiment of the present disclosure;

FIG. 54d shows an oblique view of the scan pattern for the scan drive unit, according to one exemplary embodiment of the present disclosure;

FIG. 54e shows potential primary mirror geometries, according to one exemplary embodiment of the present disclosure;

FIG. 54f shows potential secondary mirror geometries, according to one exemplary embodiment of the present disclosure;

FIG. 55a shows a top down view of scan patterns for a scanning camera system, according to one exemplary embodiment of the present disclosure;

FIG. 55b shows an oblique view of the scan patterns from FIG. 55a, according to one exemplary embodiment of the present disclosure;

FIG. 55c shows a top down view of scan patterns for a scanning camera system, according to one exemplary embodiment of the present disclosure;

FIG. 55d shows an oblique view of the scan patterns from FIG. 55c, according to one exemplary embodiment of the present disclosure;

FIG. 55e shows a top down view of scan patterns for a scanning camera system, according to one exemplary embodiment of the present disclosure;

FIG. 55f shows an oblique view of the scan patterns from FIG. 55e, according to one exemplary embodiment of the present disclosure;

FIG. 56a shows a top down view of a scan pattern for a scan drive unit, according to one exemplary embodiment of the present disclosure;

FIG. 56b shows an oblique view of the scan pattern from FIG. 56a, according to one exemplary embodiment of the present disclosure;

FIG. 56c shows a top down view of a scan pattern for a scan drive unit, according to one exemplary embodiment of the present disclosure;

FIG. 56d shows an oblique view of the scan pattern from FIG. 56c, according to one exemplary embodiment of the present disclosure;

FIG. 56e shows a top down view of a scan pattern for a scan drive unit, according to one exemplary embodiment of the present disclosure;

FIG. 56f shows an oblique view of the scan pattern from FIG. 56e, according to one exemplary embodiment of the present disclosure;

FIG. 57a shows a top down view of a scan pattern for a scan drive unit, according to one exemplary embodiment of the present disclosure;

FIG. 57b shows a top down view of a scan pattern for a scan drive unit, according to one exemplary embodiment of the present disclosure;

FIG. 57c shows a top down view of a scan pattern for a scan drive unit, according to one exemplary embodiment of the present disclosure;

FIG. 57d shows a top down view of a scan pattern for a scan drive unit, according to one exemplary embodiment of the present disclosure;

FIG. 57e shows a top down view of scan patterns for a scanning camera system, according to one exemplary embodiment of the present disclosure;

FIG. 57f shows an oblique view of the scan patterns from FIG. 57e, according to one exemplary embodiment of the present disclosure;

FIG. 58a shows a scan drive unit at a first perspective, according to one exemplary embodiment of the present disclosure;

FIG. 58b shows the scan drive unit at a second perspective, according to one exemplary embodiment of the present disclosure;

FIG. 58c shows a top down view of a scan pattern for the scan drive unit, according to one exemplary embodiment of the present disclosure;

FIG. 58d shows an oblique view of the scan pattern for the scan drive unit, according to one exemplary embodiment of the present disclosure;

FIG. 58e shows scanning mirror structure geometries, according to one exemplary embodiment of the present disclosure;

FIG. 58f shows scanning mirror structure geometries including one for over-rotation, according to one exemplary embodiment of the present disclosure;

FIG. 59a shows a top down view of a scan pattern for a scan drive unit, according to one exemplary embodiment of the present disclosure;

FIG. 59b shows an oblique view of the scan pattern for the scan drive unit, according to one exemplary embodiment of the present disclosure;

FIG. 59c shows a top down view of scan patterns for a scanning camera system, according to one exemplary embodiment of the present disclosure;

FIG. 59d shows an oblique view of the scan patterns for the scanning camera system, according to one exemplary embodiment of the present disclosure;

FIG. 60a shows a scan drive unit at a first perspective, according to one exemplary embodiment of the present disclosure;

FIG. 60b shows the scan drive unit at a second perspective, according to one exemplary embodiment of the present disclosure;

FIG. 60c shows a top down view of a scan pattern for the scan drive unit, according to one exemplary embodiment of the present disclosure;

FIG. 60d shows an oblique view of the scan pattern for the scan drive unit, according to one exemplary embodiment of the present disclosure;

FIG. 60e shows scanning mirror structure geometries, according to one exemplary embodiment of the present disclosure;

FIG. 60f shows scanning mirror structure geometries including one for over-rotation, according to one exemplary embodiment of the present disclosure;

FIG. 61a shows a scan drive unit at a first perspective, according to one exemplary embodiment of the present disclosure;

FIG. 61b shows the scan drive unit at a second perspective, according to one exemplary embodiment of the present disclosure;

FIG. 61c shows a top down view of a scan pattern for the scan drive unit, according to one exemplary embodiment of the present disclosure;

FIG. 61d shows an oblique view of the scan pattern for the scan drive unit, according to one exemplary embodiment of the present disclosure;

FIG. 61e shows scanning mirror structure geometries, according to one exemplary embodiment of the present disclosure;

FIG. 61f shows scanning mirror structure geometries including one for over-rotation, according to one exemplary embodiment of the present disclosure;

FIG. 62a shows a top down view of a scan pattern for a scan drive unit, according to one exemplary embodiment of the present disclosure;

FIG. 62b shows an oblique view of the scan pattern for the scan drive unit, according to one exemplary embodiment of the present disclosure;

FIG. 62c shows a top down view of scan patterns for a scanning camera system, according to one exemplary embodiment of the present disclosure;

FIG. 62d shows an oblique view of the scan patterns for the scanning camera system from FIG. 62c, according to one exemplary embodiment of the present disclosure;

FIG. 62e shows a top down view of scan patterns for a scanning camera system, according to one exemplary embodiment of the present disclosure;

FIG. 62f shows an oblique view of the scan patterns for the scanning camera system form FIG. 62e, according to one exemplary embodiment of the present disclosure;

FIG. 63a shows a top down view of a scan pattern for a scan drive unit, according to one exemplary embodiment of the present disclosure;

FIG. 63b shows an oblique view of the scan pattern for the scan drive unit, according to one exemplary embodiment of the present disclosure;

FIG. 63c shows a top down view of scan patterns for a scanning camera system, according to one exemplary embodiment of the present disclosure;

FIG. 63d shows an oblique view of the scan patterns for the scanning camera system from FIG. 63c, according to one exemplary embodiment of the present disclosure;

FIG. 63e shows a top down view of scan patterns for a scanning camera system, according to one exemplary embodiment of the present disclosure; and FIG. 63f shows an oblique view of the scan patterns for the scanning camera system form FIG. 63e, according to one exemplary embodiment of the present disclosure.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

A scanning camera system may include multiple cameras and coupled beam steering mechanisms mounted in or on a vehicle. For example, a scanning camera system may be mounted within a survey hole of an aerial vehicle or in an external space such as a pod. For the sake of clarity, an aerial vehicle will be used to facilitate discussion of the various embodiments presented herein, though it can be appreciated by one of skill in the art that the vehicle is not limited to being an aerial vehicle.

A scanning camera system is controlled to capture a series of images of an object area (typically the ground) as the aerial vehicle follows a path over a survey region. Each image captures a projected region on the object area with an elevation angle (the angle of the central ray of the image or 'line of sight' to the horizontal plane) and an azimuthal angle (the angle of the central ray around the vertical axis relative to a defined zero azimuth axis). The elevation may also be expressed in terms of the obliqueness (the angle of the central ray of the image or 'line of sight' to the vertical axis), so that vertical imagery with a high elevation corresponds to a low obliqueness and an elevation of 90° corresponds to an obliqueness of 0°. This disclosure will use the ground as the exemplary object area for various embodiments discussed herein, but it can be appreciated that the object does not have to be a ground in other embodiments. For example it may consist of parts of buildings, bridges, walls, other infrastructure, vegetation, natural features such as cliffs, bodies of water, or any other object imaged by the scanning camera system.

The calculation of the projected geometry on the object area from a camera may be performed based on the focal length of the lens, the size of the camera sensor, the location and orientation of the camera, distance to the object area and the geometry of the object area. The calculation may be refined based on nonlinear distortions in the imaging system such as barrel distortions, atmospheric effects and other corrections. Furthermore, if the scanning camera system includes beam steering elements such as mirrors then these must be taken into account in the calculation, for example by modelling a virtual camera based on the beam steering elements to use in place of the actual camera in the projected geometry calculation.

A scanning camera system may consist of one or more scan drive units, each of which includes a scanning element such as a scanning mirror to perform beam steering. A scanning mirror may be driven by any suitable rotating motor (such as a piezo rotation stage, a stepper motor, DC motor or brushless motor) coupled by a gearbox, direct coupled or belt driven. Alternatively the mirror may be coupled to a linear actuator or linear motor via a gear. Each scan drive unit includes a lens to focus light beams onto one or more camera sensors, where the lens may be selected from the group comprising: a dioptric lens, a catoptric lens and a catadioptric lens. Each scan drive unit also includes one or more cameras that are configured to capture a series of images, or frames, of the object area. Each frame has a view elevation and azimuth determined by the scan drive unit geometry and scan angle, and may be represented on the object area by a projected geometry. The projected geometry is the region on the object area imaged by the camera.

Figure 1A:
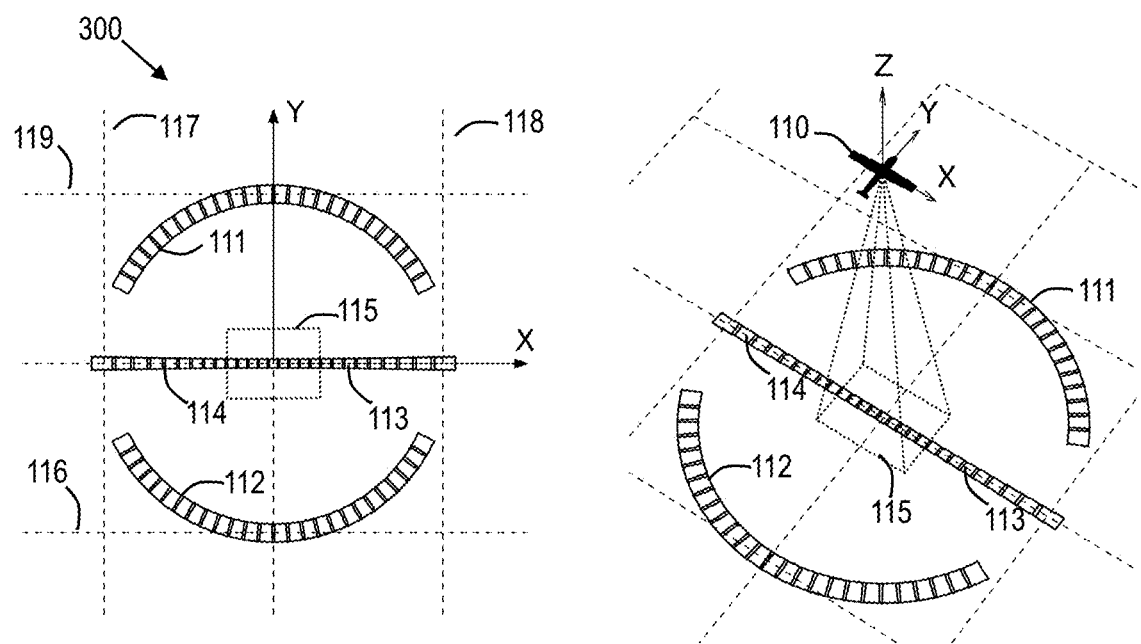
FIG. 1a shows scan patterns for a scanning camera system taken from a stationary aerial vehicle, according to one exemplary embodiment of the present disclosure.

The projected geometry of a sequence of frames captured by a scan drive unit may be combined to give a scan pattern. Referring now to the drawings, where like reference numerals designate identical or corresponding parts throughout the several views, FIG. 1a shows the scan patterns for a scanning camera system 300 with three scan drive units 301, 302, 303 from a top down view (left) and a perspective view (right) showing an aerial vehicle 110. It is noted that the scan patterns in FIG. 1a assume all frames are captured for the same aerial vehicle 110 location. In a real system, the aerial vehicle 110 will move between frame captures as will be discussed later. The x- and y-axes in the plot meet at the location on the ground directly under the aerial vehicle 110. The grid lines 117, 118 correspond to a distance to the left and right of the aerial vehicle 110 equal to the altitude of the aerial vehicle 110. Similarly, the grid lines 119, 116 correspond to a distance forward and behind the aerial vehicle 110 equal to the altitude of the aerial vehicle 110. The two curved scan patterns 111, 112 correspond to the two cameras of the scan drive unit 301, while the two scan patterns 113, 114 are symmetric about the y-axis and correspond to the single camera of each of scan drive unit 302 and scan drive unit 303. The dashed single projective geometry 115 corresponds to a lower resolution overview camera image.

Figure 2:
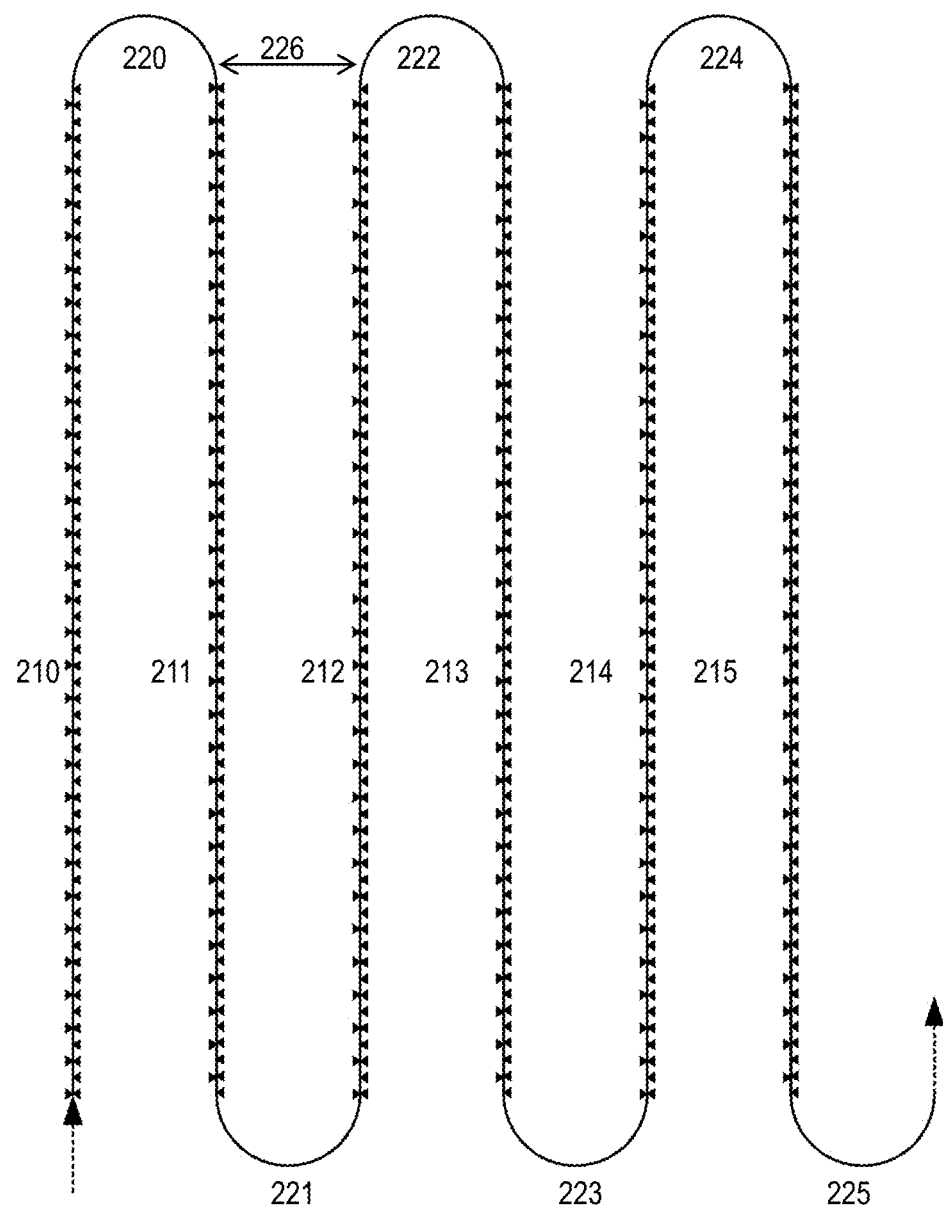
FIG. 2 shows a serpentine flight path that an aerial vehicle can take to capture images using a scanning camera system, according to one exemplary embodiment of the present disclosure.

The aerial vehicle 110 may follow a serpentine flight path such as the one illustrated in FIG. 2. The path consists of a sequence of straight flight lines 210, 211, 212, 213, 214, 215 along a flight direction (the y-axis) connected by curved turning paths 220, 221, 222, 223, 224, 225. The serpentine flight path is characterised by a flight line spacing 226, that is the spacing of adjacent flight lines (210 to 211, 211 to 212, etc.) perpendicular to the flight direction (i.e. along the x-axis in FIG. 2). In general, the flight line spacing is fixed, but may be adaptive to capture some regions with an increased density of images. It is noted that the combined width of the scan patterns may be much wider that the flight line spacing.

Each scan pattern is repeated as the aerial vehicle moves along its flight path over the survey area to give a dense coverage of the scene in the survey area with a suitable overlap of captured images for photogrammetry, forming photomosaics and other uses. Across the flight line this can be achieved by setting the scan angles of frames within a scan pattern close enough together. Along the flight lines this can be achieved by setting a forward spacing between scan patterns (i.e. sets of frames captured as the scan angle is varied) that is sufficiently small. The timing constraints of each scan drive unit may be estimated based on the number of frames per scan pattern, the forward spacing and the speed of the aerial vehicle over the ground. The constraints may include a time budget per frame capture and a time budget per scan pattern.

Figure 1B:
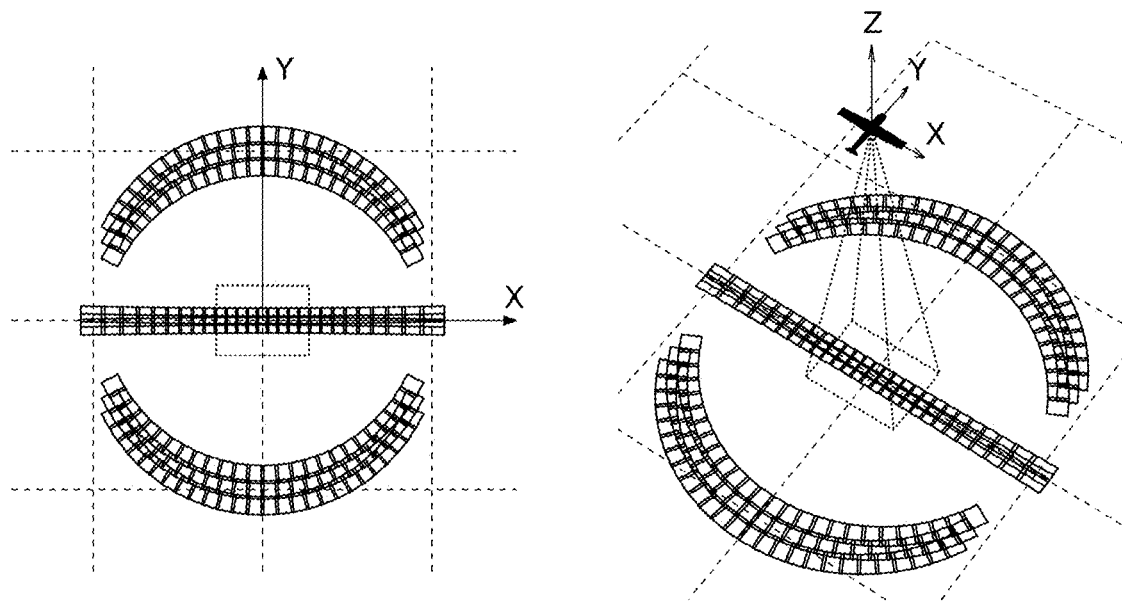
FIG. 1b shows overlapping sets of scan patterns for a scanning camera system taken from a stationary aerial vehicle, according to one exemplary embodiment of the present disclosure.

FIG. 1b shows the scan patterns of the scanning camera system 300 from FIG. 1a with additional scan patterns for each scan drive unit 301, 302, 303 positioned one forward spacing ahead and behind the original object area geometry. In this configuration the scan angle steps and forward spacings are selected to give a 10% overlap of frames. In other configurations, the scan angle steps and forward spacings may be selected to give a fixed number of pixels of overlap in frames, or an overlap corresponding to a specified distance on the object area, or some other criteria.

In general, the timing constraints of scanning camera systems have more restrictive timing constraints than fixed camera systems. However, scanning camera systems may allow an increased flight line spacing for a given number of cameras resulting in a more efficient camera system. They also make more efficient use of the limited space in which they may be mounted in a commercially available aerial vehicle (either internally, such as in a survey hole, or externally, such as in a pod).

The flight lines 210, 211, 212, 213, 214, 215 of the serpentine flight path shown in FIG. 2 are marked with locations spaced at the appropriate forward spacings for the three scan drive units 301, 302, 303. These may be considered to mark the position of the aerial vehicle 110 on the serpentine flight path at which the initial frame of each scan pattern would be captured for each of the three scan drive units 301, 302, 303. The forward spacing used for the scan drive units 302, 303 that correspond to scan patterns 113, 114 in FIG. 1a is approximately half of the forward spacing used for the scan drive unit 301 corresponding to the two curved scan patterns 111, 112 of FIG. 1a for an equal percentage of forward overlap of scan angles.

The flight lines of the serpentine path may take any azimuthal orientation. It may be preferable to align the flight lines (y-axis in FIG. 1a and FIG. 1b) with either a North Easterly or North Westerly direction. In this configuration the scanning camera system 300 illustrated in FIG. 1a and FIG. 1b has advantageous properties for the capture of oblique imagery aligned with the cardinal directions (North, South, East and West).

Figure 3:
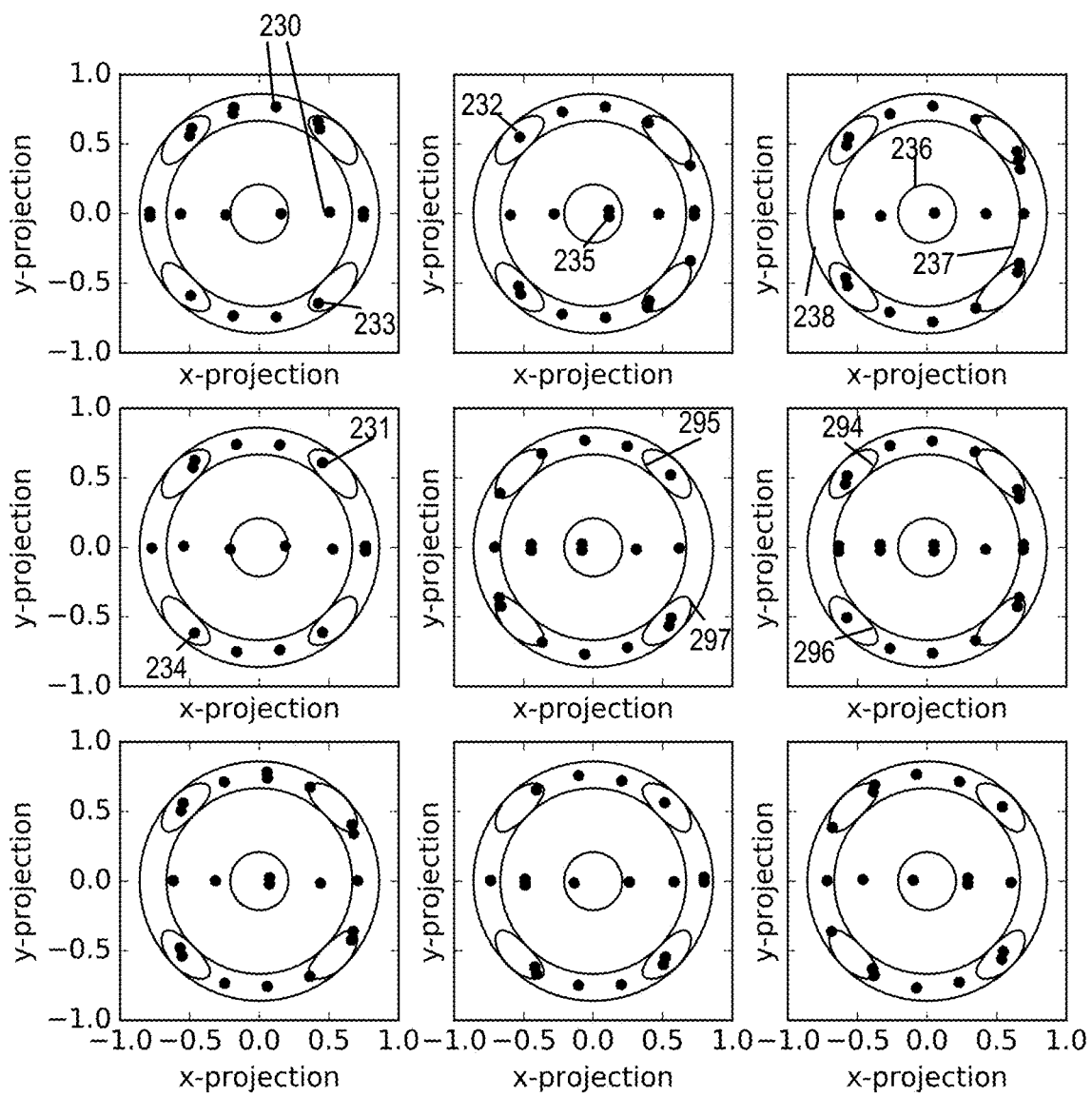
FIG. 3 shows distribution views at various ground locations for a scanning camera system, according to one exemplary embodiment of the present disclosure.

FIG. 3 shows the distribution of views (elevation and azimuth) at nine different ground locations for a scanning camera system 300 with scan patterns as shown in FIG. 1a, and flown with a more realistic serpentine flight path (more and longer flight lines) than the example survey flight path of FIG. 2. Each plot is a Lambert equal area projection with y-axis parallel to the flight lines. The point at coordinate x=0, y=0 corresponds to a view of the ground directly beneath the aerial vehicle 110 with zero obliqueness.

The circles of viewing directions at fixed elevations 236, 237, 238 represent views with obliqueness of 12°, 39° and 51°, respectively. The curved path of viewing directions in the hemisphere 294, 295, 296, 297 represent views with obliqueness between 39° and 51° spaced at 90° azimuthally. The curved path of viewing directions in the hemisphere 294, 295, 296, 297 may represent suitable views for oblique imagery along cardinal directions if the serpentine flight follows a North Easterly or North Westerly flight line direction.

Each viewing direction 230, 231, 232, 233, 234, 235 corresponds to a pixel in an image captured by the scanning camera system 300 and represents the view direction (elevation and azimuth) of that ground location at the time of image capture relative to the aerial vehicle 110 in which the scanning camera system 300 is mounted. Neighbouring pixels in the image would correspond to neighbouring ground locations with similar view directions. The viewing directions 230, 231, 232, 233, 234, 235 either fall within a horizontal band through the centre or a circular band around 45-degree elevation. Viewing directions 230, 235 in the horizontal band correspond to images captured by the cameras of scan drive unit 302 and scan drive unit 303, while viewing directions 231, 232, 233, 234 around the circular band correspond to images captured by scan drive unit 301. Some views may be suitable for oblique imagery (e.g. viewing direction 231, 232, 233, 234) and some for vertical imagery (e.g. viewing direction 235). Other views may be suitable for other image products, for example they may be useful in the generation of a 3D textured model of the area.

The capture efficiency of aerial imaging is typically characterized by the area captured per unit time (e.g. square km per hour). For a serpentine flight path with long flight lines, a good rule of thumb is that this is proportional to the speed of the aircraft and the flight line spacing, or swathe width of the survey. A more accurate estimate would account for the time spent manoeuvring between flight lines. Flying at increased altitude can increase the efficiency as the flight line spacing is proportional to the altitude and the speed can also increase with altitude, however it would also reduce the resolution of the imagery unless the optical elements are modified to compensate (e.g. by increasing the focal length or decreasing the sensor pixel pitch).

The data efficiency of a scanning camera system may be characterised by the amount of data captured during a survey per area (e.g. gigabyte (GB) per square kilometre (km)). The data efficiency increases as the overlap of images decreases and as the number of views of each point on the ground decreases. The data efficiency determines the amount of data storage required in a scanning camera system for a given survey, and will also have an impact on data processing costs. Data efficiency is generally a less important factor in the economic assessment of running a survey than the capture efficiency as the cost of data storage and processing is generally lower than the cost of deploying an aerial vehicle with a scanning camera system.

The maximum flight line spacing of a given scanning camera system may be determined by analysing the combined projection geometries of the captured images on the ground (scan patterns) along with the elevation and azimuth of those captures, and any overlap requirements of the images such as requirements for photogrammetry methods used to generate image products.

In order to generate high quality imaging products, it may be desirable to: (1) image every point on the ground with a diversity of capture elevation and azimuth, and (2) ensure some required level of overlap of images on the object area (e.g. for the purpose of photogrammetry or photomosaic formation)

The quality of an image set captured by a given scanning camera system operating with a defined flight line spacing may depend on various factors including image resolution and image sharpness.

The image resolution, or level of detail captured by each camera, is typically characterized by the ground sampling distance (GSD), i.e. the distance between adjacent pixel centres when projected onto the object area (ground) within the camera's field of view. The calculation of the GSD for a given camera system is well understood and it may be determined in terms of the focal length of the camera lens, the distance to the object area along the line of sight, and the pixel pitch of the image sensor. The distance to the object area is a function of the altitude of the aerial camera relative to the ground and the obliqueness of the line of sight.

The sharpness of the image is determined by several factors including: the lens/sensor modular transfer function (MTF); the focus of the image on the sensor plane; the surface quality (e.g. surface irregularities and flatness) of any reflective surfaces (mirrors); the stability of the camera system optical elements; the performance of any stabilisation of the camera system or its components; the motion of the camera system relative to the ground; and the performance of any motion compensation units.

The combined effect of various dynamic influences on an image capture may be determined by tracking the shift of the image on the sensor during the exposure time. This combined motion generates a blur in the image that reduces sharpness. The blur may be expressed in terms of a drop in MTF. Two important contributions to the shift of the image are the linear motion of the scanning camera system relative to the object area (sometimes referred to as forward motion) and the rate of rotation of the scanning camera system (i.e. the roll, pitch and yaw rates). The rotation rates of the scanning camera system may not be the same as the rotation rates of the aerial vehicle if the scanning camera system is mounted on a stabilisation system or gimbal.

The images captured by a scanning camera system may be used to create a number of useful image based products including: photomosaics including orthomosaic and panoramas; oblique imagery; 3D models (with or without texture); and raw image viewing tools.

In addition to the resolution and sharpness, the quality of the captured images for use to generate these products may depend on other factors including: the overlap of projected images; the distribution of views (elevations and azimuths) over ground points captured by the camera system during the survey; and differences in appearance of the area due to time and view differences at image capture (moving objects, changed lighting conditions, changed atmospheric conditions, etc.).

The overlap of projected images is a critical parameter when generating photomosaics. It is known that the use of a low-resolution overview camera may increase the efficiency of a system by reducing the required overlap between high resolution images required for accurate photogrammetry. This in turn improves the data efficiency and increases the time budgets for image capture.

The quality of the image set for vertical imagery depends on the statistics of the obliqueness of capture images over ground points. Any deviation from the zero obliqueness results in vertical walls of buildings being imaged, resulting in a leaning appearance of the buildings in the vertical images. The maximum obliqueness is the maximum deviation from vertical in an image, and is a key metric of the quality of the vertical imagery. The maximum obliqueness may vary between 10° for a higher quality survey up to 25° for a lower quality survey. The maximum obliqueness is a function of the flight line spacing and the object area projective geometry of captured images (or the scan patterns) of scan drive units.

An orthomosaic blends image pixels from captured images in such a way as to minimise the obliqueness of pixels used while also minimising artefacts where pixel values from different original capture images are adjacent. The maximum obliqueness parameter discussed above is therefore a key parameter for orthomosaic generation, with larger maximum obliqueness resulting in a leaning appearance of the buildings. The quality of an orthomosaic also depends on the overlap of adjacent images captured in the survey. A larger overlap allows the seam between pixels taken from adjacent images to be placed judiciously where there is little texture, or where the 3D geometry of the image is suitable for blending the imagery with minimal visual artefact. Furthermore, differences in appearance of the area between composited image pixels result in increased artefacts at the seams also impacting the quality of the generated orthomosaic.

The quality of imagery for oblique image products can be understood along similar lines to that of vertical imagery and orthomosaics. Some oblique imagery products are based on a particular viewpoint, such as a 45-degree elevation image with azimuth aligned with a specific direction (e.g. the four cardinal directions North, South, East or West). The captured imagery may differ from the desired viewpoint both in elevation and azimuth. Depending on the image product, the loss of quality due to errors in elevation or azimuth will differ. Blended or stitched image oblique products (sometimes referred to as panoramas) may also be generated. The quality of the imagery for such products will depend on the angular errors in views and also on the overlap between image views in a similar manner to the discussion of orthomosaic imagery above.

The quality of a set of images for the generation of a 3D model is primarily dependent on the distribution of views (elevation and azimuth) over ground points. In general, it has been observed that decreasing the spacing between views and increasing the number of views will both improve the expected quality of the 3D model. Heuristics of expected 3D quality may be generated based on such observations and used to guide the design of a scanning camera system.

FIGS. 4a-4f, 5a-5f and 6a-6f demonstrate the scan drive units 301, 302, 303 that can be used to achieve the scan patterns of FIG. 1a. The first scan drive unit 301, shown in FIGS. 4a and 4b, can be used to capture scan patterns 111, 112 having circular arcs centred around an elevation of 45°. Top down and oblique views of the scan patterns 111, 112 from the two cameras 310, 311 of scan drive unit 301 are shown in FIGS. 4c and 4d, respectively.

Figure 4A:
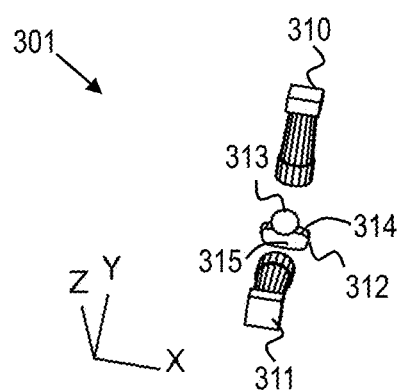
FIG. 4a shows a scan drive unit from a first perspective, according to one exemplary embodiment of the present disclosure.
Figure 4B:
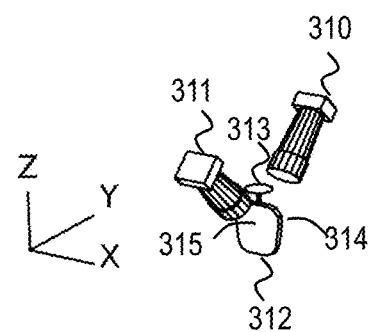
FIG. 4b shows the scan drive unit from a second perspective, according to one exemplary embodiment of the present disclosure.
Figure 4C:
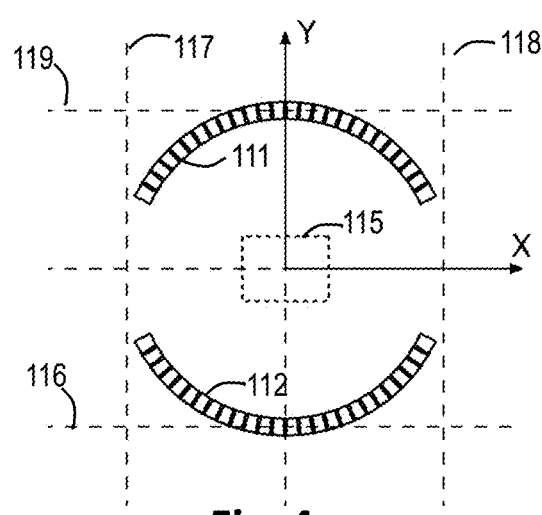
FIG. 4c shows a scan pattern captured by the scan drive unit from a top down view, according to one exemplary embodiment of the present disclosure.
Figure 4D:
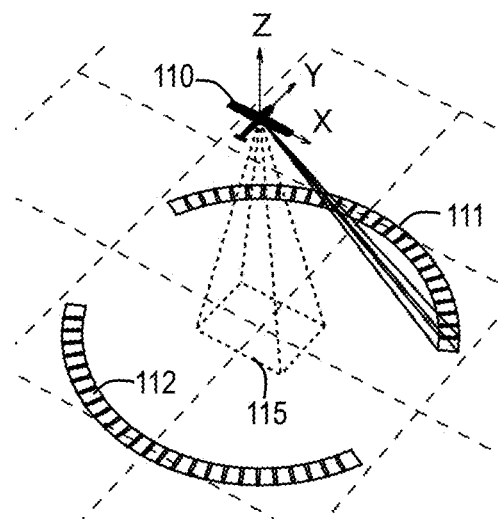
FIG. 4d shows the scan pattern captured by the scan drive unit from an oblique view, according to one exemplary embodiment of the present disclosure.

Two geometric illustrations of the scan drive unit 301 from different perspectives are shown in FIGS. 4a and 4b. The scan drive unit 301 comprises a scanning mirror structure 312 attached to a scan drive 313 on a vertical scan axis (elevation $\theta_S=-90°$ and azimuth $\phi_S=0°$). In one embodiment, the scanning mirror structure 312 is double-sided. The geometric illustration shows the configuration with the scan angle of the scan drive 313 set to 0° so that the first mirror surface 314 is oriented (elevation $\theta_M^1=0°$ and azimuth $\phi_M^1=0°$) with its normal directed toward the first camera 310 along the y-axis. A second mirror surface 315 is mounted on the opposite side of the scanning mirror structure 312 and directed toward the second camera 311. The two cameras 310, 311 are oriented downward at an oblique angle but with opposing azimuths (camera 310 elevation $\theta_S=-45°$ and azimuth $\phi_S=180°$, camera 311 elevation $\theta_S=-45°$ and azimuth $\phi_S=0°$).

In one example, the cameras 310, 311 utilise the Gpixel GMAX3265 sensor (9344 by 7000 pixels of pixel pitch 3.2 microns). The camera lenses may have a focal length of 420 mm and aperture of 120 mm (corresponding to F3.5). The scanning mirror structure 312 may have a thickness of 25 mm. Unless otherwise stated, all illustrated cameras utilise the Gpixel GMAX3265 sensor, with a lens of focal length 420 mm and aperture of 120 mm (F3.5), and all mirrors illustrated have a thickness of 25 mm.

The optical axis of a lens is generally defined as an axis of symmetry of the lens. For example it may be defined by a ray passing from a point at or near the centre of the sensor through the lens elements at or near to their centres. The optical axis of a lens in a scan drive unit may be modified by one or more mirror structures of the scan drive unit. It may extend beyond the lens, reflect at one or more mirror surfaces, then continue to a point on the object area. The distance from the camera 310 to the mirror surface 314 along the optical axis may be 247 mm. The distance from the second camera 311 to the second mirror surface 315 along the optical axis may also 247 mm. In other embodiments, the distances between elements may be selected in order that the components fit within the required space, and the scan drive unit 301 is able to rotate by the required angular range (which may be between ±30.7° and ±46.2° for the two sided arrangement described here). The scanning mirror structure 312 rotation axis is assumed to intersect the optical axis of one or both cameras 310, 311. The distances between components of all scan drive units presented in this specification may be selected to best fit within the available space while allowing the required angular range of rotation of the scanning mirror structure.

The shape of the reflective surface of the scanning mirror structure should be large enough to reflect the full beam of rays imaged from the area on the ground onto the camera lens aperture so they are focused onto the camera sensor as the scan angle of the scan drive unit varies over a given range of scan angles. In one embodiment of scanning mirror structure 312, the standard range of scan angles is −30.7° to 30.7°. Existing methods have been described elsewhere that may be used to calculate a suitable scanning mirror structure shape for which this criterion is met.

One suitable method determines the geometry of regions of the scanning mirror structure surface that intersects the beam profile defined by rays passing between the object area and the camera sensor through the lens aperture at each sampled scan angle. The beam profile may vary from circular at the aperture of the camera, to a rectangular shape corresponding to the sensor shape at the focus distance. The union of the geometries of these intersection regions on the mirror surface gives the required scanning mirror structure size to handle the sampled set of scan angles. In some instances, the calculated scanning mirror structure shape may be asymmetric about the axis of rotation, and so it may be possible to reduce the moment of inertia of the scanning mirror structure by shifting the axis of rotation. In this case, the scanning mirror structure geometry may be re-calculated for the shifted axis of rotation. The re-calculated shape may still be asymmetric around the axis of rotation, in which case the process of shifting the axis of rotation and re-calculating the geometry may be iterated until the scanning mirror structure is sufficiently close to symmetric and the moment of inertia is minimised.

The methods described above generate the geometry of the scanning mirror structure required for a particular sensor orientation in the camera. The sensors of the scan drive units 301, 302, 303 shown in FIGS. 4a-4f, 5a-5f and 6a-6f are oriented in what may be referred to as a landscape orientation. Viewed from above, the projected geometry of the image captured closest to the y-axis has a landscape geometry (it is wider along the x-axis than it is long along the y-axis). Alternative embodiments may use a sensor oriented at 90° to that illustrated in FIGS. 4a-4f, 5a-5f and 6a-6f, referred to as a portrait orientation. Viewed from above, the projected geometry of the image captured closest to the y-axis would have a portrait geometry (it is narrower along the x-axis than it is long along the y-axis). Other embodiments may use any orientation between landscape and portrait orientation.

It may be advantageous to use a scanning mirror structure geometry that is large enough to handle the portrait orientation of the sensor in addition to the landscape orientation. Such a scanning mirror structure geometry may be generated as the union of the landscape orientation and portrait orientation mirror geometries. Such a scanning mirror structure geometry may allow greater flexibility in the configuration of the scan drive use. Further, it may be advantageous to use a scanning mirror structure geometry that can handle any orientation of the sensor by considering angles other than the landscape and portrait orientations. Such a scanning mirror structure can be calculated assuming a sensor that is circular in shape with a diameter equal in size to the diagonal length of the sensor.

The scanning mirror structure may comprise aluminium, beryllium, silicon carbide, fused quartz or other materials. The scanning mirror structure may include hollow cavities to reduce mass and moment of inertia, or be solid (no hollow cavities) depending on the material of the scanning mirror structure. The mirror surface may be coated to improve the reflectivity and or flatness, for example using nickel, fused quartz or other materials. The coating may be on both sides of the scanning mirror structure to reduce the thermal effects as the temperature of the scanning mirror structure changes. The required flatness of the mirror surface may be set according to the required sharpness of the capture images and the acceptable loss of sharpness due to the mirror reflection. The mirror surface may be polished to achieve the required flatness specification.

The thickness of a scanning mirror structure is generally set to be as small as possible, so as to reduce mass and minimise spatial requirements, while maintaining the structural integrity of the scanning mirror structure so that it can be dynamically rotated within the time budget of the captured images of the scan patterns without compromising the optical quality of captured images. In one embodiment, a thickness of 25 mm may be suitable.

Depending on the manufacturing process and materials used in the fabrication of the scanning mirror structure, it may be advantageous to use a convex mirror shape. In this case, the convex hull of the shape calculated above may be used as the scanning mirror structure shape. Furthermore, the scanning mirror structure shape may be dilated in order to ensure that manufacturing tolerances in the scanning mirror structure and other components of the scan drive unit or control tolerances in setting the scan angle do not result in any stray or scattered rays in the system and a consequent loss of visual quality.

Figure 4E:
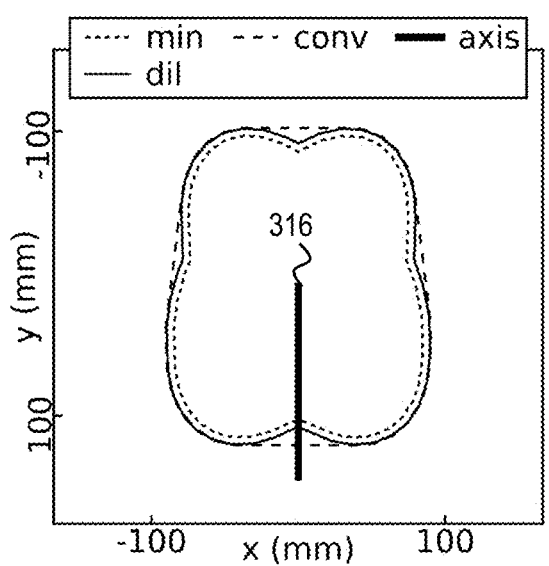
FIG. 4e shows a first set of potential geometries for a scanning mirror structure in the scan drive unit, according to one exemplary embodiment of the present disclosure.

FIG. 4e shows various scanning mirror structure geometries calculated for the scan drive unit 301. These include the minimum geometry ("min"), a dilated minimum geometry that is extended by 5 mm beyond the minimum geometry around its perimeter ("dilate") and a dilated convex geometry that is the convex hull of the dilated minimum geometry ("convex"). Any of these geometries, or other variants that may be envisaged (e.g. to handle alternative sensor orientations), may be used to define the shape of the scanning mirror structure 312 for this scan drive unit 301.

The axis of rotation 316 was selected such that it intersects the ray along the optical axis of the lens through the centre of the aperture. The scan drive unit would be attached at the end that extends beyond the scanning mirror structure 312. The centre of mass of the scanning mirror structure 312 is aligned with the axis of rotation 316, so that no shift of the axis of rotation is required.

Figure 4F:
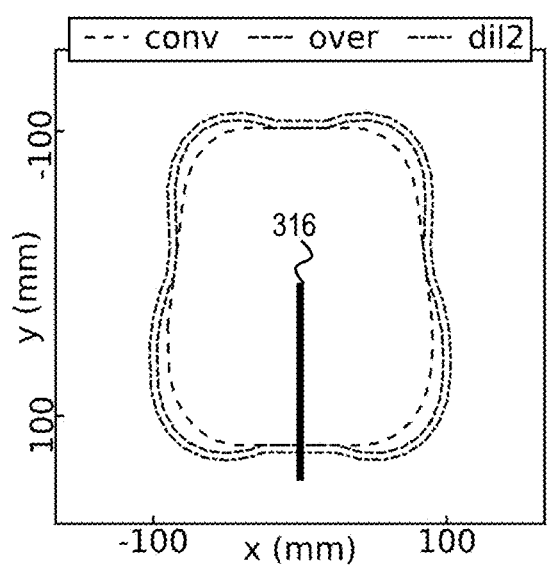
FIG. 4f shows a second set of potential geometries for the scanning mirror structure in the scan drive unit, according to one exemplary embodiment of the present disclosure.

FIG. 4f shows the dilated convex geometry again ("convex"), and also an extended geometry that might be required if the range of scan angles is extended by 7.5° at each end of the scan angle range ("over"). The angular spacing of the scan angle samples is kept roughly the same as the original in the calculation by increasing the number of sample steps. This geometry will be discussed further later in this specification with reference to over-rotation for yaw correction.

FIG. 4g shows a magnified view of additional geometries of mirrors and/or paddle flaps, according to an embodiment. For example, as can be seen in FIG. 4g, paddle flaps (hatched line areas) can cover an entire perimeter of a mirror, or one or more portions thereof. The mirrors and/or paddle flaps can be symmetric or asymmetric.

The capture of images on opposite mirror surfaces (e.g. mirror surface 314, 315) may be synchronised or not synchronised. In general the image capture takes place once the scanning mirror structure has come completely to rest in order to achieve a high image quality. In other arrangements, image stabilisation may be used to compensate for mirror motion during image exposure.

In a slightly modified arrangement, the scanning mirror structure 312 may employ a single mirror surface (i.e. one of mirror surface 314 or 315) and the scanning mirror structure 312 may rotate through a full 360°, using the scan drive 313, so that the single mirror surface may be used in turn by the two cameras 311, 310. For example, in a modified arrangement, the second mirror surface 315 does not need to be a mirror surface. This multiplexing arrangement would have tighter requirements on the timing of image capture as the images are not captured simultaneously for both mirror surfaces 314, 315.

Figure 5A:
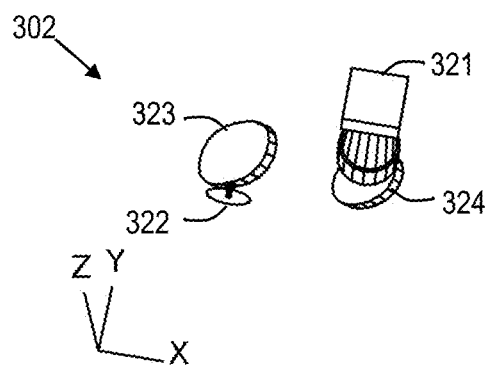
FIG. 5a shows another scan drive unit from a first perspective, according to one exemplary embodiment of the present disclosure.
Figure 5B:
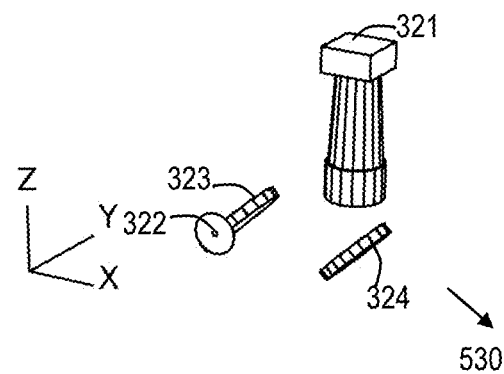
FIG. 5b shows the scan drive unit from a second perspective, according to one exemplary embodiment of the present disclosure.
Figure 5C:
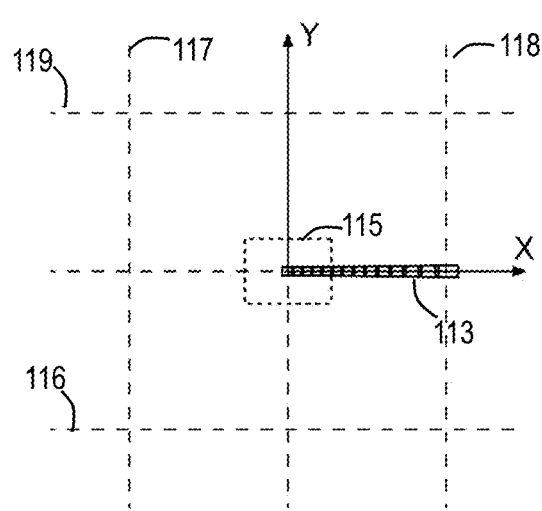
FIG. 5c shows a scan pattern captured by the scan drive unit from a top down view, according to one exemplary embodiment of the present disclosure.
Figure 5D:
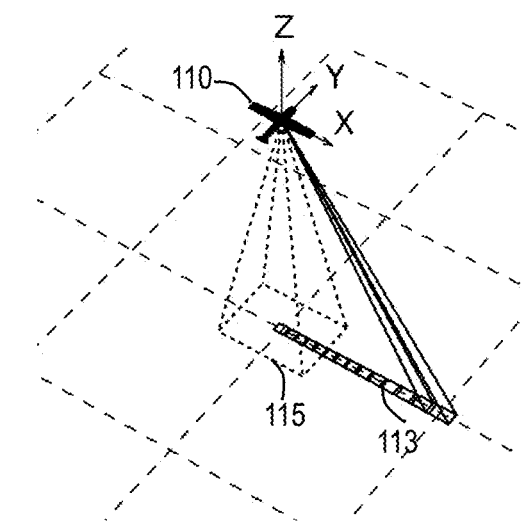
FIG. 5d shows the scan pattern captured by the scan drive unit from an oblique view, according to one exemplary embodiment of the present disclosure.

The second scan drive unit 302 of the scanning camera system 300 is shown in FIG. 5a-5f. As shown in FIGS. 5c and 5d, scan drive unit 302 can be used to capture a single straight scan pattern 113 at a right angle to the flight line from 0 to 45° obliqueness. The scan pattern 113 extends to the right of the aerial vehicle 110 looking ahead along the flight line. Two geometric illustration of the scan drive unit 302 from different perspectives are shown in FIG. 5a and FIG. 5b. The scan drive unit 302 comprises a single sided scanning primary mirror 323 held on a horizontal scan axis (elevation $\theta_S=-0°$ and azimuth $\phi_S=180°$), and a fixed secondary mirror 324. The geometric illustration shows the configuration with the scan angle of the scan drive 322 set to 0° at which angle the primary mirror's 323 surface is oriented with a normal directed at an oblique between the z- and x-axes (elevation $\theta_M^1=-45°$ and azimuth $\phi_M^1=90°$). The secondary mirror 324 is oriented with a normal opposing that of the primary mirror 323 when the scan angle is 0° (elevation $\theta_M^1=45°$ and azimuth $\phi_M^1=-90°$). There is a single camera 321 which is directed downwards at an angle of 1 degree to the vertical z-axis (elevation $\theta_S=-89°$ and azimuth $\phi_S=-90°$. Scan drive 322 samples scan angles from $-23°$ to $-0.5°$ in order to generate the scan pattern 113.

In one embodiment, the distance from the lens of camera 321 to the secondary mirror 324 along the optical axis may be 116 mm, and the distance from the primary mirror 323 to secondary mirror 324 may be 288 mm along the optical axis. Of course, other distances may be used in other embodiments.

Figure 5E:
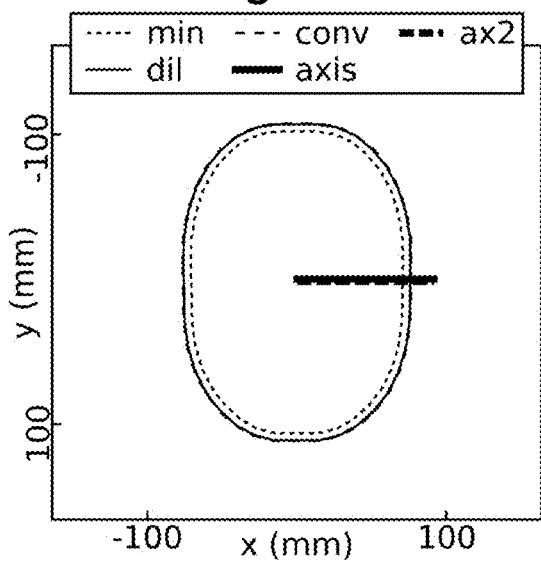
FIG. 5e shows potential geometries for a primary mirror in the scan drive unit, according to one exemplary embodiment of the present disclosure.
Figure 5F:
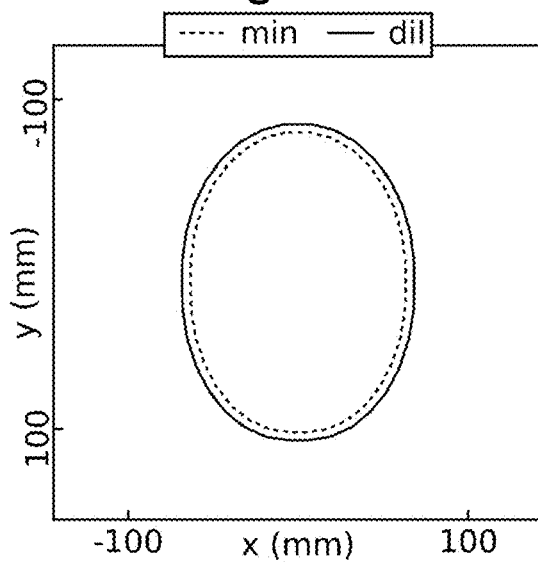
FIG. 5f shows potential geometries for a secondary mirror in the scan drive unit, according to one exemplary embodiment of the present disclosure.

There are two mirror geometries to consider for scan drive unit 302. Example geometries of the (scanning) primary mirror 323 are shown in FIG. 5e, including the minimal geometry ("min"), dilated geometry ("dilate") and convex geometry ("convex"), which is essentially the same as the dilated geometry. The centroid of the computed primary mirror was found to be shifted relative to the scan drive axis projected to the mirror surface, so FIG. 5e shows a shifted scan drive axis that may be used to reduce the moment of inertia as discussed above. Example geometries of the (fixed) secondary mirror 324 are shown in FIG. 5f, including the minimum geometry ("min") and dilated geometry ("dilate").

Figure 6A:
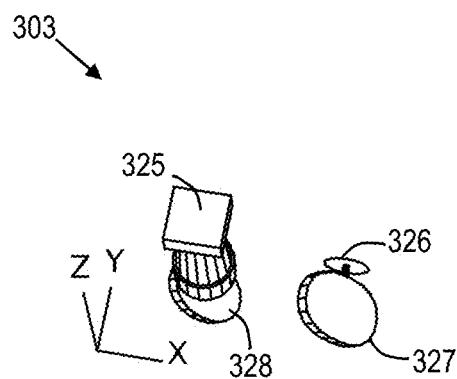
FIG. 6a shows another scan drive unit from a first perspective, according to one exemplary embodiment of the present disclosure.
Figure 6B:
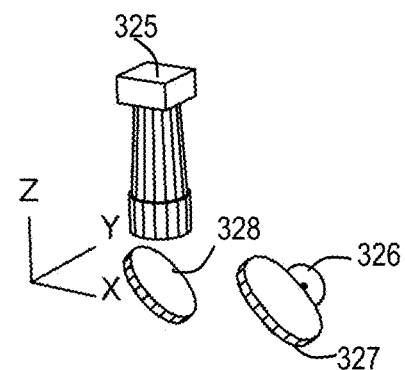
FIG. 6b shows the scan drive unit from a second perspective, according to one exemplary embodiment of the present disclosure.
Figure 6C:
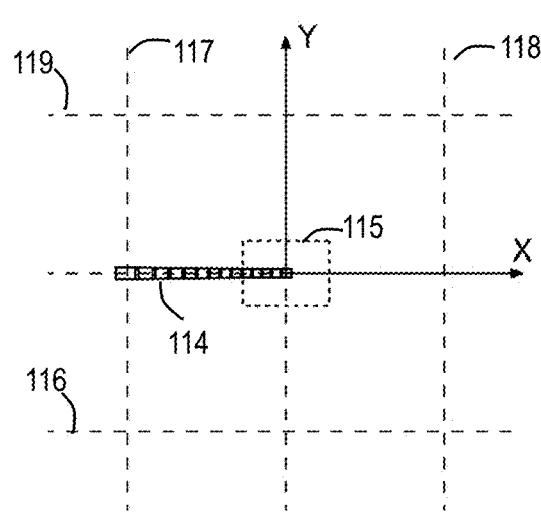
FIG. 6c shows a scan pattern captured by the scan drive unit from a top down view, according to one exemplary embodiment of the present disclosure.
Figure 6D:
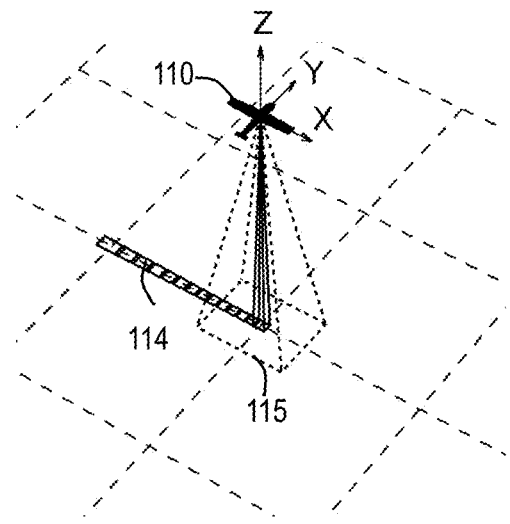
FIG. 6d shows the scan pattern captured by the scan drive unit from an oblique view, according to one exemplary embodiment of the present disclosure.
Figure 6E:
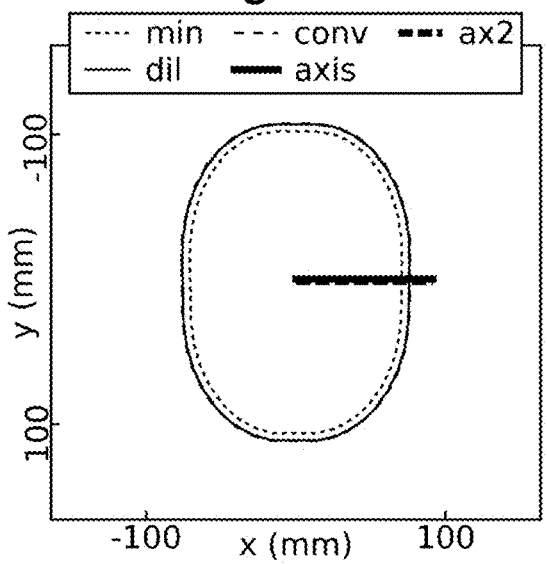
FIG. 6e shows potential geometries for a primary mirror in the scan drive unit, according to one exemplary embodiment of the present disclosure.
Figure 6F:
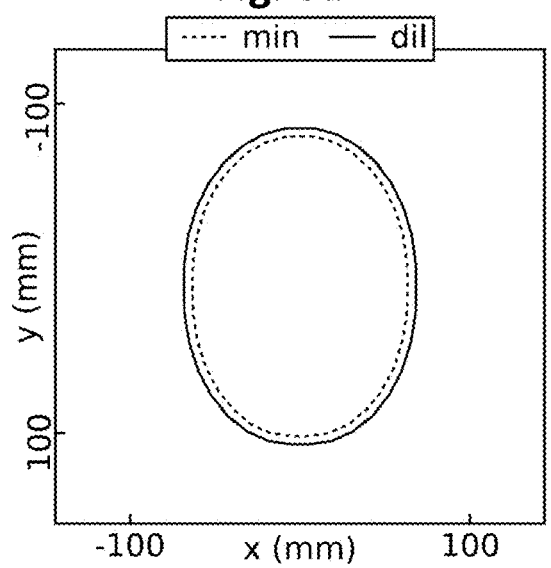
FIG. 6f shows potential geometries for a secondary mirror in the scan drive unit, according to one exemplary embodiment of the present disclosure.

The third scan drive unit 303, illustrated in FIGS. 6a and 6b, is a clone of the second scan drive unit 302 rotated by 180° around the z-axis. FIGS. 6a and 6b include camera 325, primary mirror 327, scan drive 326, and secondary mirror 328. As shown in FIGS. 6c and 6d, due to the symmetry of the scan drive units 302, 303, the scan pattern 114 for scan drive unit 303 is a mirror image of scan pattern 113 for scan drive unit 302, following a straight path that extends to the left of the aerial vehicle 110 looking forward along the flight line. The mirror geometries and dynamics shown in FIGS. 6e and 6f are identical to those described with reference to FIGS. 5e and 5f above.

FIGS. 7a to 7d show a range of perspective views of the combined components of scan drives 301, 302, 303 of the scanning camera system 300 that were described with respect to FIGS. 4a-4f, 5a-5f, and 6a-6f above including: cameras 310, 311, 321, 325; scanning mirror structure 312 with mirror surfaces 314, 315 attached to a scan drive 313; two primary mirrors 323, 327 attached to scan drives 322, 326; and two fixed secondary mirrors 324, 328.

It can be seen in FIGS. 7a-7d that the scan drive unit 302 structure is arranged so that it's imaging path passes under camera 310 of scan drive unit 301, and scan drive unit 303 is arranged so that it's imaging path passes under camera 311 of scan drive unit 301. This arrangement is highly efficient spatially and advantageous for deployment in a wide range of aerial vehicle camera (survey) holes.

Figure 7A:
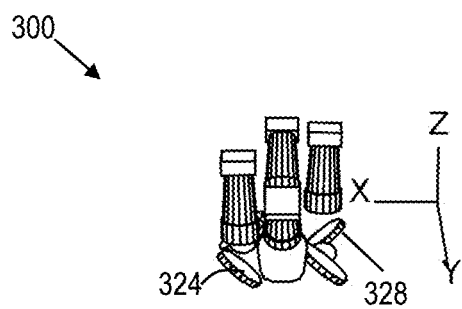
FIG. 7a shows a scanning camera system from a first perspective, according to one exemplary embodiment of the present disclosure.
Figure 7B:
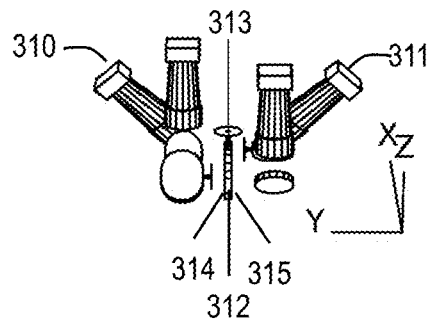
FIG. 7b shows the scanning camera system from a second perspective, according to one exemplary embodiment of the present disclosure.
Figure 7C:
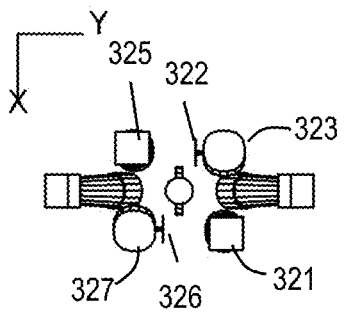
FIG. 7c shows the scanning camera system from a third perspective, according to one exemplary embodiment of the present disclosure.
Figure 7D:
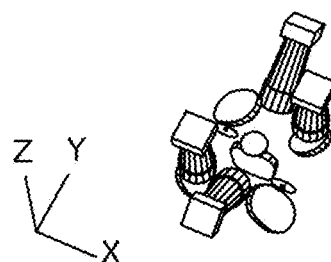
FIG. 7d shows the scanning camera system from a fourth perspective, according to one exemplary embodiment of the present disclosure.
Figure 7E:
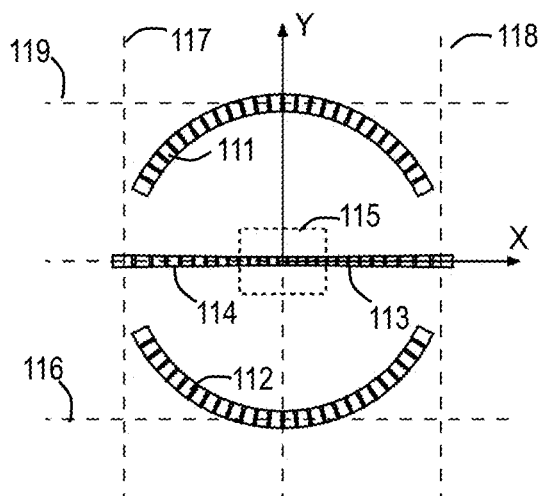
FIG. 7e shows scan patterns captured by the scanning camera system from a top down view, according to one exemplary embodiment of the present disclosure.
Figure 7F:
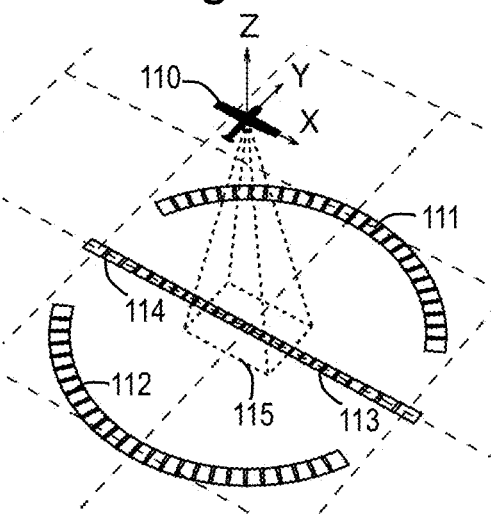
FIG. 7f shows scan patterns captured by the scanning camera system from an oblique view, according to one exemplary embodiment of the present disclosure.

FIGS. 7e and 7f show the scan patterns achieved using the scanning camera system 300 including curved scan patterns 111, 112 of oblique imagery, and straight scan patterns 113, 114 that capture a sweep of images from vertical to oblique along a direction perpendicular to the flight line. Further to the scan drive unit imaging capability, the scanning camera system 300 may additionally include one or more fixed cameras. These cameras may be standard RGB cameras, infrared cameras, greyscale cameras, multispectral cameras, hyperspectral cameras or other suitable cameras. In one embodiment, fixed camera may be a Phase One iXM100 camera sensor (11664×8750 pixels of 3.76 micron pitch) with an 80 mm F5.6 lens. Single or multipoint LIDAR camera systems may also be incorporated into the scanning camera system.

The fixed camera may be used as an overview camera, and the capture rate of the fixed camera may be set in order to achieve a desired forwared overlap between captured images, such as 60%. The flight line spacing of the survey may be limited such that the sideways overlap of overview camera images achieves a second desired goal, such as 40%. The overview camera may be directed vertically downward and may be rotated about the vertical axis such that the projected geometry on the object area is not aligned with the orientation of the aerial vehicle.

Figure 8A:
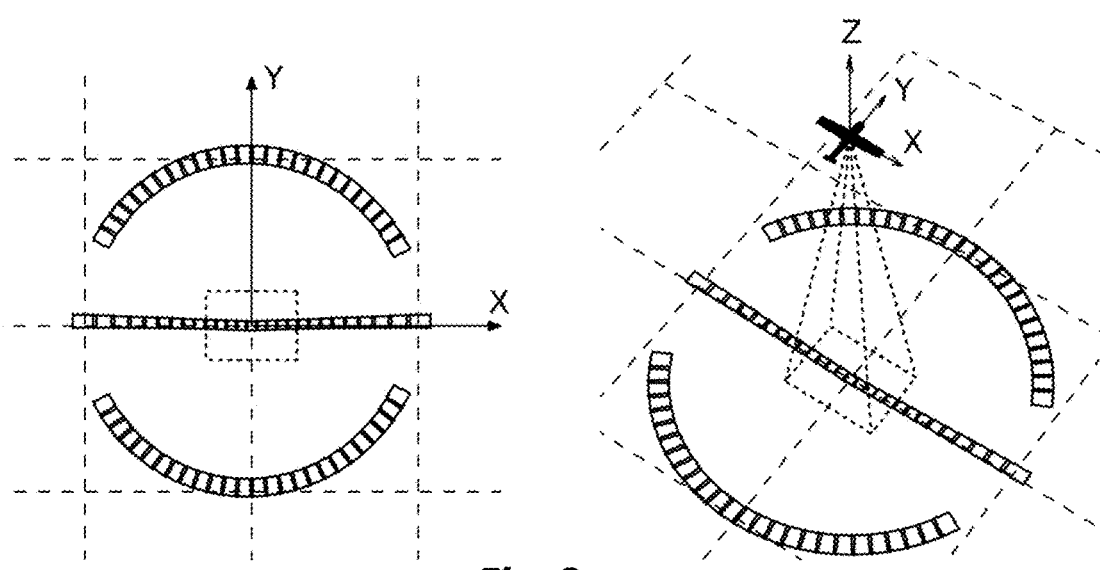
FIG. 8a shows top down and oblique views of a scan pattern taken from an aerial vehicle with forward motion, according to one exemplary embodiment of the present disclosure.
Figure 8B:
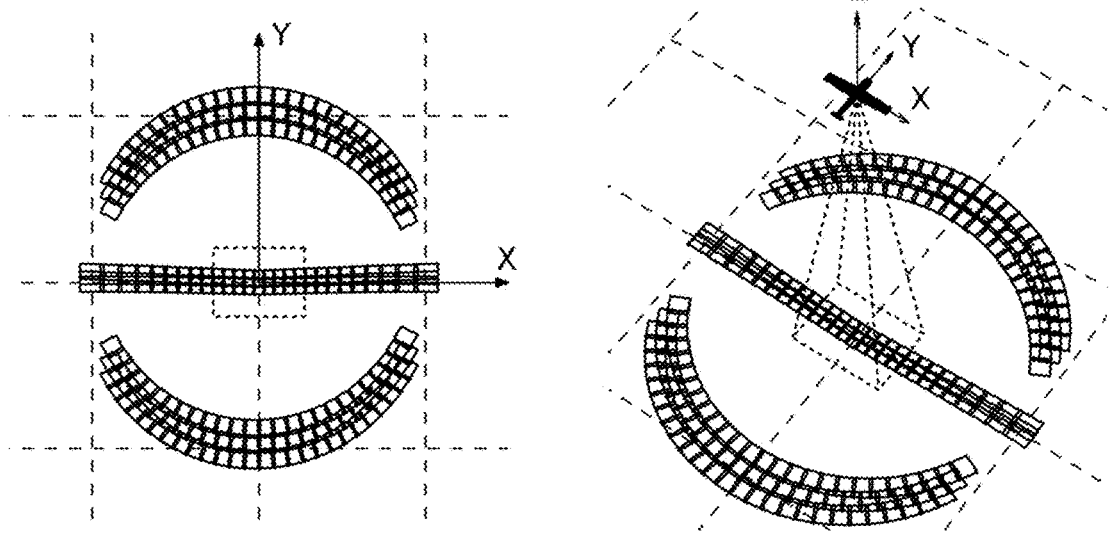
FIG. 8b shows top down and oblique views of multiple sets of scan patterns taken from an aerial vehicle with forward motion, according to one exemplary embodiment of the present disclosure.
Figure 8C:
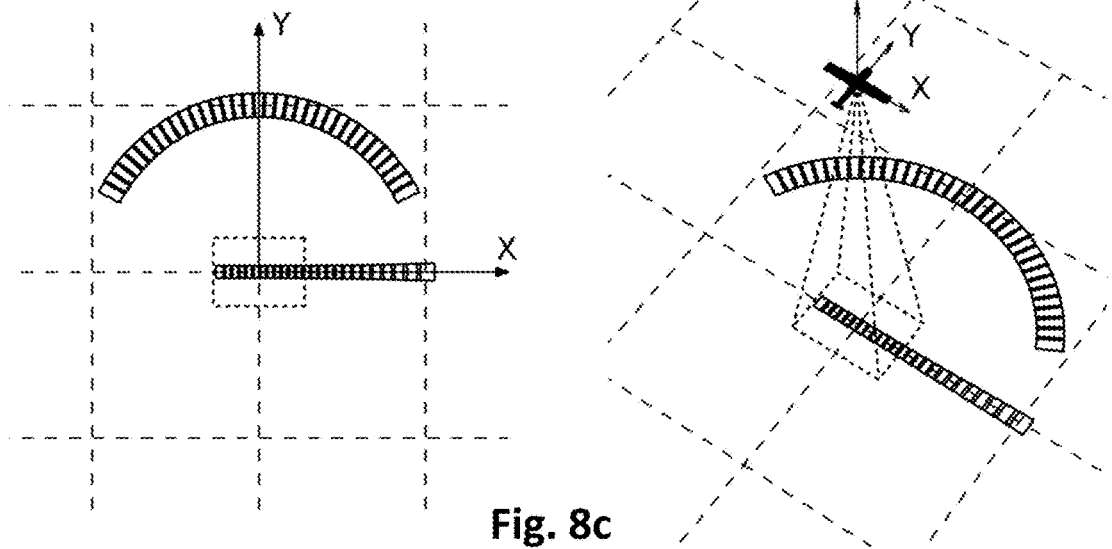
FIG. 8c shows top down and oblique views of multiple sets of scan patterns, according to one exemplary embodiment of the present disclosure.

The scan patterns 111, 112, 113, 114 of the scanning camera system 300 described above with respect to FIGS. 1a, 4c, 4d, 5c, 5d, 6c, 6d, 7e and 7f did not represent the forward motion of the aerial vehicle 110; they were generated assuming a fixed aerial vehicle 110 above the object area. Replotting the ground projection geometry of the scan patterns to include the aerial vehicle 110 linear motion over the ground may give the slightly modified scan pattern plots of FIG. 8a (single scan pattern case) and FIG. 8b (three scan patterns case). These scan patterns give a more realistic view of the scan patterns that may be used to compute the flight parameters to achieve an overlap target (such as 10% overlap). It is noted that they do not affect the view directions (elevation and azimuth) of captured images as the view angle is calculated as a function of the difference in location of the imaged ground points relative to the location of the aerial vehicle 110 at the time of capture of an image. FIG. 8c shows top down and oblique views of multiple sets of scan patterns captured by a scanning camera system according to one exemplary embodiment of the present disclosure. The scanning camera system of FIG. 8c is a reduced system comprising scan drive unit 301 without camera 311 and scan drive unit 302 only. This scanning camera system may be flown in a modified flight path where each flight line 210 to 215 is flown in both directions.

It is understood that the scanning camera system 300 geometry may be modified in a number of ways without changing the essential functionality of each of the scan drive units 301, 302, 303. For example, the scan drive and mirror locations and thicknesses may be altered, the distances between elements may be changed, and the mirror geometries may change. In general it is preferable to keep the mirrors as close together and as close to the lens as is feasible without resulting in mechanical obstructions that prevent the operationally desired scan angle ranges or optical obstructions that result in loss of image quality.

Furthermore, changes may be made to the focal distances of the individual lenses or the sensor types and geometries. In addition to corresponding geometric changes to the mirror geometries and locations, these changes may result in changes to the appropriate flight line distances, steps between scan angles, range of scan angles, and frame timing budgets for the system.

Figure 9:
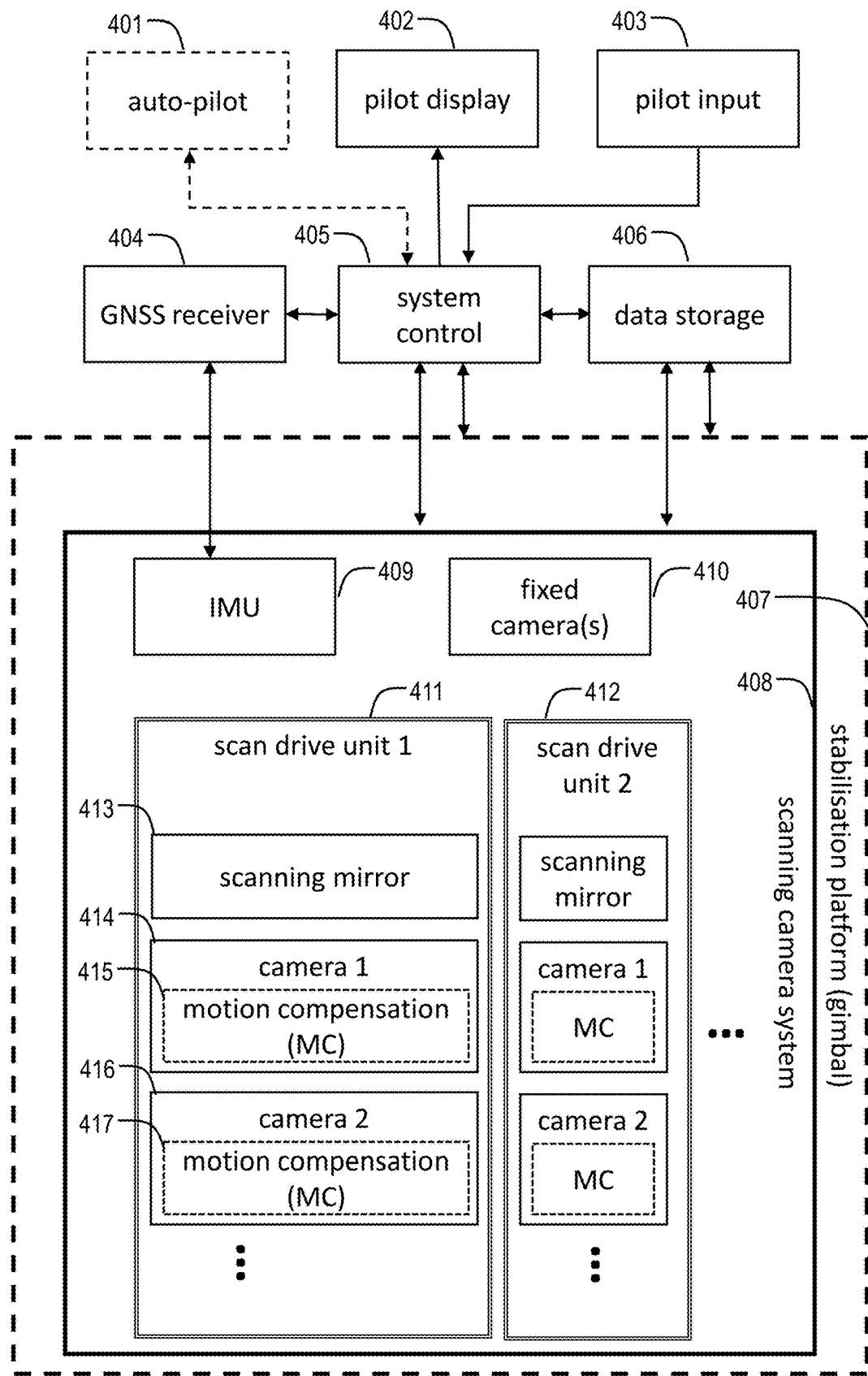
FIG. 9 shows a system diagram, according to one exemplary embodiment of the present disclosure.

A scanning camera system may be operated during a survey by a system control 405. A high-level representation of a suitable system control 405 is shown in FIG. 9. Components enclosed in dashed boxes (e.g. auto-pilot 401, motion compensation (MC) unit 415) represent units that may be omitted in other embodiments. The system control 405 may have interfaces with the scanning camera system 408, stabilisation platform 407, data storage 406, GNSS receiver 404, auto-pilot 401, pilot display 402 and pilot input 403. The system control 405 may comprise one or more computing devices that may be distributed, such as computers, laptop computers, micro controllers, ASICS or FPGAs, to control the scan drive units and fixed cameras of the camera system during operation. The system control 405 can also assist the pilot or auto-pilot of the aerial vehicle to follow a suitable flight path over a ground region of interest, such as the serpentine flight path discussed with respect to FIG. 2. The system control 405 may be centrally localised or distributed around the components of the scanning camera system 408. The system control 405 may use Ethernet, serial, CoaxPress (CXP), CAN Bus, i²C, SPI, GPIO, custom internal interfaces or other interfaces as appropriate to achieve the required data rates and latencies of the system.

The system control 405 may include one or more interfaces to the data storage 406, which can store data related to survey flight path, scan drive geometry, scan drive unit parameters (e.g. scan angles), Digital Elevation Model (DEM), Global Navigation Satellite System (GNSS) measurements, inertial measurement unit (IMU) measurements, stabilisation platform measurements, other sensor data (e.g. thermal, pressure), motion compensation data, mirror control data, focus data, captured image data and timing/synchronisation data. The data storage 406 may also include multiple direct interfaces to individual sensors, control units and components of the scanning camera system 408.

The scanning camera system 408 may comprise one or more scan drive units 411, 412, an IMU 409 and fixed camera(s) 410. The IMU 409 may comprise one or more individual units with different performance metrics such as range, resolution, accuracy, bandwidth, noise and sample rate. For example, the IMU 409 may comprise a KVH 1775 IMU that supports a sample rate of up to 5 kHz. The IMU data from the individual units may be used individually or fused for use elsewhere in the system. In one embodiment, the fixed camera(s) 410 may comprise a Phase One iXM100, Phase One iXMRS100M, Phase One iXMRS150M, AMS Cmosis CMV50000, Gpixel GMAX3265, or IOIndustries Flare 48M30-CX and may use a suitable camera lens with focal length between 50 mm and 200 mm.

The system control 405 may use data from one or more GNSS receivers 404 to monitor the position and speed of the aerial vehicle 110 in real time. The one or more GNSS receivers 404 may be compatible with a variety of space-based satellite navigation systems, including the Global Positioning System (GPS), GLONASS, Galileo and BeiDou.

The scanning camera system 408 may be installed on a stabilisation platform 407 that may be used to isolate the scanning camera system 408 from disturbances that affect the aerial vehicle 110 such as attitude (roll, pitch, and/or yaw) and attitude rate (roll rate, pitch rate, and yaw rate). It may use active and/or passive stabilisation methods to achieve this. Ideally, the scanning camera system 408 is designed to be as well balanced as possible within the stabilisation platform 407. In one embodiment the stabilisation platform 407 includes a roll ring and a pitch ring so that scanning camera system 408 is isolated from roll, pitch, roll rate and pitch rate disturbances.

In some embodiments the system control 405 may further control the capture and analysis of images for the purpose of setting the correct focus of lenses of the cameras of the scan drive units 411, 412 and/or fixed camera(s) 410. The system control 405 may set the focus on multiple cameras based on images from another camera. In other embodiments, the focus may be controlled through thermal stabilisation of the lenses or may be set based on known lens properties and an estimated optical path from the camera to the ground. Some cameras of the scanning camera system 408 may be fixed focus. For example, some of the fixed focus cameras used for overview images may be fixed focus.

Each scanning camera system is associated with some number of scan drive units. For example scanning camera system 408 includes scan drive unit 411, 412, though more can be included. As another example, the scanning camera system 300 shown in FIG. 7a-7d comprises 3 scan drive units 301, 302, 303 that were discussed above with respect to FIGS. 4a-4f, 5a-5f and 6a-6f. Alternative configurations of scanning camera systems with different numbers of scan drive units will be discussed below. Each scan drive unit 411, 412 shown in FIG. 9 may comprise a scanning mirror 413 and one or more cameras 414, 416.

Each camera 414, 416 of FIG. 9 may comprise a lens, a sensor, and optionally a motion compensation unit 415, 417. The lens and sensor of the cameras 414, 416 can be matched so that the field of view of the lens is able to expose the required area of the sensor with some acceptable level of uniformity.

Each lens may incorporate a focus mechanism and sensors to monitor its environment and performance. It may be thermally stabilised and may comprise a number of high-quality lens elements with anti-reflective coating to achieve sharp imaging without ghost images from internal reflections. The system control 405 may perform focus operations based on focus data 438 between image captures. This may use known techniques for auto-focus based on sensor inputs such as images (e.g. image texture), LIDAR, Digital Elevation Model (DEM), thermal data or other inputs.

Figure 10:
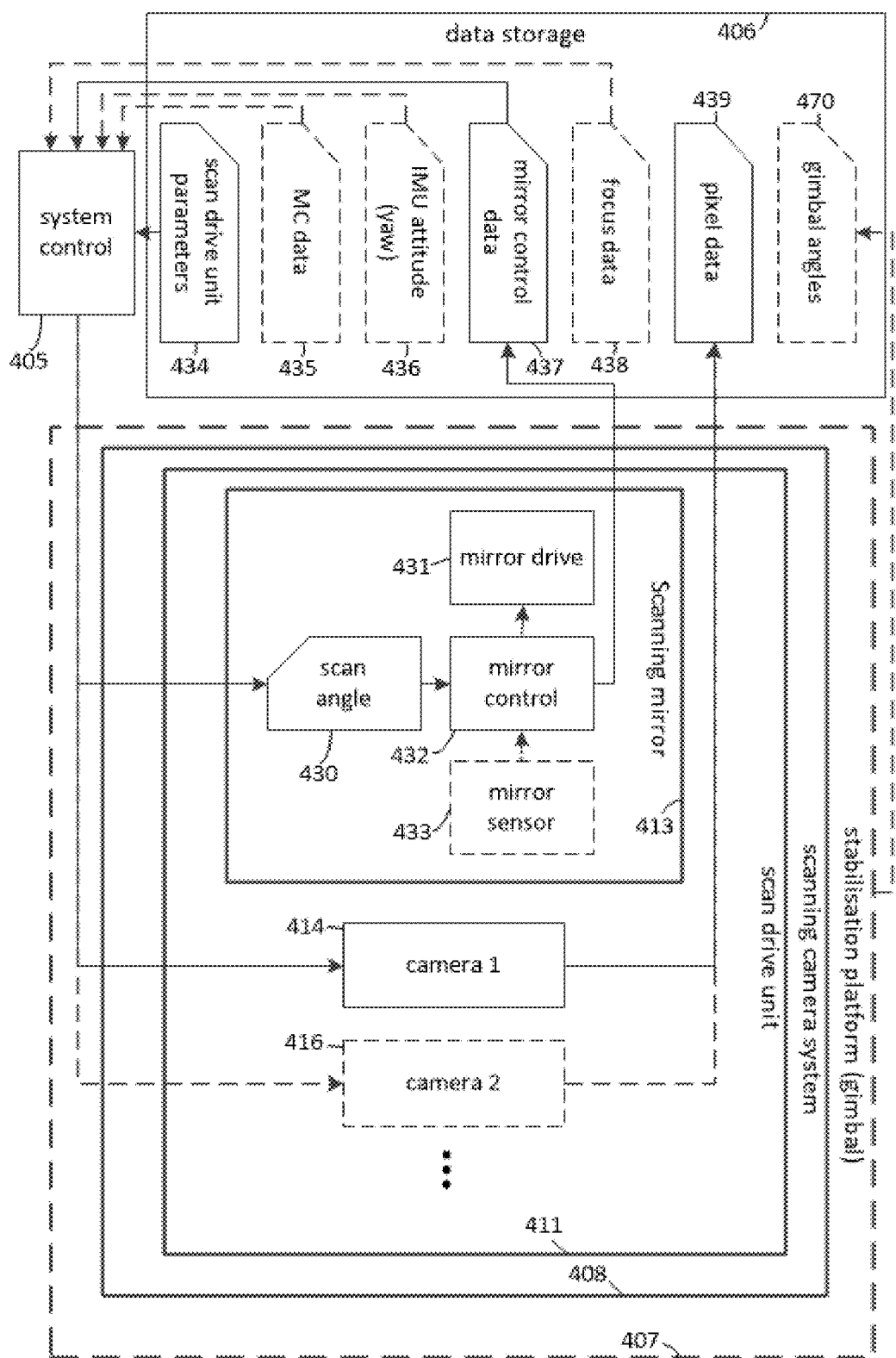
FIG. 10 shows another system diagram, according to one exemplary embodiment of the present disclosure.

The control of the scanning mirror 413 and the capture of images by the camera or cameras 414, 416 of the scan drive unit 411 are illustrated in the high-level process of FIG. 10. The system control 405 uses data inputs from data storage 406 to iteratively set the scan angle 430 and trigger the camera or cameras 414, 416 to capture images. The scan angle 430 is set according to the scan drive unit parameters 434, which defines the sequence of scan drive angles corresponding to the sequence of images to be captured for each scan pattern, and the sequential timing of frames of the scan pattern. As discussed above, the sequence of scan angles and timing of frame capture may be set to achieve a desired overlap of projective geometry of captured images on the ground that is advantageous for particular aerial image products.

Optionally, the sequence of scan angle 430 settings may be updated according to IMU data such as the attitude of the aerial vehicle relative to the expected attitude (aligned with the flight line). For example, the scan angle 430 may be corrected to account for the yaw of the aerial vehicle in the case that the stabilisation platform 407 does not handle yaw. Specifically, for the scan drive unit 301 discussed in relation to FIG. 4a-4f that captures two arc shaped scan patterns 111, 112, a scan angle correction of half of the yaw angle may be used so that the scan pattern is corrected for yaw as will be discussed in greater detail later with respect to FIGS. 32-37.

Alternatively, if the stabilisation platform 407 has only partial yaw correction then a smaller scan angle correction may be used.

The mirror control 432 receives an instruction to set the scan drive to the scan angle 430 from the system control 405, and optionally uses inputs from a mirror sensor 433 that reports the status of mirror drive 431 in order to control the mirror drive 431 so that the scanning mirror 413 is set to the desired scan angle 430. The mirror control 432 sends mirror control data 437 to be stored in data storage 406. When the scanning mirror 413 has settled to the correct scan angle according to the mirror control data 437, the system control 405 may send a trigger instruction to the camera or cameras 414, 416 associated with the scanning mirror 413.

Optionally, the system control 405 also controls the timing of the camera trigger to be synchronous with the operation of the motion compensation of each camera 414, 416. Motion compensation (MC) data 435 relating to the motion compensation for the camera 414, 416 is stored in data storage 406 and may be used to achieve this synchronisation.

Pixel data 439 corresponding to captured images are stored in the data storage 406. Optionally, gimbal angles 470 may be stored in data storage 406 including information relating to the orientation of the scanning camera system 408 in the stabilisation platform 407 (i.e. gimbal) at the time of capture of images for the stored pixel data 439. Other data logged synchronously with the image capture may include GNSS data (ground velocity 462, latitude/longitude data 463 and altitude 464 as shown in FIG. 11) and IMU attitude data 436.

It may be understood that the process illustrated in FIG. 10 may be employed to capture motion compensated images with projective geometry according to the scan patterns of the scan drive unit. This process may be slightly modified without affecting the scope of the systems and methods described in this specification.

The motion compensation may use a variety of methods including, but not limited to, tilting or rotating transparent optical plates or lens elements in the optical path, tilting or rotating mirrors in the optical path, and/or camera sensor translation. The dynamics of the motion compensation method may be synchronised with the image capture such that the undesirable motion of the image is minimised during exposure and the sharpness of the output image is maximised. It is noted that the motion compensation may shift the image on the sensor which would affect the principal point of the camera and may need to be accounted for in image processing, such as bundle adjustment and calibration.

Figure 11:
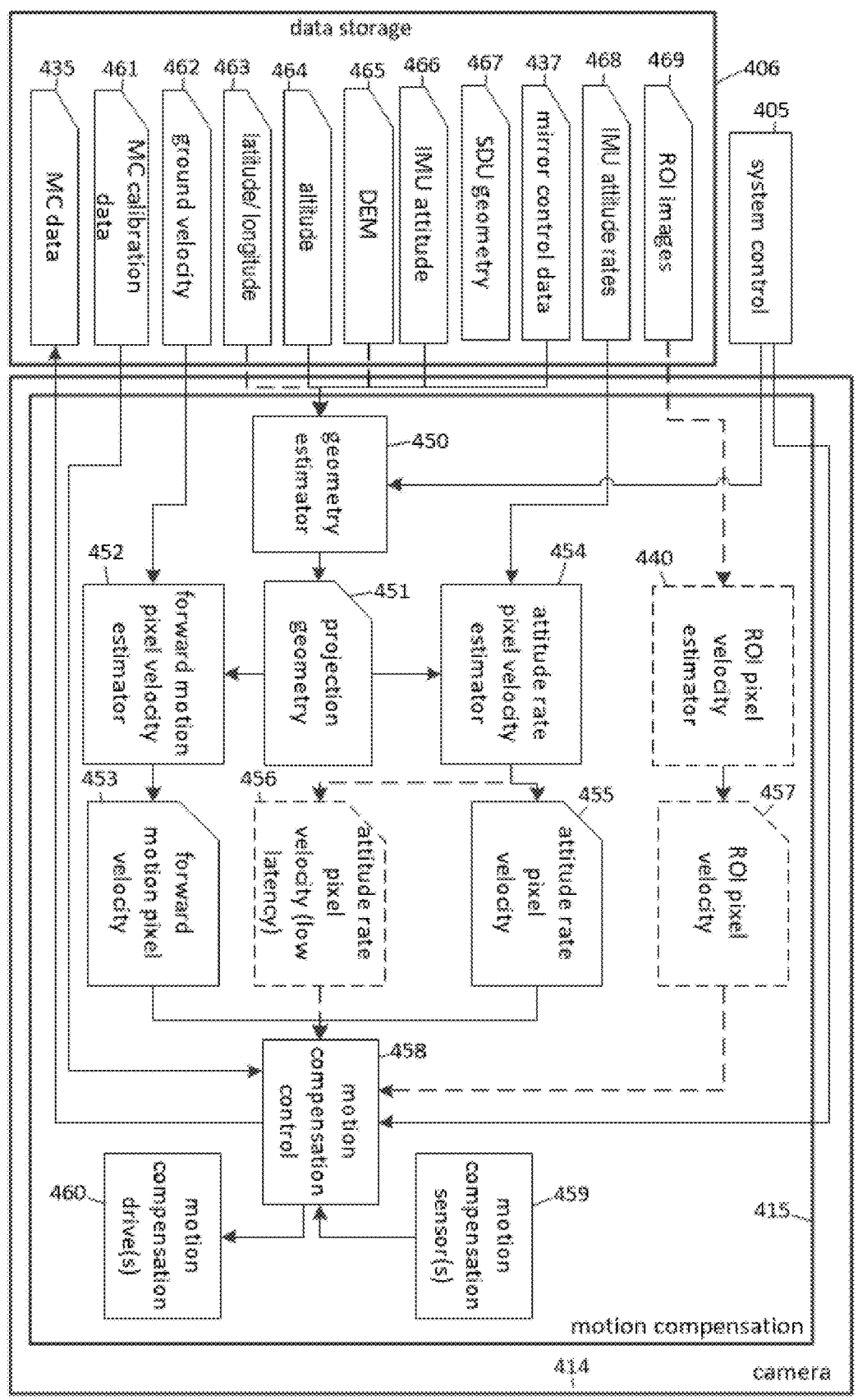
FIG. 11 shows another system diagram, according to one exemplary embodiment of the present disclosure.

A suitable process for the motion compensation unit 415 of camera 414 is illustrated in the high-level process of FIG. 11. The system control 405 sends signals to control the operation of the motion compensation unit 415, synchronise with the control of the scanning mirror 413, and trigger the camera 414 to capture motion compensated images with the desired projected geometry.

The motion compensation unit 415 uses geometry estimator module 450 to determine the projection geometry 451 of the camera 414 of the scan drive unit 411 in its current configuration that is a function of the scan angle. The projection geometry 451 is the mapping between pixel locations in the sensor and co-ordinates of imaged locations on the ground. The co-ordinates on the object area may be the x- and y-axes of the various scan pattern illustrations shown in, e.g. FIGS. 4a and 4b. The projection geometry 451 may be expressed in terms of a projective geometry if the ground is represented as a flat plane, or may use other representations to handle a more general non-flat object area.

The geometry estimator module 450 may compute the projection geometry 451 based on the known scan angle 430 reported in the mirror control data 437, the known scan drive unit (SDU) geometry data 467, the IMU attitude data 466 that reports the orientation of the scan drive unit, and the aerial vehicle altitude data 464. Optionally, the geometry estimator module 450 may use local ground surface height profile data from a Digital Elevation Model (DEM) 465 and latitude/longitude data 463 of the aerial vehicle to form a more accurate projection geometry. The geometry estimator module 450 may operate at a fixed rate, or may at specific times for example be based on the settling of the scanning mirror 413 provided through the mirror control data 437.

The projection geometry 451 may be used in combination with various motion sensor measurements to estimate pixel velocity estimates. A pixel velocity estimate is an estimate of the motion of the focused image over the camera sensor during exposure. Two different pixel velocity estimators are described herein, relating to linear and angular motion of the aerial vehicle. These are referred to as forward motion pixel velocity estimator 452 and the attitude rate pixel velocity estimator 454 respectively.

The forward motion pixel velocity estimator 452 uses the projection geometry 451 in addition to the current ground velocity 462 of the aerial vehicle generated by the GNSS receiver 404 to calculate a forward motion pixel velocity 453 corresponding to the linear motion of the scanning camera system 408 during the camera exposure. A pixel velocity may be expressed as an average velocity of the image of the ground over the camera sensor and may comprise a pair of rates (e.g. expressed in pixels per millisecond), corresponding to the rate of motion of the image of the ground along the two axes of the sensor. Alternatively, it may comprise an orientation angle (e.g. in degrees or radians) and a magnitude of motion (e.g. in pixels per millisecond), or any other suitable vector representation.

The forward motion pixel velocity estimator 452 may compute the forward motion pixel velocity 453 by mapping the location on the ground corresponding to a set of points across the sensor based on the projection geometry, shifting those points according to the motion of aerial vehicle over a short time step (e.g. 1ms or a value related to the camera exposure time), then projecting back to the sensor. The shift in each sensor location from the original location due to the motion of the aerial vehicle may be divided by the time step to estimate the local vector velocity at the sensor location. The pixel velocity of the image may be computed by statistically combining (e.g. averaging) the local vector velocities over the set of sampled sensor location.

The forward motion pixel velocity estimator 452 can operate at a fixed update rate, or can operate to update when there are changes to the input data (ground velocity 462 and projection geometry 451) or based on some other appropriate criteria.

The attitude rate pixel velocity estimator 454 uses the projection geometry 451 in addition to the IMU attitude rates 468 generated by the IMU 409 to calculate an attitude rate pixel velocity 455 corresponding to the rate of change of attitude (e.g. yaw rate) of the scanning camera system 408 during a camera exposure. The attitude rate pixel velocity 455 may be expressed in the same vector form as the forward motion pixel velocity 453. The attitude rate pixel velocity estimator 454 may use a similar short time step based estimation approach to determine the attitude rate pixel velocity 455. A pixel location on the sensor may be mapped to a position on the ground through the projection geometry 451. A second projection geometry is then generated based on the projection geometry 451 rotated according to the change in attitude of the scanning camera system that would occur over the short time step due to the current attitude rate. The position on the ground is mapped back to a sensor coordinate based on the second projection geometry. The attitude rate pixel velocity 455 may be estimated as the change in sensor position relative to the original position divided by the time step.

The attitude rate pixel velocity estimator 454 module may operate at a fixed update rate, or may operate to update when there are changes to the input data (IMU attitude rates 468 and projection geometry 451) or based on some other appropriate criteria. The IMU attitude rates 468 may have high frequency components and the attitude rate pixel velocity 455 may vary over short times.

It may be advantageous to send multiple updated attitude rate pixel velocity estimates to the motion compensation control 458 corresponding to a single image capture in terms of the dynamic requirements of the motion compensation drive(s) 460. This is represented in the process flow by the additional ROI pixel velocity estimator 440. It may also be advantageous to use some kind of forward prediction estimator on the IMU data to reduce the difference in actual attitude rate between the time of measurement and the time of the camera exposure. Suitable forward prediction methods may include various known filters such as linear filters, Kalman filters and statistical method such as least squares estimation. The forward prediction methods may be tuned based on previously sampled attitude rate data from similar aircraft with similar stabilisation platform and camera system.

In one embodiment, the scanning camera system 408 may be isolated from roll and pitch rate by a stabilisation platform 407, and the attitude rate pixel velocity 455 may be computed based only on the yaw rate of the aerial vehicle. In other embodiments the scanning camera system 408 may be isolated from roll, pitch and yaw, and the attitude rate pixel velocity 455 may be assumed to be negligible.

In addition to motion sensor pixel velocity estimators such as the forward motion pixel velocity estimator 452 and attitude rate pixel velocity estimator 454, a direct measurement of the pixel velocity may be computed based on captured images. It may be advantageous to perform this analysis on small region of interest (ROI) images 469, preferably taken in textured regions of the area, in order to reduce the latency between the capture of images and the generation of the pixel velocity estimate. The ROI images 469 should be captured in the absence of motion compensation and may use a short exposure time relative to normal image frame capture, but preferably after the mirror has settled. The vector pixel shift may be estimated between ROI images captured at slightly different times using any suitable image alignment method (for example correlation based methods in the Fourier domain or in real space, gradient based shift estimation method, or other techniques). The vector pixel shift estimate may be converted to a pixel velocity by dividing the shift by the time step between the time of capture of the ROI image.

The ROI pixel velocity estimator 440 may combine pixel velocity estimates from more than two ROI images to improve accuracy, and it may operate with a fixed rate or when ROI images are available. An estimated ROI pixel velocity 457 may be rejected if certain criteria are not met, for example if there is insufficient texture in the images. The location of the captured images may be set to improve the likelihood of good texture being found in the imaged region, for example based on the analysis of other images captured by the scanning camera system or based on previous surveys of the same area.

The motion compensation process illustrated in FIG. 11 may be adapted to the case that one or more scanning mirror structures are not stationary during capture. It may be advantageous to allow the mirror to move continuously during operation rather than coming to a halt for each exposure. The alternative process would use an additional scanning mirror pixel velocity estimator that would analyse the motion of the scanning mirror structure during the exposure. The scanning mirror pixel velocity estimator may use a short time step estimation approach to determine a scanning mirror pixel velocity. A pixel location on the sensor may be mapped to a position on the ground through the projection geometry 451. A second projection geometry is then generated based on the projection geometry 451 calculated at a second time that is a short time after the time of the projection estimate and for a second scan mirror angle corresponding to the expected scan mirror angle at that time. The position on the ground is mapped back to a sensor coordinate based on the second projection geometry. The scanning mirror pixel velocity may be estimated as the change in sensor position relative to the original position divided by the time step. The scanning mirror pixel velocity may additionally be supplied to the motion compensation control where it may be combined with the forward motion pixel velocity 453 and/or the attitude rate pixel velocity 455.

The motion compensation control 458 combines available pixel velocity estimates that are input to determine an overall pixel velocity estimate, and uses this estimate to control the drives of the motion compensation unit to trigger the dynamic behaviour of the motion compensation elements to stabilise the image on the sensor during the camera exposure time. The motion compensation control 458 also receives timing signals from the system control 405 that gives the required timing of the motion compensation so that it can be synchronised with the settling of the scanning mirror structure and the exposure of the camera. The motion compensation control 458 may optionally use motion compensation calibration data 461 that may be used to accurately transform the estimated overall pixel velocity to be compensated by the motion compensation unit 415 into dynamic information relating to the required control of the motion compensating elements (for example the rotations or tilts of optical plates, mirrors or other components used in motion compensation).

The attitude rate pixel velocity 455 and forward motion pixel velocity 453 estimates are motion sensor based pixel velocity estimates that correspond to different motions of the aerial vehicle. These may be combined by adding together the vector components. Alternatively, a single estimate may be used for example if only one rate is available, or if one rate is not required (e.g. if the stabilisation platform 407 is effectively isolating the scanning camera system 408 from all attitude rates).

The ROI pixel velocity 457 is a directly measured overall pixel velocity estimate that includes the motion from attitude rate and forward motion. The ROI pixel velocity 457 may be used in place of the other pixel velocity estimates when it is available, or it may be combined with the other estimates statistically (for example based on a Kalman filter or other appropriate linear or non-linear methods).

There may be some latency in the operation of the motion compensation drive(s) 460 to achieve the appropriate dynamics of the components of the motion compensation unit 415. Therefore the motion compensation control 458 can send control signals for the motion of the motion compensation drive(s) 460 starting at some required time step prior to the image exposure in order to account for this latency. The motion compensation control 458 may optionally update the control signals to the motion compensation drive(s) 460 prior to the image exposure based on updated pixel velocity estimates such as low latency attitude rate pixel velocity estimator 456. Such low latency updates may be used to achieve a more accurate motion compensation and sharper imagery.

Figure 12:
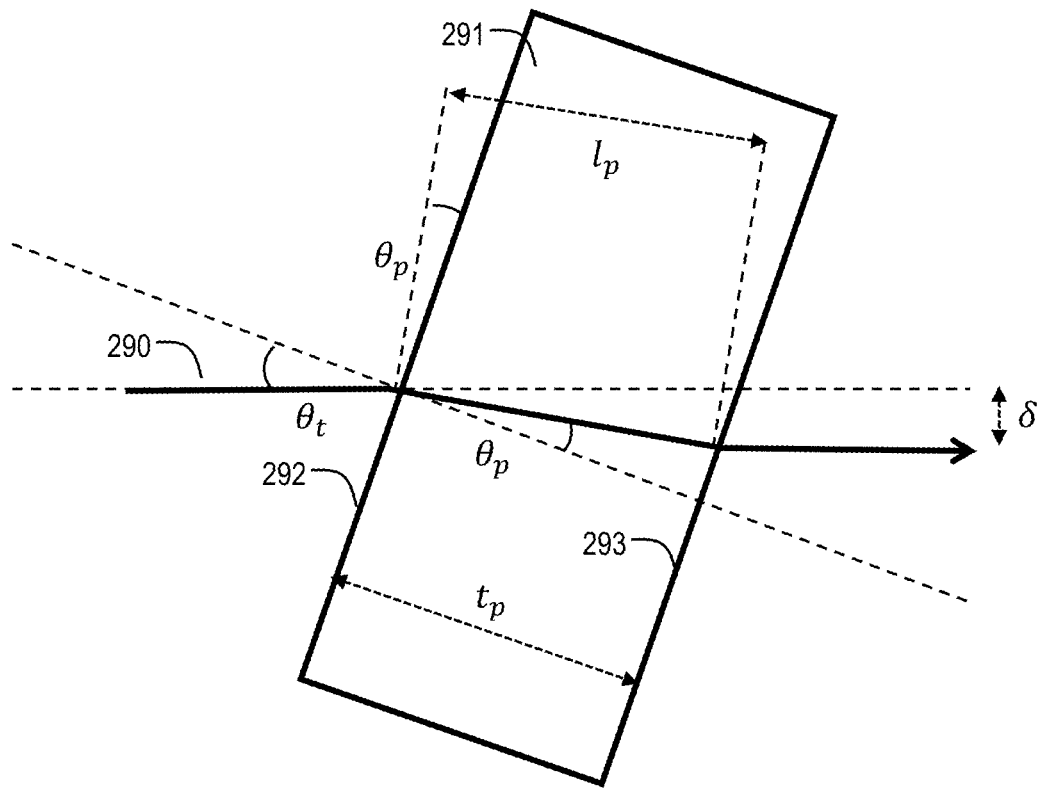
FIG. 12 illustrates refraction of light at a glass plate, according to one exemplary embodiment of the present disclosure.

The principle of operation of tilting optical plate motion compensation is based on the refraction of light at the plate surfaces, as illustrated in FIG. 12. When a light ray 290 is incident on a tilted optical plate 291, it is refracted at the front surface 292 according to Snell's law, and then refracted at the rear surface 293 to return to its original orientation. The effect on the light ray 290 is that it is offset by a transverse distance δ relative to its original path. The size of the offset is proportional to the optical plate's 231 thickness, roughly proportional to the tilt angle (for small angles), and also depends on the refractive index of the glass. If the tilt angle ($\theta_t$) of the optical plate 291 varies with time, then the offset of the ray also varies. Applying this principle to a camera, varying the tilt of an optical plate between the lens and sensor may be used to shift the rays of light that focus to form an image on the sensor, thereby shifting the image on the sensor.

One or more tilting optical plates may be introduced between the camera lens and the sensor. Such plates affect the focus of rays on the sensor, however, this effect may be taken into account in the lens design so that the MTF of the lens remains high, and sharp images may be obtained. The design is compensated at a design tilt angle of the optical plate, which may be zero tilt, or some nominal tilt related to the expected dynamics of the plate during exposure. At angles other than the design angle of the optical plate, the change in the optical path results in aberrations and a drop in MTF. For example, dispersion in the glass of the optical plate causes rays at different wavelengths to take different deviations resulting in some chromatic aberrations and a drop in MTF. This loss of sharpness is small provided that the angle of the plate does not deviate too much from the design angle.

The optical plates can be manufactured according to tolerances relating to the flatness of the two surfaces, and the angle of wedge between the opposite surfaces. In one embodiment, they should be built from a material with high refractive index and low dispersion. Such glasses would have a relatively high Abbé number. The plates will be dynamically controlled to follow a desired rotation trajectory; in such a case, a glass with a low specific density and high stiffness can be used. The total thickness and material of optical plates to be placed between the lens and the sensor is a key parameter in the lens design. In one embodiment BK7 glass may be used as it has good all-round properties in terms of refractive index, dispersion, specific density and stiffness, and is also readily available. Other suitable glasses include S-FPL51, S-FPL53, or SPHM-53.

In general, thicker glass plates are better as they require smaller tilts to achieve a given motion correction, however the space available between lens and sensor places an upper limit on the plate thickness. A suitable thickness of glass may be around 10 mm, though it may be understood that the methods of motion compensation described in this specification are effective over a wide range of glass plate thicknesses. Suitable tolerances for the manufacture of the plates may be surfaces<λ/4 roughness, parallel to <1 arcmin with reflectivity<0.5%.

Figure 13A:
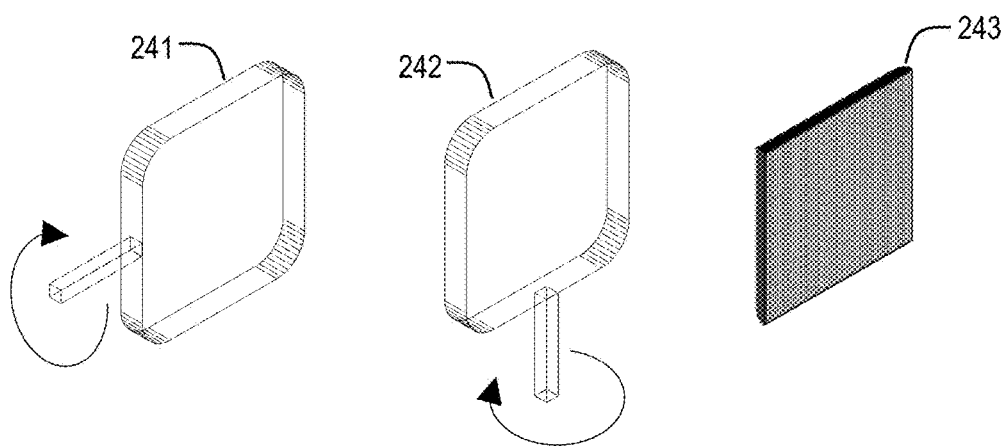
FIG. 13a shows an arrangement for motion compensation in a camera of a scanning camera system from a perspective view, according to one exemplary embodiment of the present disclosure.
Figure 13B:
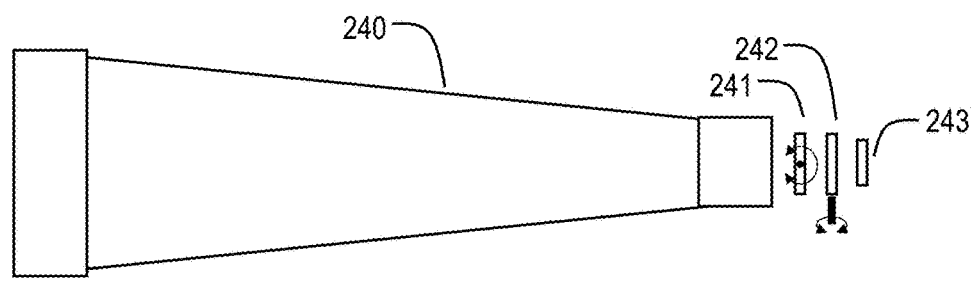
FIG. 13b shows the arrangement for motion compensation in the camera of the scanning camera system from a side view, according to one exemplary embodiment of the present disclosure.
Figure 13C:
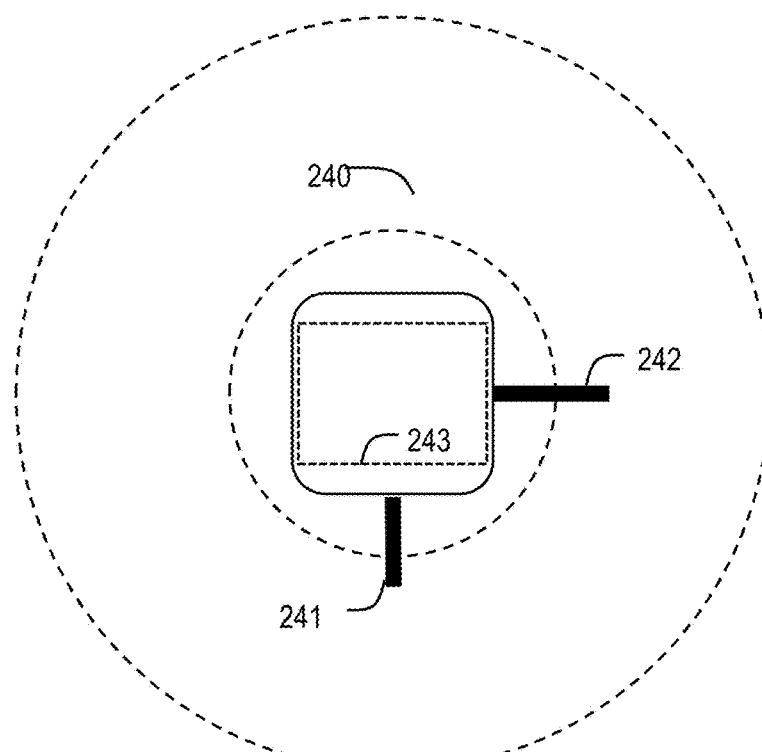
FIG. 13c shows the arrangement for motion compensation in the camera of the scanning camera system from a view down the optical axis, according to one exemplary embodiment of the present disclosure.

FIGS. 13a, 13b and 13c illustrate a first arrangement for motion compensation in the camera of a scanning camera system from a perspective, a side view, and from a view down the optical axis of the lens, respectively. The camera comprises of a focusing lens 240, two optical plates 241, 242 and a sensor 243. The sensor 243 is mounted in the appropriate focal plane to capture sharp images of the area. Each optical plate 241, 242 is mounted to allow the plate tilt angle to be controlled about a plate tilt axis. The tilt plate angle may be controlled using any suitable actuator or rotating motors (such as a DC motor or brushless motor) coupled by a gearbox, direct coupled or belt driven.

In FIGS. 13a, 13b and 13c, the tilt axis of the first optical plate 241 is orthogonal to the tilt axis of the second plate 242. In this arrangement the optical plates 241, 242 may be tilted about their respective axes to shift the image on the sensor 243 in orthogonal directions, although non-orthogonal arrangements are possible. An image of an area may be shifted over the sensor 243 along any vector direction and with a speed that depends on the rates of tilt of the first and second optical plates 241, 242. If the image of an area is moving over the area due to dynamic motions of the camera relative to the area then the rates of the two optical plates 241, 242 may be independently set so that the vector direction of motion and speed act to stabilise the image.

The transverse shape and size of the optical plates 241, 242 should be large enough so that all focusing rays of light are incident on the sensor 243. The optical plates 241, 242 may be round, square, rectangular, square bevel or rectangular bevel in shape. One advantage of the rectangular and square based shapes is that they have lower moment of inertia around the tilt axis, thereby reducing the load on a drive motor used to control the optical plate motion during operation. If the sensor 243 has a non-uniform aspect ratio then the rectangular based shapes may have a very low moment of inertia while being large enough to encompass all imaged rays. However, such optical plates do require the major axis of the rectangular optical plates 241, 242 to be correctly aligned with the major axis of the sensor 243. The optical plates 241, 242 can be mounted so that they may be dynamically controlled to tilt according to required dynamics, as discussed herein. In one embodiment, the optical plates may be 5 mm thick BK7 glass.

Figure 14A:
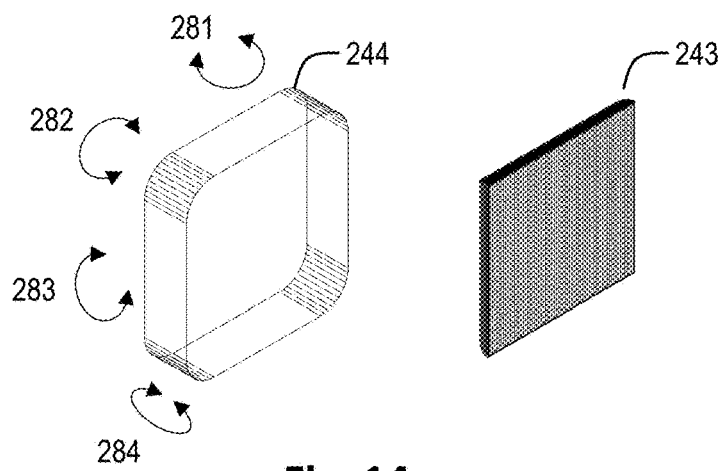
FIG. 14a shows another arrangement for motion compensation in a camera of a scanning camera system from a perspective view, according to one exemplary embodiment of the present disclosure.
Figure 14B:
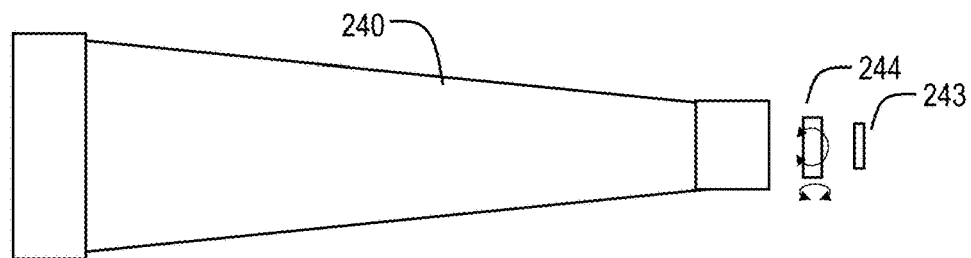
FIG. 14b shows the arrangement for motion compensation in the camera of the scanning camera system from a side view, according to one exemplary embodiment of the present disclosure.
Figure 14C:
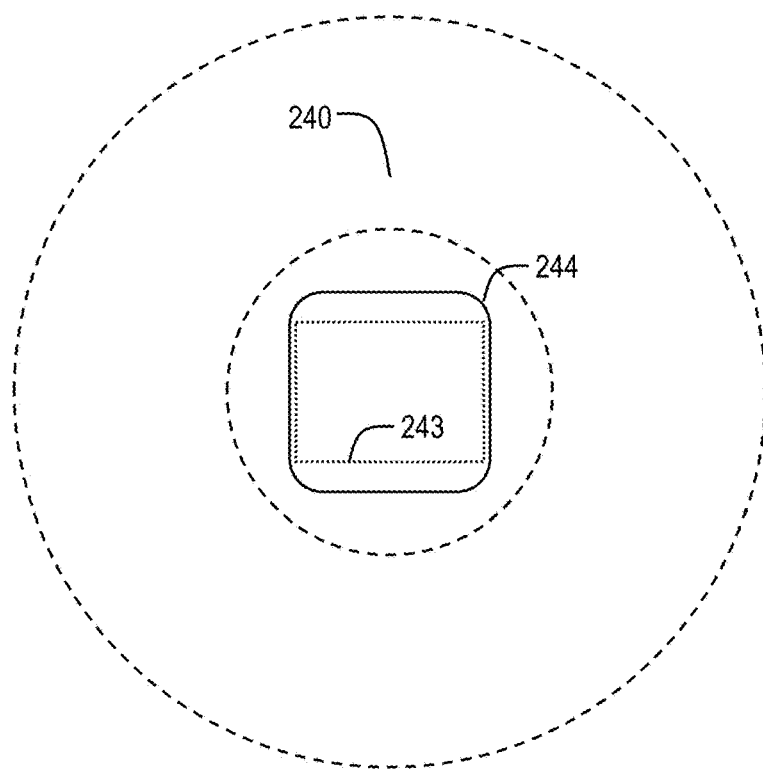
FIG. 14c shows the arrangement for motion compensation in the camera of the scanning camera system from a view down the optical axis, according to one exemplary embodiment of the present disclosure.

FIGS. 14a, 14b and 14c illustrate a second arrangement for motion compensation in the camera of a scanning camera system from a perspective, a side view, and from a view down the optical axis of the lens, respectively. The camera comprises of a focusing lens 240, a single optical plate 244 and a sensor 243. The sensor 243 is mounted in the appropriate focal plane to capture sharp images of the area. The optical plate 244 is mounted to allow the plate tilt angle to be controlled about an arbitrary axis in the plane perpendicular to the optical axis. This includes tilt around the axis aligned to the sensor axes (illustrated by rotations 281, 283), and any intermediate angle (such as those illustrated by the rotations 282, 284). An image of an area may be shifted over the sensor 243 along any vector direction determined by the rotation axis and with a speed that depends on the rate of tilt of the optical plate 244. If the image of an area is moving over the area due to dynamic motions of the camera relative to the area, then the axis of tilt and the rate of tilt of the optical plate 244 may be independently set so that the vector direction of motion and speed act to stabilise the image.

The criteria for the transverse shape and size of the optical plate 244 are the same as for the optical plates 241, 242, that is to say it should be large enough so that all focusing rays of light are incident on the sensor 243. Circular, rectangular, and square shaped plates may be used. It is noted, however, that since a single plate is used, the spatial restrictions on the plate may be reduced compared to the twin plate case (from FIG. 13a, 13b, 13c), meaning an increased thickness of the optical plate 244 may be possible. As discussed above, increasing the thickness increases the image shift for a given tilt. In one embodiment the optical plate 244 may be 10 mm thick BK7 glass.

Figure 15A:
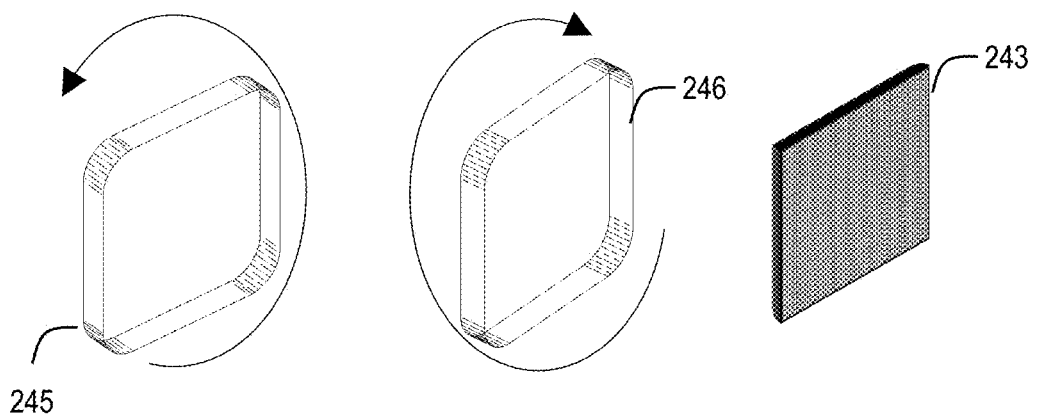
FIG. 15a shows another arrangement for motion compensation in a camera of a scanning camera system from a perspective view, according to one exemplary embodiment of the present disclosure.
Figure 15B:
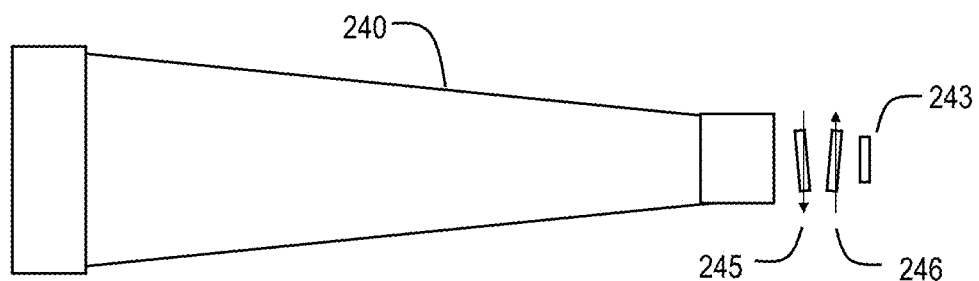
FIG. 15b shows the arrangement for motion compensation in the camera of the scanning camera system from a side view, according to one exemplary embodiment of the present disclosure.
Figure 15C:
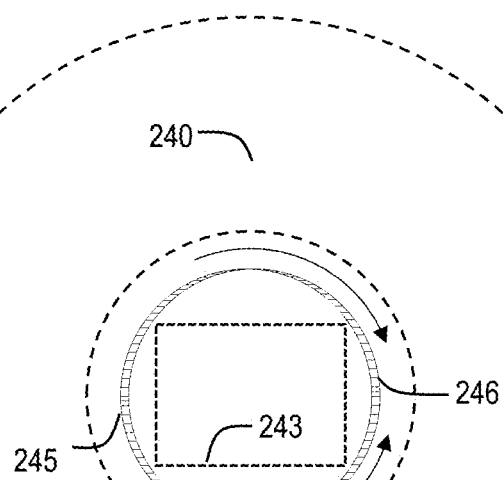
FIG. 15c shows the arrangement for motion compensation in the camera of the scanning camera system from a view down the optical axis, according to one exemplary embodiment of the present disclosure.

FIGS. 15a, 15b and 15c illustrate another arrangement for motion compensation in the camera of a scanning camera system from a perspective, a side view, and from a view down the optical axis of the lens, respectively. The camera comprises of a focusing lens 240, two optical plates 245, 246 and a sensor 243. The sensor 243 is mounted in the appropriate focal plane to capture sharp images of the area. Each optical plate 245, 246 is mounted to with a fixed plate tilt angle as may be seen in the side view of FIG. 15b. Each optical plate 245, 246 is additionally mounted so that is may be rotated about the optical axis with a rotation rate and rotation phase that may be controlled. During operation, the two optical plates 245, 246 are rotated with independently selected rotation rates and independent phases of rotation. The rotations of the optical plates 245, 246, are controlled such that the tilts of the two optical plates 245, 246 are opposed at the time of exposure of the sensor 243 to capture an image in order to minimise loss of image quality. At the time of exposure, the phases of the optical plates 245, 246 determine the vector direction of image motion, and the rotation rates of the optical plates 245, 246 determine the speed of image motion generated by the motion compensation unit of the camera. If the image of an area is moving over the area due to dynamic motions of the camera relative to the area, then phase and rotation rates of the two optical plates 245, 246 may be independently set so that the vector direction of motion and speed act to stabilise the image.

The criteria for the transverse shape and size of the optical plates 245, 246 are the same as for optical plates 241, 242, that is to say they should be large enough so that all focusing rays of light are incident on the sensor 243. Due to the rotations of the optical plates 245, 246 about the optical axes, it may be advantageous to use circular optical plates. In one embodiment the optical plates 245, 246 may be 5 mm thick BK7 glass tilted at 6°.

Referring back to FIG. 11, in one embodiment, the motion compensation unit 415 may comprise a pair of optical plates 241, 242, as were discussed with reference to FIG. 13a-13c. Each tilting optical plate 241, 242 may be tilted by motion compensation drive(s) 460 according to a trajectory provided by the motion compensation control 458. One or more motion compensation sensor(s) 459 may be used to track the motion and give feedback to the motion compensation control 458.

Figure 16:
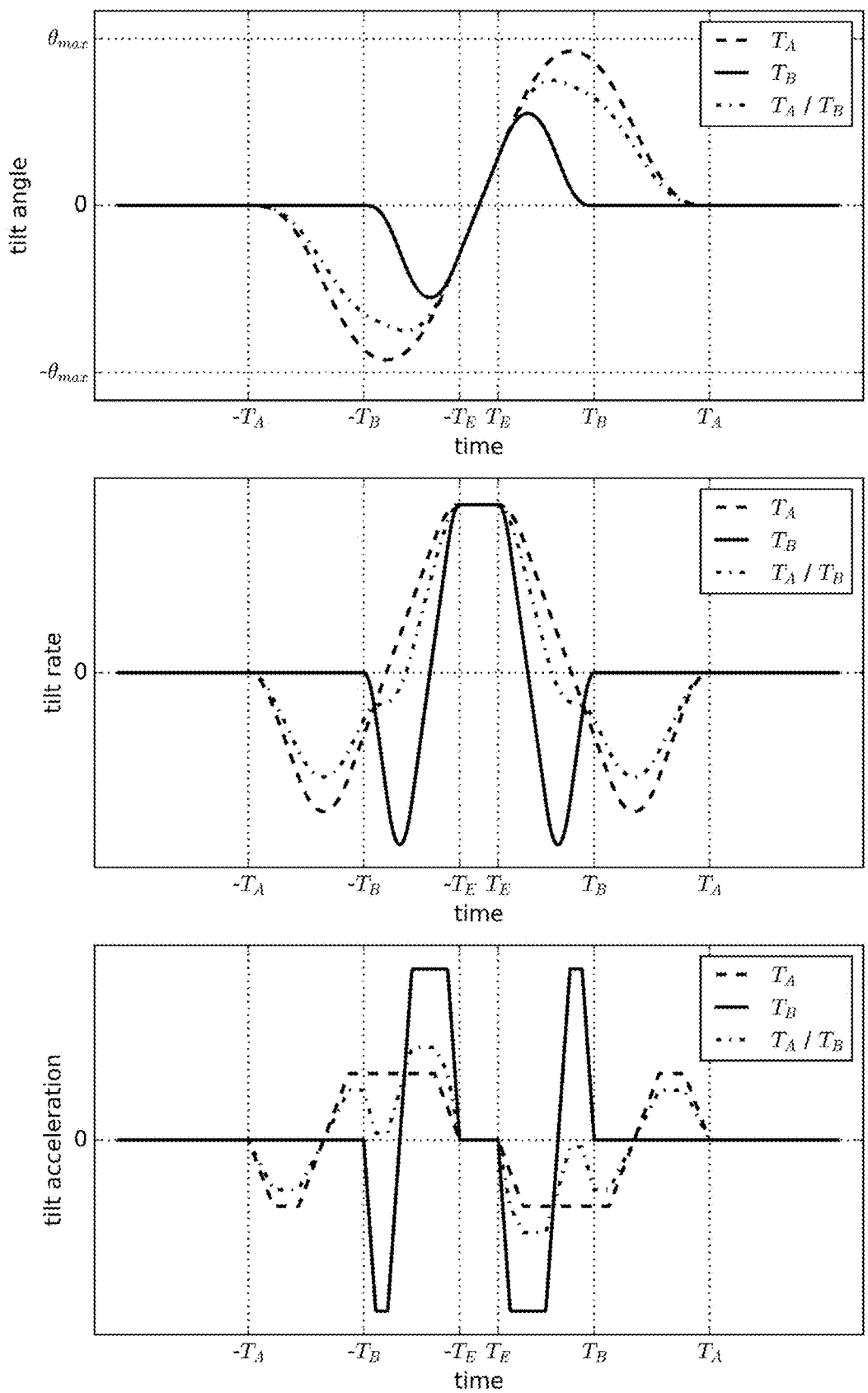
FIG. 16 shows trajectories for tilt (top), tilt rate (middle), and tilt acceleration (bottom) for tilting plate motion, according to one exemplary embodiment of the present disclosure.

FIG. 16 shows some example trajectories suitable for the tilting plate motion. Three sample trajectories are shown, one with a longer latency $T_{lat}^A$, one with a shorter latency $T_{lat}^B$, and one that is generated by adding together a fraction of the longer latency trajectory and a fraction of the shorter latency trajectory that may be referred to as a mixed latency trajectory, $T_{lat}^A/T_{lat}^B$.

FIG. 16 includes plots of the tilt (top plot), tilt rate (middle plot), and tilt acceleration (bottom plot) associated with the three trajectories. The plots are each centred around the time (x-axis) 0, which is assumed to be the middle of the image exposure time, and are based on a piecewise linear tilt acceleration. Alternative trajectories may be formed based on different assumptions such as piecewise constant tilt acceleration, piecewise linear tilt jerk, or other suitable assumptions that may be selected based on the specific motion compensation control and drive.

The three trajectories of FIG. 16 achieve the same constant tilt rate (zero tilt acceleration) over the time period— $T_{exp}$ to $T_{exp}$ around the time 0. This constant tilt rate time period may be longer than the total exposure time of the camera in order to allow for errors in the control of the tilting plate and the timing of the exposure. There may be some limits on the maximum and minimum tilts allowable, indicated by $\pm\theta_{max}$ in the tilt angle plot. The tilt at time offset of zero (the middle of the period of constant tilt rate) is zero in order to minimise loss of sharpness due to non-zero tilt during the exposure.

Comparing the three trajectories, it may be seen that the longer and mixed latency trajectories may be advantageous in terms of the acceleration rates required, while the lower latency may be advantageous in terms of the maximum tilt required. However, if the dynamics of the aircraft have some high frequency components, the mixed and lower latency trajectories may be advantageous as they may use more up to date motion estimates with lower errors over the exposure time.

Figure 17A:
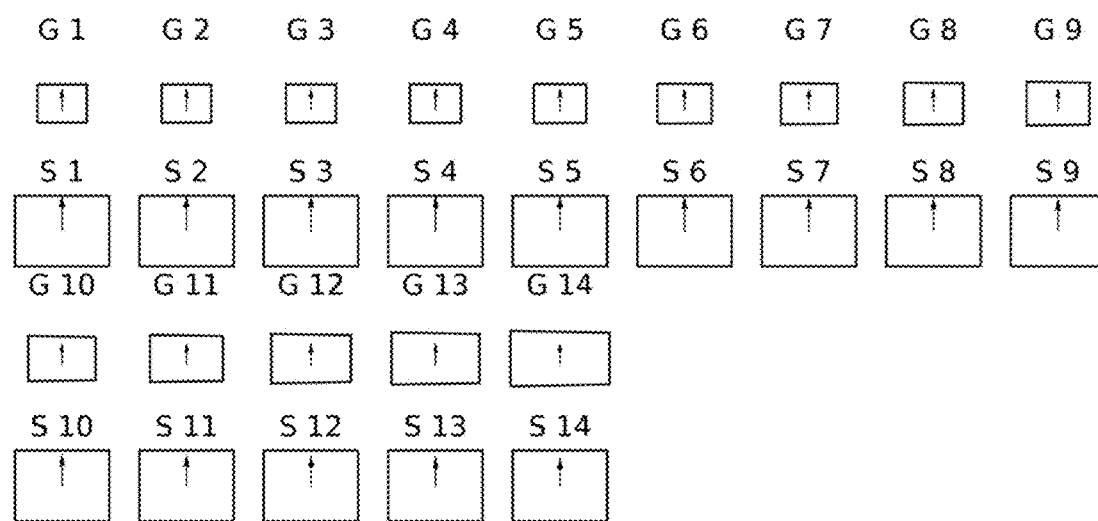
FIG. 17a shows various object area projection geometries and corresponding sensor plots for motion compensation, according to one exemplary embodiment of the present disclosure.

FIG. 17a includes 14 object area projection geometries G1 to G14 that illustrate the 14 frames of the scan pattern of the third scan drive unit 303 of scanning camera system 300 discussed with reference to FIG. 3 above. In this instance the scanning camera system 300 is assumed to be aligned with the motion of the aerial vehicle as may occur in the absence of yaw. Each ground projection geometry G1-G14 has an arrow representing the forward motion vector of the aerial vehicle. FIG. 17a also includes 14 corresponding sensor plots S1 to S14 that illustrates the corresponding motion compensating pixel velocity relative to the sensor geometry due to forward motion as an arrow in each rectangular sensor outline.

Figure 17B:
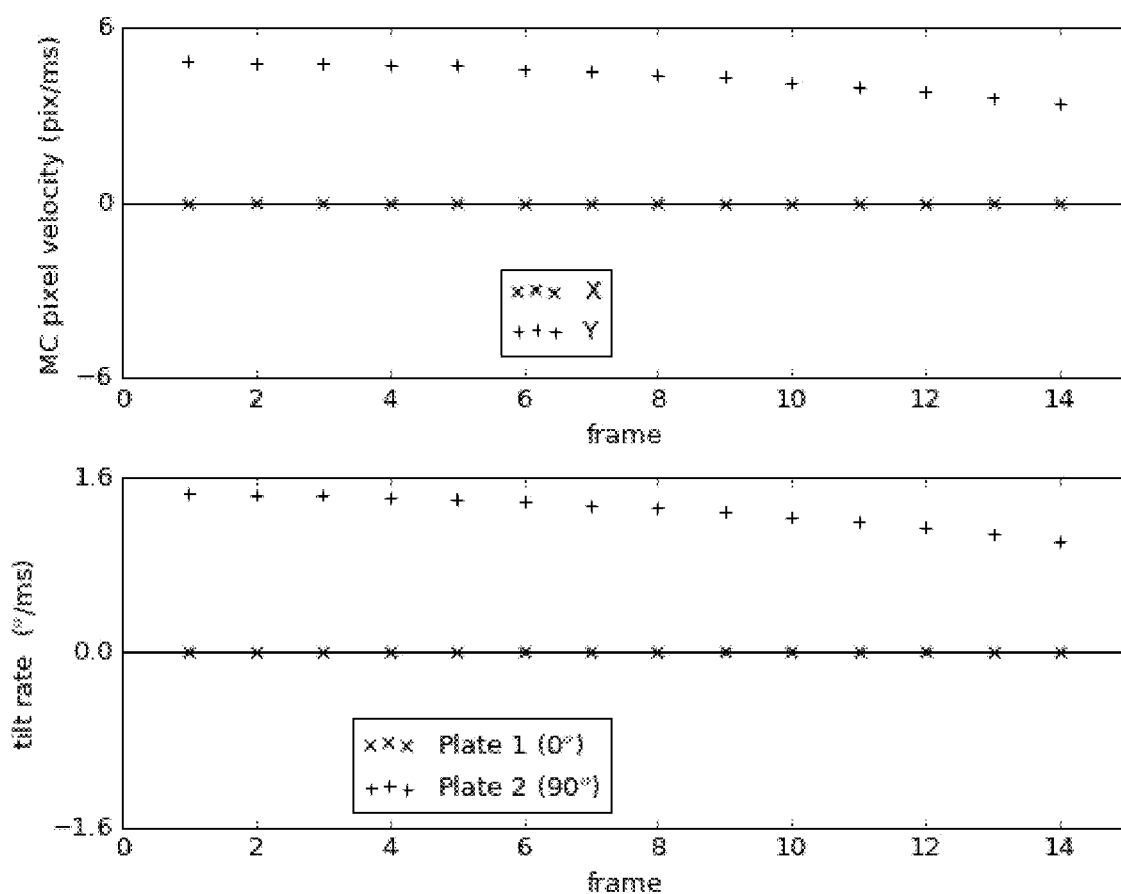
FIG. 17b illustrates the motion compensation pixel velocity from FIG. 17a (upper) and corresponding tilt rates for a first and second optical plate (lower), according to one exemplary embodiment of the present disclosure.

The upper plot of FIG. 17b shows the components of the motion compensating pixel velocities illustrated in FIG. 17a as a function of frame number (1 to 14), where the pixel pitch is 3.2 microns. The lower plot in FIG. 17b shows the corresponding plate tilts for the first and second optical plates (e.g. optical plate 241, 242) required for motion compensation. In this case, the plates may be 5 mm BK7 plates, with the first axis aligned at 0° and the second at 90° so that tilting the first plate results in an image shift along the x-axis and tilting the second plate results in an image shift along the y-axis. The conversion from pixel velocities to plate tilt rates may be achieved using the motion compensation calibration data, which may consist of thickness, material (refractive index) and orientation data for each of the plates, or alternatively may consist of parameters of functions that may be used to convert image shifts to plate tilts and vice versa. It is noted that none of the pixel velocities of the upper plot of FIG. 17b include a component in the x-axis and therefore the tilt rate for the first plate is zero for all frames. In this particular case the first plate is redundant.

FIG. 18a includes 26 object area projection geometries G1 to G26 that illustrate the 26 frames of the scan pattern of the first scan drive unit 301 of scanning camera system 300 discussed with reference to FIG. 4a-4f above. The scanning camera system 300 is assumed to be aligned with the motion of the aerial vehicle and each ground projection geometry has an arrow representing the forward motion vector of the aerial vehicle. FIG. 18a also includes 26 corresponding sensor plots S1 to S26 that illustrates the corresponding motion compensating pixel velocity relative to the sensor geometry due to forward motion as an arrow in each rectangular sensor outline.

FIG. 18b gives plots of the pixel velocity components (where the pixel pitch is 3.2 microns) of the frames illustrated in FIG. 18a and the corresponding tilt rates of the first and second plates required for motion compensation, again assuming 5 mm BK7 plates, with the first axis aligned at 0° and the second at 90°. Due to the scan pattern of the first scan drive unit 301, the pixel velocities generally have non-zero components along both axes and therefore both optical plates are used.

Figure 19A:
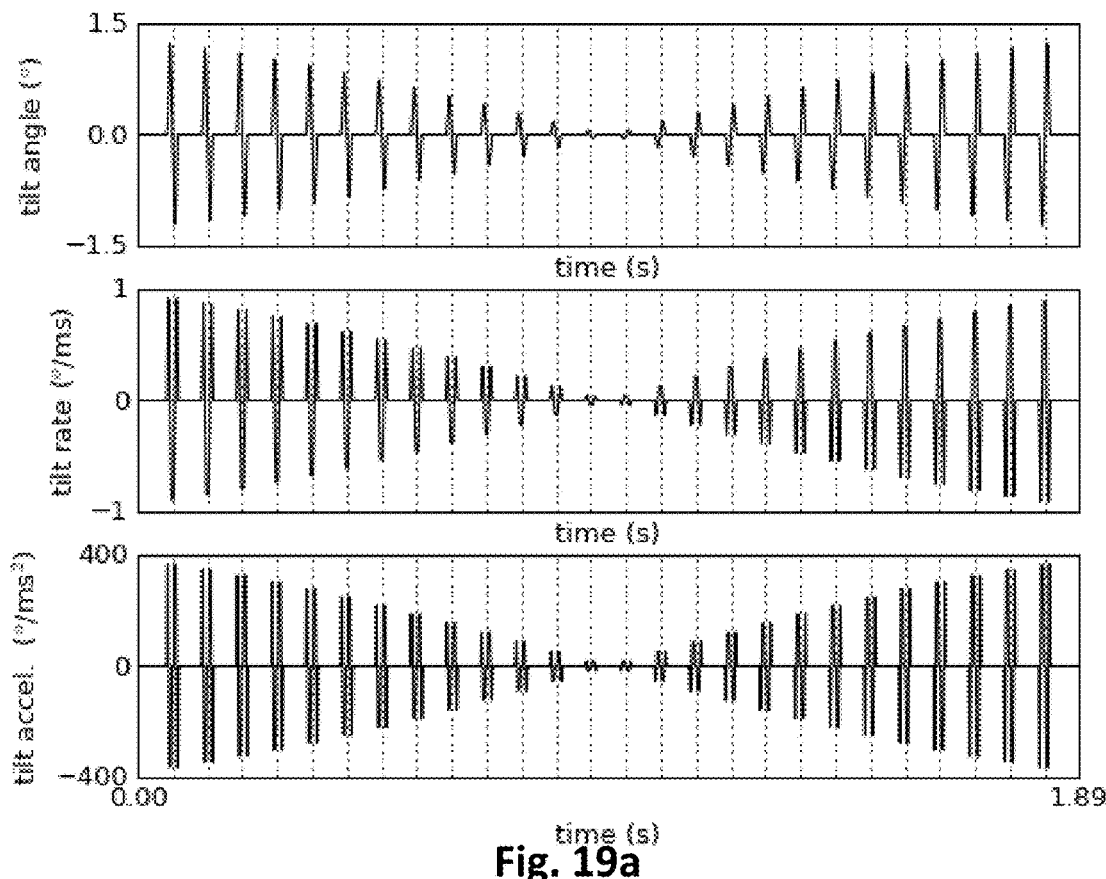
FIG. 19a shows a tilt trajectory for the first optical plate from FIG. 18b that can be used to achieve motion compensation for the required tilt rate, according to one exemplary embodiment of the present disclosure.
Figure 19B:
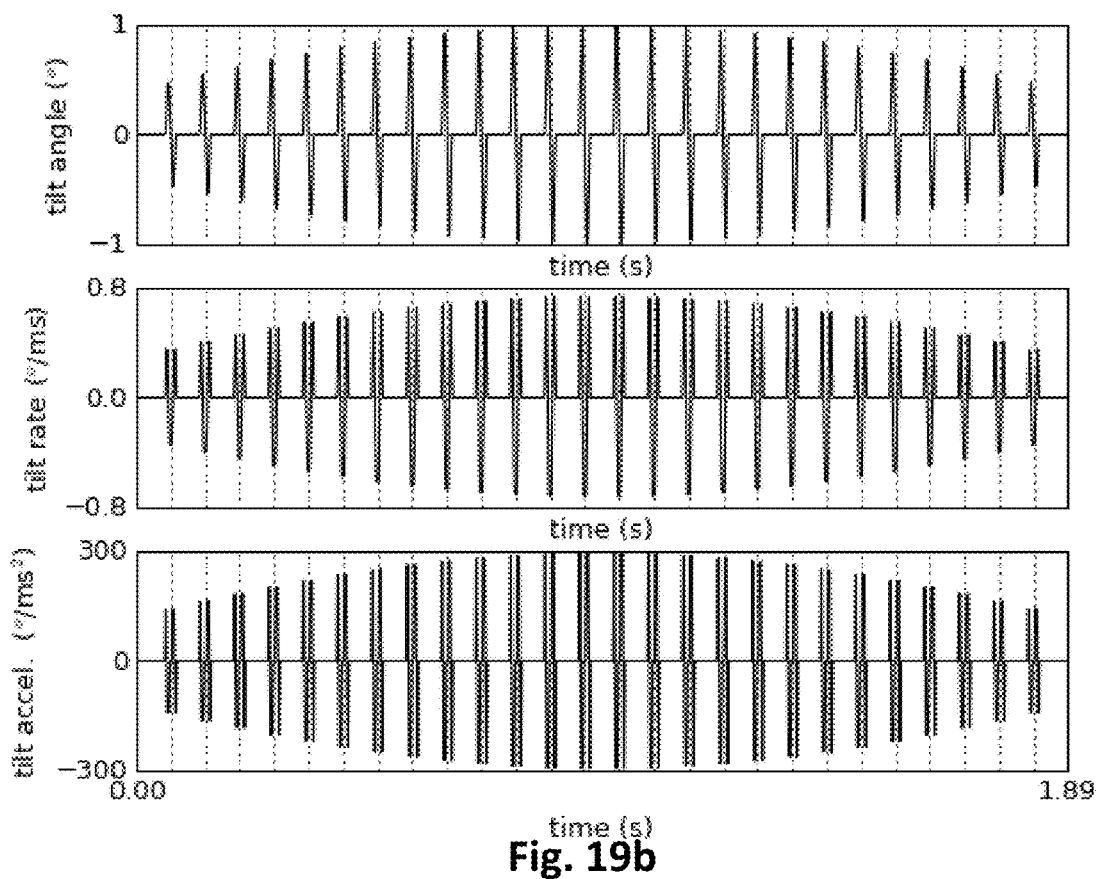
FIG. 19b show a tilt trajectory for the second optical plate from FIG. 18b that can be used to achieve motion compensation for the required tilt rate, according to one exemplary embodiment of the present disclosure.

FIG. 19a shows a tilt trajectory for the first optical plate that may be used to achieve motion compensation for the required tilt rates shown in the second, lower plot of FIG. 18b. The trajectory consists of 26 sections that are scaled copies of the longer latency trajectory of FIG. 16 joined by stationary sections of zero plate tilt. The scaling of each section is set according to the required tilt rates of the first optical plate. Alternative trajectories may be formed based on the shorter latency trajectory of FIG. 16 or a mixed latency trajectory, or may use a mixture of trajectories with different latencies or mixtures of latencies. FIG. 19b shows a tilt trajectory for the second optical plate that may be used to achieve motion compensation for the required tilt rates shown in the second, lower plot of FIG. 18b. This trajectory was formed in the same way as the tilt trajectory for the first optical plate shown in FIG. 19a. In the plots shown in FIGS. 19a and 19b, increments between each pair of adjacent dashed vertical lines along the x-axis equates to 75 milliseconds.

Figure 20A:
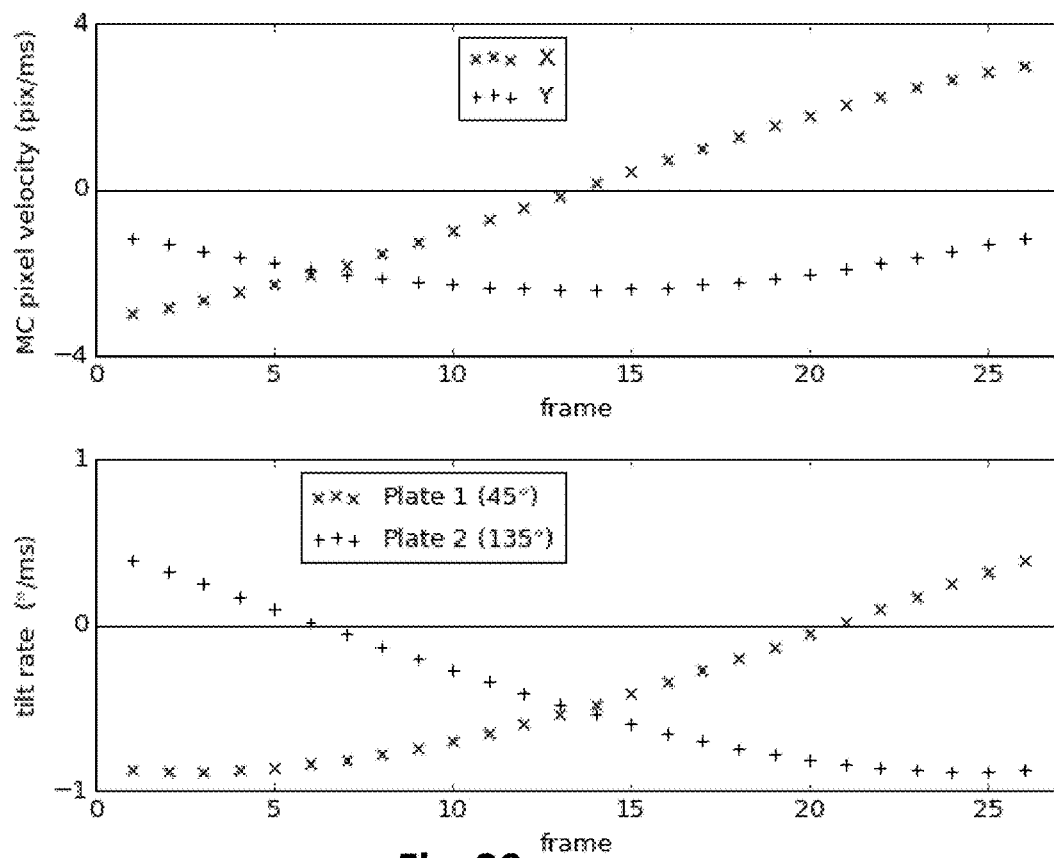
FIG. 20a illustrates pixel velocities and tilt rates for a first scan drive unit, according to one exemplary embodiment of the present disclosure.
Figure 20B:
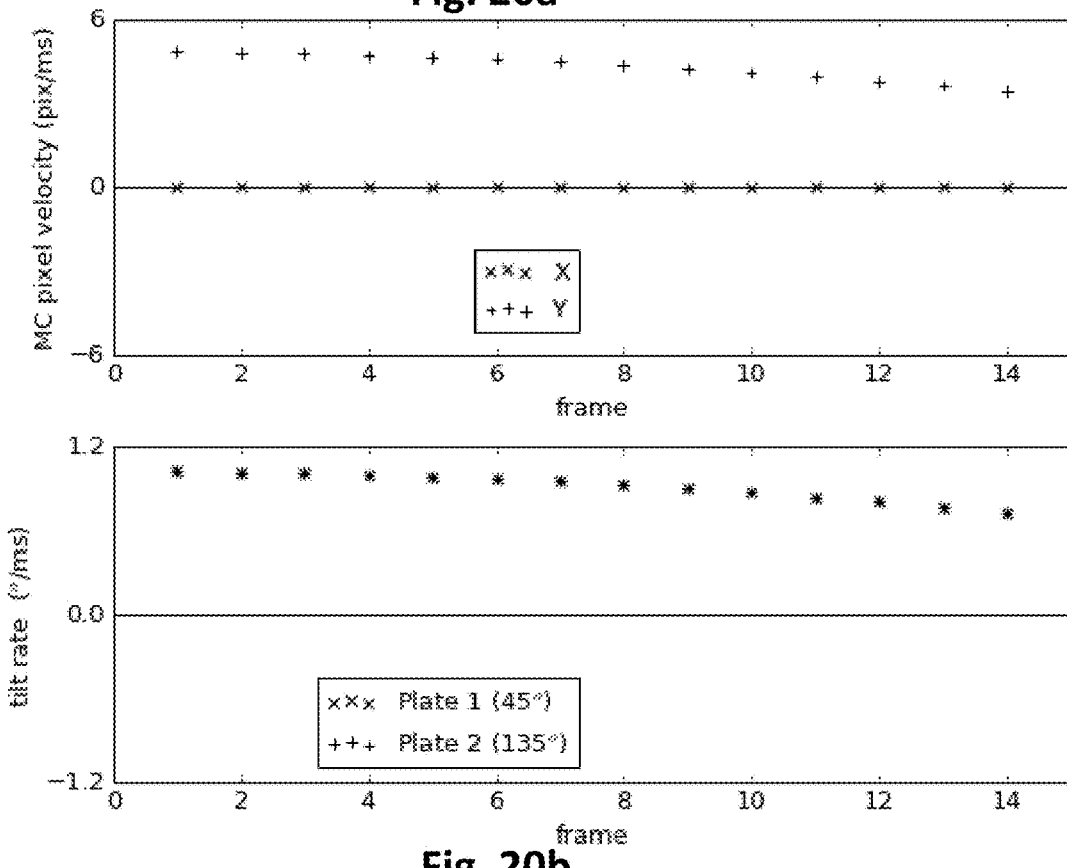
FIG. 20b illustrates pixel velocities and tilt rates for a second scan drive unit, according to one exemplary embodiment of the present disclosure.

FIGS. 20a and 20b illustrate how alignment of the optical plates affects the computed motion compensation tilt rates through the motion compensation calibration data. FIG. 20a shows an alternative set of motion compensation plate tilt rates computed for the first scan drive unit 301 and for the same pixel velocity data as FIG. 18b, but for 5 mm BK7 plates oriented at 45° and 135°. FIG. 20b shows an alternative set of motion compensation plate tilt rates computed for the second scan drive unit 302 and for the same pixel velocity data as FIG. 18b, but for 5 mm BK7 plates oriented at 45° and 135°.

Figure 21A:
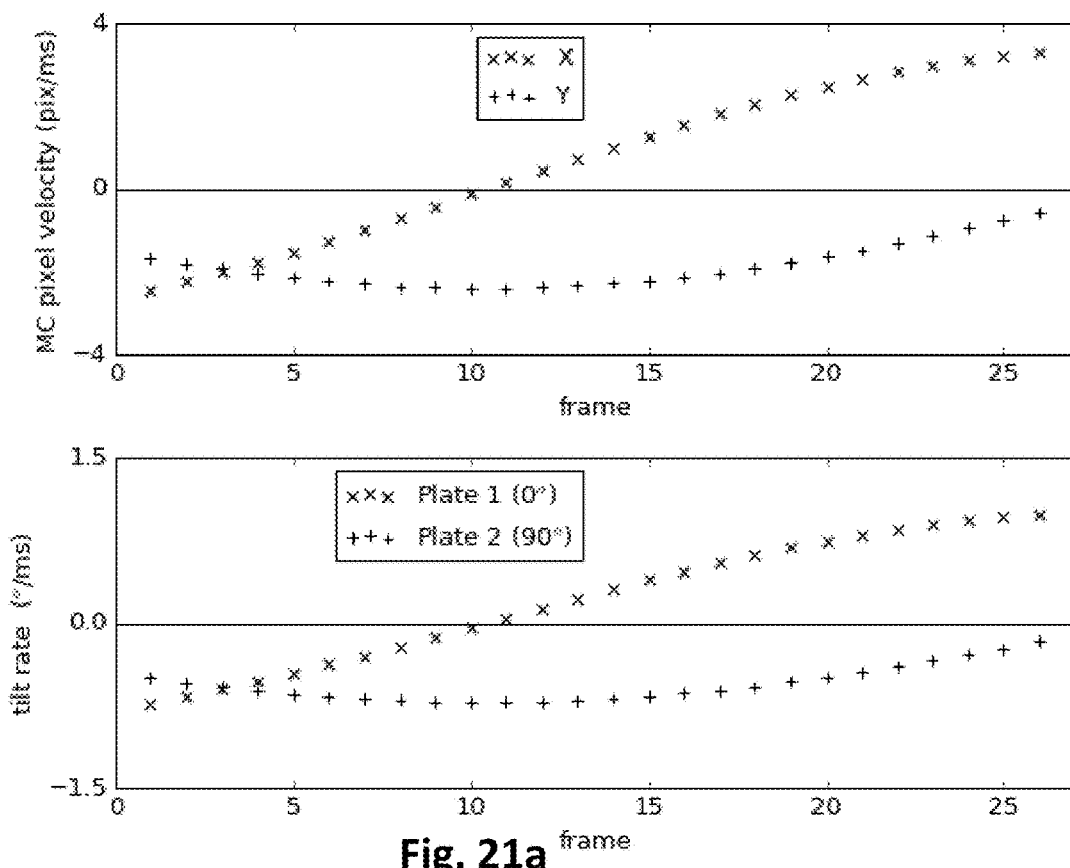
FIG. 21a illustrates pixel velocities and tilt rates for a first scan drive unit, according to one exemplary embodiment of the present disclosure.
Figure 21B:
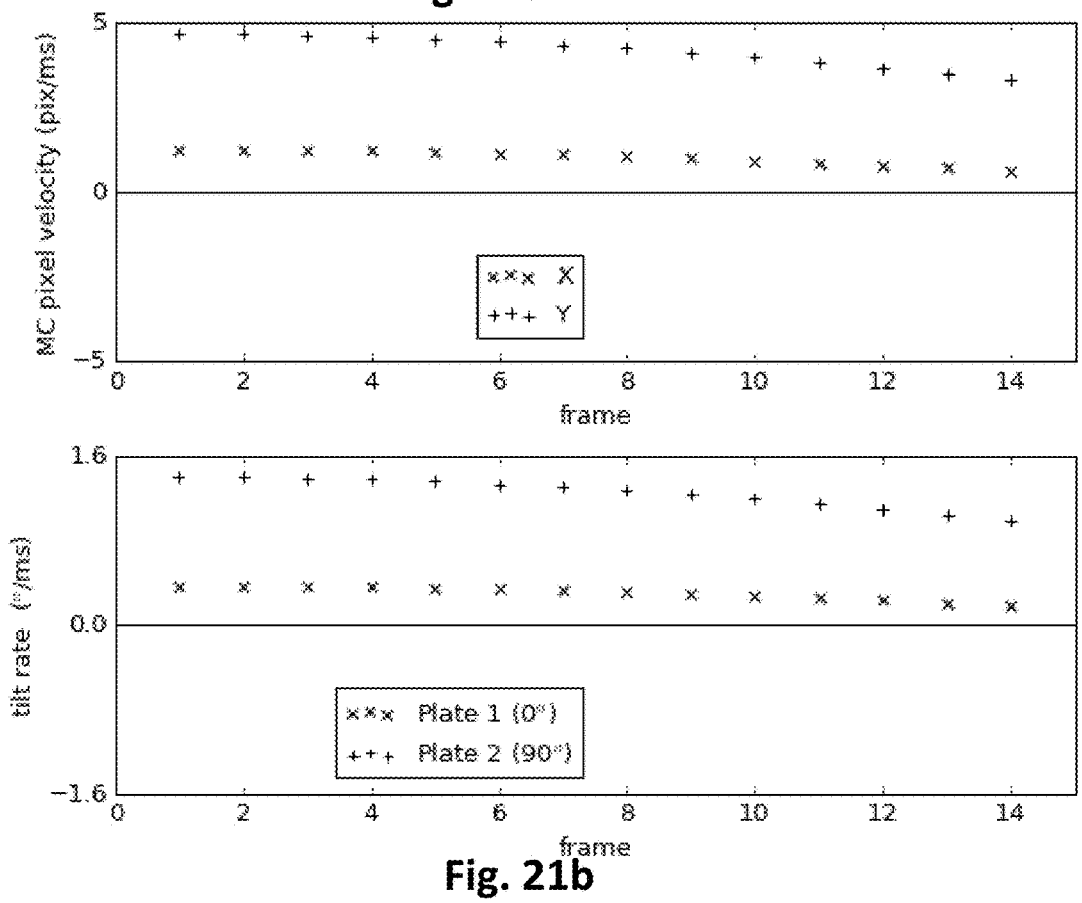
FIG. 21b illustrates pixel velocities and tilt rates for a second scan drive unit, according to one exemplary embodiment of the present disclosure.

FIGS. 21a and 21b illustrates how the pixel (pitch: 3.2 microns) velocities and tilt rates are affected by the alignment of the scanning camera system 300 relative to the flight path, specifically for the case of a 15 degree yaw that is not corrected in the stabilisation platform. FIGS. 21a and 21b show the pixel velocities and tilt rates for scan drive unit 301 and scan drive unit 302 respectively, and for the case of 5 mm BK7 tilting plates oriented at 0° and 90°, respectively.

FIGS. 22a and 22b illustrate how the pixel (pitch: 3.2 microns) velocities and tilt rates are affected by the rate of change of attitude of the scanning camera system 300, specifically for the case of yaw rates of up to 3° per second, randomly sampled at each frame and not corrected in the stabilisation platform. FIGS. 22a and 22b show the pixel velocities and tilt rates for scan drive unit 301 and scan drive unit 302 respectively, and for the case of 5 mm BK7 tilting plates oriented at 0° and 90°, respectively.

Figure 23A:
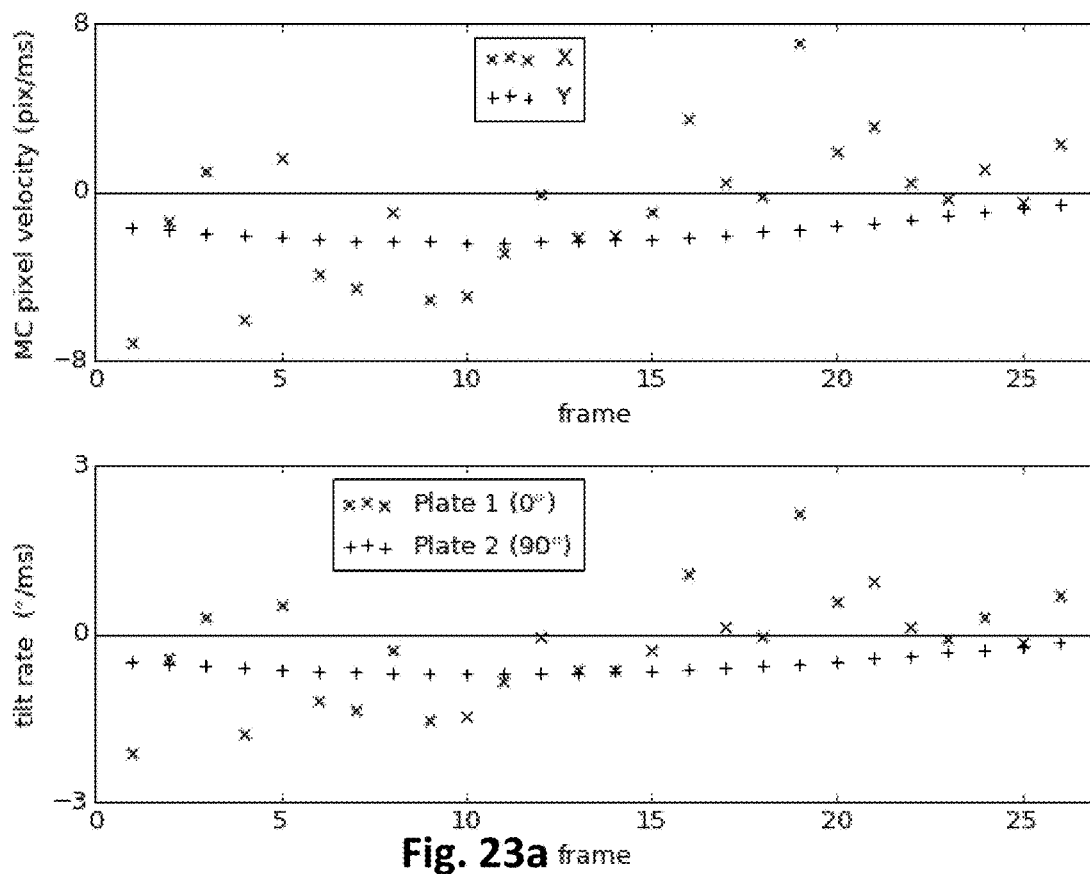
FIG. 23a illustrates pixel velocities and tilt rates for a first scan drive unit, according to one exemplary embodiment of the present disclosure.
Figure 23B:
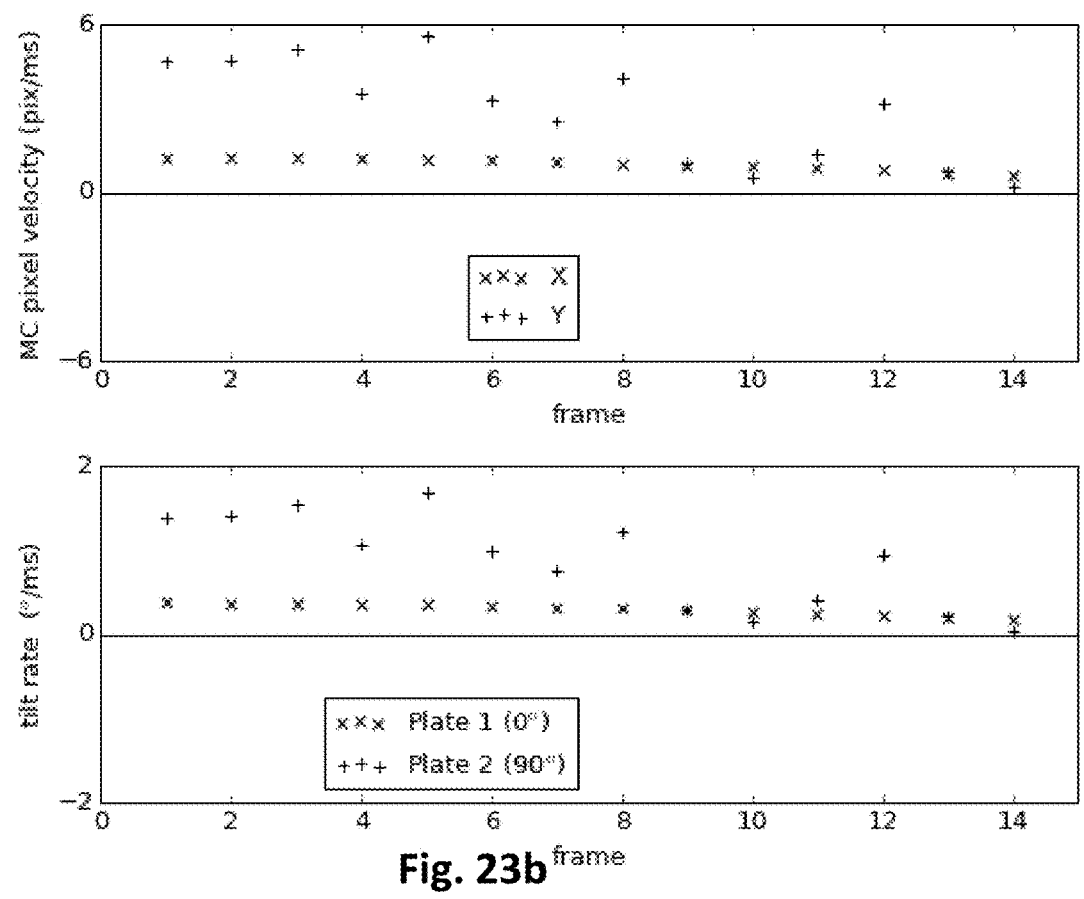
FIG. 23b illustrates pixel velocities and tilt rates for a second scan drive unit, according to one exemplary embodiment of the present disclosure.

FIGS. 23a and 23b illustrates how the pixel (pitch 3.2 microns) velocities and tilt rates are affected by the rate of change of attitude and alignment of the scanning camera system 300 relative to the flight path, specifically for the case of a yaw of 15° and a yaw rate of up to 3° per second that is not corrected in the stabilisation platform and is randomly sampled at each frame. FIGS. 23a and 23b show the pixel velocities and tilt rates for scan drive unit 301 and scan drive unit 302 respectively, and for the case of 5 mm BK7 tilting plates oriented at 0° and 90° respectively.

Similar techniques to those applied to generate the sample trajectories of FIGS. 17a, 17b, 18a, 18b, 19a, 19b, 20a, 20b 21a, 21b, 22a, 22b, 23a and 23b may also be applied to the single tilting optical plate case of FIG. 14. In this case, however, there would be a single plate (i.e. optical plate 244) of roughly double the thickness of a single plate (e.g. 10 mm BK7) and the tilting plate drive would be actuated to achieve a tilt rate and a tilt orientation. The tilt orientation would be computed based on trigonometric operations on the x- and y-components of the pixel velocity, while the tilt magnitude would be computed based on the magnitude of the pixel velocity vector.

The computation of spin rates and phases for the spinning tilted plate motion compensation unit discussed with reference to FIGS. 15a, 15b and 15c is more complicated. The two plates (i.e. optical plates 245, 246) should be controlled to spin in opposite directions such that at the middle of the exposure time they are oriented with an opposed tilt. The opposite tilt should be oriented according to the vector direction of the required pixel velocity, and equal and opposite spin rates should be used for the plates with a magnitude determined in accordance with the plate thicknesses, plate materials and the required pixel velocity magnitude. Such a trajectory may be achieved by using a similar trajectory to that shown in FIG. 16, however such a trajectory may require very large drive torque and it may be more efficient to use a continuous spinning operation for certain frames depending on the motion compensation pixel velocity requirements. In one embodiment, the optical plates may be 5 mm thick BK7 glass tilted at 6°.

In the case that the motion compensation requirements are mostly due to linear motion of the aerial vehicle, the errors in motion compensation that arise from the variable projection geometry over the sensor pixels may be reduced by introducing a small angle between the sides of one or both optical plate (i.e. a wedge) in the tilting plate cases. In the case that the motion compensation requirements include a significant contribution from the attitude rate pixel velocity, any advantage of this wedge configuration would be reduced.

Figure 24:
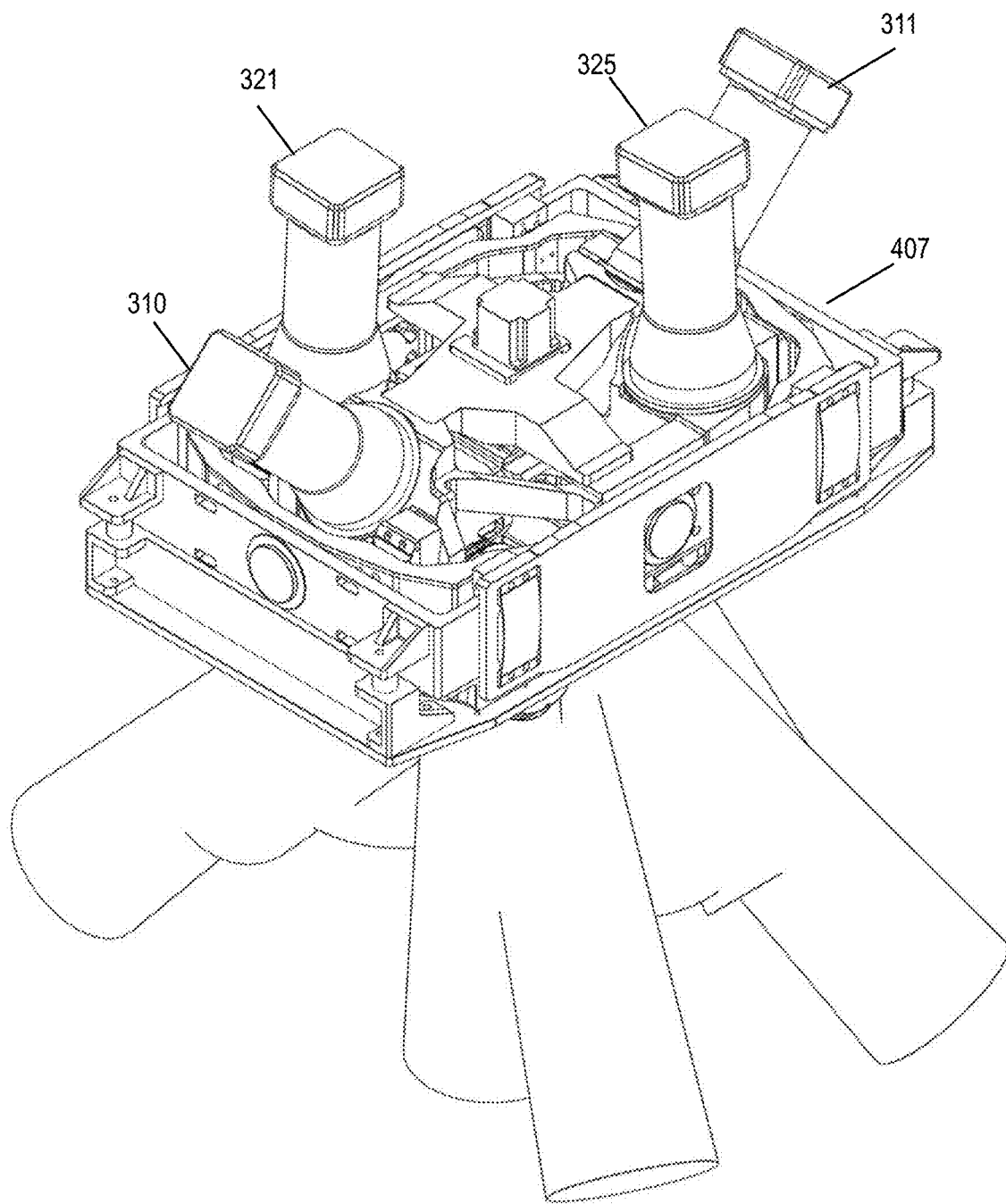
FIG. 24 shows a view of a scanning camera system; according to one exemplary embodiment of the present disclosure.

An alternative view of the scanning camera system 300 is shown in FIG. 24 that is based on a solid model of the camera system components fixed into a stabilisation platform 407. From above, the mirror structures are mostly occluded by the mounting structures that hold the camera system components in place. FIGS. 25, 26, 27, 28 and 29 illustrate how the aerial vehicle's attitude affects the orientation of the scanning camera system 300 in a stabilisation platform 407.

FIG. 25 shows a top and bottom view of the scanning camera system 300 for the case of an aerial vehicle aligned with the flight lines (y-axis), as might be the case for the aerial vehicle flying in the absence of roll, pitch or yaw. The survey hole 305 is aligned with the aerial vehicle, and therefore also with the flight lines. The scanning camera system 300 can be seen to fit in the survey hole 305 with a small margin around the perimeter.

FIG. 26 shows a top and bottom view of the scanning camera system 300 for the case that the aerial vehicle is aligned with the flight lines (y-axis) with a roll of 6° that has been corrected by the stabilisation platform 407. This configuration is equivalent to survey hole 305 remaining aligned with the flight lines but rotated around the axis of the flight lines relative to the scanning camera system 300. The margin around the perimeter of the survey hole 305 is slightly reduced due to the roll.

FIG. 27 shows a top and bottom view of the scanning camera system 300 for the case that the aerial vehicle is aligned with the flight lines (along the y-axis) with a pitch of 6° that has been corrected by the stabilisation platform 407. As was for the case of roll shown in FIG. 26, the margin around the perimeter of the survey hole 305 is slightly reduced.

FIG. 28 shows a top and bottom view of the scanning camera system 300 for the case that the aerial vehicle is aligned with the flight lines (y-axis) with a yaw of 15° that has been corrected by the stabilisation platform 407. The larger of yaw (15°) modelled is selected to be representative of the range of dynamics that may be seen in the range of commercial aerial vehicles in which the scanning camera system 300 may be deployed. In contrast to the roll and pitch cases of FIGS. 26 and 27, the margin around the perimeter of the survey hole 305 is greatly reduced, so that the scanning camera system 300 may no longer fit in the survey hole 305.

In order to reduce the spatial requirements in the survey hole 305, the stabilisation system may be configured to correct only for roll and pitch. This conveys the added advantage of reducing the size, cost and complexity of the stabilisation platform 407. FIG. 29 shows a top and bottom view of the scanning camera system 300 for the case that the aerial vehicle is aligned with the flight lines (y-axis) with a yaw of 15° that has not been corrected by the stabilisation platform 407. The configuration of the scanning camera system 300 relative to the stabilisation platform 407 is identical to that shown in FIG. 25, however the scanning camera system 300 is rotated according to the yaw so that the captured scan patterns are rotated on the object area. In an embodiment, the scan angle can be set based on a difference between the yaw angle of the vehicle and a preferred yaw angle (e.g. zero). The scan angle can be adjusted during or between one or more flight lights.

Figure 30A:
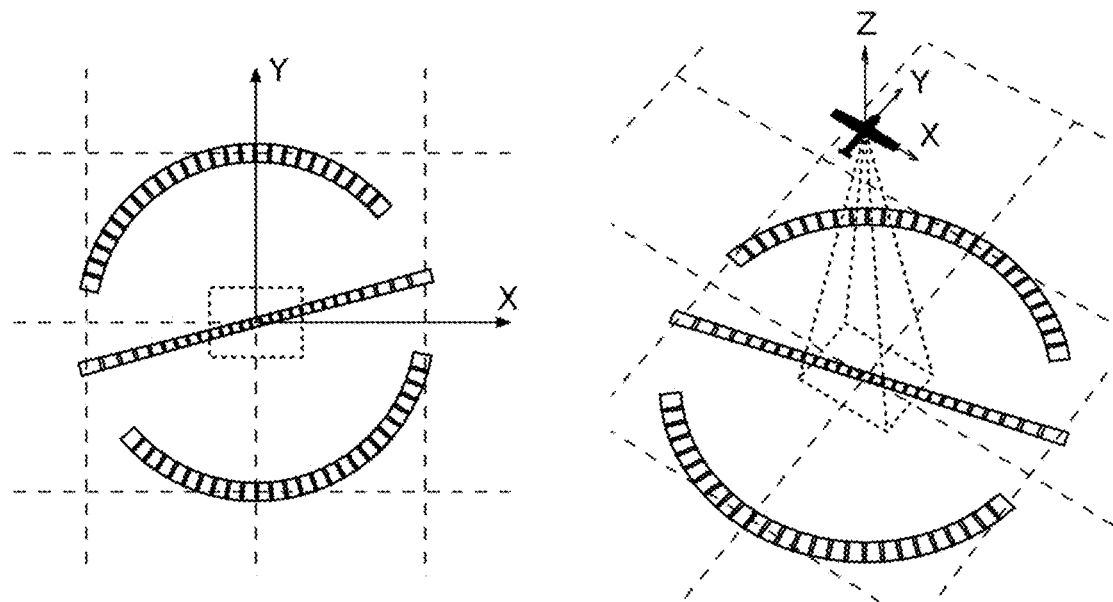
FIG. 30a shows top and oblique views of scan patterns for a scanning camera system when the aerial vehicle has yaw, according to one exemplary embodiment of the present disclosure.
Figure 30B:
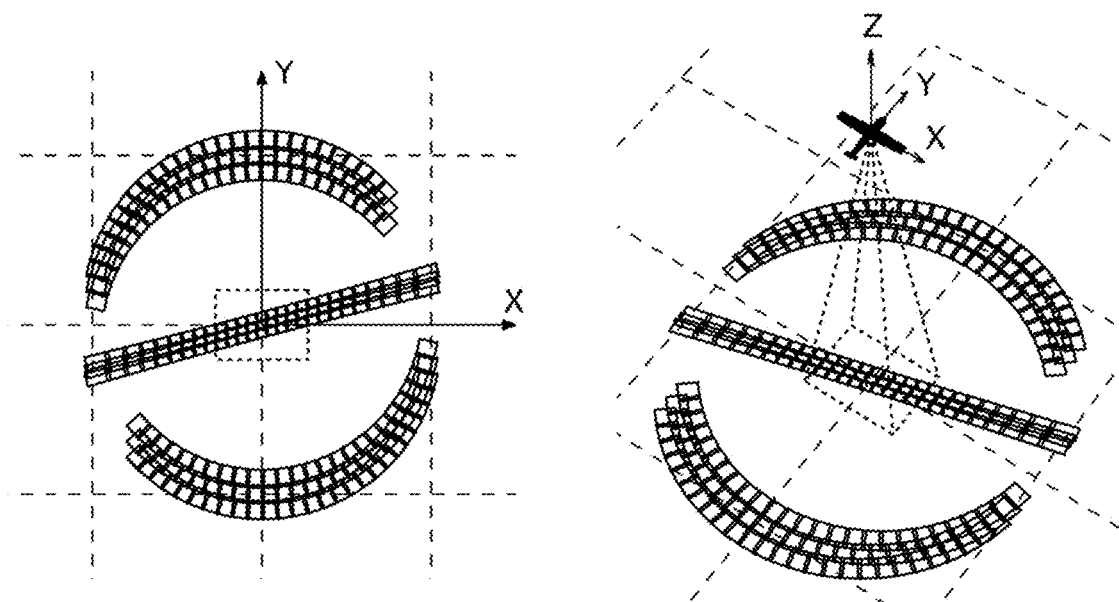
FIG. 30b shows top and oblique views of three sets of scan patterns with forward overlap for a scanning camera system when the aerial vehicle has yaw, according to one exemplary embodiment of the present disclosure.

FIG. 30a illustrates the scan patterns on the ground for the scanning camera system 300 when the aerial vehicle has a yaw of 15° relative to the flight line (y-axis). The curved and linear scan patterns that make up the overall system scan pattern are all rotated by the yaw angle around the z-axis. Images captured with these rotated scan patterns may have lower quality relative to those captured without the yaw as seen in FIG. 1a. The drop in quality may be correspond to loss of coverage of specific azimuthal angles of oblique imagery (e.g. increased tolerance in captured imagery relative to the cardinal directions), a slight increase in the maximum obliqueness of the vertical imagery due to the angle of the linear scan pattern through the vertical, and/or other factors. FIG. 30b illustrates three sets of scan patterns with forward overlaps that may be captured during the operation of a scanning camera system in an aerial vehicle with a yaw of 15°.

One aspect of the present disclosure is the design of the first scan drive unit 301 that captures oblique images. The selection of scan angles within a scan pattern may be advantageously modified in order to correct for the yaw of the aerial vehicle. Specifically, a correction of one half of the yaw applied to each sampled scan angle of the scanning mirror can be used to generate a scan pattern that is the same as the scan pattern that would have been generated in the absence of yaw with the original scan angles. FIG. 31 shows a top and bottom view of the scanning camera system 300 for a case that the aerial vehicle is aligned with the flight lines (along the y-axis) with a yaw of 15° that has been corrected by an offset scan angle of the scanning mirror (that is a correction of 7.5° of the scanning mirror scan angle relative to the scanning mirror of FIGS. 25 to 29).

Figure 32A:
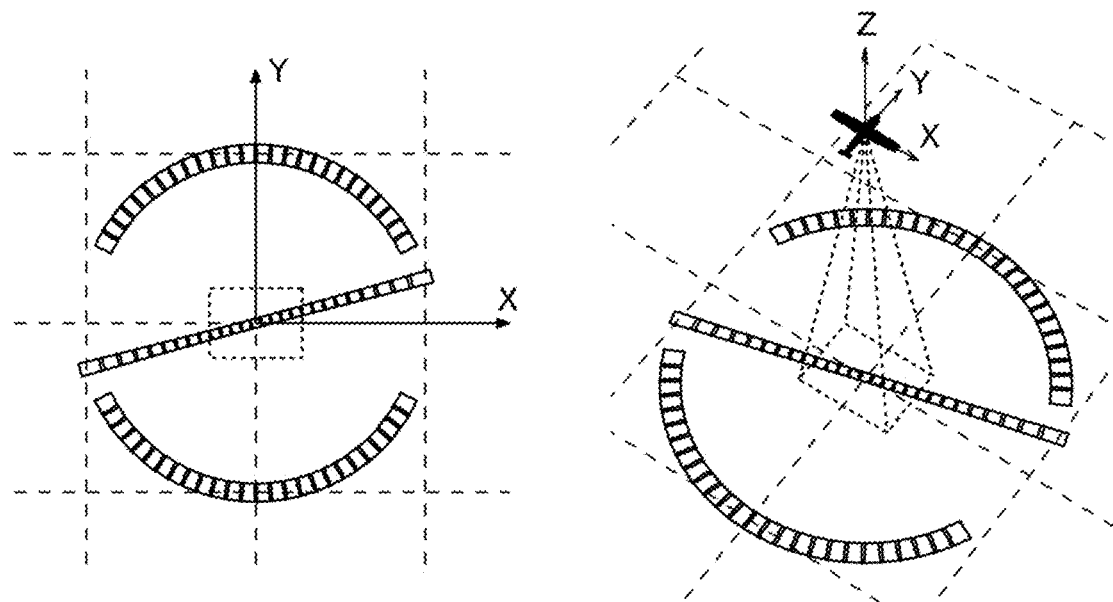
FIG. 32a shows top and obliques views of scan patterns for a scanning camera system when the aerial vehicle has yaw, according to one exemplary embodiment of the present disclosure.
Figure 32B:
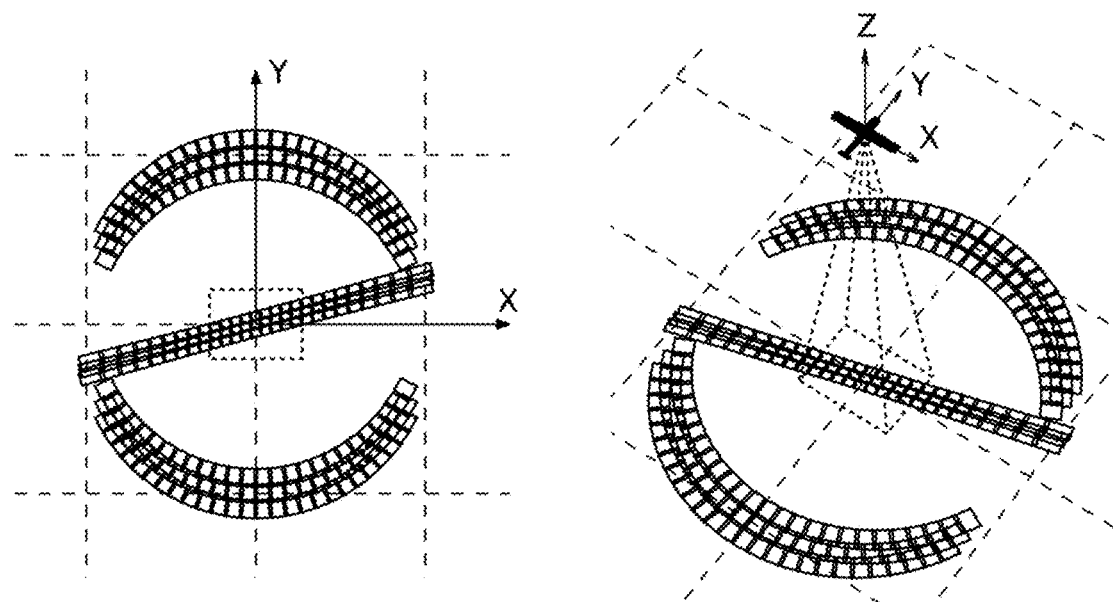
FIG. 32b shows top and oblique views of three sets of scan patterns with forward overlap for a scanning camera system when the aerial vehicle has yaw, according to one exemplary embodiment of the present disclosure.

FIG. 32a illustrates the scan patterns on the ground for the scanning camera system 300 when the aerial vehicle has a yaw of 15° relative to the flight line (y-axis) with scan angle yaw correction performed in the first scan drive unit 301. The curved scan patterns corresponding to the first scan drive unit 301 match those of FIG. 1 (without yaw), while the linear scan patterns corresponding to scan drive unit 302 and scan drive unit 303 are rotated by the yaw angle around the z-axis. In this case the drop in quality of oblique imagery is eliminated, while the small loss in image quality due to the slight increase in vertical imagery maximum obliqueness discussed above remains. The overall quality of the generated images has therefore improved through the yaw correction process based on the adaptive control of the scan angles of the first scan drive unit 301. FIG. 32b illustrates three sets of scan patterns with forward overlaps that may be captured during an operation of the scanning camera system in an aerial vehicle under the configuration described with respect to FIG. 32a.

The range of scan angles of the first scan drive unit 301 required to handle yaws between −15° and 15° is larger than the range of scan angles used for imaging in the absence of yaw. Specifically, the range of scan angles is extended by 7.5° in each direction from the standard range (−30.7° to +30.7°) to give an extended range (−38.2° to +38.2°). The standard mirror geometries designed for the standard scan angle range discussed with reference to FIG. 4e would not be large enough to handle scan angles beyond the standard range. If a mirror is set to a scan angle beyond its design range then light from light beams originating in other locations in the area can pass around the outside of the mirror rather than reflecting from the mirror. This light is incident on the lens and focused on the sensor resulting in ghost images in the captured images (images of another area superimposed on the captured image).

Figure 33A:
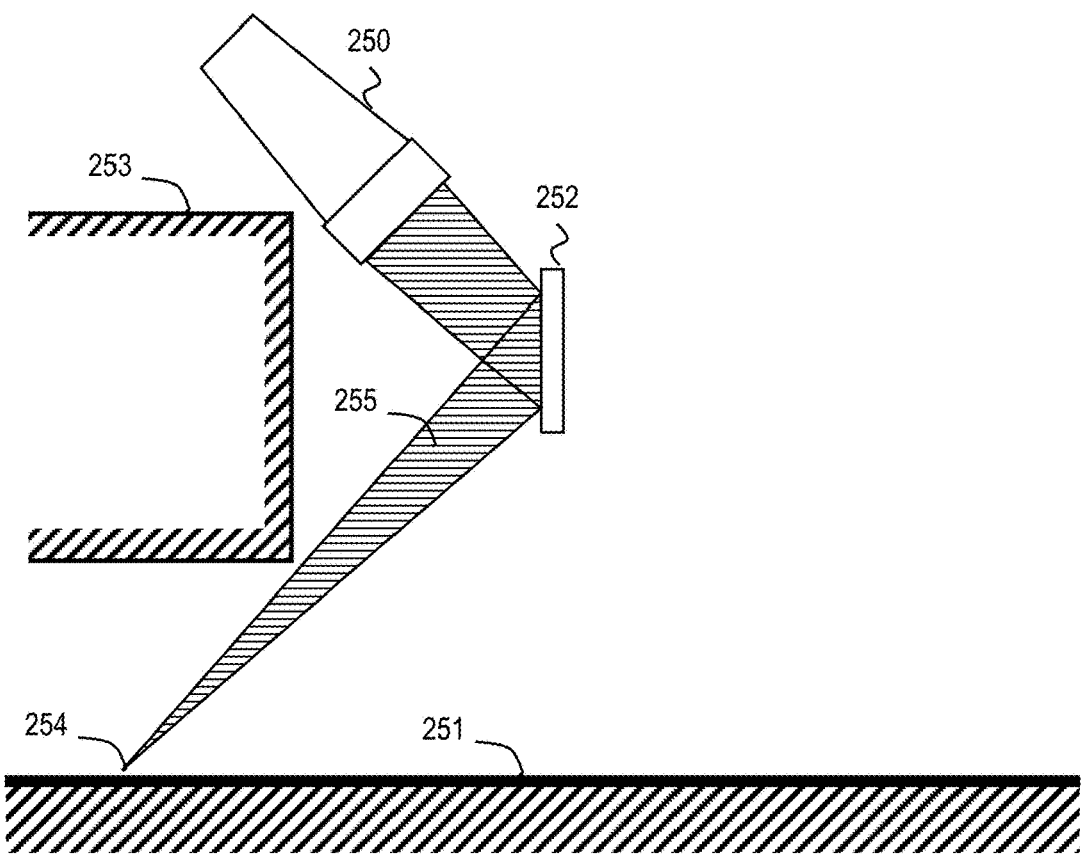
FIG. 33a illustrates capturing an image without a ghost image beam, according to one exemplary embodiment of the present disclosure.
Figure 33B:
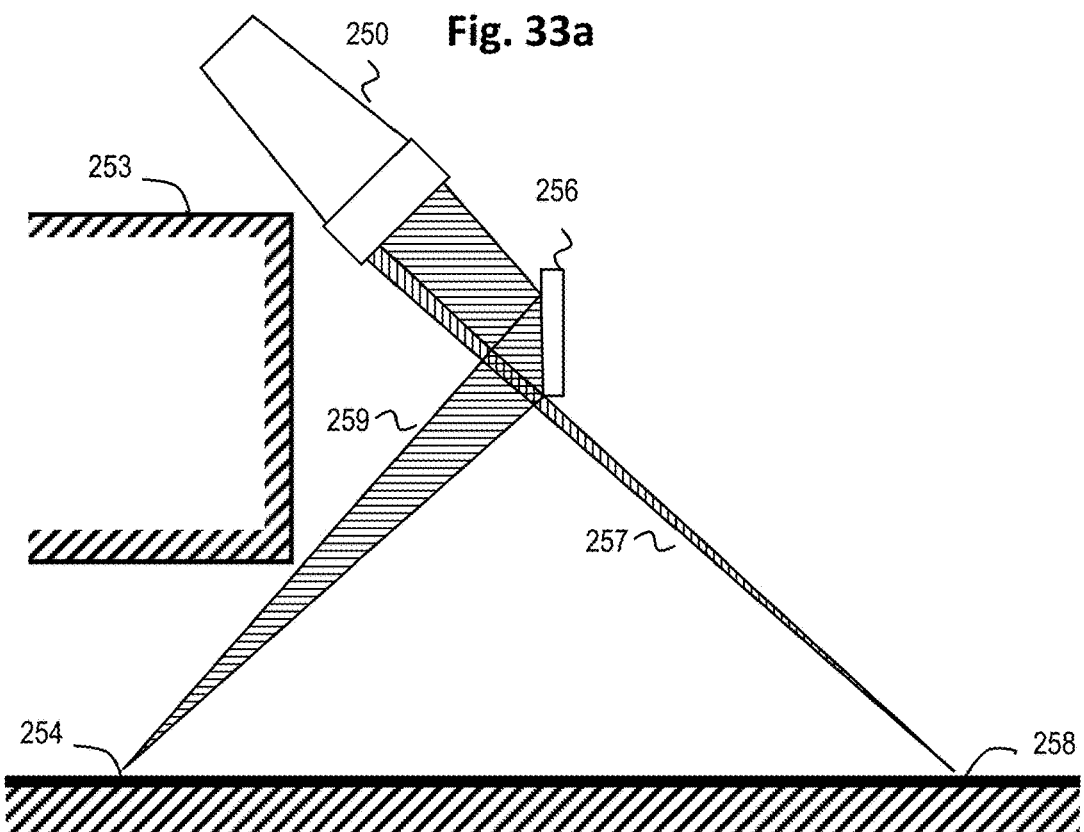
FIG. 33b illustrates capturing an image with a ghost image beam, according to one exemplary embodiment of the present disclosure.

FIGS. 33a and 33b help to illustrate the formation of a ghost image due to a mirror that was designed for a smaller range of scan angles than the current scan angle setting. FIG. 33a shows a camera 250 that is imaging an area 251 reflected in a mirror 252. The camera 250 is located inside a survey hole 253 and the imaged area 251 is very close to the camera 250, however the principle demonstrated in FIG. 33a may be generalised to an area at a much greater distance from the camera 250 as would be the case in an aerial survey. The light from location 254, imaged by the camera 250, forms a beam 255 that is focused on a sensor in camera 250 at a particular pixel that corresponds to the point on the ground at location 254. FIG. 33b shows the same arrangement, however the mirror 252 from FIG. 33a is replaced by a smaller mirror 256 around which a second beam 257 from a second location 258 in the area 251 passes. The second beam 257 is focused by the camera lens to the same pixel location on the sensor of the camera 250 as a third beam 259, that is the subset of the first beam 255 in FIG. 33a defined by the reduced mirror geometry.

Extending the illustration of FIG. 33b, each pixel in the sensor may be exposed to some light from a reflected beam, such as beam 259, and to non-reflected light from a beam, such as beam 257. The exposure of the sensor therefore includes a reflected image component due to reflected beams of light and a ghost image component due to direct image beams that pass around the mirror. Furthermore, the reflected image component may have a reduced exposure compared to the case that the mirror is sufficiently large to handle all beams focused onto the sensor, and that reduced exposure may vary across the sensor (vignetting).

FIG. 4f illustrated an extended mirror geometry computed for the case of over-rotation ("over"), that is for the extended rotation range that would be appropriate to capture the curved paths of the scan pattern of FIG. 32a without ghost image formation. The extended scanning mirror geometry is larger than the standard mirror geometries of FIG. 4e that were designed for the standard scan angle range. In some instances, the cost and complexity of manufacturing the extended scanning mirror can be increased relative to a standard scanning mirror due to its increased size. Furthermore, the mass and moment of inertia of an extended mirror can be greater than a standard scanning mirror so that the dynamic performance of the extended mirror may be reduced, and the cost and complexity of mounting and controlling its movements may be increased.

In one embodiment of the present disclosure, increased costs, complexity and reduced dynamic performance of the extended mirror may be mitigated through the use of a hybrid mirror structure. A hybrid mirror structure is based on a standard mirror structure extended out to the geometry of the extended mirror using sections of lightweight low reflectivity material. The key advantage of the hybrid mirror is that low reflectivity material sections block unwanted light beams consisting of rays of light that would otherwise pass around the mirror scan angles beyond the standard range, thereby preventing loss of quality due to the associated ghost images. The lightweight extensions also result in a lower moment of inertia when compared to a full extended scanning mirror, such that the dynamic performance is increased.

Figure 34A:
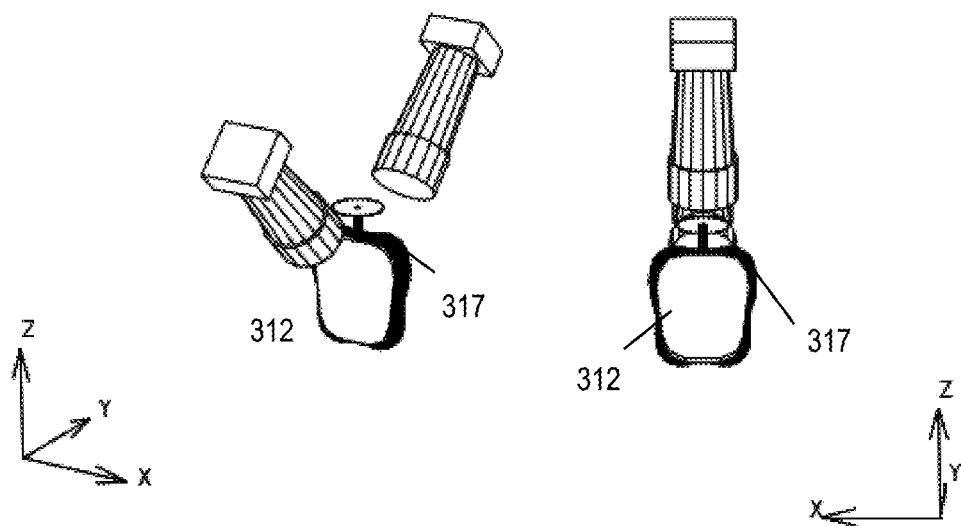
FIG. 34a illustrates a hybrid mirror having low-reflectance material, according to one exemplary embodiment of the present disclosure.

FIG. 34a shows an illustration of the hybrid mirror in a scan drive unit 301 according to an embodiment of the invention. The low-reflective material 317 is added around the scanning mirror structure 312 to improve image quality when the scan angle is beyond the standard range.

Figure 34B:
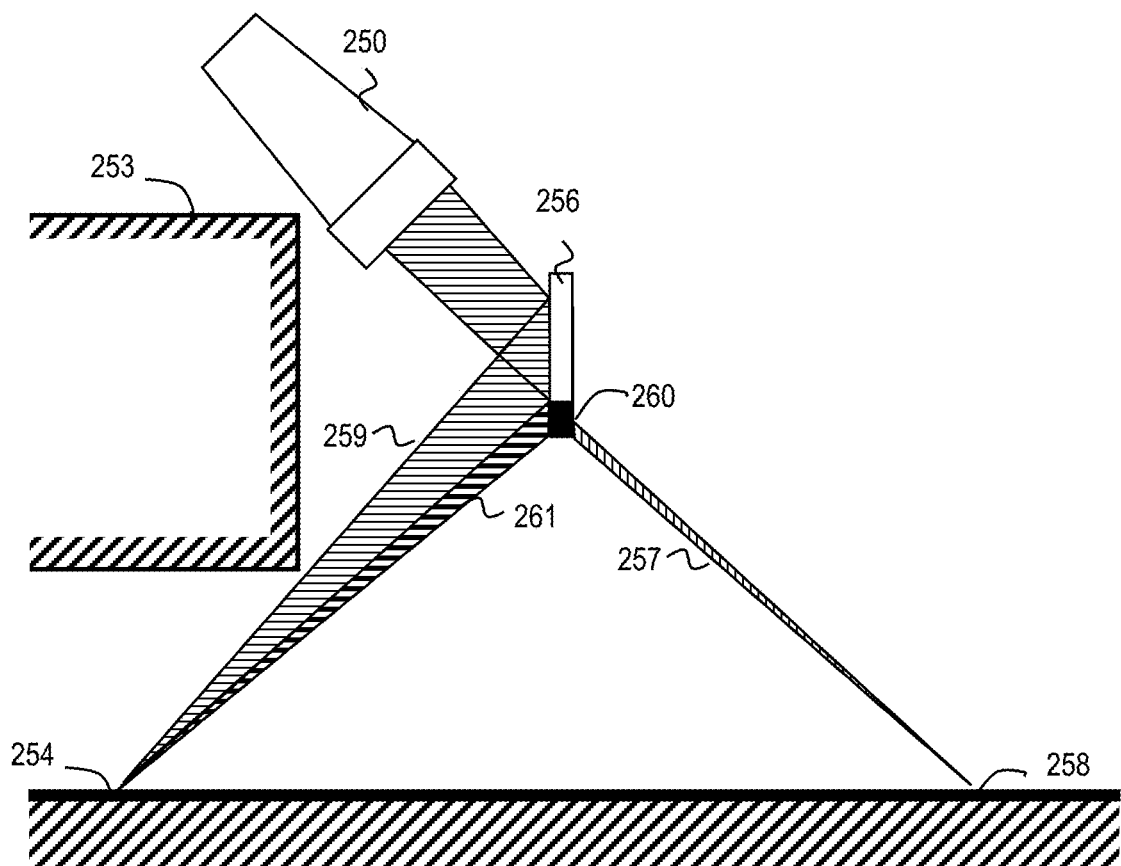
FIG. 34b illustrates using a hybrid mirror to prevent ghost images, according to one exemplary embodiment of the present disclosure.

FIG. 34b illustrates the principle of operation of the hybrid mirror to prevent ghost images for the arrangement shown in FIG. 33b. The mirror 256 has been modified by the addition of a section of low-reflective material 260 that blocks the beam 257 from the second location 258 that would contribute to a ghost image. The added low-reflective material 260 does not reflect the light beam 261 from the ground point location 254 that is a subset of the original beam 255 of FIG. 33a. The beam 259 that is also a subset of beam 255 is, however, reflected from the reflective surface of the mirror 256 and focused through the camera lens onto the camera's 250 sensor. The surface quality of the reflective surface of the mirror 259 needs to be sufficiently high in order to generate a high quality focused image that may be captured by the sensor. In this way the ground location 254 is imaged, however the ground location 258 that is associated with a ghost image, is not imaged. On the other hand, since there is no specular reflection from the low-reflective material 260, the surface quality (roughness, flatness, reflectivity) does not need to be high in order to maintain the overall sharpness and quality of images captured on the sensor.

The exposure of the pixel corresponding to the area location 254 is reduced since only a subset (i.e. beam 259) of the original beam 255 is reflected by the mirror 256 and focused onto the sensor. The exposure of other pixels on the sensor may be reduced to a greater or lesser extent due to the mirror geometry being smaller than required. This results in a form of vignetting where the exposure is a function of location on the sensor, and a captured image may look darker over some regions compared to others. The vignetting will be discussed further below with respect to FIGS. 36a and 36b. This vignetting may be modelled and corrected as will be discussed further below.

The low reflectivity material can be attached to the mirror in a secure, stiff manner such that it moves with the mirror structure blocking unwanted beams. Given that the sections no longer need to meet tight optical specifications in terms of flatness and reflectivity they may be manufactured from lightweight low-cost materials, for example carbon-fibre. This conveys the additional benefit of reducing the moment of inertia and mass of the hybrid mirror structure relative to an extended mirror structure. The reduced moment of inertia and mass of the mirror structure may allow for faster rotation of the scanning mirror between requested scan angles, and therefore a faster scanning camera system. The low reflectance material sections may change the overall geometry of the hybrid mirror structure relative to the standard mirror structure. For example, they may form non-convex extensions to a convex standard mirror structure.

In another embodiment of the present disclosure, the aperture of the camera may be dynamically tuned such that the geometry of the mirror surfaces 314, 315 of scanning mirror structure 312 are large enough to reflect all rays that are focused onto the sensor. Specifically, the aperture is reduced as the scan angle extends beyond the design parameters of the mirror (i.e. when over-rotation occurs). In one embodiment the aperture may be reduced symmetrically. In other embodiments the aperture may be reduced asymmetrically. The asymmetry of the aperture may be selected to minimise the change in aperture while removing all beams associated with ghost images. This can minimise the loss of exposure over the sensor. The smallest required asymmetric change in aperture may take an arbitrary shape. Another approach is to use a simple dynamic change to the aperture, such as one or more sliding section of opaque material each of which is moved to close the aperture from a particular side so as to selectively block some part of the aperture. This may be achieved using a modified, possibly, asymmetric iris to control the aperture. Alternatively an active element such as an LCD may be used to create a dynamic aperture that may be controlled electronically to form a wider variety of shapes up to the resolution of the element. An active aperture may give greater control over the aperture and a faster speed of update compared to sliding sections of material. On the other hand it may be less practical and may not constitute as effective a block, with the risk of a small fraction being transmitted through the aperture.

As was discussed with reference to FIGS. 25, 26, 27, 28 and 29, the geometry of the survey hole can be a constraint in the design of a scanning camera system suitable of deployment in an aerial vehicle. The components of the scanning camera system must be mounted inside the survey hole. Furthermore, if a stabilisation platform is used to maintain the attitude of the scanning camera system during flight then there should be sufficient margin spatially for the scanning camera system to rotate with the stabilisation platform without touching the survey hole walls.

Figure 35A:
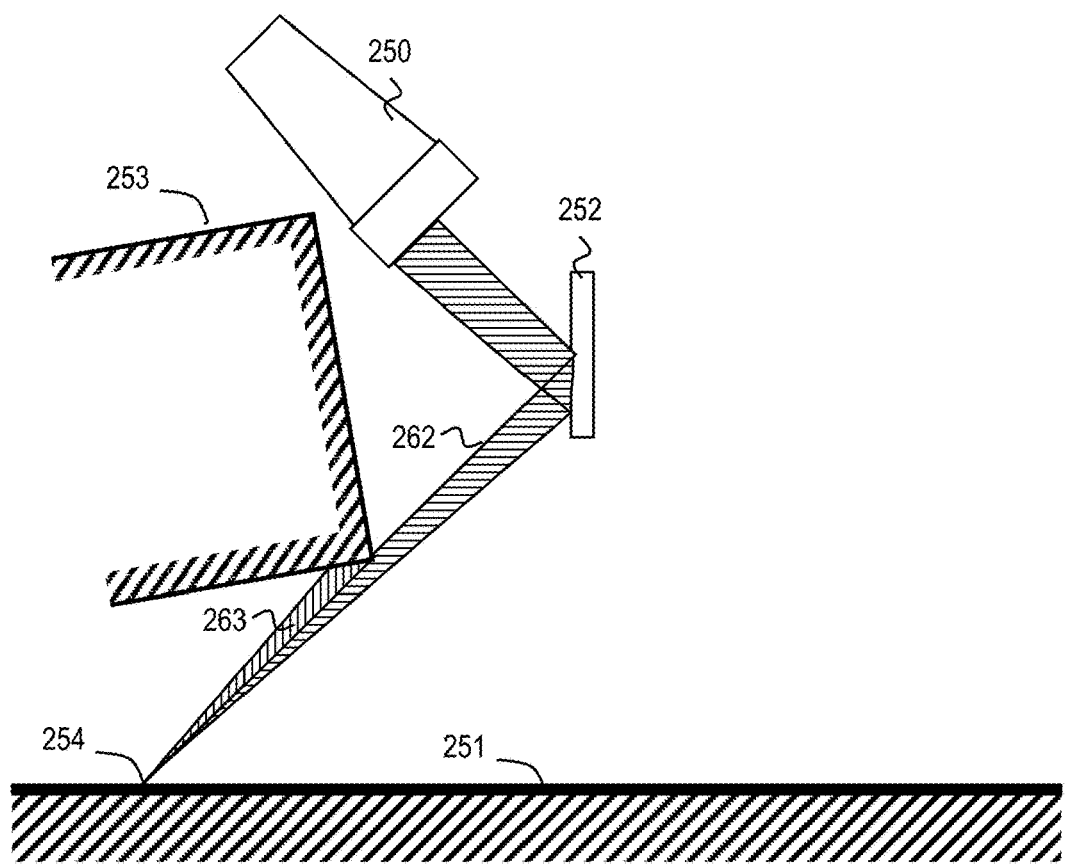
FIG. 35a illustrates vignetting caused by a survey hole, according to one exemplary embodiment of the present disclosure.
Figure 35B:
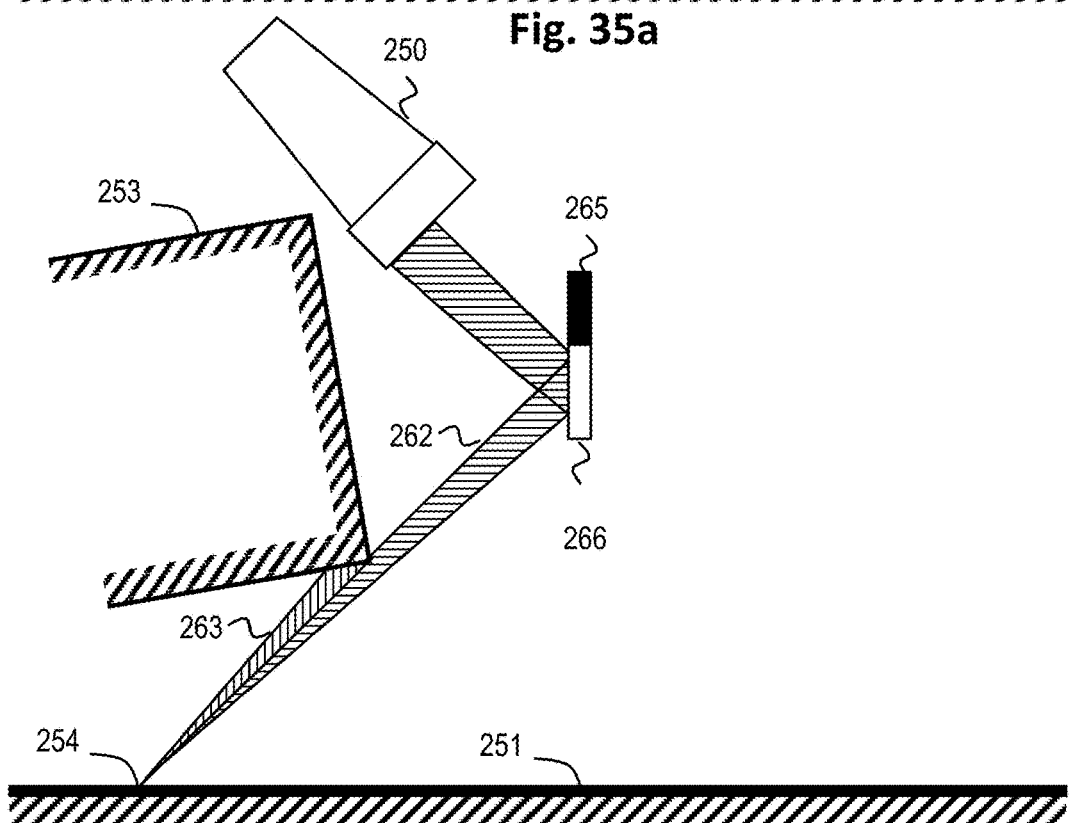
FIG. 35b illustrates vignetting caused by a survey hole, according to one exemplary embodiment of the present disclosure.

Further to this spatial constraint, there is an optical constraint relating to the placement of the scanning camera system in the survey hole that is illustrated using FIGS. 35a and 35b. FIG. 35a shows the camera 250 imaging the location 254 of the area 251, reflected in the mirror 252, after the survey hole 253 has moved relative to the camera 250 and mirror 252. This situation might occur in the case that the camera 250 and mirror 252 are mounted on a stabilisation system on the survey hole 253, and the survey hole 253 attitude is changed, for example through a roll or pitch of the aerial vehicle that it is attached to. In this case the beam 255 of light consists of two parts: (1) the first part of the beam 262 reflects from the mirror 252 and is focused onto the sensor by the camera lens, and (2) the second part of the beam 263 is occluded by the survey hole 253 and does not reflect from the mirror 252 to be focused onto the sensor.

The pixel corresponding to the area location 254 is exposed less due to the occlusion. The exposure of other pixels on the sensor may be reduced to a greater or lesser extent due to the occlusion. This results in a form of vignetting where the exposure is a function of location on the sensor, and a captured image may look darker over some regions compared to others.

It is noted that some parts of the full beam 255 may be occluded by the survey hole so that they are not incident on the low-reflective mirror sections. This is illustrated in FIG. 35b, in which a beam 263 is occluded by the survey hole 253 and therefore does not reach the low-reflective material 265 attached to the mirror 266.

The vignetting of images due to the geometries represented in FIGS. 34b, 35a and 35b is further illustrated by FIGS. 36a through 36h. FIGS. 36a to 36h illustrate the calculation of vignetting and ghost images due to the geometry of the scan drive unit in a survey hole, optionally mounted on a stabilisation platform. The calculations are based on projecting geometry of various components and objects along the image beam path onto the aperture plane of the camera assuming multiple sensor locations. This calculation of projection geometry illustrates a model of the illumination of an image sensor of a camera by an imaging beam, according to one embodiment. The model of the illumination takes into consideration factors such as a geometry of a constrained space housing a scanning camera system, scan angle of a scanning mirror structure, geometry of the scanning mirror structure, and roll/pitch/yaw of a vehicle housing the scanning camera system to model the illumination of an image sensor in a camera by an imaging beam.

Figure 36A:
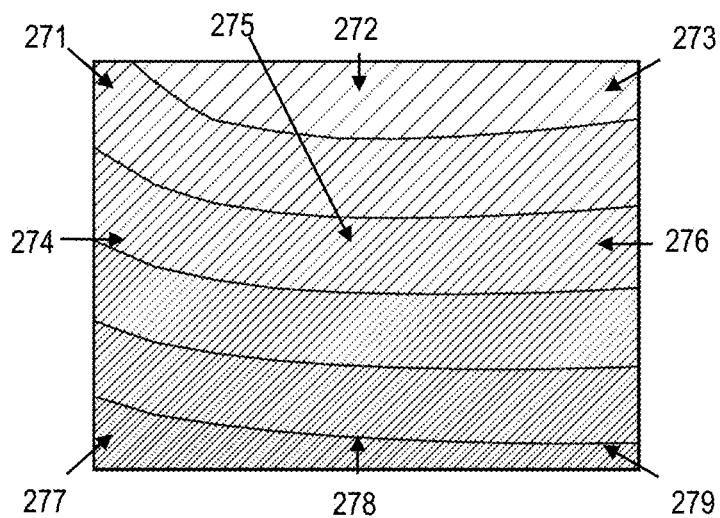
FIG. 36a shows an image of a uniform untextured surface affected by vignetting, according to one exemplary embodiment of the present disclosure.

FIG. 36a shows an image of a uniform untextured surface that is affected by vignetting. The darker parts of the image (e.g. sensor location 277) are more strongly affected by the vignetting than the lighter parts of the image (e.g. location 273).

Figure 36B:
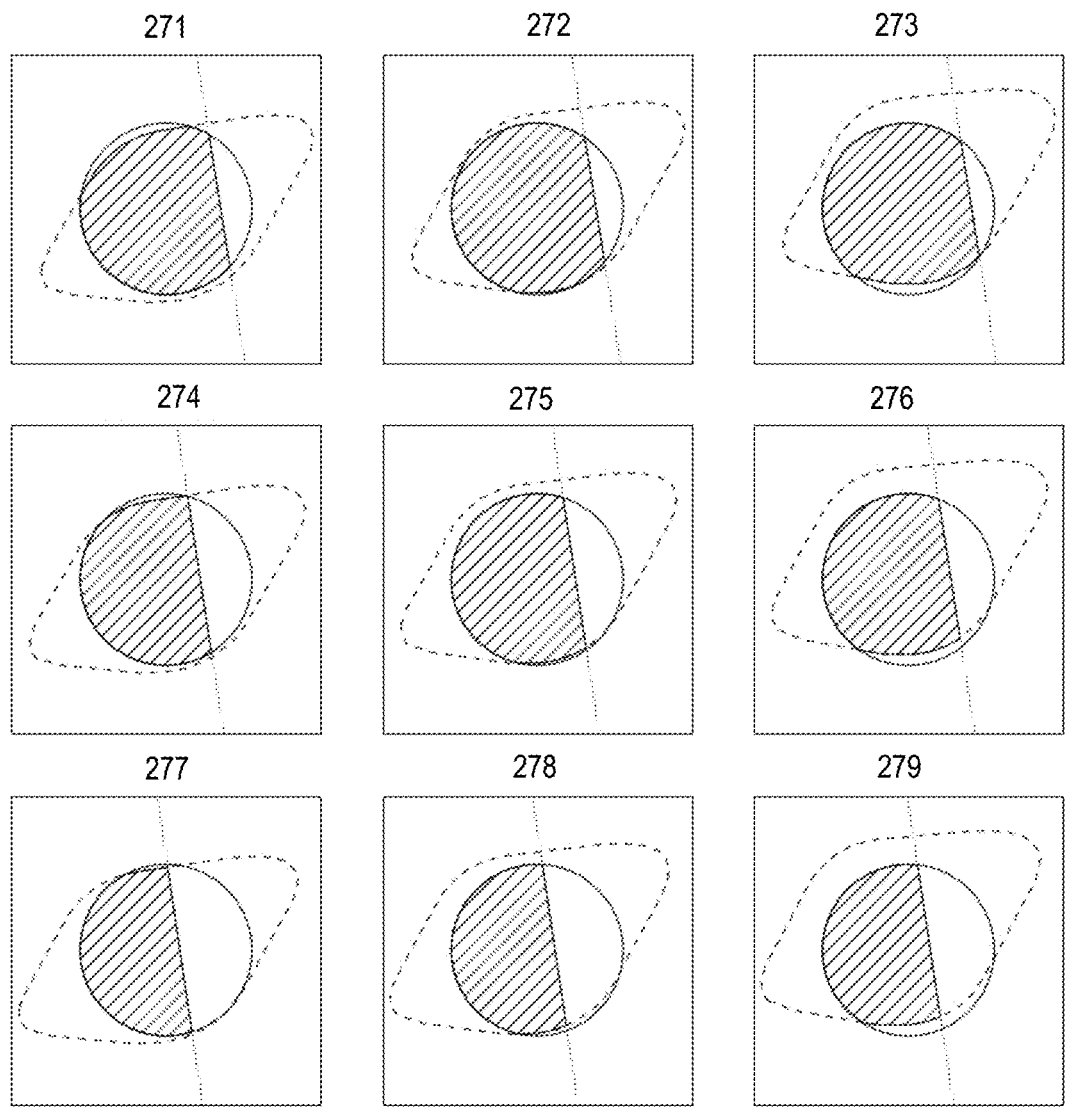
FIG. 36b illustrates vignetting at various locations on the image from FIG. 36a, according to one exemplary embodiment of the present disclosure.

Nine sensor locations 271, 272, 273, 274, 275, 276, 277, 278, 279 in FIG. 36a are indicated, and the vignetting of the image at each sensor location is illustrated further in the corresponding plots of FIG. 36b. Each plot of FIG. 36b illustrates the illumination of the aperture by light reflected from the mirror of a scan drive unit. The centre of each plot in 36b represents the intersection of the optical axis of the lens with the aperture plane. The solid circular line represents the aperture, while the dashed contour represents the projection of the mirror surface geometry onto the space of the aperture. If the dashed contour extends to or beyond the solid circle, then the mirror is sufficiently large for the camera aperture. Any part of the circle not inside the dashed contour is, however, not illuminated by the reflected beam from the mirror. The dotted line is part of a larger contour that represents the survey hole. Within the plots, the survey hole is to the left of the dashed line, so that any part of the solid circle to the right of the aperture is not illuminated by reflected light from the mirror due to occlusion by the survey hole. The diagonal hashed part of the solid circle represents the fraction of the aperture that is illuminated by reflected light from the mirror, which may be related to the exposure of the sensor pixel corresponding the plot. It is seen that the degree of vignetting varies across the sensor and may depend on both survey hole occlusion and the finite mirror geometry.

A vignetting image for a uniformed untextured area may be formed as discussed above with respect to FIGS. 36a and 36b. The vignetting image may be generated at the full sensor resolution, or at a lower resolution, in which case the vignetting at any given pixel may be estimated by interpolating the vignetting image. The vignetting image may be stored as vignetting data 473 in data storage 406. This vignetting data 473 can be used to update pixels values to compensate for vignetting, according to one embodiment.

FIG. 36b further illustrates the requirements for dynamically tuning the aperture of the lens to avoid ghost imaging. Specifically, any part of the circular aperture that is not contained within the dashed line corresponding to the projected mirror geometry should be masked by the dynamic aperture mask. This defines a minimum level of masking, and as discussed above, it may be more practical to mask a larger or more regular region.

Figure 36C:
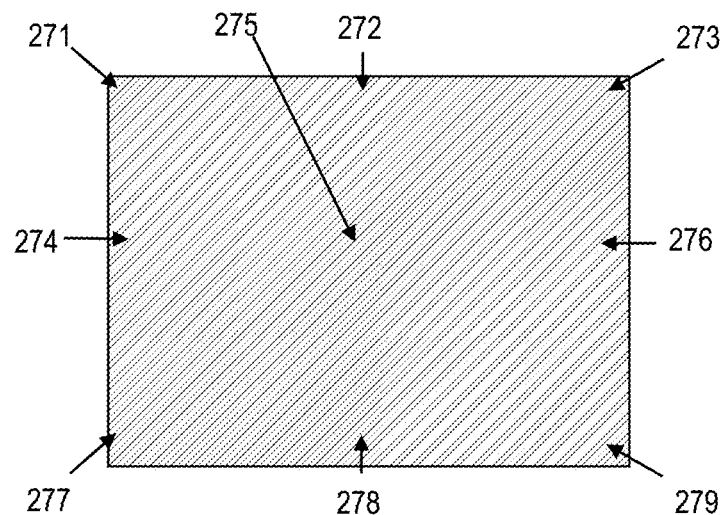
FIG. 36c shows an image obtained using a modified aperture and having less vignetting, according to one exemplary embodiment of the present disclosure.

FIG. 36c illustrates an image that may be captured for the same geometry represented in FIGS. 34b, 35a and 35b but with a modified aperture. The variation in illumination is substantially eliminated, so that the image should no longer be affected by vignetting or a ghost image.

Figure 36D:
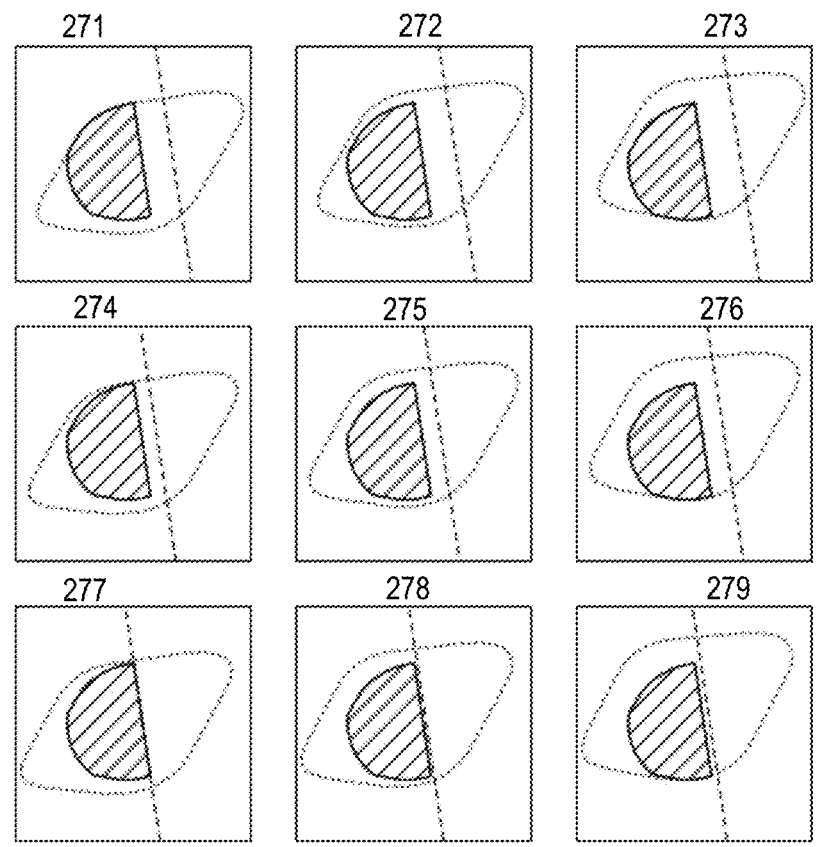
FIG. 36d shows an example of regions that can define an aperture, according to one exemplary embodiment of the present disclosure.

FIG. 36d illustrates an irregular and asymmetric region that defines a modified aperture that may be achieved by dynamically reducing the circular aperture of FIG. 36b. The full irregular region is hashed at all sensor locations, indicating that the geometry of the system including the survey hole and mirror has not affected the exposure of the sensor. This substantially removes the vignetting and ghost images that result from the geometry. As was the case for FIG. 36b, the centre of each plot in 36d represents the intersection of the optical axis of the lens with the aperture plane. The same is true for each plot in 36e, 36f, 36g and 36h.

Figure 36E:
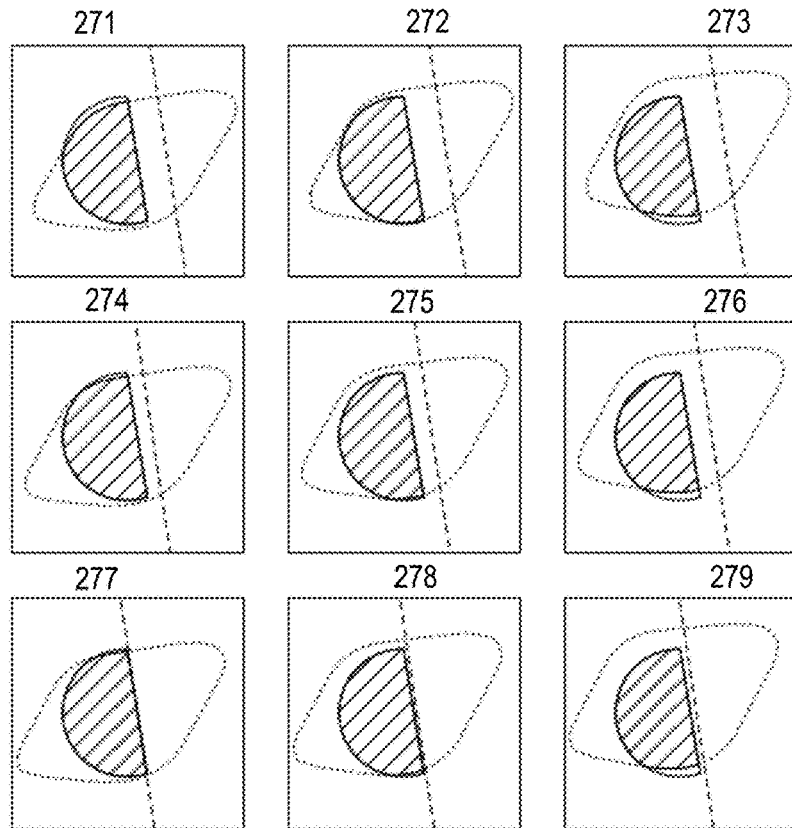
FIG. 36e shows an example of regions that can define an aperture, according to one exemplary embodiment of the present disclosure.

FIG. 36e illustrates a first alternative irregular region that defines a modified aperture that may be achieved by dynamically reducing the circular aperture of FIG. 36b. Specifically the circularly symmetric aperture is modified by blocking a segment defined by drawing a single straight line across the circle. Most of the irregular region of FIG. 36e is hashed in most images, though there is a small part that is not hashed in sensor locations (e.g. 271, 273, 276 and 279). These small regions would introduce a small amount of vignetting and may also allow for ghost images if the mirror does not have low reflectance material extensions that block ghost images.

Figure 36F:
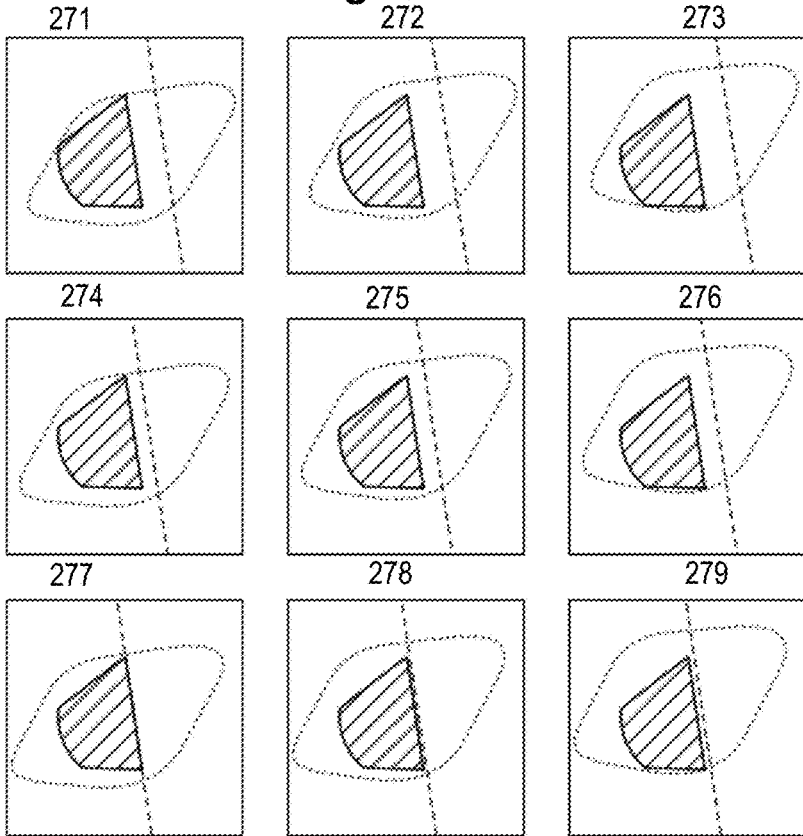
FIG. 36f shows an example of regions that can define an aperture, according to one exemplary embodiment of the present disclosure.

FIG. 36f illustrates a second alternative irregular region that defines a modified aperture that may be achieved by dynamically reducing the circular aperture of FIG. 36b. Specifically the circularly symmetric aperture is modified by blocking three segments, each defined by drawing a single straight line across the circle. The full irregular region is hashed at all sensor locations, indicating that the geometry of the system including the survey hole and mirror has not affected the exposure of the sensor. This substantially removes the vignetting and ghost images that result from the geometry.

Figure 36G:
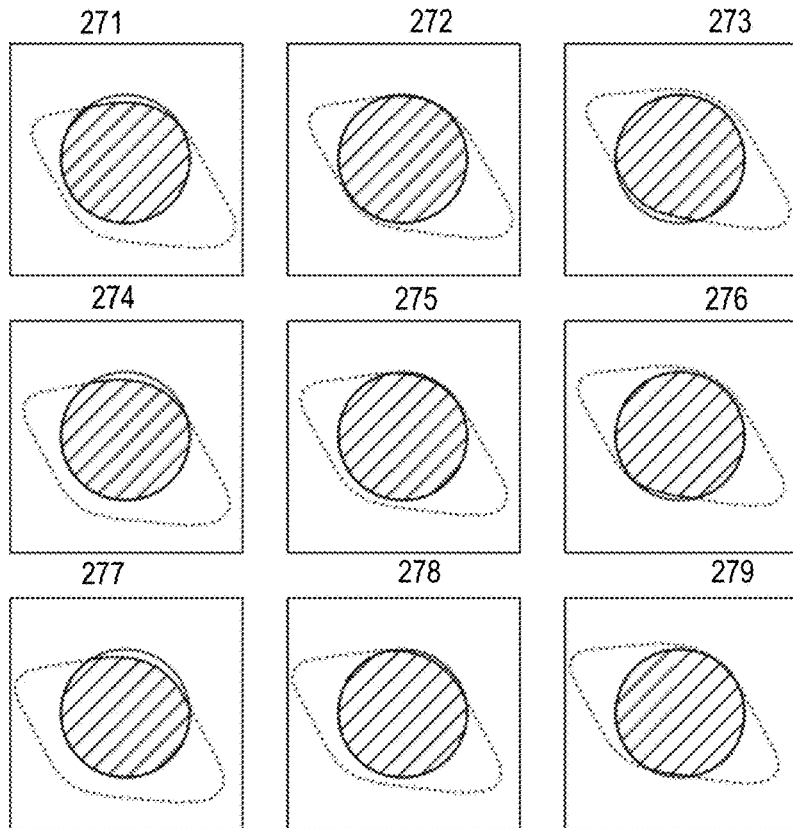
FIG. 36g shows an example of regions that can define an aperture, according to one exemplary embodiment of the present disclosure.

FIG. 36g illustrates the aperture plane geometry for a similar case to that shown in FIG. 36b but with the scanning mirror angle modified such that the mirror geometry projection is deformed, and such that the survey hole does not block any of the image beams that are incident on the full aperture. Most of the irregular region of FIG. 36e is hashed in most images, though there is a small part that is not hashed in sensor locations (e.g. 271, 273, 274, 276 and 277). These small regions would introduce a small amount of vignetting and may also allow for ghost images if the mirror does not have low reflectance material extensions that block ghost images.

Figure 36H:
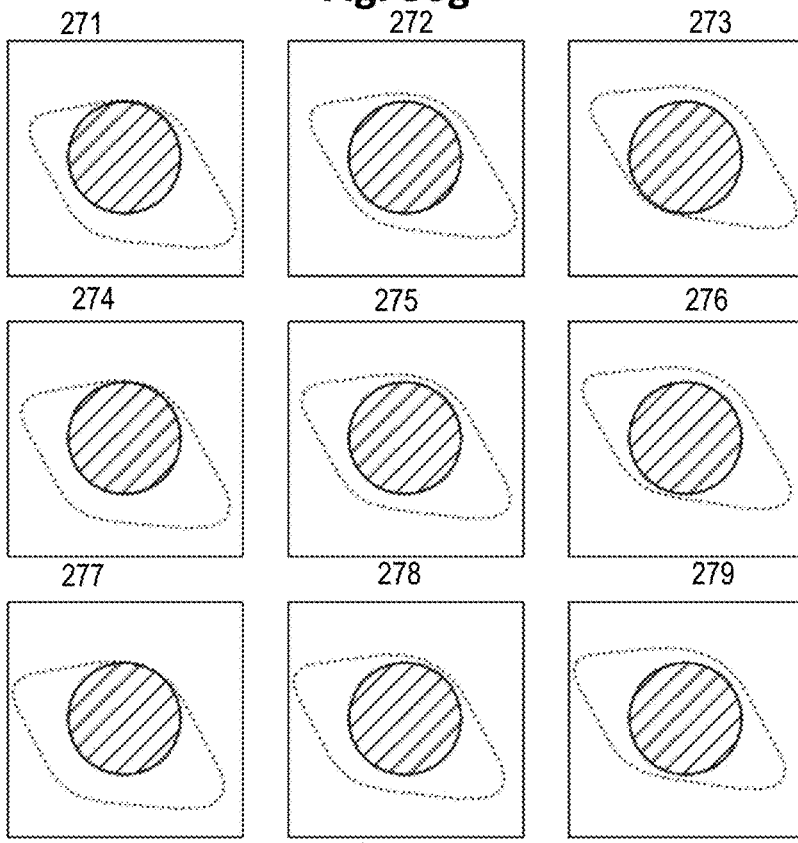
FIG. 36h shows an example of regions that can define an aperture, according to one exemplary embodiment of the present disclosure.

FIG. 36h illustrates a third alternative region that defines a modified aperture that may be achieved by dynamically reducing the circular aperture of FIG. 36b symmetrically resulting in a smaller circular aperture. The full region is hashed at all sensor locations, indicating that the geometry of the system including the survey hole and mirror has not affected the exposure of the sensor. This substantially removes the vignetting and ghost images that result from the geometry.

System control 405 receives the IMU attitude data (roll, pitch, and/or yaw) and the scan drive unit parameters 434 including the scan angles. System control 405 is programmed to correlate the IMU attitude data and the scan angles with the presence of occlusion due to, for example, the survey hole 253, and the aperture not being contained within the projected mirror geometry to compute dynamic aperture settings for a given frame. System control 405 may compute the dynamic aperture settings on the fly, the computation being based on parameters such as the geometry of the scanning camera system, the scan drive angle, the geometry of occluding objects such as the constrained camera hole, parameters of the camera such as sensor geometry and focal length, and flight parameters such as roll, pitch and yaw. Alternatively, it may use pre-defined look up tables of dynamic aperture parameters that may be functions of parameters such as scan angle and/or the roll, pitch and/or yaw of the aircraft. System control 405 controls the dynamic aperture through signals sent to the cameras, illustrated as 414 and 416 in FIG. 10. Based on the control signals, the aperture may be modified either mechanically (e.g. through the motion of one or more iris elements) or electronically (e.g. for an LCD aperture) or otherwise. In an embodiment, the aperture can be modified using one or more motors (e.g. stepper motor, DC motor). The aperture can be reduced symmetrically, for example as shown in FIG. 36h, asymmetrically, for example as shown in FIGS. 36b and 36f, or a combination of the two, for example as shown in FIG. 36d.

Figure 37:
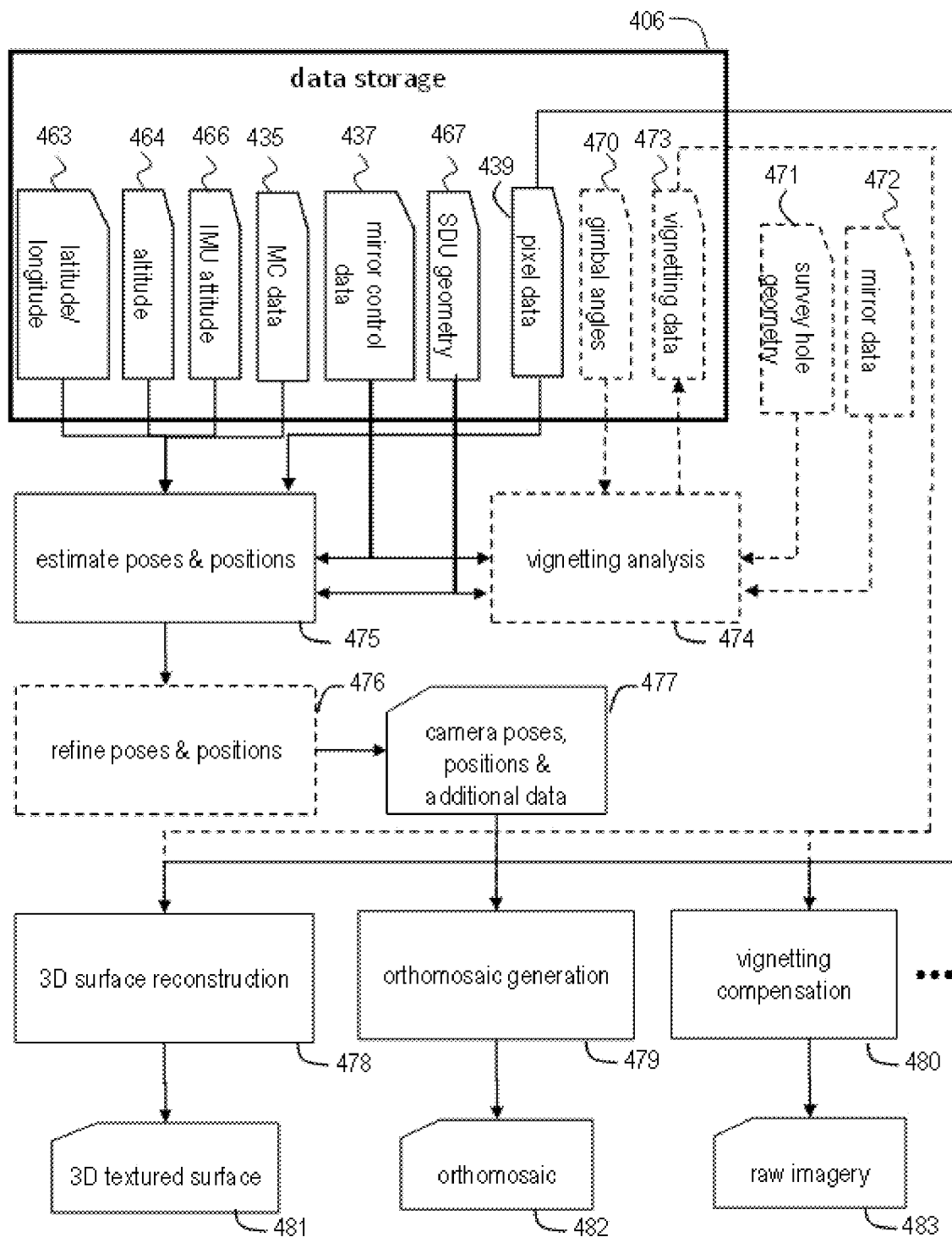
FIG. 37 illustrates post-processing that can be performed after images have been captured from an aerial survey, according to one exemplary embodiment of the present disclosure.

FIG. 37 illustrates post-processing analysis that may be performed after images have been captured for a given aerial survey. The post-processing analysis may be performed in flight or after the flight, and may be performed on a computing platform such as a computer or a cloud processing platform. The analysis uses data from the data storage 406 which may be copied to other data storage after or during the flight. In one embodiment, the post-processing analysis can be performed using a network controller, such as an Intel Ethernet PRO network interface card from Intel Corporation of America, for interfacing with a network. As can be appreciated, the network can be a public network, such as the Internet, or a private network such as an LAN or WAN network, or any combination thereof and can also include PSTN or ISDN sub-networks. The network can be wired, such as via an Ethernet network, or can be wireless, such as via a cellular network including EDGE, 3G, 4G, and 5G wireless cellular systems. The wireless network can also be Wi-Fi, Bluetooth, NFC, radio frequency identification device, or any other wireless form of communication that is known.

One or more individual captured images may optionally be processed by a vignetting analysis process 474 to generate vignetting data 473 that may be used to correct for vignetting of image pixels due to occlusion by the survey hole 305 or due to the finite geometry of the scanning mirror structure of a scan drive unit. The vignetting analysis process 474 may be performed as was discussed above with reference to FIGS. 36*a* and 36*b*. It may use the SDU geometry data 467, the mirror control data 437 and gimbal angles 470 corresponding to a given image from the pixel data 439. It may additionally use data defining the survey hole geometry 471, and mirror data 472 relating to the geometry of a scanning mirror structure in order to determine the fractional exposure of the aperture as illustrated in FIG. 36*b* for multiple pixels in the sensor and then to generate a vignetting image as discussed above.

In one embodiment, the exposure data for specific pixels is stored as a fractional exposure, where the fractional area is the fraction of the circular region corresponding to the aperture is filled with the diagonal cross hatch. A fractional exposure of 1 would represent a full exposure corresponding to the case that the circular region in FIG. 36*b* is fully filled by the diagonal hatch region. The vignetting image may consist of fractional exposure data corresponding to specific pixels and may be stored as vignetting data 473. The vignetting data 473 may be used to correct individual pixels from the pixel data 439 by modifying the pixel values according to the vignetting data 473 for that pixel. For example, a pixel RGB value may be divided by the fractional exposure corresponding to that pixel stored in the vignetting data. The vignetting data 473 may be interpolated to provide suitable vignetting data for all pixels in the image. In another embodiment the fractional exposure may be weighted according to the angle of incidence of rays on the aperture, for example through a cosine or other trigonometric function.

The post-processing of pixel data illustrated in FIG. 37 begins at processing step 475 which estimates the pose and position of the camera corresponding to each image in a global coordinate system. This pose and position may correspond to a virtual camera that represents the apparent viewpoint and view direction of the camera (i.e. under the assumption that no mirrors were in the optical path at the time of image capture). Processing step 475 may use standard known techniques sometimes referred to as bundle adjustment and may use pixel data 439 from one or more fixed overview cameras in addition to the scanning camera system. Processing step 475 may use various survey data corresponding to the captured images including latitude/longitude data 463, altitude data 464, IMU attitude data 466, motion compensation data 435, mirror control data 437, and SDU geometry data 467. Processing step 475 may optionally generate additional data related to nonlinearities of the cameras (e.g. barrel distortion) and other aspects of the imaging system components and the environment in which the images were captured (e.g. atmospheric effects).

Processing step 475 may optionally be followed by a refinement step 476 that improves the various estimates or poses, position and other aspects of the imaging system and/or environment. The camera poses, positions and additional data 477 are stored for use in generating various image products based on the survey.

A process for 3D surface reconstruction 478 may use the camera poses, positions and additional data 477 plus pixel data 439 to generate a 3D textured surface using known techniques that are described elsewhere herein. 3D surface reconstruction 478 may optionally use vignetting data 473 to improve the quality of the output by correcting for vignetting in the captured images by updating pixel values using a model of illumination of the image sensor by the imaging beam.

A process for orthomosaic generation 479 may use the camera poses, positions and additional data 477 plus pixel data 439 to generate an orthomosaic 482 using known techniques that are described elsewhere herein. Orthomosaic generation 479 may optionally use vignetting data 473 to improve the quality of the output by correcting for vignetting in the captured images.

A process for vignetting compensation 480 may use the camera poses, positions and additional data 477 plus pixel data 439 and vignetting data 473 to generate raw imagery that has been corrected for vignetting in the captured images.

In some embodiments, the captured images may be cropped, or region of interest imaging may be employed such that the captured frames used for the analysis described with respect to FIG. 37 may have a variety of different pixel dimensions. There may be a number of advantages to this approach such as reducing the data storage requirements of captured image pixels and also removing pixels with lower quality due to vignetting from generated image products.

By capturing images at scan angles such that the captured images have overlapping portions, portions of the images can be stitched together to form a cohesive image even after other portions of the image affected by vignetting have been cropped out. The cropping can include removing some or all portions affected by vignetting. The scan angles can be chosen based on a model of the illumination of the image sensor by the imaging beam, where the illumination may be reduced by partial occlusion from a constrained space, the scanning mirror structure being outside a predetermined range of scan angles, or a combination thereof. In one embodiment, the predetermined range of scan angle is determined by the mirror geometry. For example, the regions discussed with respect to FIGS. 36*a* to 36*h* can be used to model the illumination of the image sensor by the imaging beam to know the image sensor locations that are and are not affected by vignetting. For those portions that have vignetting, steps of the scan angles can be smaller to obtain images with enough overlap. In other words, different step sizes for the scan angle can be used for different ranges of scan angles. In an embodiment, a step size of the values of the scan angle of the scanning mirror structure based upon on at least one of: a yaw angle of a vehicle including the imaging system; a roll of the vehicle; a pitch of the vehicle; a geometry of the scanning mirror structure; the scan angle; and a geometry of the constrained space.

Figure 38A:
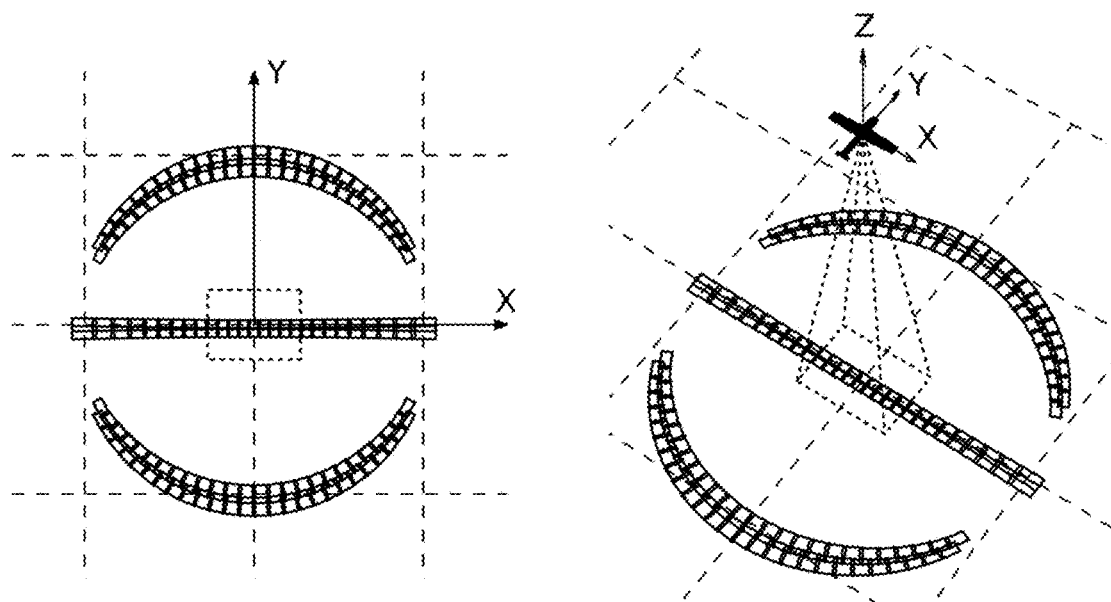
FIG. 38a shows top and oblique views of sets of scan patterns with sampled sensor pixels, according to one exemplary embodiment of the present disclosure.

FIG. 38*a* illustrates the projective geometry of a suitable set of cropped image frames for the scanning camera system 300 and for two scan patterns along the flight path. The overlap of the projection geometry of frames along the curved paths of scan pattern 111, 112 is seen to be more uniform than was seen in FIG. 1*b* and this has been achieved by cropping the sensor pixels associated with the outer edge of the curved paths for scan pattern 111, 112. In this case the cropped pixels are found either at the top or bottom assuming a landscape orientation of the sensor. The outer, cropped pixels with higher obliqueness, are generally more affected by vignetting due to the outer edge of the survey hole and therefore there is an advantage to rejecting these pixels and preserving higher quality pixels taken from the sensor positions corresponding to the inner geometry of the curved paths for scan pattern 111, 112 and lower obliqueness.

In some cases, it may additionally be advantageous to capture images at a higher rate so that the forward overlap of scan patterns is increased. The increased forward overlap may allow for rejection of an increased set of pixels along the exterior of scan patterns 111, 112 without compromising the overlap of pixels that may be required for photogrammetry and image post-processing.

It may further be advantageous to crop pixels of scan patterns 111, 112 on the sides of the sensor rather than just the top or bottom. For example, in the case that mirror over-rotation is used to achieve yaw correction it may be advantageous to crop pixels on one or both sides of the sensor. The location and number of cropped pixels may be selected based on vignetting due to the survey hole or low-reflective sections attached to the exterior of the scanning mirror.

Figure 38B:
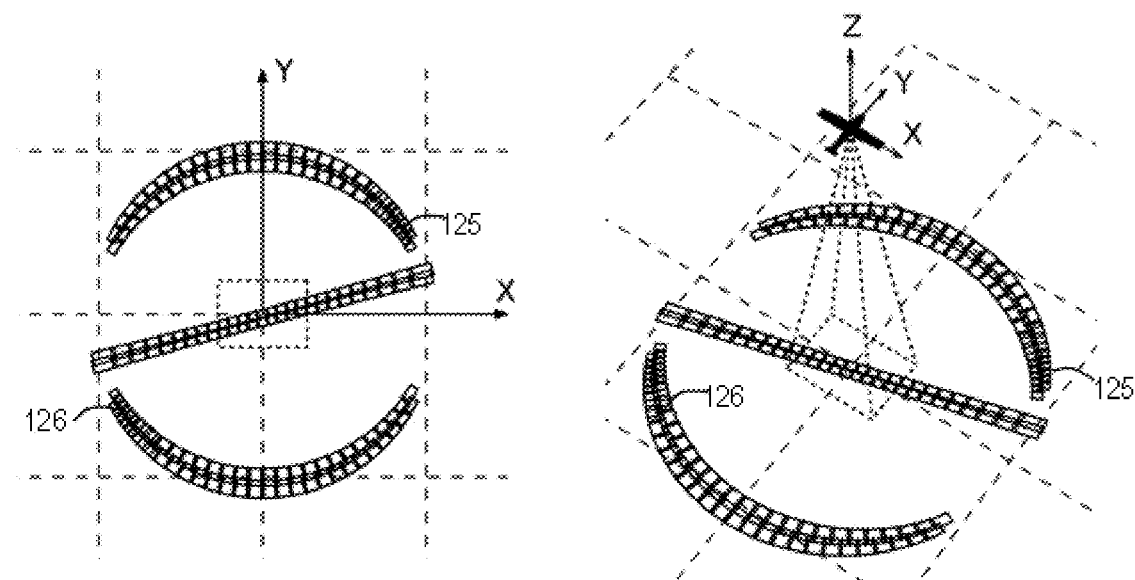
FIG. 38b shows top and oblique views of another set of scan patterns with sampled sensor pixels, according to one exemplary embodiment of the present disclosure.

Cropping pixels on the sides of the sensor may reduce the overlap of adjacent image pixels, however the required overlap may be recovered by increasing the sampling of scan angles of the scanning mirror used in parts of the scan pattern corresponding to frames to be cropped. This is illustrated in FIG. 38b, where the spacing of projected geometry of frames is seen to be reduced towards the frames 125, 126 of scan patterns 111, 112 respectively due to cropping the sides of images. The number of frames has, however, been increased so that the required overlap is maintained between adjacent frames (in this case 10%). The spacing of the samples may vary according to any suitable criteria. The spacing may alternate between discrete values at particular threshold values of scan angle, for example it may be defined by a larger spacing over a particular range of scan angle and by a smaller spacing beyond that range of scan angle. The particular range of scan angles may correspond to the range of scan angles for which a scanning mirror geometry was determined. Alternatively the spacing may vary according to a function of the scan drive angle. In one embodiment the function may be based on trigonometric functions over particular ranges of the scan angle. Other suitable functional forms may be defined based on polynomial functions, rational functions, or transcendental functions such as exponential, logarithmic, hyperbolic functions, power functions, or other periodic functions.

Increasing the scan angle sampling may also be performed advantageously over selected sections of a scan pattern in order to increase the redundancy of image capture. For example, it may be advantageous to capture vertical imagery with a higher sample rate than other imagery. This higher sample rate results in an increased redundancy due to the higher overlap between adjacent frames. The increased redundancy may allow for an improved vertical product, in particular where the image quality may vary between captured images. Variable image quality may occur due to variable dynamics during capture, specular image reflections from the area, or other sources.

Figure 39A:
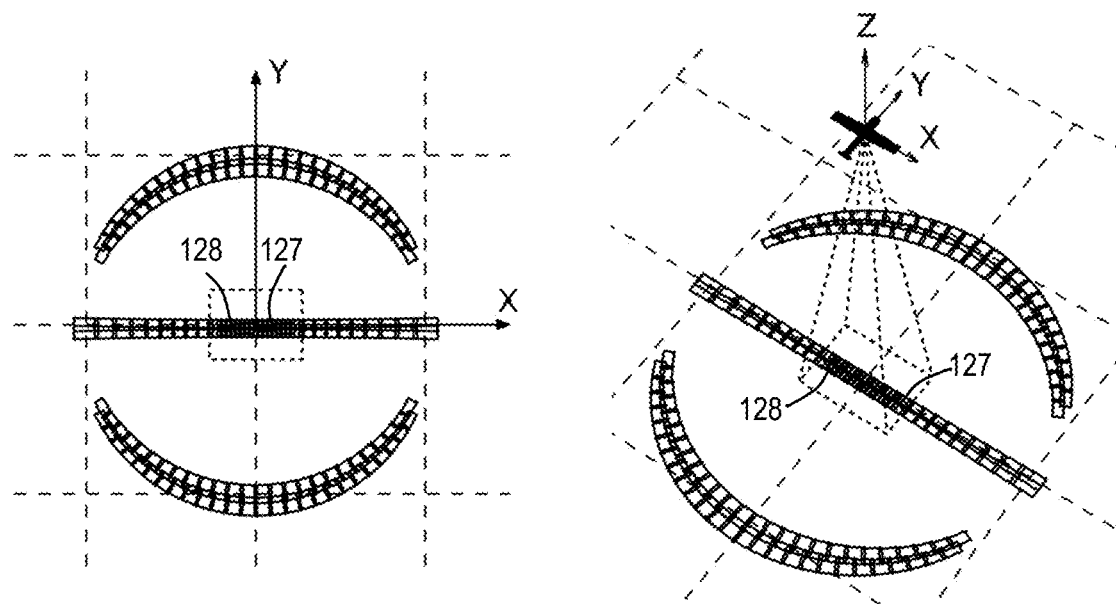
FIG. 39a shows top and oblique views of sets of scan patterns with sensor pixels sampled with a greater number of scan angles than in FIG. 38a, according to one exemplary embodiment of the present disclosure.
Figure 39B:
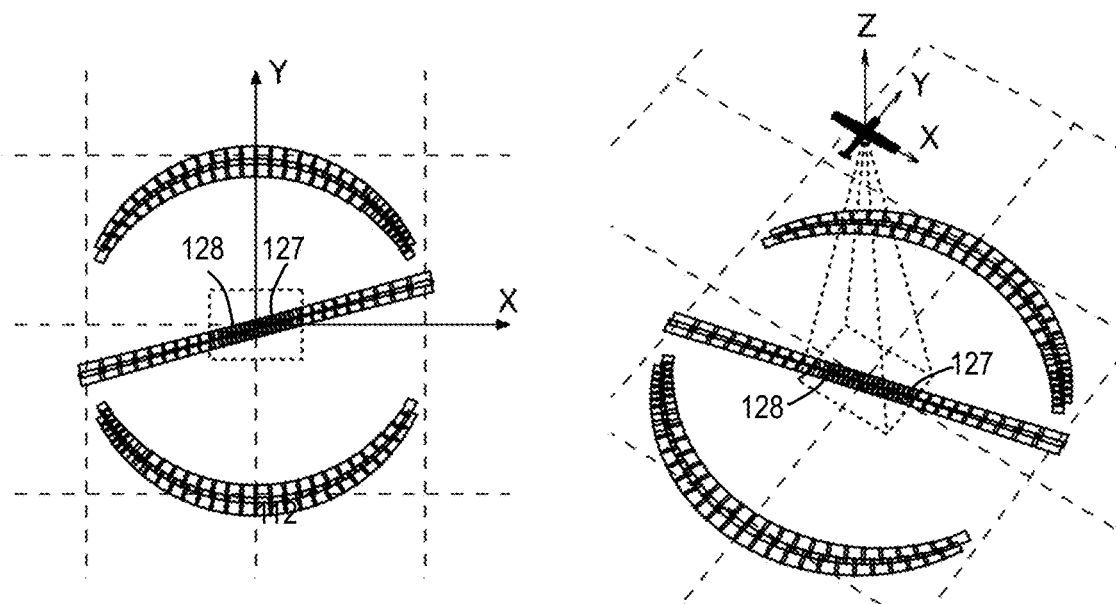
FIG. 39b shows another top and oblique views of sets of scan patterns with sensor pixels sampled with a greater number of scan angles than in FIG. 38b, according to one exemplary embodiment of the present disclosure.

FIG. 39a shows a modified set of scan patterns with increased scan angle sampling based on the scan patterns of FIG. 38a. In particular, the imagery on the straight path scan patterns 113, 114 may have an increased scan angle sample rate over selected frames 127, 128 towards the y-axis where the obliqueness of imagery is smallest (i.e. the images are closest to vertical). FIG. 39b shows a modified set of scan patterns with increased scan angle sampling around the selected set of lower obliqueness frames 127, 128 based on the scan patterns of FIG. 38b.

FIGS. 38a, 38b, 39a and 39b give illustrations of scanning camera system scan patterns using cropping and increased sampling of scan angles of a scanning mirror to improve the output quality, and in some cases reduce the data storage requirements of an aerial survey. It may be understood that the geometry of cropping and sampling of scan angles may be modified or optimised in a number of ways in order to improve the performance of the scanning camera system and the quality of generated image based products, within the scope of the inventions described in this specification.

The scanning camera system is suitable for deployment in a wide range of aerial vehicles for operation over a variety of operating altitudes and ground speeds, with a range of GSDs and capture efficiencies. Additionally it is robust to a range of operating conditions such as variable wind and turbulence conditions that result in dynamic instabilities such as roll, pitch and yaw of the aerial vehicle. By way of example, this includes (but is not limited to) twin piston aircraft such as a Cessna 310, turboprop aircraft such as a Beechworth KingAir 200 and 300 series, and turbofan (jet) aircraft such as a Cessna Citation, allowing aerial imaging from low altitudes to altitudes in excess of 40,000 feet, at speeds ranging from less than 100 knots to over 500 knots. The aircraft may be unpressurised or pressurised, and each survey hole may be open or contain an optical glass window as appropriate. Each survey hole may be optionally protected by a door which can be closed when the camera system is not in operation. Other suitable aerial vehicles include drones, unmanned aerial vehicles (UAV), airships, helicopters, quadcopters, balloons, spacecraft and satellites.

FIG. 40 gives a table that illustrates a range of suitable survey parameters for the scanning camera system 300 varying from altitude of 11,000 ft to 40,000 ft and from ground speed of 240 knots up to ground speed of 500 knots. The sensors of the cameras of the scanning camera system 300 are Gpixel GMAX3265 sensor (9344 by 7000 pixels of pixel pitch 3.2 microns) and the camera lens focal length varies from 300 to 900 mm. Each configuration gives a GSD (ground sampling distance) that is the smallest step between pixels in the captured images. Each configuration is defined according to a flight line spacing, based on which a maximum obliqueness (for images used to create vertical orthomosiacs) in degrees and an efficiency in km²/hour may be estimated. The maximum obliqueness is estimated assuming a yaw range of +/−15° and no yaw correction in the stabilisation platform. The table of FIG. 40 illustrates a number of features of the scanning camera system 300. The GSD is seen to decrease with focal length and increase with the altitude. The maximum obliqueness and efficiency both increase with flight line spacing.

Each configuration of FIG. 40 also includes a timing budget for scan drive units 301, 302, 303. The timing is based on the analysis of scan patterns such as those shown in FIG. 1b or 8b with a required overlap of 10% between adjacent frames. Each scan pattern has a corresponding number of frames that increases with focal length due to the smaller GSD and the consequent reduced projection geometry of frames on the ground.

The timing budget in FIG. 40 is the average time available per frame for moving and settling the scanning mirror, latency in the motion compensation units and the capture and transfer of image data from the camera to data storage 406. In practice, however, it may be advantageous to allocate a larger time budget for greater angular steps of the scanning mirror, for example when the scan angle resets to start a new scan pattern. Furthermore, the time budget may be eroded by additional image captures, for example for the purpose of focus setting. The timing per frame is seen to decrease with GSD in FIG. 40, that is it decreases with focal length and increases with altitude. It also decreases with ground speed.

FIG. 41 gives a table that illustrates a range of suitable survey parameters for the scanning camera system 300 where the sensor of the scanning camera system 300 is an AMS Cmosis CMV50000 CMOS sensor (7920 by 6004 pixels of pixel pitch 4.6 microns). The GSD is lower than in FIG. 40 due to the increased pixel pitch, and the timings per frame are consequently larger. However, the other parameters are essentially unchanged. Other suitable sensors include the Vita25k, Python25k, or other RGB, monochrome, multi-spectral, hyperspectral, or infra-red sensors. Different cameras of the scanning camera system may employ different sensors. In an alternative embodiment the sensor used in each scan drive unit may be a monochrome sensor and the overview camera may be standard RGB. Pan-sharpening using coarse RGB overview pixels and the fine detail monochrome pixels may be used to create high quality color resolution imagery.

It is noted that the scanning camera system may use an overview camera in order to achieve certain photogrammetry related requirements. The flight line spacings given in the tables of FIGS. 40 and 41 were selected based on maximum obliqueness of vertical imagery, and the overview camera sensor and focal length should be selected such that the projective geometry 115 of the overview camera is sufficient to achieve those requirements with a given flight line spacing.

The image quality over a survey area may be improved by flying over the area with a reduced flight line spacing or flying multiple surveys over the same area. For example, two serpentine flight paths may be flown over a region with flight line orientations that are orthogonal to each other. This might be achieved by flying with flight lines oriented along North-South directions then East-West directions. Three serpentine paths may be flown, for example with relative flight line orientations spaced at 60°. Four serpentine paths may be flown, for example with relative flight line orientations spaced at 45°. There is a cost in terms of the efficiency of capture when multiple surveys or reduced flight line spacings are used. As can be appreciated by one of skill in the art, additional and/or alternative flight paths can be taken to increase the angular diversity, which may assist with improved 3D mesh reconstruction.

In any given scan drive unit, the orientation of a sensor within a camera may be rotated around the optical axis such that the projection geometry is modified. Changing the sensor orientation also changes the requirements in terms of mirror geometry, the scan angle steps between image captures, and the flight parameters such as the forward spacing between subsequent scan pattern captures.

Figure 42A:
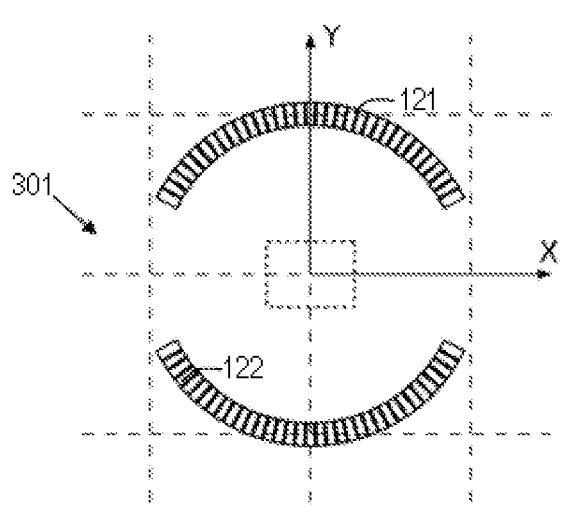
FIG. 42a shows a top down view of a scan pattern, according to one exemplary embodiment of the present disclosure.
Figure 42B:
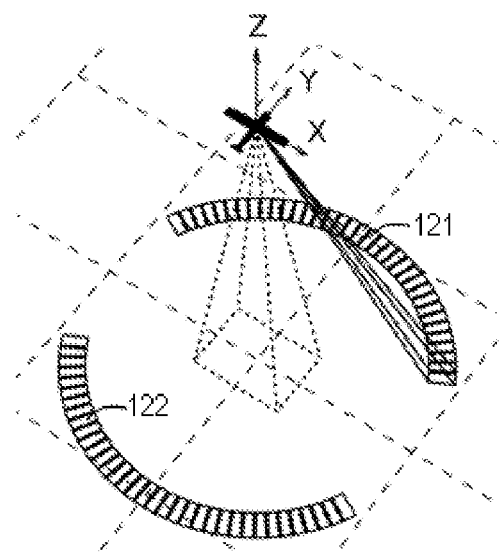
FIG. 42b shows an oblique view of the scan pattern from FIG. 42a, according to one exemplary embodiment of the present disclosure.
Figure 42C:
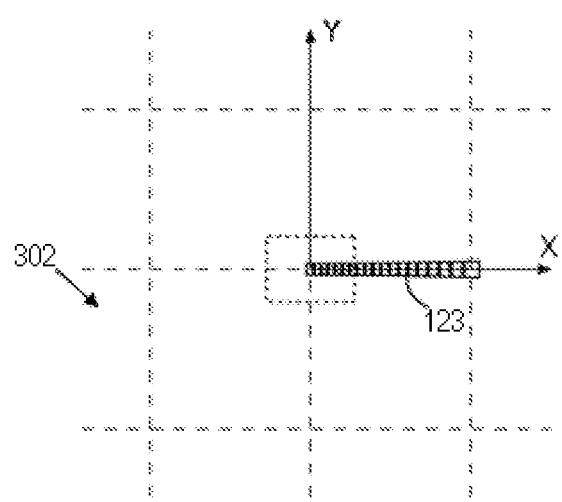
FIG. 42c shows a top down view of a scan pattern, according to one exemplary embodiment of the present disclosure.
Figure 42D:
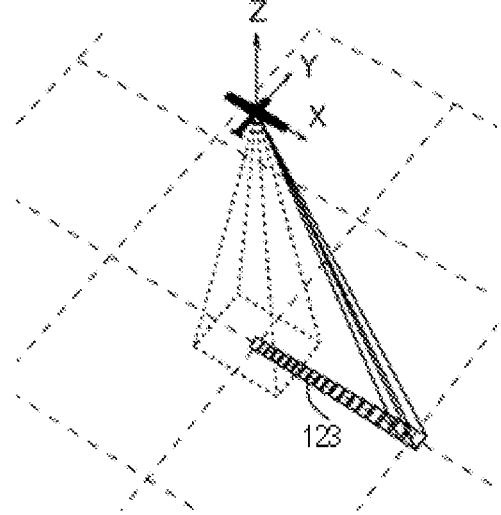
FIG. 42d shows an oblique view of the scan pattern from FIG. 42c, according to one exemplary embodiment of the present disclosure.
Figure 42E:
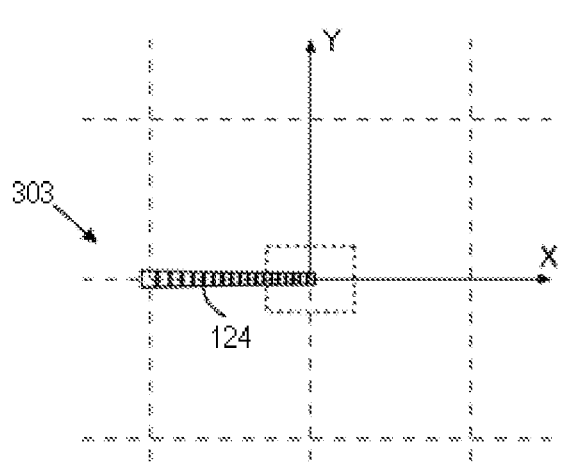
FIG. 42e shows a top down view of a scan pattern, according to one exemplary embodiment of the present disclosure.
Figure 42F:
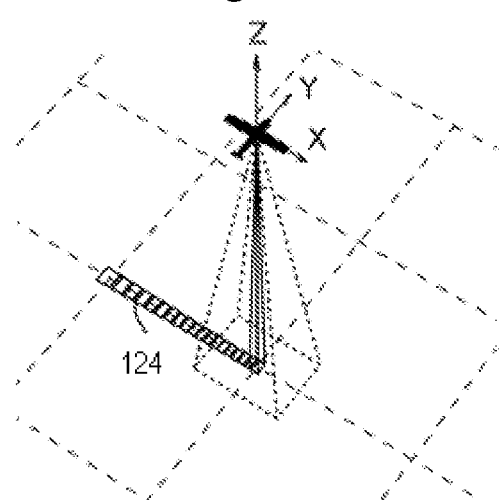
FIG. 42f shows an oblique view of the scan pattern from FIG. 42e according to one exemplary embodiment of the present disclosure.

FIGS. 42*a* and 42*b* illustrate the updated scan patterns 121, 122 of scan drive unit 301 when the sensor is rotated by 90° to the portrait sensor orientation. FIGS. 42*c* and 42*d* illustrate the updated scan pattern 123 of scan drive unit 302 when the sensor is rotated by 90° to the portrait sensor orientation. FIGS. 42*e* and 42*f* illustrate the updated scan pattern 124 of scan drive unit 303 when the sensor is rotated by 90° to the portrait sensor orientation. It is noted that the scan angle steps in the scan patterns 121, 122, 123 124 are smaller than the equivalent landscape sensor orientation scan patterns 111, 112, 113, 114 respectively.

Figure 43A:
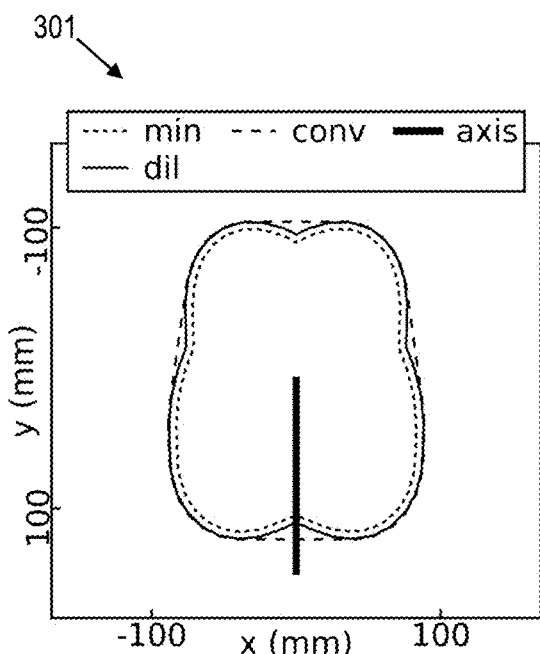
FIG. 43a shows potential scanning mirror structure geometries for a sensor having a portrait orientation, according to one exemplary embodiment of the present disclosure.
Figure 43B:
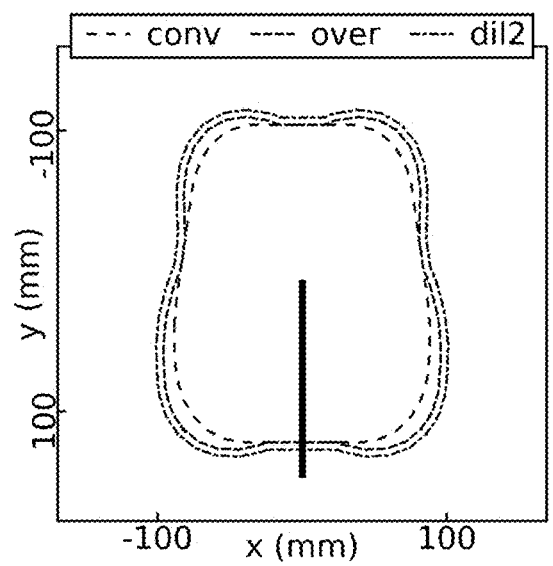
FIG. 43b shows potential scanning mirror structure geometries for a sensor having a portrait orientation including one for over-rotation, according to one exemplary embodiment of the present disclosure.

FIGS. 43*a* and 43*b* illustrate the calculated mirror geometry of the mirror surfaces 314 and/or mirror surface 315 of the scanning mirror structure 312 for the portrait sensor orientation. These differ slightly from those for the landscape orientation shown in FIGS. 4*e* and 4*f* It may be advantageous to use a mirror geometry that is able to handle either sensor orientation. This may be achieved by using a mirror geometry that is the union of the landscape and portrait geometries (for example the landscape "convex" geometry of FIG. 4*e* and the portrait "convex" geometry of FIG. 43*a*). If low reflectivity sections are to be used to allow over-rotation of the mirror without introducing ghost images then these sections should also be the union of the calculated section geometries for the landscape geometry (e.g. "over/dilate" of FIG. 4*f* and "over/dilate" of FIG. 43*b*).

Figure 43C:
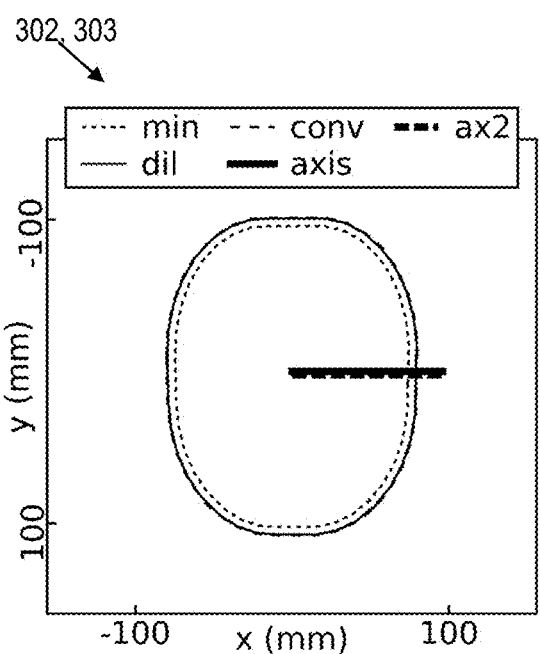
FIG. 43c shows potential primary mirror geometries for a sensor having a portrait orientation, according to one exemplary embodiment of the present disclosure.
Figure 43D:
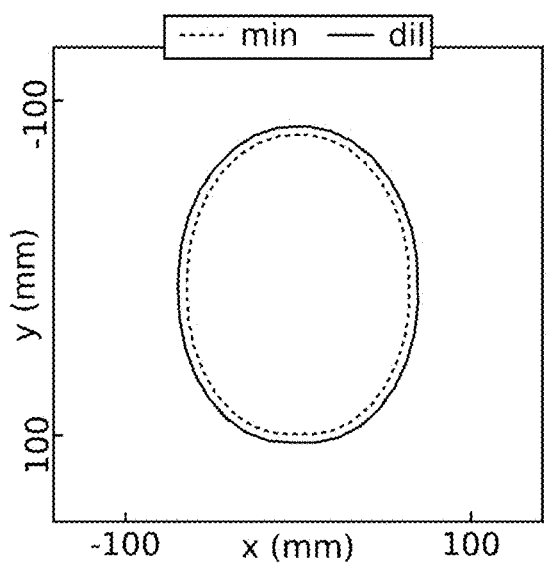
FIG. 43d shows potential secondary mirror geometries for a sensor having a portrait orientation, according to one exemplary embodiment of the present disclosure.

FIG. 43*c* illustrates the calculated mirror geometry of the primary mirror 323 of scan drive unit 302 for the portrait sensor orientation. FIG. 43*c* also illustrates the calculated geometry of primary mirror 327 of scan drive unit 303 for the portrait sensor geometry. These differ slightly from those for the landscape sensor orientation illustrated in FIGS. 5*e* and 6*e* respectively. FIG. 43*d* illustrates the calculated mirror geometry of the secondary mirror 324 of scan drive unit 302 for the portrait sensor orientation. FIG. 43*c* also illustrates the calculated geometry of secondary mirror 328 of scan drive unit 303 for the portrait sensor geometry. These differ slightly from those for the landscape sensor orientation illustrated in FIGS. 5*f* and 6*f* respectively.

As was the case for the scan drive unit 301, it may be advantageous to use mirror geometries that are able to handle either sensor orientation. This may be achieved by using a mirror geometry that is the union of the landscape and portrait geometries. For example, scan drive 302 may use a primary mirror 323 defined by the union of the landscape "convex" geometry of FIG. 5*e* and the portrait "convex" geometry of FIG. 43*c*. This geometry may also be used for the primary mirror 327 of scan drive unit 303. In the same way, a secondary mirror formed as the union of the "dilate" geometries of FIGS. 5*f* and 43*d* may be used for the secondary mirror 324 of scan drive unit 302 and also for the secondary mirror 328 of scan drive unit 303.

Figure 44A:
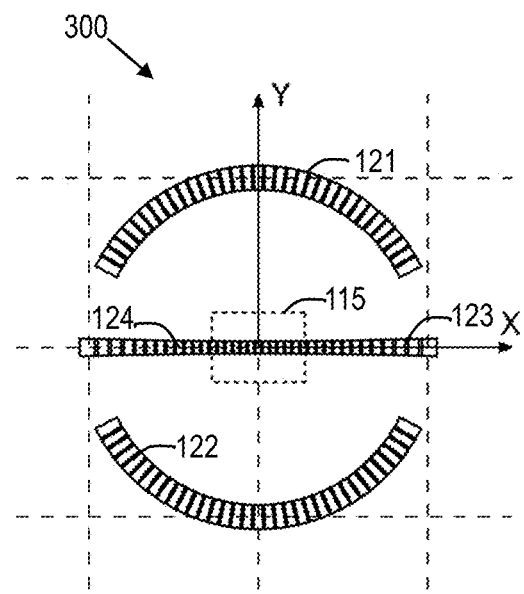
FIG. 44a shows a top down view of scan patterns obtained using a scanning camera system with sensors having a portrait orientation, according to one exemplary embodiment of the present disclosure.
Figure 44B:
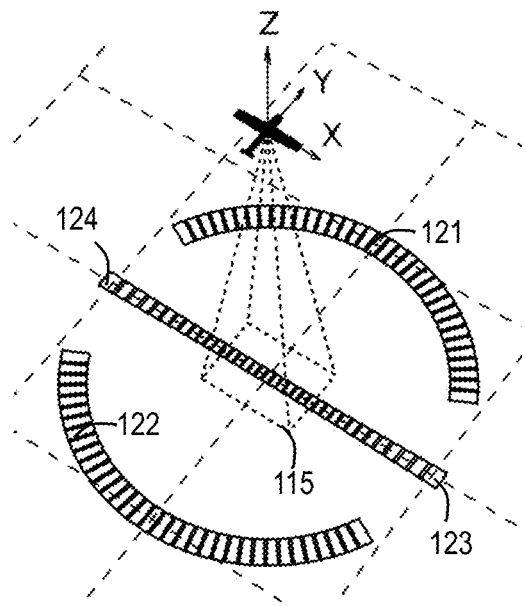
FIG. 44b shows an oblique view of scan patterns obtained using a scanning camera system with sensors having a portrait orientation, according to one exemplary embodiment of the present disclosure.
Figure 44C:
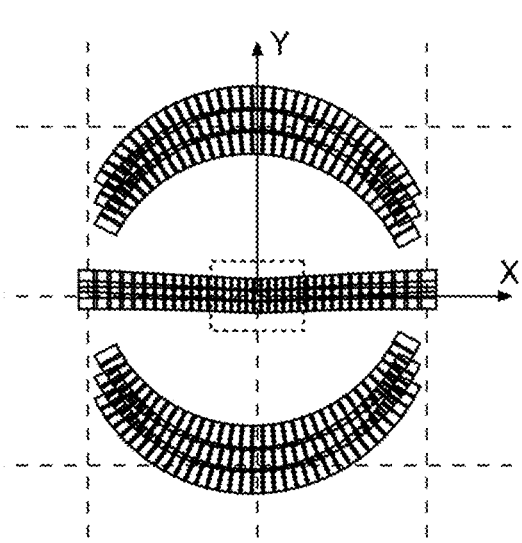
FIG. 44c shows a top down view of multiple scan patterns realistic forward motion, according to one exemplary embodiment of the present disclosure.
Figure 44D:
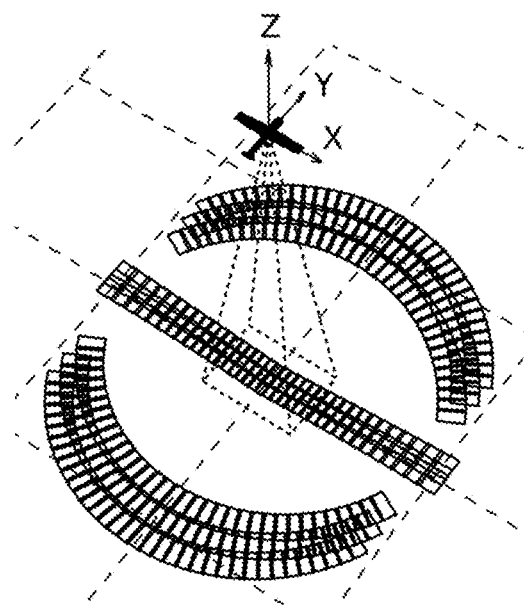
FIG. 44d shows an oblique view of multiple scan patterns with realistic forward motion, according to one exemplary embodiment of the present disclosure.

FIGS. 44*a* and 44*b* show the scan patterns achieved using the scanning camera system 300 with portrait orientation sensors. The scan patterns include curved scan patterns 121, 122 of oblique imagery, and straight scan patterns 123, 124 for the case that the aerial vehicle 110 does not move between image captures of the scan patterns. FIGS. 44*c* and 44*d* show the same scan patterns with the effect of a realistic forward motion of the aerial vehicle between image captures. It also shows multiple scan patterns during a flight line, where the forward spacing between scan patterns has been increased relative to the landscape sensor orientation case that was illustrated in FIG. 8*b*.

Within the scope of the present disclosure, alternative camera systems may be used with a mixture of portrait and landscape sensor orientations. For example, a scanning camera system may combine portrait sensor orientation scan drive unit 301 with landscape sensor orientation scan drive units 302, 303, or it may combine landscape sensor orientation scan drive unit 301 with portrait sensor orientation scan drive units 302, 303, or other such combinations.

If the vehicle survey aperture is sufficiently large, or if there a multiple apertures in the vehicle, then one or more additional scan drive units may be added to a scanning camera system to improve some aspect of the captured imagery such as quality for 3D reconstruction. One suitable additional scan drive unit 350 is illustrated in FIGS. 45*a*-45*f*. It can be used to capture a single curved scan pattern 130 extending from an obliqueness of 22.5° in front of the aerial vehicle 110 (on the y-axis) to an obliqueness of 45° to the left of the aerial vehicle 110 (on the x-axis) that is illustrated in FIGS. 45*c* and 45*d*. Two geometric illustrations of the scan drive unit 350 from different perspectives are shown in FIG. 45*a* and FIG. 45*b*. The scan drive unit 350 comprises a single sided scanning primary mirror 357 held on an oblique scan axis (elevation $\theta_S=-52.5°$ and azimuth $\phi_S=180°$) and a fixed secondary mirror 358. The geometric illustration shows the configuration with the scan angle of the scan drive 356 set to 0° at which angle the primary mirror's 357 surface is oriented with a normal directed between the z- and y-axes (elevation $\theta_M^1=-37.5°$ and azimuth $\phi_M^1=0°$). The secondary mirror 358 is oriented with a normal opposing that of the primary mirror 357 when the scan angle is 0° (elevation $\theta_M^1=52.5°$ and azimuth $\phi_M^1=180°$). There is a single camera 355 which is directed downwards at an angle of 7.5° to the vertical z-axis (elevation $\theta_S=-82.5°$ and azimuth $\phi_S=180°$).

The scan drive 356 samples scan angles from −32.4° to 0.01° in order to generate the scan pattern 130. The minimal, dilated, and convex, and symmetric geometries calculated for the primary mirror 357 are shown in FIG. 45e along with the axis of rotation and a shifted axis of rotation. The minimum and dilated geometries of the secondary mirror 358 are shown in FIG. 45f.

Figure 46A:
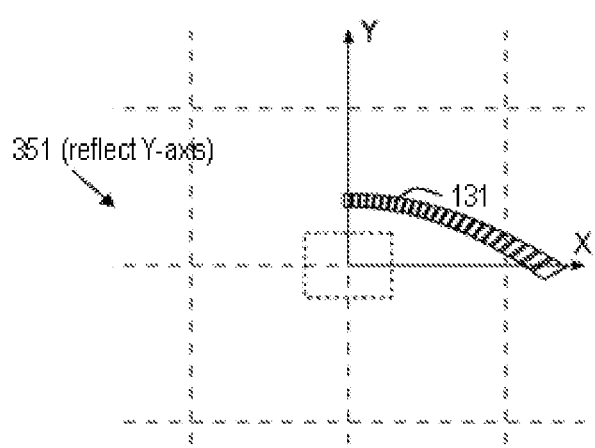
FIG. 46a shows a top down view of a scan pattern for a scan drive unit, according to one exemplary embodiment of the present disclosure.
Figure 46B:
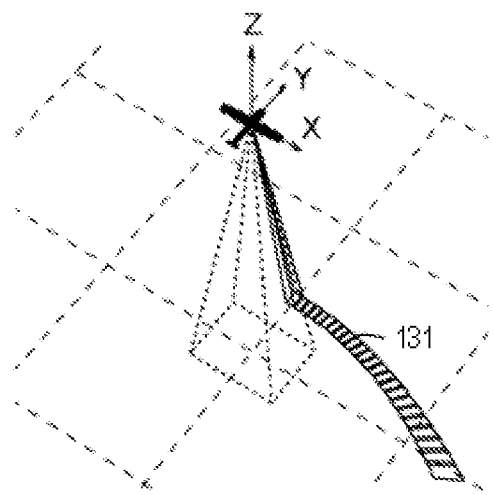
FIG. 46b shows an oblique view of a scan pattern for the scan drive unit from FIG. 46a, according to one exemplary embodiment of the present disclosure.

Other suitable scan drive units may be designed based on scan drive unit 350. For example, scan drive unit 351 is a mirror image of scan drive unit 350 that may be formed by reflecting all components in the y-axis of FIGS. 45a and 45b. Scan drive unit 351 generates a single curved scan pattern 131 extending from an obliqueness of 22.5° in front of the aerial vehicle 110 (on the y-axis) to an obliqueness of 45° to the right of the aerial vehicle 110 (on the x-axis) that is illustrated in FIGS. 46a and 46b.

Figure 46C:
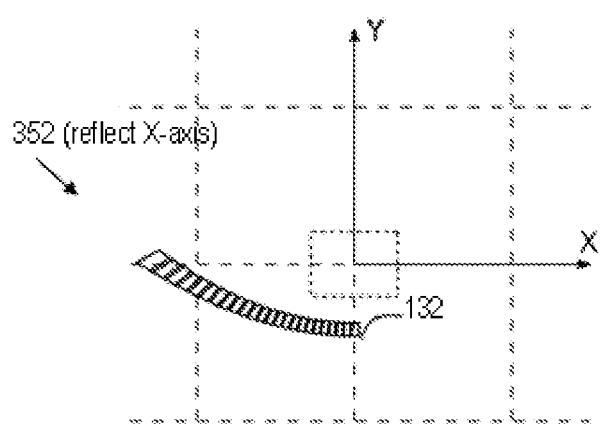
FIG. 46c shows a top down view of a scan pattern for a scan drive unit, according to one exemplary embodiment of the present disclosure.
Figure 46D:
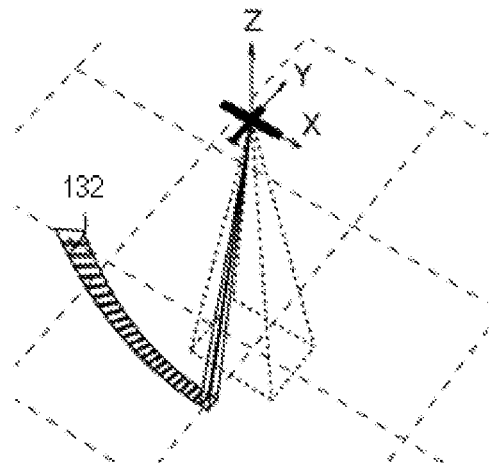
FIG. 46d shows an oblique view of the scan pattern for the scan drive unit from FIG. 46c, according to one exemplary embodiment of the present disclosure.
Figure 46E:
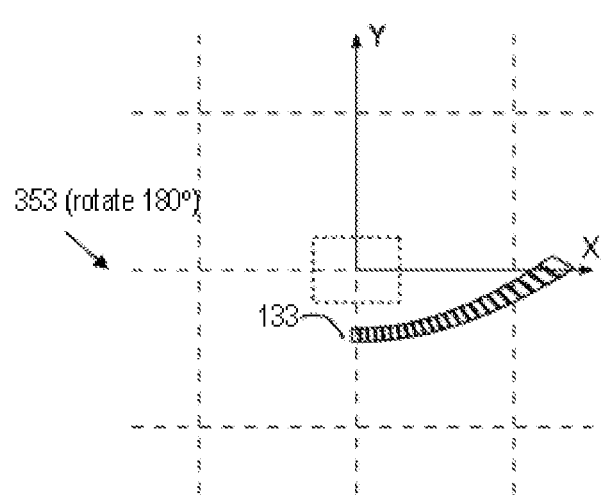
FIG. 46e shows a top down view of a scan pattern for a scan drive unit, according to one exemplary embodiment of the present disclosure.
Figure 46F:
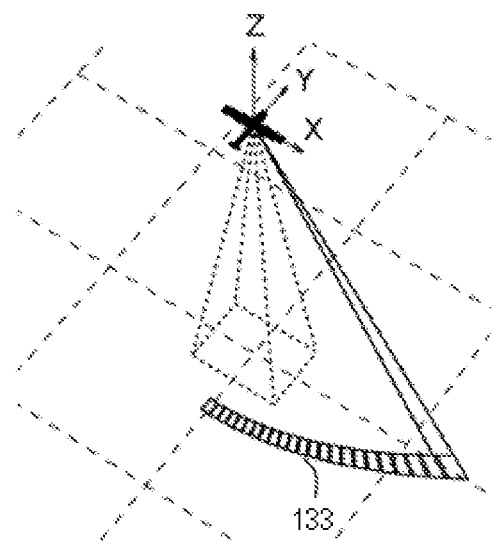
FIG. 46f shows an oblique view of the scan pattern for the scan drive unit from FIG. 46e, according to one exemplary embodiment of the present disclosure.

Scan drive unit 352 is a mirror image of scan drive unit 350 that may be formed by reflecting all components in the x-axis of FIGS. 45a and 45b. Scan drive unit 352 generates a single curved scan pattern 132 extending from an obliqueness of 22.5° behind the aerial vehicle 110 (on the y-axis) to an obliqueness of 45° to the left of the aerial vehicle 110 (on the x-axis) that is illustrated in FIGS. 46c and 46d.

Scan drive unit 353 is formed by rotating scan drive unit 350 by 180° around the z-axis of FIGS. 45a and 45b. Scan drive unit 353 generates a single curved scan pattern 133 extending from an obliqueness of 22.5° behind the aerial vehicle 110 (on the y-axis) to an obliqueness of 45° to the right of the aerial vehicle 110 (on the x-axis) that is illustrated in FIGS. 46a and 46b.

Figure 47A:
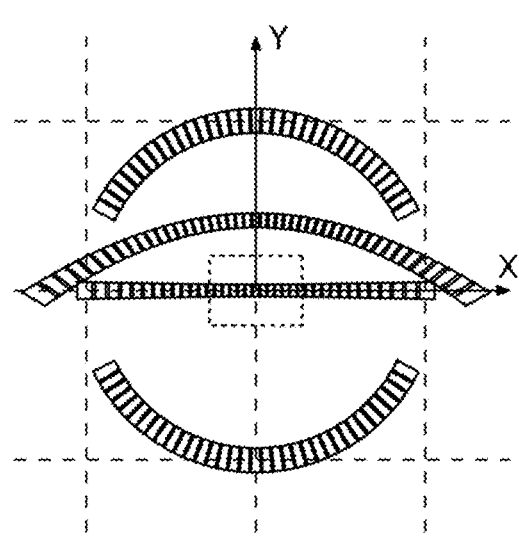
Figure 47B:
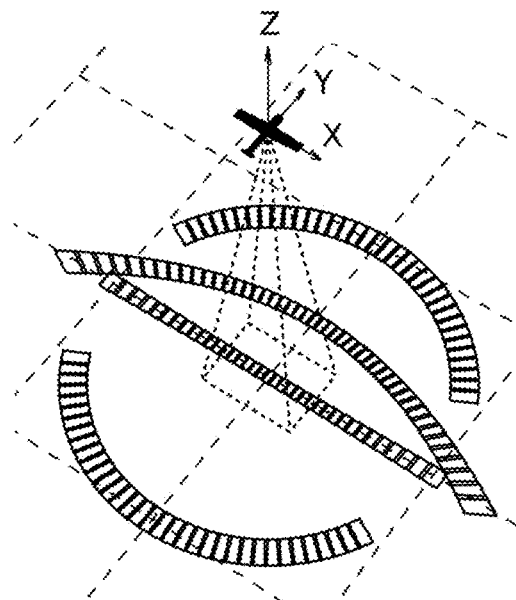
Figure 47C:
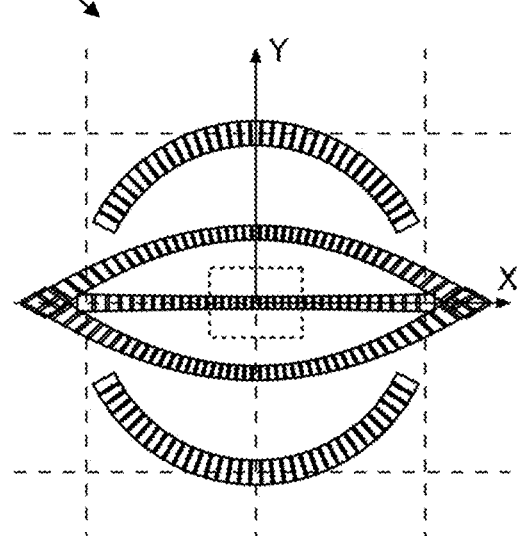
Figure 47D:
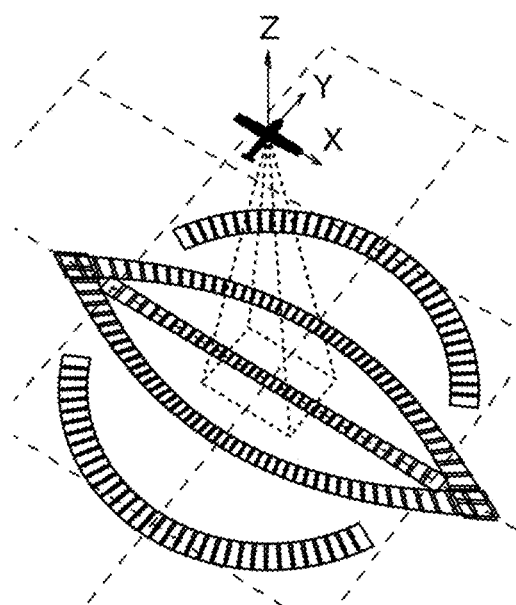

Scanning camera system 354 comprises the scanning camera system 300 with two additional scan drive units 350, 351. The combined scan patterns of scanning camera system 354 are illustrated in FIGS. 47a and 47b. Scanning camera system 355 comprises the scanning camera system 300 with four additional scan drive units 350, 351, 352, 353. The combined scan patterns of scanning camera system 354 are illustrated in FIGS. 47c and 47d.

It may be understood that the scan drive units 350, 351, 352, 353 and scanning camera systems 354, 355 are illustrated in FIGS. 45a-45d, 46a-46d and 47a-47d with a portrait sensor orientation, however alternative sensor orientations (e.g. landscape) may be used in any of the cameras discussed herein within the scope of this specification.

FIGS. 48a-48f illustrate scan drive unit 360 which has advantageous properties in terms of spatial compactness due to the use of a shared scanning primary mirror 367. Scan drive unit 360 can be used to capture a pair of curved scan patterns 135, 136 each of which start on the y-axis and extend left and back relative to the aerial vehicle 110, as shown in FIGS. 48c and 48d. Two geometric illustrations of the scan drive unit 360 from different perspectives are shown in FIG. 48a and FIG. 48b. The scan drive unit 360 comprises a single sided, shared scanning primary mirror 367 held on an oblique scan axis (elevation $\theta_S=45°$ and azimuth $\phi_S=0°$) and a fixed secondary mirror 368. The geometric illustration shows the configuration with the scan angle of the scan drive 366 set to 0° at which angle the shared scanning primary mirror's 367 surface is oriented with a normal directed between the z- and y-axes (elevation $\theta_M^1=-45°$ and azimuth $\phi_M^1=0°$). The secondary mirror 368 is oriented with a normal opposing that of the shared scanning primary mirror 367 when the scan angle is 0° (elevation $\theta_M^1=45°$ and azimuth $\phi_M^1=180°$). There are two cameras 365, 369. The first camera 365 is directed downwards along the vertical z-axis (elevation $\theta_S=-90°$ and the second camera 369 is directed downwards at an angle of 22.5° to the vertical z-axis (elevation $\theta_S=-67.5°$ and azimuth $\phi_S=0°$).

Scan drive 366 samples scan angles from −0.01° to 28° in order to generate the scan patterns 135, 136 simultaneously. The sampling of scan angles may be the same or may be different for each of the cameras 365, 369. The minimal, dilated, and convex, and symmetric geometries calculated for the shared scanning primary mirror 367 are shown in FIG. 48e along with the axis of rotation and a shifted axis of rotation. The minimum and dilated geometries of the secondary mirror 368 are shown in FIG. 48f.

Other suitable scan drive units may be designed based on scan drive unit 360. For example, scan drive unit 361 is a mirror image of scan drive unit 360 that may be formed by reflecting all components in the y-axis of FIGS. 48a and 48b. Scan drive unit 361 generates a pair of curved scan patterns 137, 138 extending from points on the y-axis backwards and to the right relative to the aerial vehicle 110 as illustrated in FIGS. 49a and 49b.

Scan drive unit 362 is a mirror image of scan drive unit 360 that may be formed by reflecting all components in the x-axis of FIGS. 48a and 48b. Scan drive unit 362 generates a pair of curved scan patterns 139, 140 extending from points on the y-axis forwards and to the left relative to the aerial vehicle 110 as illustrated in FIGS. 49c and 49d.

Scan drive unit 363 is formed by rotating scan drive unit 360 by 180° around the z-axis of FIGS. 48a and 48b. Scan drive unit 362 generates a pair of curved scan patterns 141, 142 extending from points on the y-axis forwards and to the left relative to the aerial vehicle 110 as illustrated in FIGS. 49e and 49f.

FIGS. 50a to 50d show a range of perspective views of the combined components of scan drive units 301, 360, 361 of the scanning camera system 364 that were described with respect to FIGS. 4a-4f, 48a-48f and 49a-49f above. Scan drive unit 360 and scan drive unit 361 sit on either side of the scan drive unit 301 respectively. This arrangement is highly efficient spatially and advantageous for deployment in a wide range of aerial vehicle camera (survey) holes. FIGS. 50e and 50f show the scan patterns achieved using the scanning camera system 364 including curved scan patterns 111, 112 of oblique imagery, and curved scan patterns 135, 136, 137, 138 of imagery with variable obliqueness. Further to the scan drive unit imaging capability, the scanning camera system 364 may additionally include one or more fixed cameras.

FIGS. 51a-51f illustrate scan drive unit 370 which has similar geometrical properties to scan drive unit 360 but does not use a shared scanning mirror. Scan drive unit 370 can be used to capture a single curved scan pattern 150 extending from an obliqueness of 22.5° in front of the aerial vehicle 110 (on the y-axis) back and left relative to the aerial vehicle 110 that is illustrated in FIGS. 51c and 51d. Two geometric illustrations of the scan drive unit 370 from different perspectives are shown in FIG. 51a and FIG. 51b.

The scan drive unit 370 comprises a single sided, scanning primary mirror 377 held on an oblique scan axis (elevation $\theta_S=-45°$ and azimuth $\phi_S=0°$) and a fixed secondary mirror 378. The geometric illustration shows the configuration with the scan angle of the scan drive 376 set to 0° at which angle the primary mirror's 377 surface is oriented with a normal directed between the z- and y-axes (elevation $\theta_M^1=-45°$ and azimuth $\phi_M^1=0°$). The secondary mirror 378 is oriented with a normal opposing that of the primary mirror 377 when the scan angle is 0° (elevation $\theta_M^1=45°$ and azimuth $\phi_M^1=180°$). There is a single camera 375 which is directed downwards at an angle of 22.5° to the vertical z-axis (elevation $\theta_S=-67.5°$ and azimuth $\phi_S=0°$). Scan drive 376 samples scan angles from −0.01° to 28° in order to generate the scan pattern 150. The minimal, dilated, and convex, and symmetric geometries calculated for the primary mirror 377 are shown in FIG. 51e along with the axis of rotation and a shifted axis of rotation. The minimum and dilated geometries of the secondary mirror 378 are shown in FIG. 51f.

Other suitable scan drive units may be designed based on scan drive unit 370. For example, scan drive unit 371 is a mirror image of scan drive unit 370 that may be formed by reflecting all components in the y-axis of FIGS. 51a and 51b. Scan drive unit 371 generates a single curved scan pattern 151 extending from an obliqueness of 22.5° in front of the aerial vehicle 110 (on the y-axis) back and to the right of the aerial vehicle 110 that is illustrated in FIGS. 52a and 52b.

Scan drive unit 372 is a mirror image of scan drive unit 370 that may be formed by reflecting all components in the x-axis of FIGS. 51a and 51b. Scan drive unit 372 generates a single curved scan pattern 152 extending from an obliqueness of 22.5° behind the aerial vehicle 110 (on the y-axis) to an obliqueness of 45° to the left of the aerial vehicle 110 (on the x-axis) that is illustrated in FIGS. 52c and 52d.

Scan drive unit 373 is formed by rotating scan drive unit 370 by 180° around the z-axis of FIGS. 51a and 51b. Scan drive unit 373 generates a single curved scan pattern 153 extending from an obliqueness of 22.5° behind the aerial vehicle 110 (on the y-axis) to an obliqueness of 45° to the right of the aerial vehicle 110 (on the x-axis) that is illustrated in FIGS. 52e and 52f.

Scanning camera system 379 comprises the scan drive units 301, 360, 361, 372, 373. The combined scan patterns of scanning camera system 379 are illustrated in FIGS. 53a and 53b.

Scanning camera system 381 comprises the scanning camera system 300 with two additional scan drive units 372, 373. The combined scan patterns of scanning camera system 382 are illustrated in FIGS. 53c and 53d.

Scanning camera system 382 comprises the scanning camera system 300 with four additional scan drive units 370, 371, 372, 373. The combined scan patterns of scanning camera system 382 are illustrated in FIGS. 53e and 53f.

Scan drive units 301, 302, 303, 350, 351, 352, 353, 360, 361, 362, 363, 370, 371, 372, 373 are examples of scan drive units that use a scan drive axis that is parallel to the mirror surface(s) that it rotates. Such scan drive units may be referred to as tilting scan drive units. Alternative scan drive units may use a scan drive axis that is not parallel to the plane of the mirror surface(s) that it rotates. Such scan drive units employ a spinning mirror and may be referred to as spinning scan drive units.

FIGS. 54a-54f illustrate a spinning scan drive unit 380 with a portrait sensor orientation. The scan drive unit 380 comprises a single sided scanning primary mirror 383 held on an horizontal scan axis (elevation $\theta_S=-0°$ and azimuth $\phi_S=0°$) and a fixed secondary mirror 384. The geometric illustration shows the configuration with the scan angle of the scan drive unit 380 set to 0° at which angle the primary mirrors 383 surface is oriented with a normal directed between the z- and y-axes (elevation $\theta_M^1=-45°$ and azimuth $\phi_M^1=0°$). The secondary mirror 378 is oriented with a normal opposing that of the primary mirror 383 when the scan angle is 0° (elevation $\theta_M^1=45°$ and azimuth $\phi_M^1=180°$). There is a single camera 376 which is directed vertically downwards (elevation $\theta_S=-90°$ and azimuth $\phi_S=0°$). As shown in FIGS. 54c and 54d, scan drive unit 380 generates a single straight scan pattern 155 extending from an obliqueness of 45° to the left of the aerial vehicle (on the x-axis) to an obliqueness of 45° to the right of the aerial vehicle (on the x-axis) as the scan angle varies between −45° and 45°.

Scan drive unit 380 samples scan angles from −45° to 45° in order to generate the scan pattern 155. In some arrangements, two or more scan drive units 380 may be used, the image captures of the scan pattern 155 being split between scan drive units in order to achieve the timing budget requirements of the system. For example, scan drive unit 380 may sample scan angles from −45° to 0° and a second scan drive unit may sample scan angles and 0° to 45° such that the full range of scan angles are sampled and the same scan pattern is achieved with roughly double the time budge per frame. Scan drive units 302, 303 are used in a similar way to split a single line scan pattern into two scan patterns 113, 114. Any of the scan patterns described in this specification may be split into parts in the same way, effectively trading off time budget of image capture against the spatial requirements and additional cost of the extra scan drive units.

The minimal, dilated, and convex, and symmetric geometries calculated for the primary mirror 383 are shown in FIG. 54e along with the axis of rotation and a shifted axis of rotation. The minimum and dilated geometries of the secondary mirror 384 are shown in FIG. 54f.

As can be appreciated by one of skill in the art, any of the scanning camera systems described herein and obvious variations thereof can be integrated with one or more of any scan drive unit or scanning camera system discussed herein to achieve various timing requirements. Furthermore, the selection of scan angles that define the scan patterns may be selected according to the requirements and constraints of the operating conditions such as altitude, flight speed, etc.

As can be appreciated by one of skill in the art, the position of the scan drive in any scan drive unit may be selected at either end of the mirror depending on the space available for installation and the geometry of the scan drive. Furthermore the precise distances between mirrors along the optical axis may also be altered in order to achieve the most efficient use of space and minimise occlusions that would reduce captured image quality. Small geometric changes such as these alter the required mirror geometry but do not significantly alter the view directions of captured images. Such changes may allow for more scan drive units to be placed in a constrained space with minimal or no occlusions to give a better imaging system that generates more diverse and/or higher quality captured images.

FIGS. 55a-55f illustrate the scan patterns of three scanning camera systems that employ scan drive unit 380. Scanning camera system 391 comprises scan drive units 301, 380. The combined scan patterns of scanning camera system 391 are illustrated in FIGS. 55a and 55b. Scanning camera system 392 comprises the scanning camera system 391 and the scan drive units 370, 371. The combined scan patterns of scanning camera system 391 are illustrated in FIGS. 55c and 55d. Scanning camera system 393 comprises the scanning camera system 392 and the scan drive units 372, 373. The combined scan patterns of scanning camera system 393 are illustrated in FIGS. 55e and 55f.

As shown in FIGS. 56a and 56b, scan drive unit 385 is formed by rotating scan drive unit 380 by 45° around the z-axis of FIGS. 54a and 54b and sampling an extended range of scan angles from −50.4° to 50.4°. Scan drive unit 385 generates a single straight scan pattern 156 extending from an obliqueness of 50.4° in front and to the left of the aerial vehicle to an obliqueness of 50.4° behind and to the right of the aerial vehicle.

As shown in FIGS. 56c and 56d, scan drive unit 386 is formed by rotating scan drive unit 380 by −45° around the z-axis of FIGS. 54a and 54b and sampling an extended range of scan angles from −50.4° to 50.4°. Scan drive unit 386 generates a single straight scan pattern 157 extending from an obliqueness of 50.4° in front and to the right of the aerial vehicle to an obliqueness of 50.4° behind and to the left of the aerial vehicle.

Scanning camera system 394 comprises the scan drive units 385, 386. The combined scan patterns of scanning camera system 394 are illustrated in FIGS. 56e and 56f. In some arrangements, two or more of scan drive units 385, 386 may be used, and the image captures of the scan pattern 156, 157 being split between scan drive units in order to achieve the timing budget requirements of the system.

As previously mentioned, any of the scanning camera systems described herein and obvious variations thereof can be integrated with one or more of any scan drive unit or scanning camera system discussed herein to achieve various timing requirements.

FIGS. 57a to 57e illustrate a number of scan drive units and/or scanning camera systems based on scan drive unit 380, each of which employs a camera with a lens of focal length 600 mm and aperture 120 mm focusing light onto AMS Cmosis CMV50000 CMOS sensor. Scan drive unit 387 has the same geometry as scan drive unit 380, but samples a reduced range of scan angles from −15° to 30.2° to generate the short straight scan pattern 160 shown in FIG. 57a. Scan drive unit 388 is formed by rotating scan drive unit 380 by 22.5° about the x-axis. Scan drive unit 388 samples a reduced range of scan angles from −30.2° to 15° to generate the short straight scan pattern 161 shown in FIG. 57b. Scan drive unit 389 is formed by rotating scan drive unit 380 by 22.5° about an axis at −30° degrees from the x-axis in the horizontal plane. Scan drive unit 389 samples a reduced range of scan angles from −28° to 47.5° to generate the straight scan pattern 162 shown in FIG. 57c. Scan drive unit 390 is formed by rotating scan drive unit 380 by 22.5° about an axis at 30° degrees from the x-axis in the horizontal plane. Scan drive unit 390 samples a reduced range of scan angles from −47.5° to 28° to generate the straight scan pattern 163 shown in FIG. 57d.

Scanning camera system 395 comprises scan drive units 387, 378, 389, 390 in addition to a modified scan drive unit 301. The modified scan drive unit 301 uses a portrait orientation AMS Cmosis CMV50000 CMOS sensors and lenses with focal length 600 mm and aperture 120 mm. FIGS. 57e and 57f illustrate the combined scan patterns of scanning camera system 395.

FIGS. 58a and 58b show perspective views of a scan drive unit 501 with three cameras 506, 507, 508 that may be used to capture three scan patterns 160, 161, 162 with circular arcs centred around an elevation of 45°, as shown in FIGS. 58c and 58d. The three scan patterns 160, 161, 162 combine to form a complete circle, as illustrated in FIGS. 58c and 58d. Scan drive unit 501 comprises a scanning mirror structure 502 attached to a scan drive 503 on a vertical scan axis (elevation $\theta_S=-90°$ and azimuth $\phi_S=0°$). In one embodiment, the scanning mirror structure 502 is double-sided. The geometric illustration shows the configuration with the scan angle of the scan drive 503 set to 0° so that the first mirror surface 504 is oriented (elevation $\theta_M^1=0°$ and azimuth $\phi_M^1=0°$) with its normal directed toward the first camera 506 along the y-axis. A second mirror surface 505 is mounted on the opposite side of the scanning mirror structure 502 and directed between the camera 507 and camera 508.

The cameras 506, 507 and 508 are oriented downward at an oblique angle but azimuths spaced at 120° (camera 506 elevation $\theta_S=-45°$, azimuth $\phi_S=180°$; camera 507 elevation $\theta_S=-45°$ and azimuth $\phi_S=60°$; camera 508 elevation $\theta_S=-45°$ and azimuth $\phi_S=-60°$). The cameras 506, 507, 508 utilise the Gpixel GMAX3265 sensor (9344 by 7000 pixels of pixel pitch 3.2 microns). The camera lenses may have a focal length of 215 mm and aperture of 120 mm (corresponding to F1.8). This lower focal length generates lower image resolution but a wider scan pattern that may be advantageous in terms of the flight line spacing and efficiency of capture.

FIG. 58e shows various mirror geometries calculated for the scan drive unit 501. These include the minimum geometry ("min"), a dilated minimum geometry that is extended by 5 mm beyond the minimum geometry around its perimeter ("dilate") and a dilated convex geometry that is the convex hull of the dilated minimum geometry ("convex"). FIG. 58f shows the dilated convex geometry again ("convex"), and also an extended geometry that might be required if the range of scan angles is extended by 7.5° at each end of the scan angle range ("over") to increase the overlap region between the scan patterns.

Scan drive unit 509 is based on scan drive unit 302, however the camera 321 uses a Gpixel GMAX3265 sensor and a lens of focal length 215 mm and aperture of 120 mm (corresponding to F1.8). Further, scan drive 322 samples a modified range of scan angles from −10.25° to 10.25° to generate the straight scan pattern 165 shown in FIGS. 59a and 59b. Scanning camera system 510 comprises scan drive units 501, 509 to generate a combined scan pattern illustrated in FIGS. 59c and 59d.

FIGS. 60a and 60b show a scan drive unit 511 with four cameras 516, 517, 518, 519 from different perspectives that may be used to capture four scan patterns 170, 171, 172, 173 with circular arcs centred around an elevation of 45° that combine to form a complete circle. Top down and oblique views of the scan patterns from the four cameras 516, 517, 518, 519 of this scan drive unit 511 are shown in FIGS. 60c and 60d. Scan drive unit 511 comprises a scanning mirror structure 512 attached to a scan drive 513 on a vertical scan axis (elevation $\theta_S=-90°$ and azimuth $\phi_S=0°$). In one embodiment, the scanning mirror structure 512 is double-sided. The geometric illustration shows the configuration with the scan angle of the scan drive set to 0° so that the first mirror surface 514 is oriented (elevation $\theta_M^1=0°$ and azimuth $\theta_M^1=0°$) with its normal directed between camera 516 and camera 517 along the y-axis. A second mirror surface 515 is mounted on the opposite side of the scanning mirror structure 512 and directed between camera 518 and camera 519. The cameras 516, 517, 518, 519 are oriented downward at an oblique angle but azimuths spaced at either 60° or 120° to each other (camera 516 elevation $\theta_C=-45°$, azimuth $\phi_C=150°$; camera 517 elevation $\theta_C=-45°$ and azimuth $\phi_C=-150°$; camera 518 elevation $\theta_C=-45°$ and azimuth $\phi_C=-30°$; camera 519 elevation $\theta_C=-45°$ and azimuth $\phi_C=30°$).

Each camera 516, 517, 518, 519 samples the scan angles of the scan drive 513 over a range of 45° in order to achieve a one quarter circle scan pattern arc. The uneven azimuthal spacing of the cameras 516, 517, 518, 519 around the scanning mirror structure 512 may be advantageous in terms of the timing budget of capture and the simultaneous use of the scanning mirror structure 512 to capture images on the cameras 516, 517, 518, 519. Scan drive 511 generates the same scan pattern that would be achieved with scan drive unit 301 sampling scan angles in the range −45° to 45°. The use of additional cameras may be advantageous as it reduces the size of scanning mirror structure 512 required to achieve the capture. This arrangement may also be advantageous in terms of robustness of yaw of the aerial vehicle 110 as the scan pattern captures a full 360° range in azimuth.

FIG. 60e shows various mirror geometries calculated for the scan drive unit 511. These include the minimum geometry ("min"), a dilated minimum geometry that is extended by 5 mm beyond the minimum geometry around its perimeter ("dilate") and a dilated convex geometry that is the convex hull of the dilated minimum geometry ("convex"). FIG. 60f shows the dilated convex geometry again ("convex"), and also an extended geometry that might be required if the range of scan angles is extended by 7.5° at each end of the scan angle range ("over") to increase the overlap region between the scan patterns.

FIGS. 61a and 61b show perspective views of a scan drive unit 521 with four cameras 526, 527, 528, 529 that may be used to capture four scan patterns 175, 176, 177, 178 with circular arcs, as shown in FIGS. 61c and 61d). Top down and oblique views of the scan patterns 175, 176, 177, 178 from the four cameras 526, 527, 528, 529 of scan drive unit 521 are shown in FIGS. 61c and 61d.

Scan drive unit 521 comprises a scanning mirror structure 522 attached to a scan drive 523 on a vertical scan axis (elevation $\theta_S=-90°$ and azimuth $\phi_S=0°$). In one embodiment, the scanning mirror structure 522 is double-sided. The geometric illustration in FIGS. 61a and 61b show the configuration with the scan angle of the scan drive 523 set to 0° so that the first mirror surface 524 is oriented (elevation $\theta_M^1=0°$ and azimuth $\phi_M^1=0°$) with its normal directed between camera 526 and camera 527 along the y-axis. A second mirror surface 525 is mounted on the opposite side of the scanning mirror structure 522 and directed between camera 528 and camera 529. The cameras 526, 527, 528, 529 are oriented downward at an oblique angle and azimuthally spaced 90° to each other (camera 526 elevation $\theta_C=-47°$, azimuth $\phi_C=135°$; camera 527 elevation $\theta_C=-43°$ and azimuth $\phi_C=45°$; camera 528 elevation $\theta_S=-47°$ and azimuth $\phi_C=-45°$; camera 529 elevation $\theta_C=-43°$ and azimuth $\phi_C=-43°$.

Each camera 526, 527, 528, 529 samples the scan angles of the scan drive 523 over a range of 60° in order to achieve a one third circle scan pattern arc. The use of two different elevations of cameras 529, 527 compared to cameras 526, 528 directed at the shared scanning mirror structure 522 means that the arcs do not overlap and capture complementary regions of the object area to the sides of the aerial vehicle 110. This may be advantageous in terms of the efficiency of the scanning camera system as a larger flight line spacing may be used while maintaining some required distribution of oblique image captures to the left and right sides of the aerial vehicle 110. It may also be advantageous in improving the quality of image capture for oblique imagery and the generation of a 3D model. This arrangement may also be advantageous in terms of robustness of yaw of the aerial vehicle 110 as the scan pattern captures a full 360° range in azimuth.

FIG. 61e shows various mirror geometries calculated for the scan drive unit 521. These include the minimum geometry ("min"), a dilated minimum geometry that is extended by 5 mm beyond the minimum geometry around its perimeter ("dilate") and a dilated convex geometry that is the convex hull of the dilated minimum geometry ("convex"). FIG. 61f shows the dilated convex geometry again ("convex"), and also an extended geometry that might be required if the range of scan angles is extended by 7.5° at each end of the scan angle range ("over") to increase the overlap region between the scan patterns.

Scan drive unit 530 has the same geometry as scan drive unit 302, but samples a modified range of scan angles from −10.25° to 10.25° to generate the short straight scan pattern 179 shown in FIGS. 62 and 62b. Scan pattern 179 may be used to generate high quality vertical image captures. Scanning camera system 531 comprises scan drive units 530, 511 to generate the combined scan pattern shown in FIGS. 62c and 62d. Scanning camera system 532 comprises scan drive units 530, 521 to generate the combined scan pattern shown in FIGS. 62e and 62f.

Scan drive unit 535 has the same geometry as scan drive unit 380, but samples a reduced range of scan angles from −22.5° to 22.5° to generate the short straight scan pattern 180 shown in FIGS. 63a and 63b. Scan pattern 180 may be used to generate high quality vertical image captures. Scanning camera system 536 comprises scan drive units 535 and scan drive unit 511 to generate the combined scan pattern shown in FIGS. 63c and 63d. Scanning camera system 537 comprises scan drive units 535, 521 to generate the combined scan pattern shown in FIGS. 63e and 63f.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may also be as set forth in the following parentheticals.

(1) An imaging system, comprising: a first camera configured to capture a first set of oblique images along a first scan path on an object area; a second camera configured to capture a second set of oblique images along a second scan path on the object area; a scanning mirror structure including at least one mirror surface; and a drive coupled to the scanning mirror structure and configured to rotate the scanning mirror structure about a scan axis based on a scan angle, wherein the first camera has an optical axis set at an oblique angle to the scan axis and includes a lens to focus a first imaging beam reflected from the scanning mirror structure to an image sensor of the first camera, the second camera has an optical axis set at an oblique angle to the scan axis and includes a lens to focus a second imaging beam reflected from the scanning mirror structure to an image sensor of the second camera, at least one of an elevation and azimuth of the first imaging beam and at least one of an elevation and azimuth of the second imaging beam vary according to the scan angle, the image sensor of the first camera captures the first set of oblique images along the first scan path by sampling the first imaging beam at first values of the scan angle, and the image sensor of the second camera captures the second set of oblique images along the second scan path by sampling the second imaging beam at second values of the scan angle.

(2) The system according to (1), wherein the at least one mirror surface includes a first mirror surface and a second mirror surface that is substantially opposite the first mirror surface, and the first imaging beam is reflected from the first mirror surface and the second imaging beam is reflected from the second mirror surface.

(3) The system according to any (1) to (2), wherein the first scan angle for the first camera is the same as the first scan angle for the second camera.

(4) The system according to any (1) to (3), wherein the image sensor of the first camera and the image sensor of the second camera capture respective images of the first set of oblique images and the second set of oblique images simultaneously.

(5) The system according to any (1) to (4), wherein a geometry of the at least one mirror surface is determined based on, at least partially, at least one of one or more predetermined orientations of the image sensor of the first camera and one or more predetermined orientations of the image sensor of the second camera; and a set of scan angles of the scanning mirror structure.

(6) The system according to any (1) to (5), wherein the scanning mirror structure is symmetric about the scan axis.

(7) The system according to any (1) to (6), wherein the scanning mirror structure is asymmetric about the scan axis.

(8) The system according to any (1) to (7), wherein the scan angle is a tilt angle of the scanning mirror structure.

(9) The system according to any (1) to (8), wherein steps of the tilt angle are determined based on sizes of the image sensors and focal lengths of the first and second camera.

(10) The system according to any (1) to (9), wherein the first camera and the second camera are inclined towards the scanning mirror structure at predetermined angles.

(11) The system according to any (1) to (10), wherein the predetermined angles are substantially 45 degrees.

(12) The system according to any (1) to (11), wherein the first scan path and the second scan path are symmetric.

(13) The system according to any (1) to (12), wherein an azimuth of the first camera is substantially 180 degrees from an azimuth of the second camera.

(14) The system according to any (1) to (13), wherein the first scan path and the second scan path are curved.

(15) The system according to any (1) to (14), further comprising: at least one third camera configured to capture vertical images; and at least one mirror configured to direct a third imaging beam, corresponding to the vertical images, to the at least one third camera.

(16) The system according to any (1) to (15), further comprising: a third camera configured to capture a third set of oblique images along a third scan path on the object area, wherein the third camera includes a lens to focus a third imaging beam reflected from the scanning mirror structure to an image sensor of the third camera.

(17) The system according to any (1) to (16), further comprising: a fourth camera configured to capture a fourth set of oblique images along a fourth scan path on the object area, wherein the fourth camera includes a lens to focus a fourth imaging beam reflected from the scanning mirror structure to an image sensor of the fourth camera.

(18) The system according to any (1) to (17), further comprising: a third camera configured to capture a third set of images; and a second scanning mirror structure configured to direct a third imaging beam, corresponding to the third set of images, to be received by the third camera.

(19) The system according to any (1) to (18), further comprising: a fourth camera configured to capture a fourth set of images; and a third scanning mirror structure configured to direct a fourth imaging beam, corresponding to the fourth set of images, to be received by the fourth camera.

(20) The system according to any (1) to (19), further comprising a third camera configured to capture a third set of oblique images along a third scan path on an object area; a fourth camera configured to capture a fourth set of oblique images along a fourth scan path on the object area; a second scanning mirror structure including at least one mirror surface; and a second drive coupled to the second scanning mirror structure and configured to rotate the second scanning mirror structure about a second scan axis based on a second scan angle, wherein the third camera has an optical axis set at an oblique angle to the second scan axis and includes a lens to focus a third imaging beam reflected from the second scanning mirror structure to an image sensor of the third camera, the fourth camera has an optical axis set at an oblique angle to the second scan axis and includes a lens to focus a fourth imaging beam reflected from the second scanning mirror structure to an image sensor of the fourth camera, at least one of an elevation and azimuth of the third imaging beam and at least one of an elevation and azimuth of the fourth imaging beam vary according to the second scan angle, the image sensor of the third camera captures the third set of oblique images along the third scan path by sampling the third imaging beam at first values of the second scan angle, and the image sensor of the fourth camera captures the fourth set of oblique images along the fourth scan path by sampling the fourth imaging beam at second values of the second scan angle.

(21) The system according to any (1) to (20), further comprising a fifth camera configured to capture a fifth set of oblique images along a fifth scan path on an object area; a sixth camera configured to capture a sixth set of oblique images along a sixth scan path on the object area; a third scanning mirror structure including at least one mirror surface; and a third drive coupled to the third scanning mirror structure and configured to rotate the third scanning mirror structure about a third scan axis based on a third scan angle, wherein the fifth camera has an optical axis set at an oblique angle to the third scan axis and includes a lens to focus a fifth imaging beam reflected from the third scanning mirror structure to an image sensor of the fifth camera, the sixth camera has an optical axis set at an oblique angle to the third scan axis and includes a lens to focus a sixth imaging beam reflected from the third scanning mirror structure to an image sensor of the sixth camera, at least one of an elevation and azimuth of the fifth imaging beam and at least one of an elevation and azimuth of the sixth imaging beam vary according to the third scan angle, the image sensor of the fifth camera captures the fifth set of oblique images along the fifth scan path by sampling the fifth imaging beam at third values of the third scan angle, and the image sensor of the sixth camera captures the sixth set of oblique images along the sixth scan path by sampling the sixth imaging beam at fourth values of the third scan angle

(22) An imaging method comprising: reflecting a first imaging beam from an object area using a scanning mirror structure having at least one mirror surface to a first image sensor of a first camera to capture a first set of oblique images along a first scan path of the object area, the first camera comprising a first lens to focus the first imaging beam to the first image sensor; reflecting a second imaging beam from the object area using the scanning mirror structure to a second image sensor of a second camera to capture a second set of oblique images along a second scan path of the object area, the second camera comprising a second lens to focus the second imaging beam to the second image sensor; rotating the scanning mirror structure about a scan axis based on a scan angle, wherein at least one of an elevation and azimuth of the each of the first and second imaging beams vary according to the scan angle; setting an optical axis of each of the first and second cameras at an oblique angle to the scan axis; and sampling the first and second imaging beams at values of the scan angle.

(23) The method according to (22), wherein the at least one mirror surface includes a first mirror surface and a second mirror surface that is substantially opposite the first mirror surface, the method comprising reflecting the first imaging beam from the first mirror surface; and reflecting the second imaging beam from the second mirror surface.

(24) The method according to any (22) to (23), wherein the scan angle for the first camera is the same as the scan angle for the second camera.

(25) The method according to any (22) to (24), comprising simultaneously capturing the first set of oblique images and the second set of oblique images.

(26) The method according to any (22) to (25), comprising determining a geometry of the at least one mirror surface based on, at least partially, at least one of one or more predetermined orientations of the image sensor of the first camera and one or more predetermined orientations of the image sensor of the second camera; and a set of scan angles of the scanning mirror structure.

(27) The method according to any (22) to (26), wherein the scanning mirror structure is symmetric about the scan axis.

(28) The method according to any (22) to (27), wherein the scanning mirror structure is asymmetric about the scan axis.

(29) The method according to any (22) to (28), wherein the scan angle is a tilt angle of the scanning mirror structure.

(30) The method according to any (22) to (29), comprising determining steps of the tilt angle based on sizes of the image sensors and focal lengths of the first and second camera.

(31) The method according to any (22) to (30), wherein the first camera and the second camera are inclined towards the scanning mirror structure at predetermined angles.

(32) The method according to any (22) to (31), wherein the predetermined angles are substantially 45 degrees.

(33) The method according to any (22) to (32), wherein the first scan path and the second scan path are symmetric.

(34) The method according to any (22) to (33), wherein an azimuth of the first camera is substantially 180 degrees from an azimuth of the second camera.

(35) The method according to any (22) to (34), wherein the first scan path and the second scan path are curved.

(36) The method according to any (22) to (35), further comprising: capturing vertical images using at least one third camera and at least one mirror configured to direct a third imaging beam from the object area, corresponding to the vertical images, to the at least one third camera.

(37) The method according to any (22) to (36), further comprising: capturing a third set of oblique images along a third scan path on the object area using a third camera, the third camera including a lens to focus a third imaging beam reflected from the scanning mirror structure to an image sensor of the third camera.

(38) The method according to any (22) to (37), further comprising: capturing a fourth set of oblique images along a fourth scan path on the object area using a fourth camera, the fourth camera including a lens to focus a fourth imaging beam reflected from the scanning mirror structure to an image sensor of the fourth camera.

(39) The method according to any (22) to (38), further comprising: capturing a third set of images using a third camera and a second scanning mirror structure configured to direct a third imaging beam, corresponding to the third set of images, to be received by the third camera.

(40) The method according to any (22) to (39), further comprising: capturing a fourth set of images using a fourth camera and a third scanning mirror structure configured to direct a fourth imaging beam, corresponding to the fourth set of images, to be received by the fourth camera.

(41) The method according to any (22) to (40), further comprising: reflecting a third imaging beam from the object area using a second scanning mirror structure having at least one mirror surface to a third image sensor of a third camera to capture a third set of oblique images along a third scan path of the object area, the third camera comprising a third lens to focus the third imaging beam to the third image sensor; reflecting a fourth imaging beam from the object area using the second scanning mirror structure to a fourth image sensor of a fourth camera to capture a fourth set of oblique images along a fourth scan path of the object area, the fourth camera comprising a fourth lens to focus the fourth imaging beam to the fourth image sensor; rotating the second scanning mirror structure about a second scan axis based on a second scan angle, wherein at least one of an elevation and azimuth of the each of the third and fourth imaging beams vary according to the second scan angle; setting an optical axis of each of the third and fourth cameras at an oblique angle to the second scan axis; and sampling the third and fourth imaging beams at values of the second scan angle.

(42) the method according to any (22) to (41), further comprising: reflecting a fifth imaging beam from the object area using a third scanning mirror structure having at least one mirror surface to a fifth image sensor of a fifth camera to capture a fifth set of oblique images along a fifth scan path of the object area, the fifth camera comprising a fifth lens to focus the fifth imaging beam to the fifth image sensor; reflecting a sixth imaging beam from the object area using the third scanning mirror structure to a sixth image sensor of a sixth camera to capture a sixth set of oblique images along a sixth scan path of the object area, the sixth camera comprising a sixth lens to focus the sixth imaging beam to the sixth image sensor; rotating the third scanning mirror structure about a third scan axis based on a third scan angle, wherein at least one of an elevation and azimuth of the each of the fifth and sixth imaging beams vary according to the third scan angle; setting an optical axis of each of the fifth and sixth cameras at an oblique angle to the third scan axis; and sampling the fifth and sixth imaging beams at values of the third scan angle.

(43) An imaging system installed on a vehicle, comprising: a first camera configured to capture a first set of oblique images along a first scan path on an object area; a scanning mirror structure including at least one mirror surface; a drive coupled to the scanning mirror structure and configured to rotate the scanning mirror structure about a scan axis based on a scan angle; and processing circuitry configured to set the scan angle of the scanning mirror structure based on, at least in part, a yaw angle of the vehicle, wherein the first camera has an optical axis set at an oblique angle to the scan axis and includes a lens to focus a first imaging beam reflected from the scanning mirror structure to an image sensor of the first camera, an azimuth of the first imaging beam captured by the first camera varies according to the scan angle and the yaw angle of the vehicle, and the image sensor of the first camera captures the first set of oblique images along the first scan path by sampling the first imaging beam at values of the scan angle.

(44) The system according to (43), further comprising a second camera configured to capture a second set of oblique images along a second scan path on the object area, wherein the second camera has an optical axis set at an oblique angle to the scan axis and includes a lens to focus a second imaging beam reflected from the scanning mirror structure to an image sensor of the second camera, an azimuth of the second imaging beam varies according to the scan angle and the yaw angle of the vehicle, and the image sensor of the second camera captures the second set of oblique images along the second scan path by sampling the second imaging beam at second values of the scan angle.

(45) The system according to any (43) to (44), wherein the scanning mirror structure has opposing first and second mirror surfaces; and the first mirror surface reflects the first imaging beam to the first camera and the second mirror surface reflects the second imaging beam to the second camera simultaneously.

(46) The system according to any (43) to (45), wherein the processing circuitry is configured to set the scan angle based on a difference between the yaw angle of the vehicle and a preferred yaw angle.

(47) The system according to any (43) to (46), wherein the preferred yaw angle is zero.

(48) The system according to any (43) to (47), wherein the processing circuitry corrects the scan angle, based on half of the difference between the yaw angle of the vehicle and the preferred yaw angle, in a direction opposite the yaw angle of the vehicle.

(49) The system according to any (43) to (48), wherein the vehicle is an aerial vehicle, and the processing circuitry adjusts the scan angle to account for different yaw angles of the aerial vehicle for at least one of during and between one or more flight lines.

(50) The system according to any (43) to (49), further comprising a stabilization platform configured to correct for roll and pitch, but not yaw, of the vehicle, the imaging system located within the stabilization platform.

(51) A method comprising reflecting a first imaging beam from an object area using a scanning mirror structure having at least one mirror surface to a first image sensor of a first camera to capture a first set of oblique images along a first scan path of the object area, the first camera comprising a lens to focus the first imaging beam to the first image sensor; rotating the scanning mirror structure about a scan axis based on a scan angle, wherein values of the scan angle are determined based on, at least in part, a yaw angle of a vehicle including the scanning mirror structure, wherein an azimuth of the first imaging beam captured by the first camera varies according to the scan angle and the yaw angle of the vehicle; and sampling the first imaging beam at the values of the scan angle.

(52) The method of (51), further comprising reflecting a second imaging beam from the object area using the scanning mirror structure to a second image sensor of a second camera to capture a second set of oblique images along a second scan path of the object area, wherein an azimuth of the second imaging beam varies according to the scan angle and the yaw angle of the vehicle, and the second camera comprises a second lens to focus the second imaging beam to the second image sensor; and sampling the second imaging beam at the values of the scan angle.

(53) The method of any (51) to (52, wherein the scanning mirror structure has opposing first and second mirror surfaces; the method comprising: simultaneously reflecting the first imaging beam to the first camera and the second imaging beam to the second camera.

(54) The method of any (51) to (53), comprising determining the values of the scan angle based on, at least in part, a difference between the yaw angle of the vehicle and a preferred yaw angle.

(55) The method of any (51) to (54), wherein the preferred yaw angle is zero.

(56) The method of any (51) to (55), further comprising correcting the scan angle, based on half of the difference between the yaw angle of the vehicle and the preferred yaw angle, in a direction opposite the yaw angle of the vehicle.

(57) The method of any (51) to (56), further comprising adjusting the scan angle to account for different yaw angles of the vehicle for at least one of during and between one or more flight lines, wherein the vehicle is an aerial vehicle.

(58) The method of any (51) to (57), further comprising correcting for roll and pitch, but not yaw, of the vehicle using a stabilization platform.

LISTING OF REFERENCE NUMERALS

110: aerial vehicle
111: scan pattern
112: scan pattern
113: scan pattern
114: scan pattern
115: projective geometry
116: grid line
117: grid line
118: grid line
119: grid line
121: scan pattern
122: scan pattern
123: scan pattern
124: scan pattern
125: frame
126: frame
127: frames
128: frames
130: scan pattern
131: scan pattern
132: scan pattern
133: scan pattern
135: scan pattern
136: scan pattern
137: scan pattern
138: scan pattern
139: scan pattern
140: scan pattern
141: scan pattern
142: scan pattern
150: scan pattern
151: scan pattern
152: scan pattern
153: scan pattern
155: scan pattern
156: scan pattern
157: scan pattern
160: scan pattern
161: scan pattern 162: scan pattern
163: scan pattern
165: scan pattern
170: scan pattern
171: scan pattern
172: scan pattern
173: scan pattern
175: scan pattern
176: scan pattern
177: scan pattern
178: scan pattern
179: scan pattern
180: scan pattern
210: flight line
211: flight line
212: flight line
213: flight line
214: flight line
215: flight line
220: turning path
221: turning path
222: turning path
223: turning path
224: turning path
225: turning path
226: flight line spacing
230: viewing direction
231: viewing direction
232: viewing direction
233: viewing direction
234: viewing direction
235: viewing direction
236: circle of viewing directions at fixed elevations
237: circle of viewing directions at fixed elevations
238: circle of viewing directions at fixed elevations
240: lens
241: optical plate
242: optical plate
243: sensor
244: optical plate
245: optical plate
246: optical plate
250: camera
251: area
252: mirror
253: survey hole
254: location
255: beam
256: mirror
257: beam
258: location
259: beam
260: low-reflective material
261: beam
262: beam
263: beam
265: low-reflective material
266: mirror
271: sensor location
272: sensor location
273: sensor location
274: sensor location
275: sensor location
276: sensor location
277: sensor location
278: sensor location
279: sensor location
281: rotation
282: rotation
283: rotation
284: rotation
290: light ray
291: optical plate
292: front surface
293: rear surface
294: curved path of viewing directions in the hemisphere
295: curved path of viewing directions in the hemisphere
296: curved path of viewing directions in the hemisphere
297: curved path of viewing directions in the hemisphere
300: scanning camera system
301: scan drive unit
302: scan drive unit
303: scan drive unit
305: survey hole
310: camera
311: camera
312: scanning mirror structure
313: scan drive
314: mirror surface
315: mirror surface
316: axis of rotation
317: low-reflective material
321: camera
322: scan drive
323: primary mirror
324: secondary mirror
325: camera
326: scan drive
327: primary mirror
328: secondary mirror
350: scan drive unit
351: scan drive unit
352: scan drive unit
353: scan drive unit
354: scanning camera system
355: scanning camera system
356: scan drive
357: primary mirror
358: secondary mirror
360: scan drive unit
361: scan drive unit
362: scan drive unit
363: scan drive unit
364: scanning camera system
365: camera
366: scan drive
367: primary mirror
368: secondary mirror
369: camera
370: scan drive unit
371: scan drive unit
372: scan drive unit
373: scan drive unit
375: camera
376: scan drive
377: primary mirror
378: secondary mirror
379: scanning camera system
380: scan drive unit
381: scanning camera system
382: scanning camera system
383: primary mirror
384: secondary mirror
385: scan drive unit 386: scan drive unit
387: scan drive unit
388: scan drive unit
389: scan drive unit
390: scan drive unit
391: scanning camera system
392: scanning camera system
393: scanning camera system
394: scanning camera system
395: scanning camera system
401: auto-pilot
402: pilot display
403: pilot input
404: GNSS receiver
405: system control
406: data storage
407: stabilisation platform
408: scanning camera system
409: IMU
410: camera (s)
411: scan drive unit
412: scan drive unit
413: scanning mirror
414: camera
415: motion compensation unit
416: camera
417: motion compensation unit
430: scan angle
431: mirror drive
432: mirror control
433: mirror sensor
434: scan drive unit parameters
435: motion compensation data
436: IMU attitude data
437: mirror control data
438: focus data
439: pixel data
440: ROI pixel velocity estimator
450: geometry estimator module
451: projection geometry
452: forward motion pixel velocity estimator
453: forward motion pixel velocity
454: attitude rate pixel velocity estimator
455: attitude rate pixel velocity
456: attitude rate pixel velocity estimator
457: ROI pixel velocity
458: motion compensation control
459: motion compensation sensor
460: motion compensation drive
461: motion compensation calibration data
462: ground velocity
463: latitude/longitude data
464: altitude data
465: DEM data
466: IMU attitude data
467: SDU geometry data
468: IMU attitude rates
469: ROI images
470: gimbal angles
471: survey hole geometry
472: mirror data
473: vignetting data
474: vignetting analysis process
475: processing step
476: refinement step
477: camera poses, positions and additional data
478: 3D surface reconstruction
479: orthomosaic generation
480: vignetting compensation
482: orthomosaic
501: scan drive unit
502: scanning mirror structure
503: scan drive
504: mirror surface
505: mirror surface
506: camera
507: camera
508: camera
509: scan drive unit
510: scanning camera system
511: scan drive unit
512: scanning mirror structure
513: scan drive
514: mirror surface
515: mirror surface
516: camera
517: camera
518: camera
519: camera
521: scan drive unit
522: scanning mirror structure
523: scan drive
524: mirror surface
525: mirror surface
526: camera
527: camera
528: camera
529: camera
530: scan drive unit
531: scanning camera system
532: scanning camera system
535: scan drive unit
536: scanning camera system
537: scanning camera system

The invention claimed is:

1. An imaging system, comprising:
a first camera configured to capture a first set of oblique images along a first scan path on an object area;
a second camera configured to capture a second set of oblique images along a second scan path on the object area;
a scanning mirror structure including at least one mirror surface; and
a drive coupled to the scanning mirror structure and configured to rotate the scanning mirror structure about a scan axis based on a scan angle, wherein
the first camera has an optical axis set at an oblique angle to the scan axis and includes a lens to focus a first imaging beam reflected from the scanning mirror structure to an image sensor of the first camera,
the second camera has an optical axis set at an oblique angle to the scan axis and includes a lens to focus a second imaging beam reflected from the scanning mirror structure to an image sensor of the second camera,
at least one of an elevation and azimuth of the first imaging beam and at least one of an elevation and azimuth of the second imaging beam vary according to the scan angle,
the image sensor of the first camera captures the first set of oblique images along the first scan path by sampling the first imaging beam at first values of the scan angle, the image sensor of the second camera captures the second set of oblique images along the second scan path by sampling the second imaging beam at second values of the scan angle, the at least one mirror surface includes a first mirror surface and a second mirror surface that is substantially opposite the first mirror surface, and the first imaging beam is reflected from the first mirror surface and the second imaging beam is reflected from the second mirror surface.

2. The imaging system according to claim 1, wherein the first scan angle for the first camera is the same as the first scan angle for the second camera.

3. The imaging system according to claim 1, wherein the image sensor of the first camera and the image sensor of the second camera capture respective images of the first set of oblique images and the second set of oblique images simultaneously.

4. The imaging system according to claim 1, wherein a geometry of the at least one mirror surface is determined based on, at least partially, at least one of
- one or more predetermined orientations of the image sensor of the first camera and one or more predetermined orientations of the image sensor of the second camera; and
- a set of scan angles of the scanning mirror structure.

5. The imaging system according to claim 1, wherein the scanning mirror structure is symmetric about the scan axis.

6. The imaging system according to claim 1, wherein the scanning mirror structure is asymmetric about the scan axis.

7. The imaging system according claim 1, wherein the scan angle is a tilt angle of the scanning mirror structure.

8. The imaging system according to claim 7, wherein steps of the tilt angle are determined based on sizes of the image sensors and focal lengths of the first and second camera.

9. The imaging system according to claim 1, wherein the first camera and the second camera are inclined towards the scanning mirror structure at predetermined angles.

10. The imaging system according to claim 9, wherein the predetermined angles are 45 degrees.

11. The imaging system according to claim 1, wherein the first scan path and the second scan path are symmetric.

12. The imaging system according to claim 1, wherein an azimuth of the first camera is 180 degrees from an azimuth of the second camera.

13. The imaging system according to claim 1, wherein the first scan path and the second scan path are curved.

14. The imaging system according to claim 1, further comprising:
- at least one third camera configured to capture vertical images; and
- at least one mirror configured to direct a third imaging beam, corresponding to the vertical images, to the at least one third camera.

15. The imaging system according to claim 1, further comprising:
- a third camera configured to capture a third set of oblique images along a third scan path on the object area, wherein
- the third camera includes a lens to focus a third imaging beam reflected from the scanning mirror structure to an image sensor of the third camera.

16. The imaging system according to claim 15, further comprising:
- a fourth camera configured to capture a fourth set of oblique images along a fourth scan path on the object area, wherein
- the fourth camera includes a lens to focus a fourth imaging beam reflected from the scanning mirror structure to an image sensor of the fourth camera.

17. The imaging system according to claim 1, further comprising:
- a third camera configured to capture a third set of images; and
- a second scanning mirror structure configured to direct a third imaging beam, corresponding to the third set of images, to be received by the third camera.

18. The imaging system according to claim 17, further comprising:
- a fourth camera configured to capture a fourth set of images; and
- a third scanning mirror structure configured to direct a fourth imaging beam, corresponding to the fourth set of images, to be received by the fourth camera.

19. The imaging system according to claim 1, further comprising
- a third camera configured to capture a third set of oblique images along a third scan path on an object area;
- a fourth camera configured to capture a fourth set of oblique images along a fourth scan path on the object area;
  - a second scanning mirror structure including at least one mirror surface; and
- a second drive coupled to the second scanning mirror structure and configured to rotate the second scanning mirror structure about a second scan axis based on a second scan angle, wherein
- the third camera has an optical axis set at an oblique angle to the second scan axis and includes a lens to focus a third imaging beam reflected from the second scanning mirror structure to an image sensor of the third camera,
- the fourth camera has an optical axis set at an oblique angle to the second scan axis and includes a lens to focus a fourth imaging beam reflected from the second scanning mirror structure to an image sensor of the fourth camera,
- at least one of an elevation and azimuth of the third imaging beam and at least one of an elevation and azimuth of the fourth imaging beam vary according to the second scan angle,
- the image sensor of the third camera captures the third set of oblique images along the third scan path by sampling the third imaging beam at first values of the second scan angle, and
- the image sensor of the fourth camera captures the fourth set of oblique images along the fourth scan path by sampling the fourth imaging beam at second values of the second scan angle.

20. The imaging system according to claim 19, further comprising
- a fifth camera configured to capture a fifth set of oblique images along a fifth scan path on an object area;
- a sixth camera configured to capture a sixth set of oblique images along a sixth scan path on the object area;
  - a third scanning mirror structure including at least one mirror surface; and
- a third drive coupled to the third scanning mirror structure and configured to rotate the third scanning mirror structure about a third scan axis based on a third scan angle, wherein the fifth camera has an optical axis set at an oblique angle to the third scan axis and includes a lens to focus a fifth imaging beam reflected from the third scanning mirror structure to an image sensor of the fifth camera, the sixth camera has an optical axis set at an oblique angle to the third scan axis and includes a lens to focus a sixth imaging beam reflected from the third scanning mirror structure to an image sensor of the sixth camera, at least one of an elevation and azimuth of the fifth imaging beam and at least one of an elevation and azimuth of the sixth imaging beam vary according to the third scan angle, the image sensor of the fifth camera captures the fifth set of oblique images along the fifth scan path by sampling the fifth imaging beam at third values of the third scan angle, and the image sensor of the sixth camera captures the sixth set of oblique images along the sixth scan path by sampling the sixth imaging beam at fourth values of the third scan angle.

21. An imaging method comprising:

reflecting a first imaging beam from an object area using a scanning mirror structure having at least one mirror surface to a first image sensor of a first camera to capture a first set of oblique images along a first scan path of the object area, the first camera comprising a first lens to focus the first imaging beam to the first image sensor;

reflecting a second imaging beam from the object area using the scanning mirror structure to a second image sensor of a second camera to capture a second set of oblique images along a second scan path of the object area, the second camera comprising a second lens to focus the second imaging beam to the second image sensor;

rotating the scanning mirror structure about a scan axis based on a scan angle, wherein at least one of an elevation and azimuth of the each of the first and second imaging beams vary according to the scan angle;

setting an optical axis of each of the first and second cameras at an oblique angle to the scan axis; and sampling the first and second imaging beams at values of the scan angle, wherein the at least one mirror surface includes a first mirror surface and a second mirror surface that is substantially opposite the first mirror surface, the method further comprising:

reflecting the first imaging beam from the first mirror surface; and reflecting the second imaging beam from the second mirror surface.

22. The method according to claim 21, wherein the scan angle for the first camera is the same as the scan angle for the second camera.

23. The method according to claim 21, comprising simultaneously capturing the first set of oblique images and the second set of oblique images.

24. The method according to claim 21, comprising determining a geometry of the at least one mirror surface based on, at least partially, at least one of one or more predetermined orientations of the image sensor of the first camera and one or more predetermined orientations of the image sensor of the second camera; and a set of scan angles of the scanning mirror structure.

25. The method according to claim 21, wherein the scanning mirror structure is symmetric about the scan axis.

26. The method according to claim 21, wherein the scanning mirror structure is asymmetric about the scan axis.

27. The method according claim 21, wherein the scan angle is a tilt angle of the scanning mirror structure.

28. The method according to claim 27, comprising determining steps of the tilt angle based on sizes of the image sensors and focal lengths of the first and second camera.

29. The method according to claim 21 wherein the first camera and the second camera are inclined towards the scanning mirror structure at predetermined angles.

30. The method according to claim 29, wherein the predetermined angles are 45 degrees.

31. The method according to claim 21, wherein the first scan path and the second scan path are symmetric.

32. The method according to claim 21, wherein an azimuth of the first camera is 180 degrees from an azimuth of the second camera.

33. The method according to claim 21, wherein the first scan path and the second scan path are curved.

34. The method according to claim 21, further comprising:

capturing vertical images using at least one third camera and at least one mirror configured to direct a third imaging beam from the object area, corresponding to the vertical images, to the at least one third camera.

35. The method according to claim 21, further comprising:

capturing a third set of oblique images along a third scan path on the object area using a third camera, the third camera including a lens to focus a third imaging beam reflected from the scanning mirror structure to an image sensor of the third camera.

36. The method according to claim 35, further comprising:

capturing a fourth set of oblique images along a fourth scan path on the object area using a fourth camera, the fourth camera including a lens to focus a fourth imaging beam reflected from the scanning mirror structure to an image sensor of the fourth camera.

37. The method according to claim 21, further comprising:

capturing a third set of images using a third camera and a second scanning mirror structure configured to direct a third imaging beam, corresponding to the third set of images, to be received by the third camera.

38. The method according to claim 37, further comprising:

capturing a fourth set of images using a fourth camera and a third scanning mirror structure configured to direct a fourth imaging beam, corresponding to the fourth set of images, to be received by the fourth camera.

39. The method according to claim 21, further comprising:

reflecting a third imaging beam from the object area using a second scanning mirror structure having at least one mirror surface to a third image sensor of a third camera to capture a third set of oblique images along a third scan path of the object area, the third camera comprising a third lens to focus the third imaging beam to the third image sensor;

reflecting a fourth imaging beam from the object area using the second scanning mirror structure to a fourth image sensor of a fourth camera to capture a fourth set of oblique images along a fourth scan path of the object area, the fourth camera comprising a fourth lens to focus the fourth imaging beam to the fourth image sensor;

rotating the second scanning mirror structure about a second scan axis based on a second scan angle, wherein at least one of an elevation and azimuth of the each of the third and fourth imaging beams vary according to the second scan angle;

setting an optical axis of each of the third and fourth cameras at an oblique angle to the second scan axis; and sampling the third and fourth imaging beams at values of the second scan angle.

40. The method according to claim 39, further comprising:

reflecting a fifth imaging beam from the object area using a third scanning mirror structure having at least one mirror surface to a fifth image sensor of a fifth camera to capture a fifth set of oblique images along a fifth scan path of the object area, the fifth camera comprising a fifth lens to focus the fifth imaging beam to the fifth image sensor;

reflecting a sixth imaging beam from the object area using the third scanning mirror structure to a sixth image sensor of a sixth camera to capture a sixth set of oblique images along a sixth scan path of the object area, the sixth camera comprising a sixth lens to focus the sixth imaging beam to the sixth image sensor;

rotating the third scanning mirror structure about a third scan axis based on a third scan angle, wherein at least one of an elevation and azimuth of the each of the fifth and sixth imaging beams vary according to the third scan angle;

setting an optical axis of each of the fifth and sixth cameras at an oblique angle to the third scan axis; and sampling the fifth and sixth imaging beams at values of the third scan angle.

\* \* \* \* \*